United States Patent
Akiyama et al.

(10) Patent No.: US 7,817,923 B2
(45) Date of Patent: Oct. 19, 2010

(54) OPTICAL TRANSMITTING APPARATUS, OPTICAL RECEIVING APPARATUS, AND OPTICAL COMMUNICATION SYSTEM COMPRISING THEM

(75) Inventors: Yuichi Akiyama, Kawasaki (JP); Takeshi Hoshida, Kawasaki (JP); Yutaka Kai, Kawasaki (JP); Hiroki Ooi, Kawasaki (JP); Kentaro Nakamura, Kawasaki (JP); Naoki Kuwata, Kawasaki (JP); Yoshinori Nishizawa, Kawasaki (JP); Tomoo Takahara, Kawasaki (JP); Masahiro Yuki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 836 days.

(21) Appl. No.: 11/275,420

(22) Filed: Dec. 30, 2005

(65) Prior Publication Data

US 2006/0263098 A1 Nov. 23, 2006

Related U.S. Application Data

(63) Continuation-in-part of application No. 11/256,128, filed on Oct. 24, 2005, now abandoned.

(30) Foreign Application Priority Data

| May 23, 2005 | (JP) | ............................ 2005-150219 |
| Jun. 30, 2005 | (JP) | ............................ 2005-192971 |
| Oct. 5, 2005 | (JP) | ............................ 2005-293039 |

(51) Int. Cl.
*H04B 10/04* (2006.01)

(52) U.S. Cl. ..................... 398/188; 398/183; 398/195

(58) Field of Classification Search ................. 398/140, 398/141, 182, 183, 188
See application file for complete search history.

(56) References Cited

U.S. PATENT DOCUMENTS

| 4,819,222 | A | * | 4/1989 | Kimura ................. 369/59.17 |
| 5,170,274 | A | | 12/1992 | Kuwata et al. |
| 5,363,230 | A | * | 11/1994 | Djupsjobacka .............. 398/194 |

(Continued)

FOREIGN PATENT DOCUMENTS

EP 0 594 088 4/1994

(Continued)

OTHER PUBLICATIONS

European Search Report, dated Sep. 5, 2006, and issued in related European Application No. 05028634.3-2415.

(Continued)

*Primary Examiner*—Dzung D Tran
(74) *Attorney, Agent, or Firm*—Staas & Halsey LLP

(57) ABSTRACT

A phase shift unit provides a prescribed phase difference ($\pi/2$, for example) between a pair of optical signals transmitted via a pair of arms constituting a data modulation unit. A low-frequency signal $f_0$ is superimposed on one of the optical signals. A signal of which phase is shifted by $\pi/2$ from the low-frequency signal $f_0$ is superimposed on the other optical signal. A pair of the optical signals is coupled, and a part of which is converted into an electrical signal by a photodiode. $2f_0$ component contained in the electrical signal is extracted. Bias voltage provided to the phase shift unit is controlled by feedback control so that the $2f_0$ component becomes the minimum.

37 Claims, 86 Drawing Sheets

U.S. PATENT DOCUMENTS

| | | | |
|---|---|---|---|
| 5,408,544 A | 4/1995 | Seino | |
| 5,532,857 A | 7/1996 | Gertel et al. | |
| 5,717,510 A | 2/1998 | Ishikawa et al. | |
| 5,805,321 A | 9/1998 | Ooi et al. | |
| 5,926,297 A | 7/1999 | Ishikawa et al. | |
| 5,953,466 A | 9/1999 | Kubota et al. | |
| 6,097,525 A | 8/2000 | Ono et al. | |
| 6,396,605 B1 | 5/2002 | Heflinger et al. | |
| 6,782,163 B2* | 8/2004 | Dragone | 385/37 |
| 6,807,372 B1* | 10/2004 | Lee et al. | 398/78 |
| 7,266,306 B1* | 9/2007 | Harley et al. | 398/182 |
| 2001/0005437 A1 | 6/2001 | Masuda et al. | |
| 2001/0007508 A1* | 7/2001 | Ooi et al. | 359/245 |
| 2002/0003648 A1 | 1/2002 | Kobayashi et al. | |
| 2002/0005975 A1 | 1/2002 | Nakamoto | |
| 2004/0081470 A1 | 4/2004 | Griffin | |
| 2004/0184819 A1 | 9/2004 | Vassilieva et al. | |
| 2005/0047780 A1 | 3/2005 | Hoshida et al. | |
| 2005/0074245 A1* | 4/2005 | Griffin | 398/188 |
| 2005/0100281 A1 | 5/2005 | Kim et al. | |
| 2005/0111855 A1* | 5/2005 | Bissessur | 398/188 |
| 2005/0117191 A1 | 6/2005 | Griffin | |
| 2007/0058988 A1* | 3/2007 | Yonenaga | 398/186 |

FOREIGN PATENT DOCUMENTS

| | | |
|---|---|---|
| EP | 1 004 920 | 5/2000 |
| EP | 1 513 273 | 3/2005 |
| EP | 1 528 697 | 5/2005 |
| JP | 7-199133 | 8/1995 |
| JP | 8-321805 | 12/1996 |
| JP | 9-80363 | 3/1997 |
| JP | 2642499 | 5/1997 |
| JP | 10-4196 | 1/1998 |
| JP | 10-079705 | 3/1998 |
| JP | 10-112688 | 4/1998 |
| JP | 10-228006 | 8/1998 |
| JP | 2000-162563 | 6/2000 |
| JP | 2001-27746 | 1/2001 |
| JP | 2001-244896 | 9/2001 |
| JP | 2002-23122 | 1/2002 |
| JP | 2002-23124 | 1/2002 |
| JP | 2004-511128 | 4/2004 |
| JP | 2004-516743 | 6/2004 |
| JP | 2004-318052 | 11/2004 |
| JP | 2005-080304 | 3/2005 |
| WO | WO 03/049333 | 6/2003 |

OTHER PUBLICATIONS

Extended European Search Report, mailed Feb. 5, 2007, and issued in corresponding European Patent Application No. 05028634.3-2415.

Eric A. Swanson et al., "High Sensitivity Optically Preamplified Direct Detection DPSK Receiver with Active Delay-Line Stabilization" IEEE Photonics Technology Letters, vol. 6, No. 2, Feb. 1994.

Extended European Search Report received on Jul. 10, 2007 issued in corresponding European patent application No. 07009948.6.

European Search Report issued on Nov. 10, 2008 in counterpart European Patent Application No. 08158857.6.2415.

European Search Report issued on Nov. 5, 2008 in counterpart European Patent Application No. 08158852.7.2415.

European Search Report issued on Nov. 12, 2008 in counterpart European Patent Application No. 08158854.3.2415.

Japanese Office Action issued on Jan. 6, 2009 in corresponding Japanese Patent Application No. 2005-293039.

Chinese Office Action issued on Jun. 5, 2009 in corresponding Chinese Patent Application 200610008306.X.

European Office Action dated Oct. 1, 2009 and issued in corresponding European Patent Application 09168464.7.

Japanese Office Action mailed Nov. 17, 2009, issued in corresponding Japanese Patent Application 2005-293039.

* cited by examiner

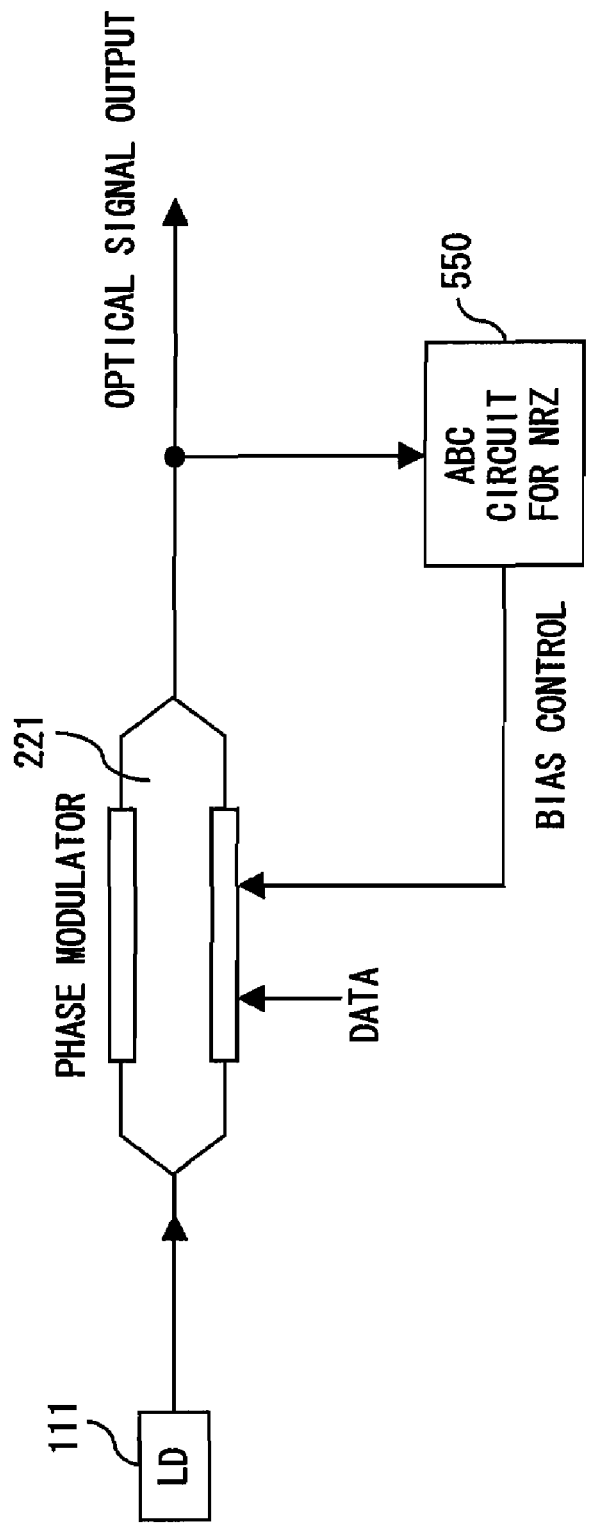
F I G. 1

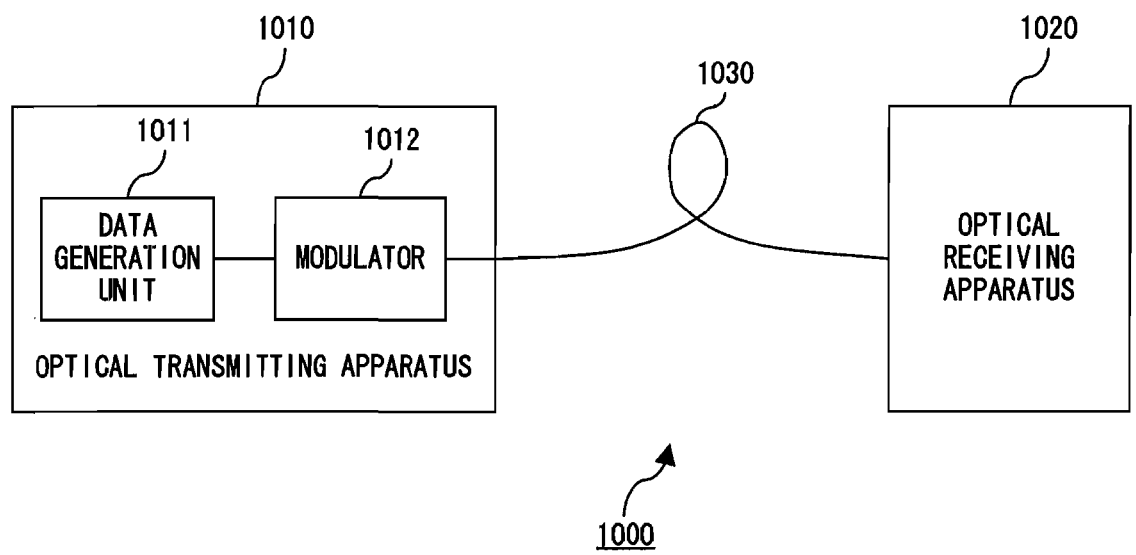
F I G. 2

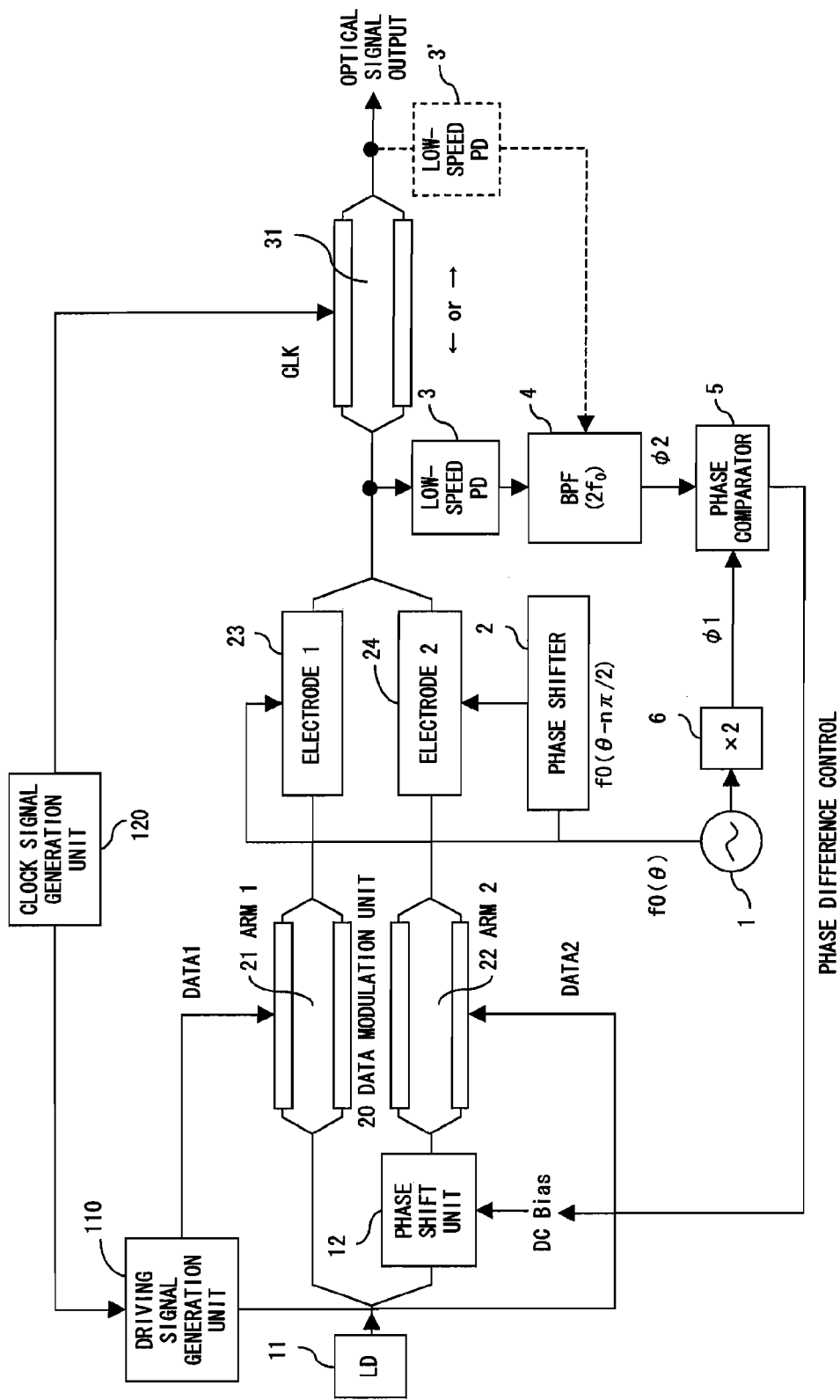
F I G. 6

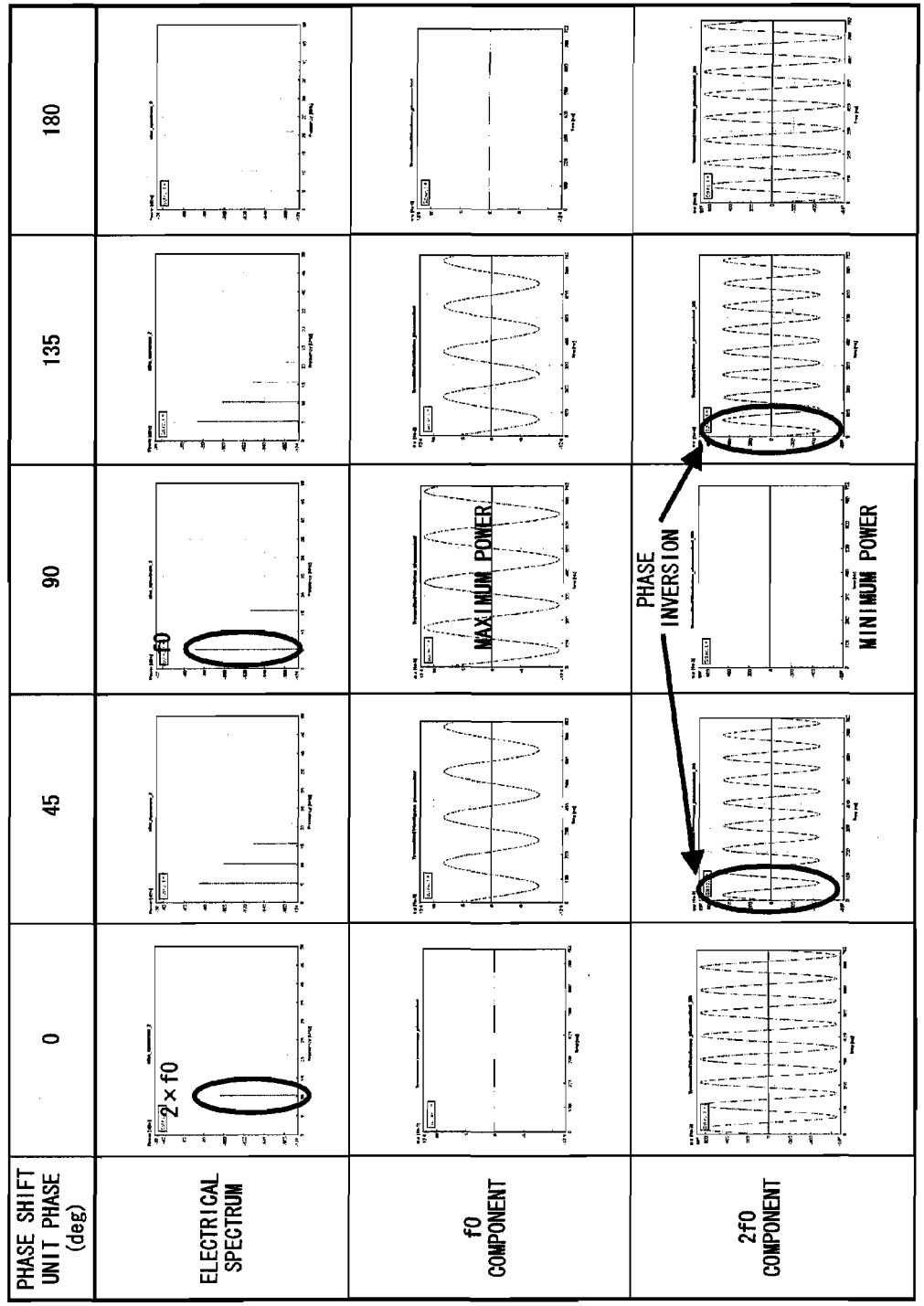
F I G. 7

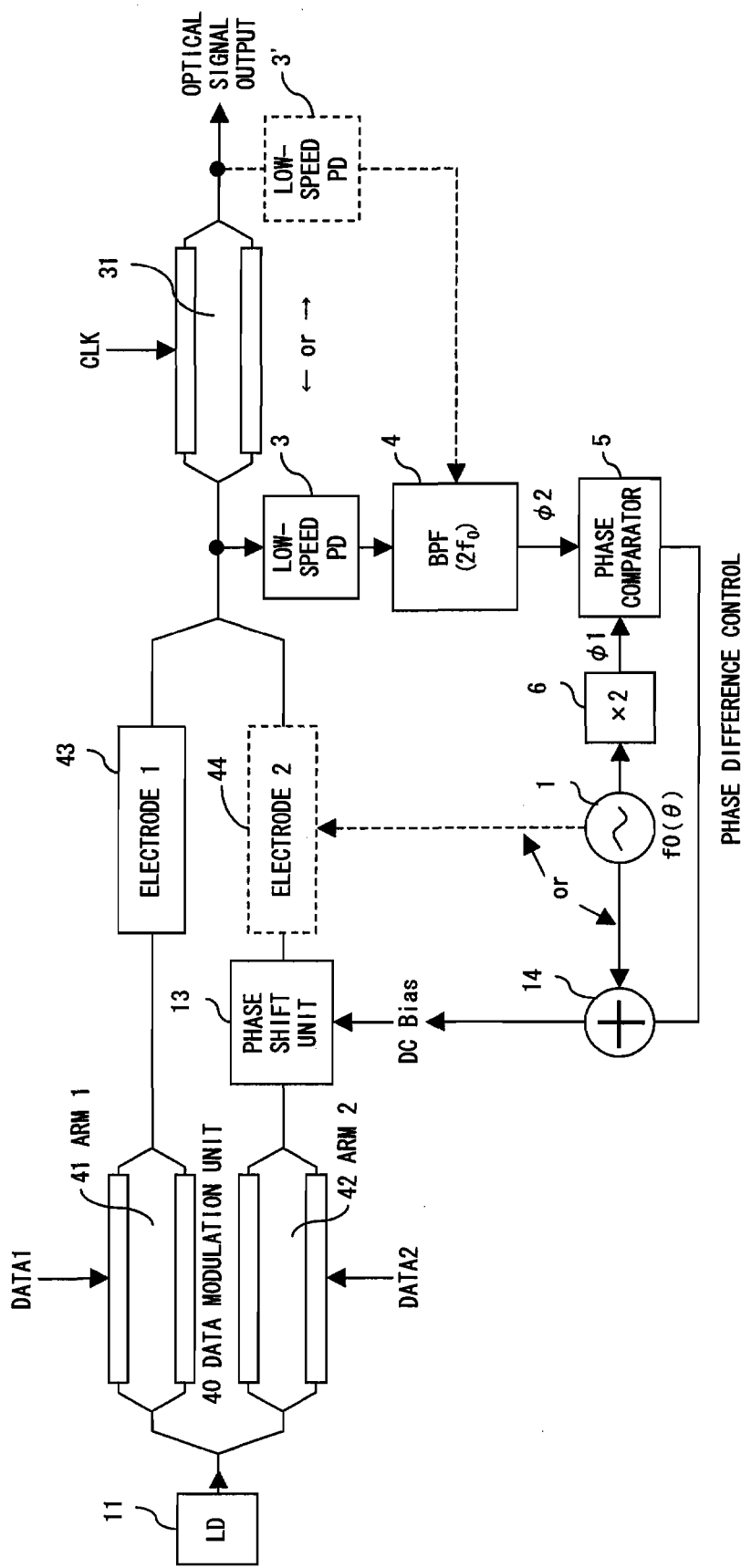
F I G. 24

| CONTROL ITEM | INPUT SIGNAL | OUTPUT SIGNAL | OPTIMAL POINT DETECTION METHOD | | FUNCTION OVERVIEW |
|---|---|---|---|---|---|
| DQPSK MODULATOR UNIT I-ARM/Q-ARM BIAS CONTROL | ELECTRICAL SIGNAL AFTER PASSING BPF (INCLUDING $f_0$ MONITOR SIGNAL) | • $f_0$ PILOT SIGNAL<br>• DC BIAS | MINIMUM VALUE OF $f_0$ COMPONENT | $f_0$ COMPONENT vs D/A OUTPUT, OPTIMAL POINT (minimum) | • CONTROL SO THAT $f_0$ COMPONENT ($Pf_0$) AFTER SYNCHRONOUS DETECTION IS MINIMUM (OPTIMAL) VALUE<br>• WHEN $f_0$ COMPONENT IS DETECTED, MOVE BIAS POINT (D/A OUTPUT VALUE) TO A DIRECTION THAT $f_0$ COMPONENT DECREASES<br>• SINCE $f_0$ SIGNAL INVERTS ITS PHASE AROUND THE OPTIMAL POINT, DETECT CHANGING DIRECTION USING THE PHASE |
| π/2 PHASE SHIFT UNIT BIAS CONTROL<br><br>(PRESENT INVENTION) | ELECTRICAL SIGNAL AFTER PASSING BPF (INCLUDING $2f_0$ AND $f_0$ MONITOR SIGNALS) | • $f_0$ PILOT SIGNAL<br>• DC BIAS | MAXIMUM VALUE OF $f_0$ COMPONENT<br><br>MINIMUM VALUE OF $2xf_0$ COMPONENT | $f_0$ COMPONENT vs D/A OUTPUT, OPTIMAL POINT (maximum)<br><br>$2xf_0$ COMPONENT vs D/A OUTPUT, OPTIMAL POINT (minimum) | • CONTROL SO THAT $f_0$ COMPONENT ($Pf_0$) AFTER SYNCHRONOUS DETECTION IS MAXIMUM (OPTIMAL) VALUE<br>• MOVE BIAS POINT (D/A OUTPUT VALUE) TO A DIRECTION THAT $f_0$ COMPONENT INCREASES<br><br>• CONTROL SO THAT $2f_0$ COMPONENT ($P2f_0$) AFTER SYNCHRONOUS DETECTION IS MINIMUM (OPTIMAL) VALUE<br>• WHEN $2f_0$ COMPONENT IS DETECTED, MOVE BIAS POINT (D/A OUTPUT VALUE) TO A DIRECTION THAT $2f_0$ COMPONENT DECREASES<br>• SINCE $f_0$ SIGNAL INVERTS ITS PHASE AROUND THE OPTIMAL POINT, DETECT CHANGING DIRECTION USING THE PHASE |
| RZ MODULATOR BIAS CONTROL | ELECTRICAL SIGNAL AFTER PASSING BPF (INCLUDING $f_0$ MONITOR SIGNAL) | • $f_0$ PILOT SIGNAL<br>• DC BIAS | MINIMUM VALUE OF $f_0$ COMPONENT | $f_0$ COMPONENT vs D/A OUTPUT, OPTIMAL POINT (minimum) | SAME AS THE CONTROL OF DQPSK MODULATION UNIT I-ARM/Q-ARM |

| No. | ITEM | | VALUE | | | | REMARKS |
|---|---|---|---|---|---|---|---|
| | | | Min. | Typ. | Max. | UNIT | |
| 1 | SUPERIMPOSED (PILOT) SIGNAL FREQUENCY | COMMON IN DQPSK MODULATOR AND RZ MODULATOR | – | 1.1 | – | kHz | |
| 2 | SUPERIMPOSED (PILOT) SIGNAL AMPLITUDE | Q-ARM DATA OF DQPSK MODULATOR | | | 0.6 (0.05 × Vπ) | Vpp | DC BIAS ELECTRODE Vπ=12V CONVERSION SUPERIMPOSED VIA BIAS ELECTRODE |
| | | I-ARM DATA OF DQPSK MODULATOR | | | 0.6 (0.05 × Vπ) | | DC BIAS ELECTRODE Vπ=12V CONVERSION SUPERIMPOSED VIA BIAS ELECTRODE |
| | | PHASE SHIFT UNIT OF DQPSK MODULATOR | | | 0.36 (0.03 × Vπ) | | DC BIAS ELECTRODE Vπ=12V CONVERSION SUPERIMPOSED VIA BIAS ELECTRODE |
| | | RZ CLOCK MODULATOR | | | 0.14 (0.04 × Vπ) | | CLOCK MODULATOR UNIT ELECTRODE Vπ=3.5V SUPERIMPOSED ON DRIVING SIGNAL OF CLOCK MODULATOR |
| 3 | PD MONITOR AVERAGE CURRENT (AMPLITUDE OF DC COMPONENT) | Q-ARM DATA OF DQPSK MODULATOR | | 90 | – | uA | DETECTION USING PD OF DQPSK MODULATOR |
| | | I-ARM DATA OF DQPSK MODULATOR | | 90 | – | | DETECTION USING PD OF DQPSK MODULATOR |
| | | PHASE SHIFT UNIT OF DQPSK MODULATOR | | 90 | – | | DETECTION USING PD OF DQPSK MODULATOR |
| | | RZ CLOCK MODULATOR | | 3.7 | – | | DETECTION USING PD OF RZ MODULATOR |
| 4 | PD MONITOR SUPERIMPOSED (PILOT) SIGNAL (AMPLITUDE OF AC COMPONENT) | Q-ARM DATA OF DQPSK MODULATOR | | 500 | | nApp | IN STARTING TRANSMISSION UNIT |
| | | I-ARM DATA OF DQPSK MODULATOR | | 500 | | | IN STARTING TRANSMISSION UNIT |
| | | PHASE SHIFT UNIT OF DQPSK MODULATOR | | 1 | | | IN STARTING TRANSMISSION UNIT |
| | | RZ CLOCK MODULATOR | | 30000 | | | IN STARTING TRANSMISSION UNIT |

WHEN DEVIATION IN AMOUNT OF
PHASE SHIFT Δ IS ZERO

WHEN DEVIATION IN AMOUNT OF
PHASE SHIFT Δ IS PRESENT

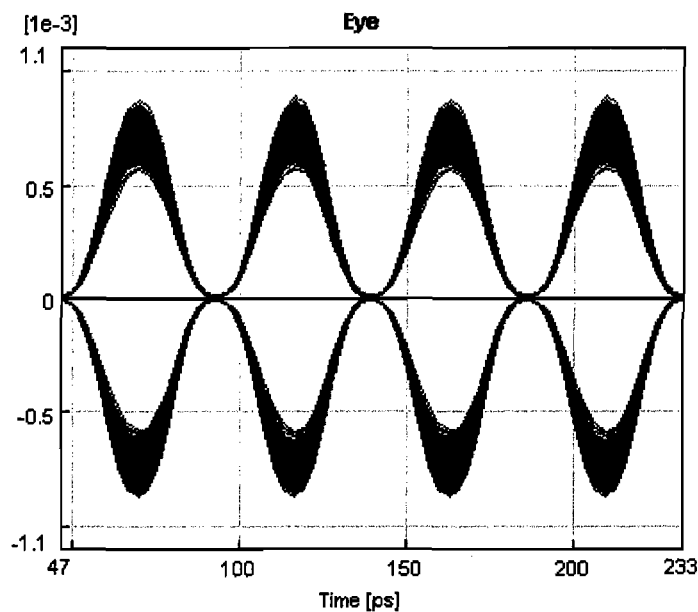
WHEN DEVIATION IN AMOUNT OF
PHASE SHIFT Δ IS ZERO
F I G. 5 7 A
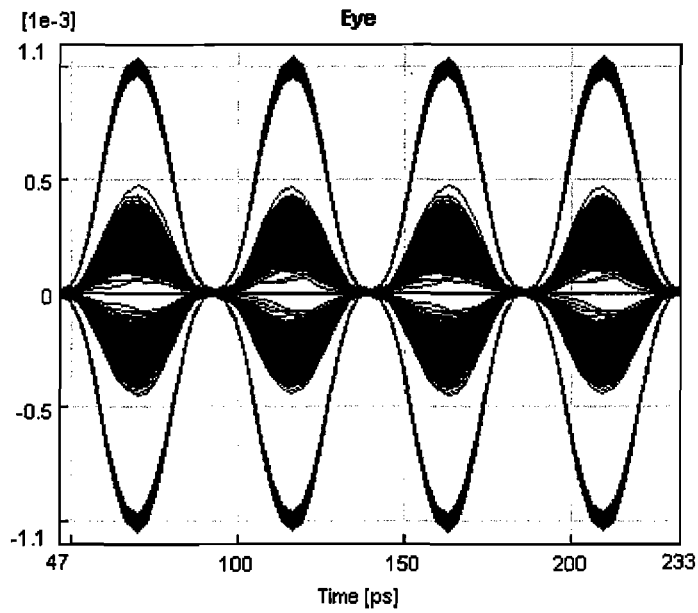
WHEN DEVIATION IN AMOUNT OF
PHASE SHIFT Δ IS PRESENT
F I G. 5 7 B

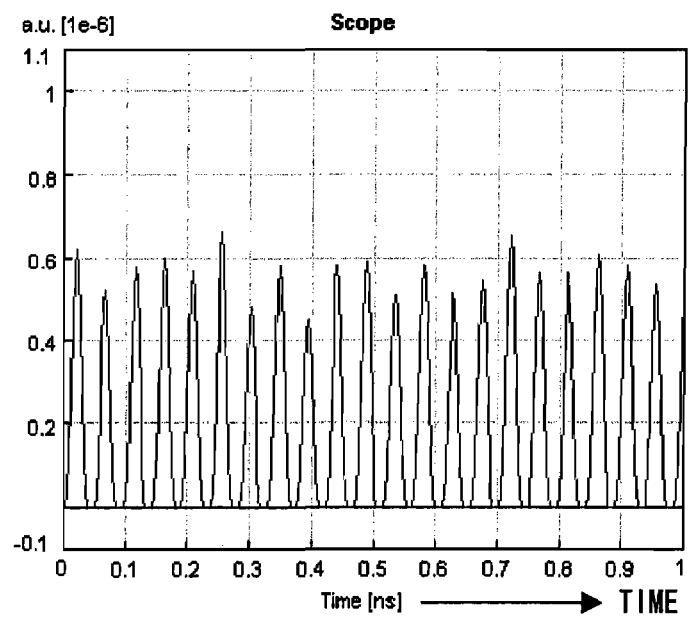
WHEN DEVIATION IN AMOUNT OF
PHASE SHIFT Δ IS ZERO
F I G. 58A
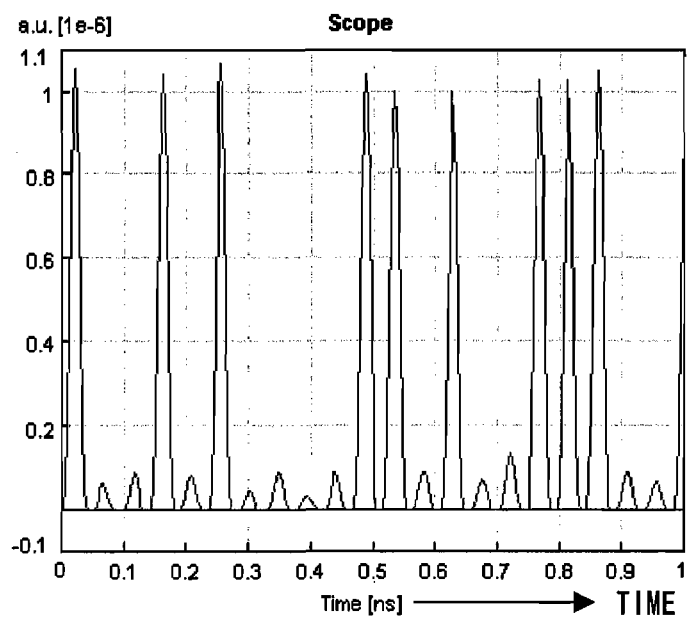
WHEN DEVIATION IN AMOUNT OF
PHASE SHIFT Δ IS PRESENT
F I G. 58B

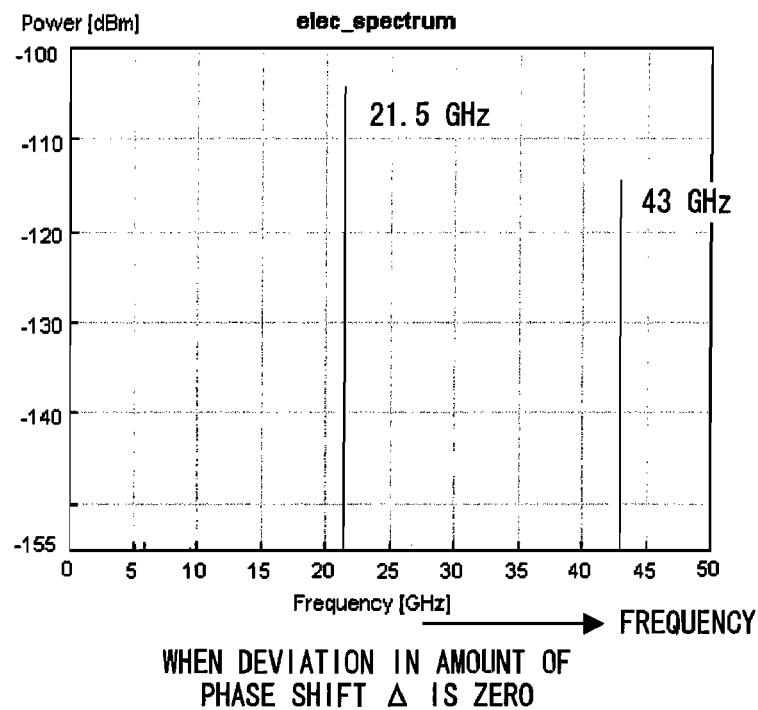
WHEN DEVIATION IN AMOUNT OF
PHASE SHIFT Δ IS ZERO
F I G. 5 9 A
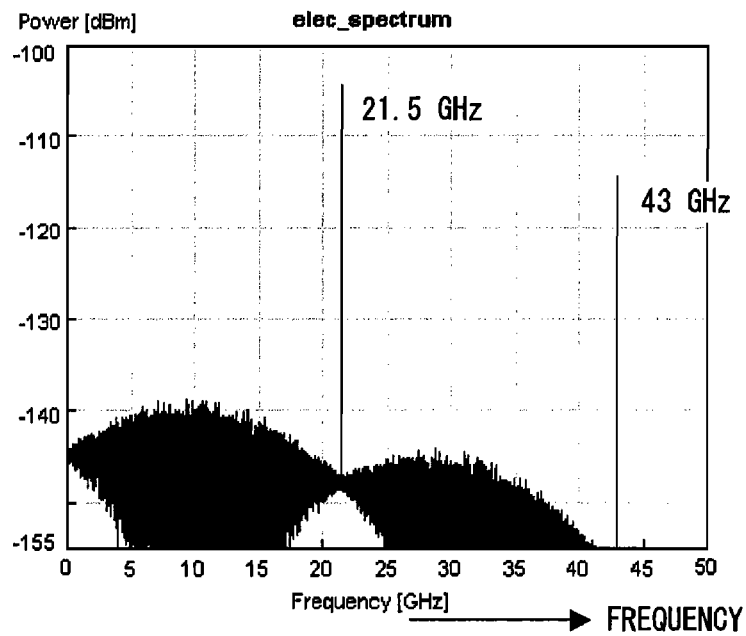
WHEN DEVIATION IN AMOUNT OF
PHASE SHIFT Δ IS PRESENT
F I G. 5 9 B

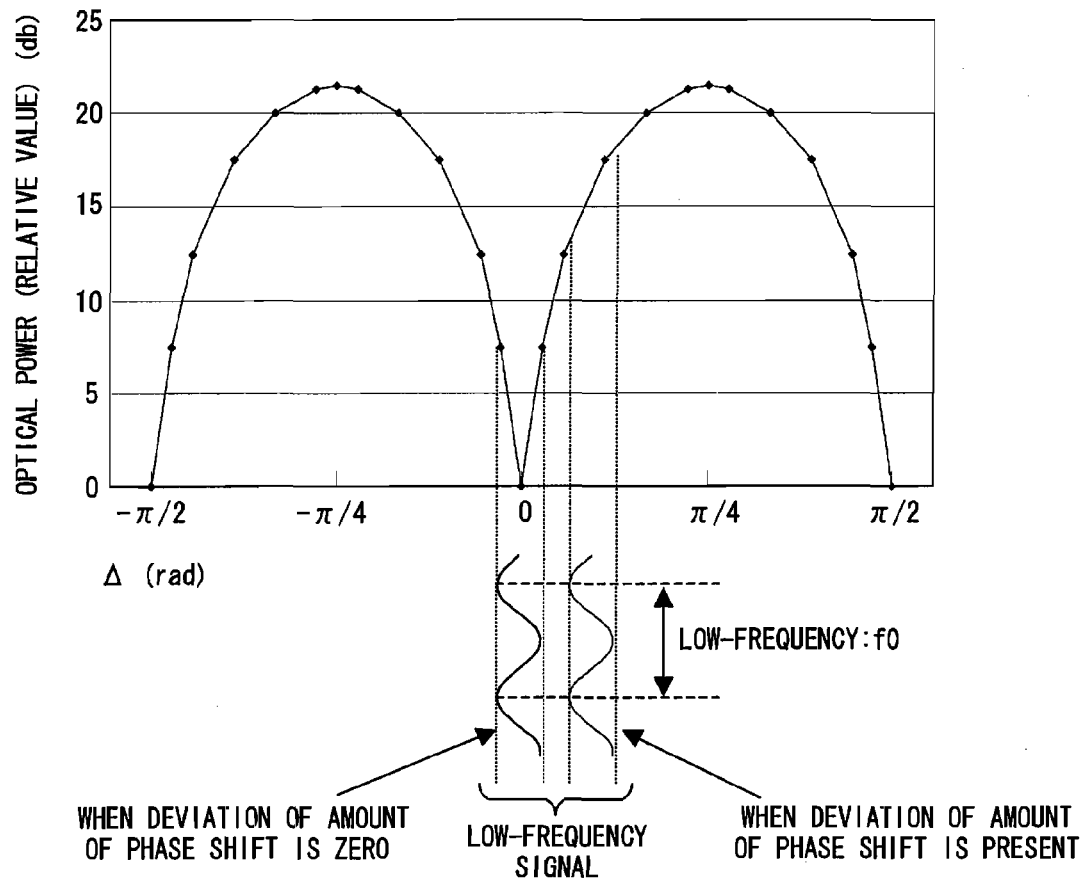
FIG. 62A
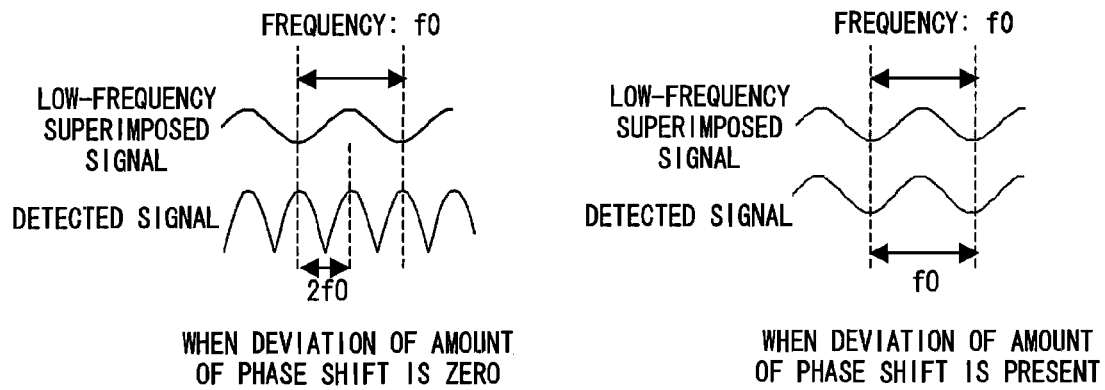
FIG. 62B
FIG. 62C

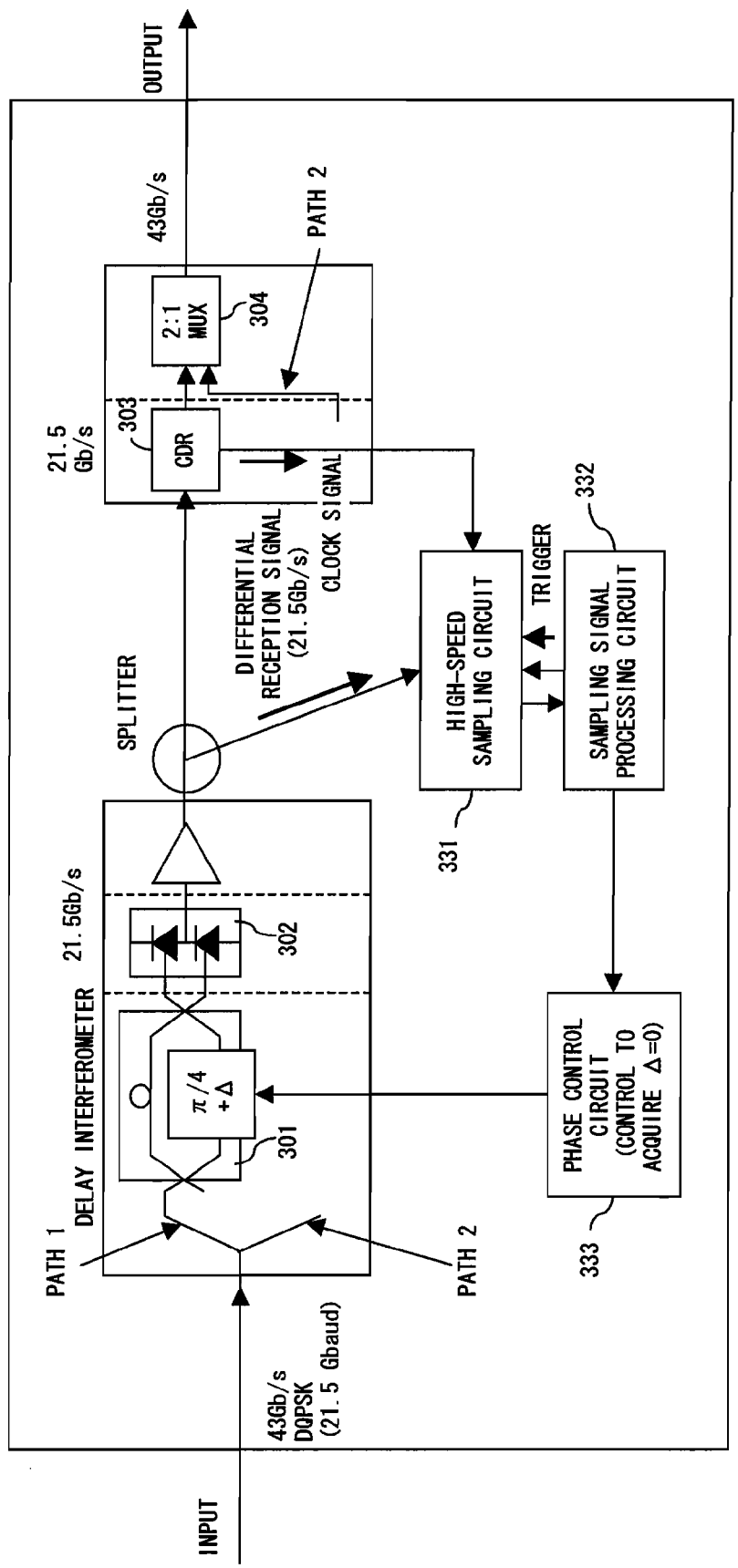
F I G. 63

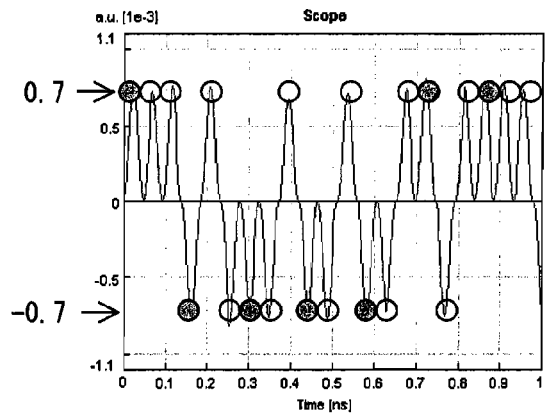

WHEN DEVIATION OF AMOUNT OF PHASE SHIFT IS ZERO
(SIGNAL VOLTAGE AT SAMPLING POINT IS ONE POSITIVE VALUE AND ONE NEGATIVE VALUE)

F I G. 6 4 A

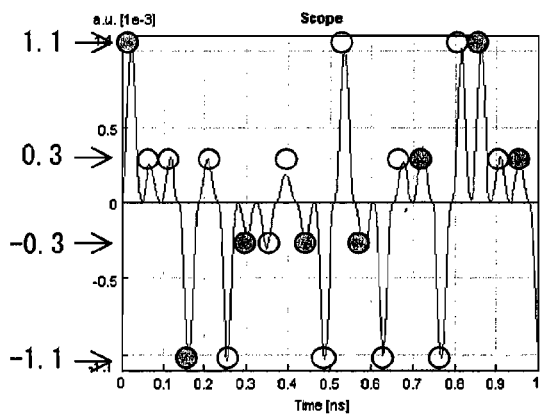

WHEN DEVIATION OF AMOUNT OF PHASE SHIFT IS PRESENT
(SIGNAL VOLTAGE AT SAMPLING POINT HAS A PLURALITY OF POSITIVE VALUES AND NEGATIVE VALUES)

F I G. 6 4 B

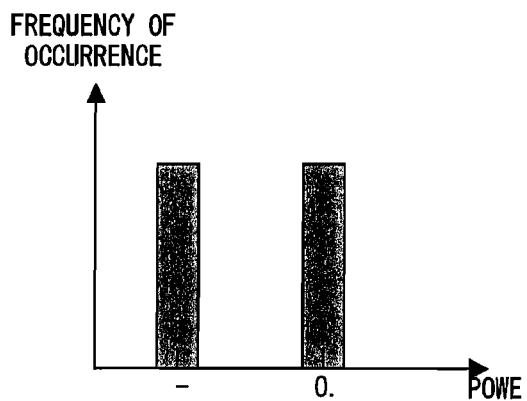

WHEN DEVIATION OF AMOUNT OF PHASE SHIFT IS ZERO

F I G. 6 4 C

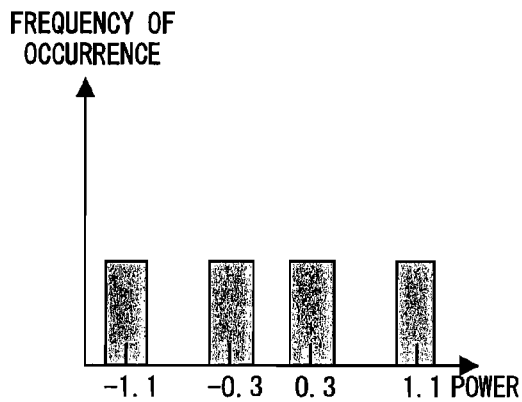

WHEN DEVIATION OF AMOUNT OF PHASE SHIFT IS PRESENT

F I G. 6 4 D

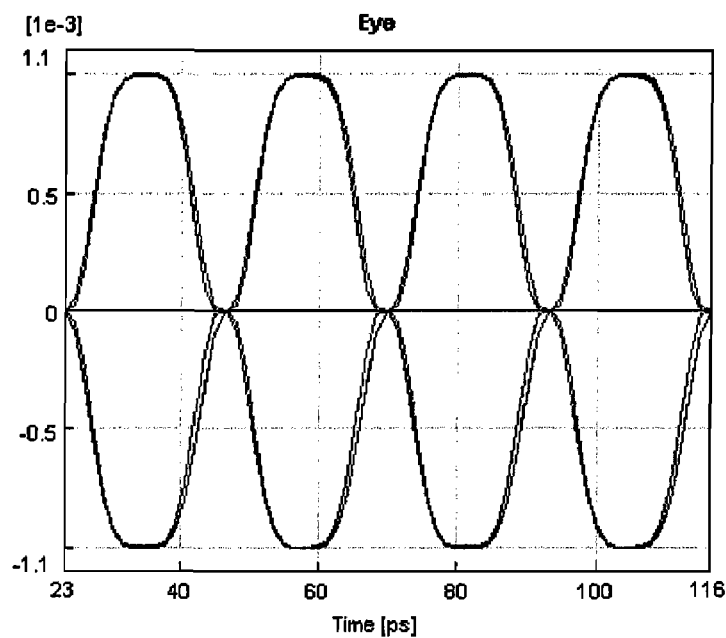
WHEN DEVIATION OF AMOUNT OF DELAY IS ZERO
F I G. 66A
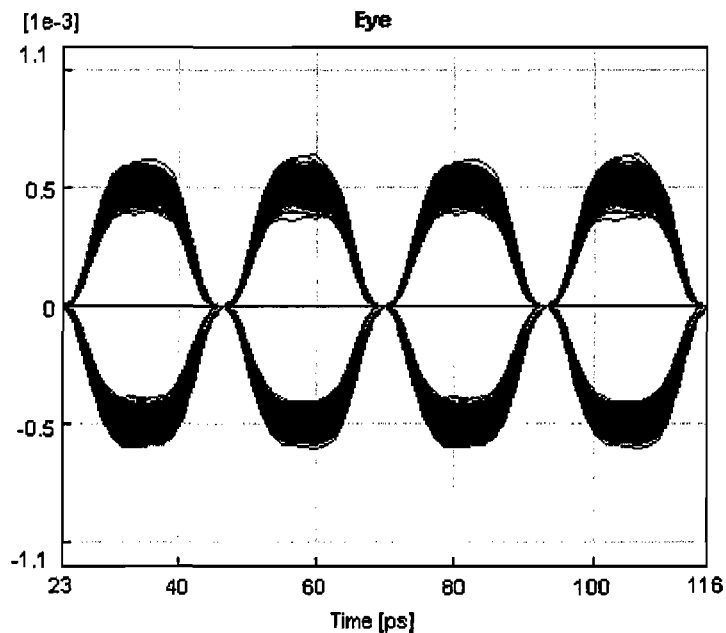
WHEN DEVIATION OF AMOUNT OF DELAY IS PRESENT
F I G. 66B

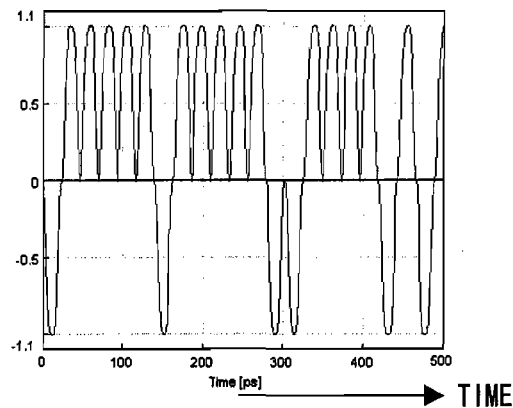
(WHEN DEVIATION OF AMOUNT
OF DELAY δ IS ZERO)
F I G. 6 8 A
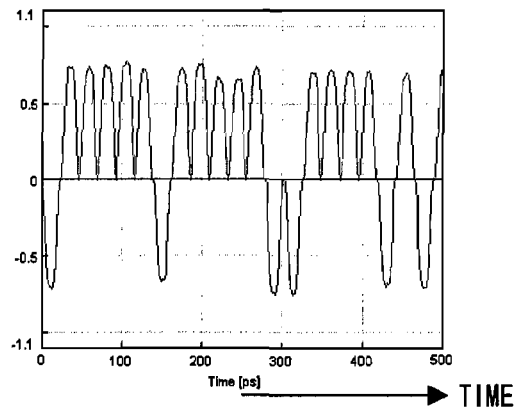
WHEN DEVIATION OF AMOUNT OF
DELAY δ IS EQUIVALENT TO
45° PHASE DIFFERENCE
F I G. 6 8 B
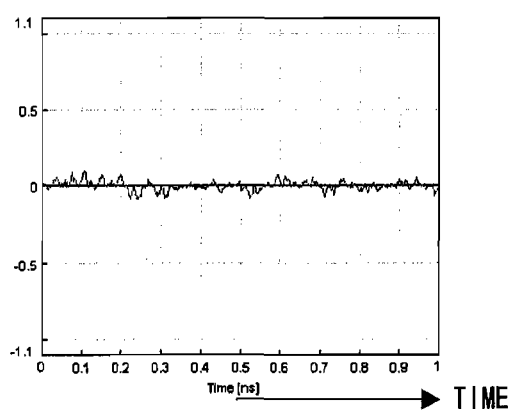
WHEN DEVIATION OF AMOUNT OF
DELAY δ IS EQUIVALENT TO
90° PHASE DIFFERENCE
F I G. 6 8 C

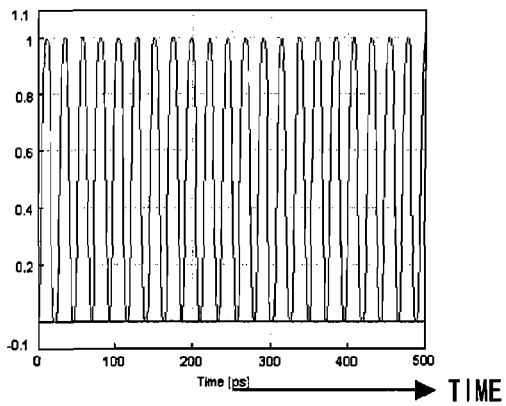
(WHEN DEVIATION OF AMOUNT
OF DELAY δ IS ZERO)
F I G. 6 9 A
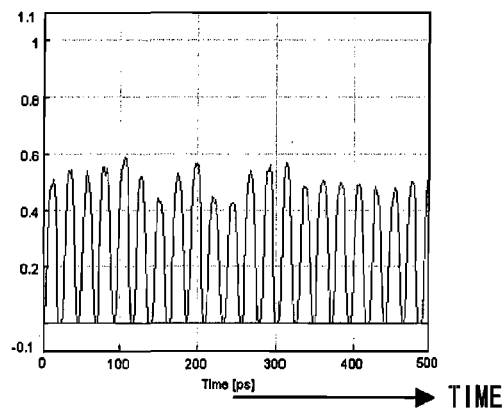
WHEN DEVIATION OF AMOUNT OF
DELAY δ IS EQUIVALENT TO
45° PHASE DIFFERENCE
F I G. 6 9 B
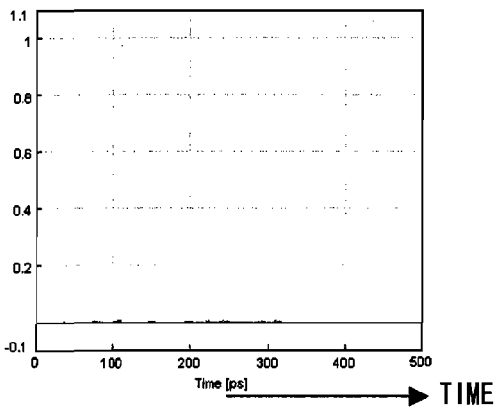
WHEN DEVIATION OF AMOUNT OF
DELAY δ IS EQUIVALENT TO
90° PHASE DIFFERENCE
F I G. 6 9 C

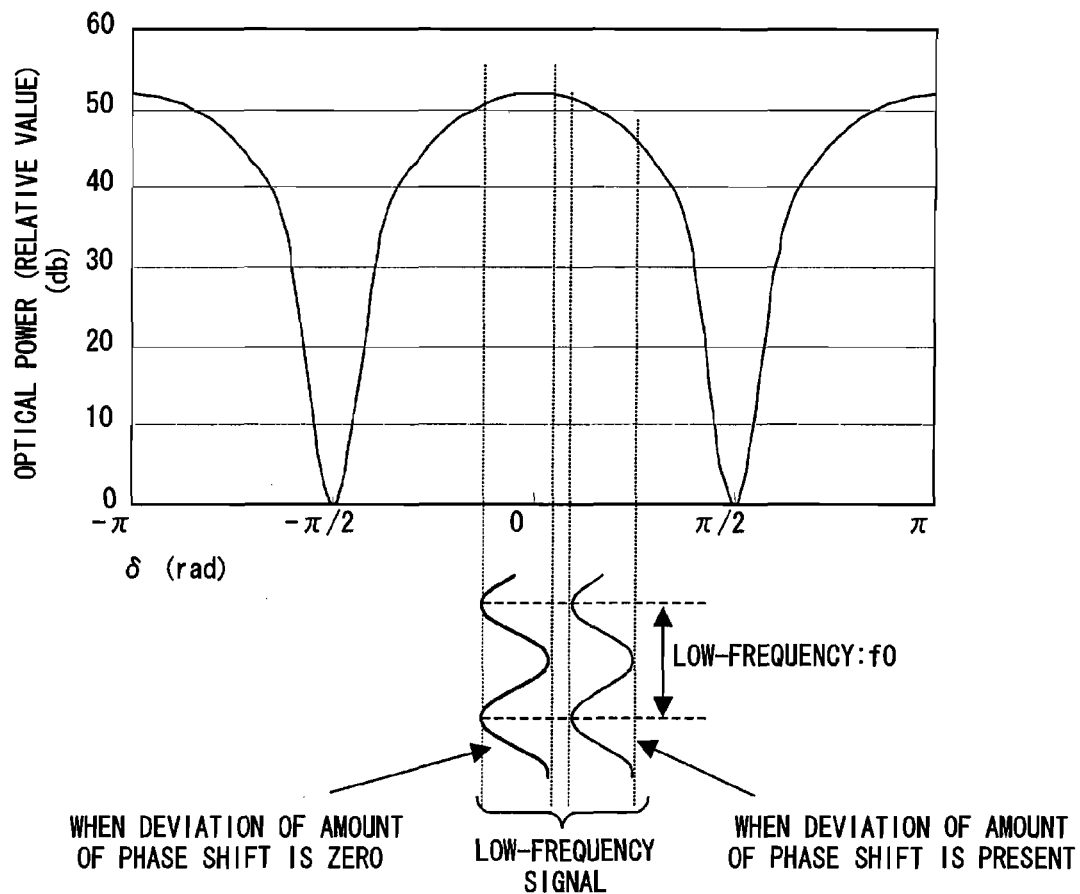
F I G. 7 3 A
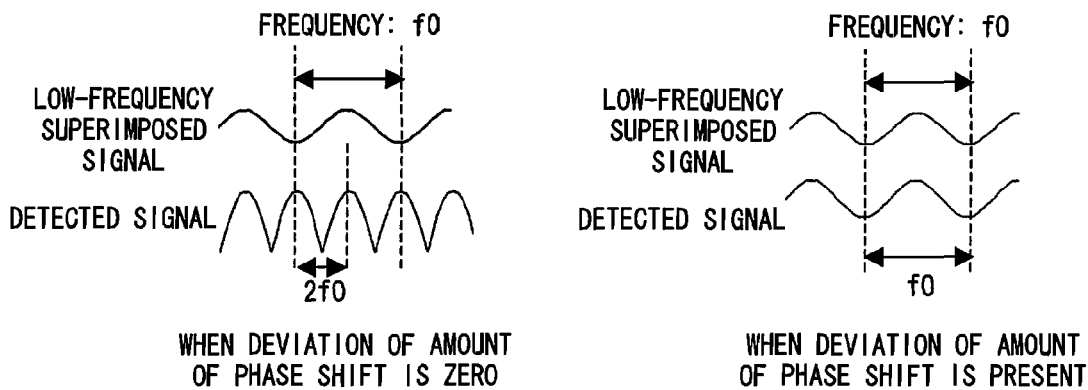
F I G. 7 3 B
F I G. 7 3 C

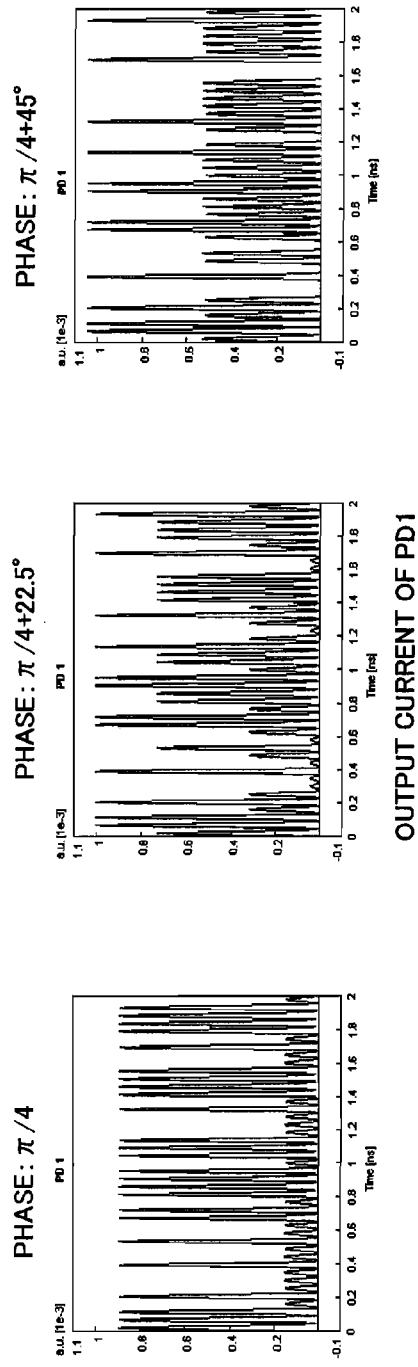
FIG. 75A OUTPUT CURRENT OF PD1
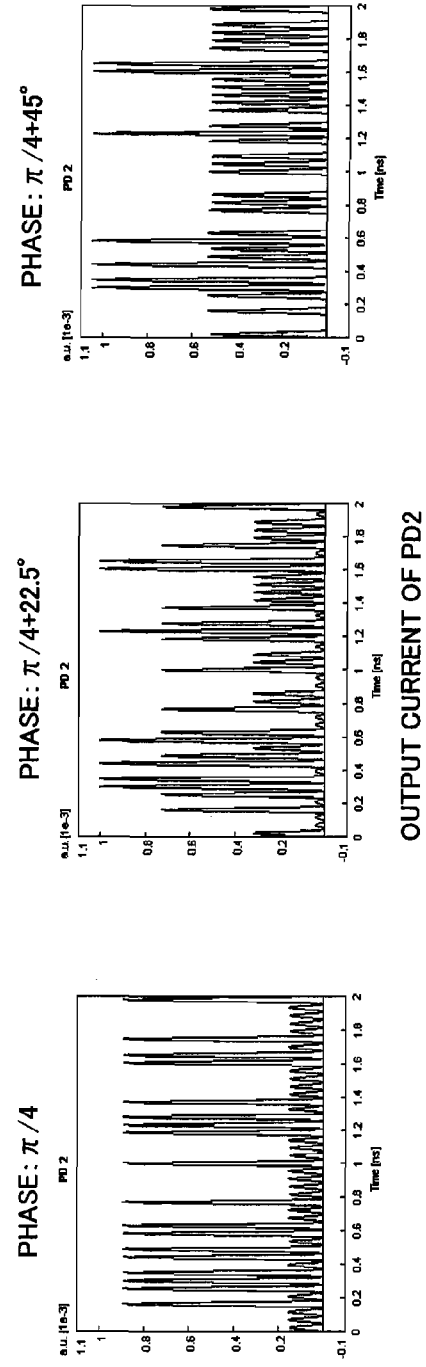
FIG. 75B OUTPUT CURRENT OF PD2

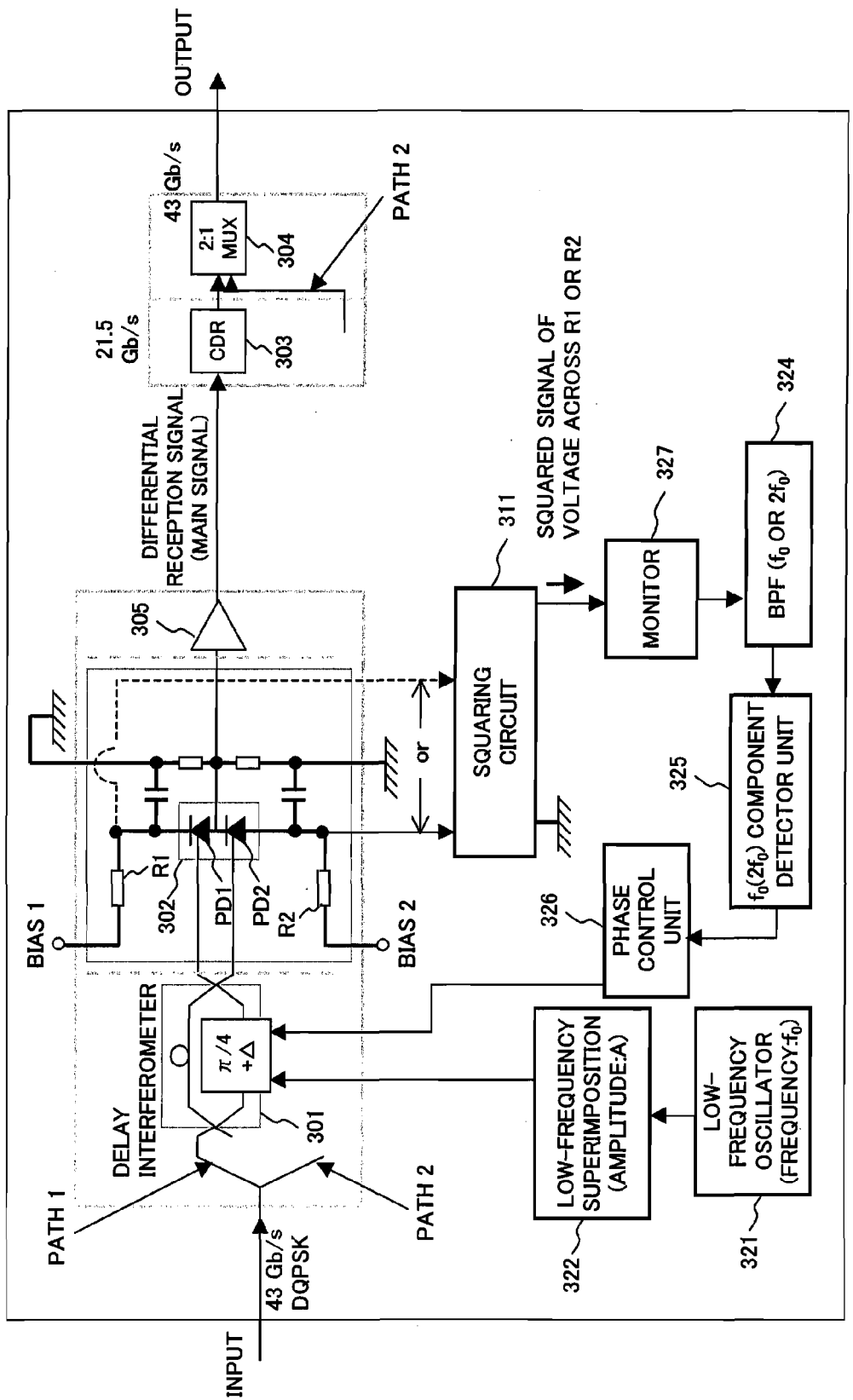
F I G. 78

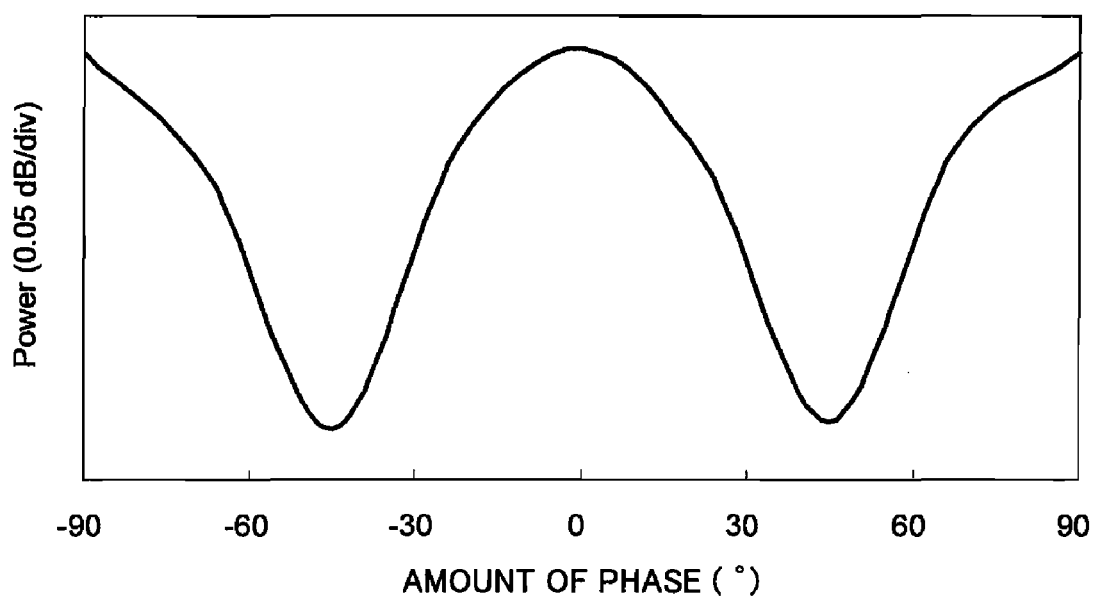
F I G. 8 3

OPTICAL TRANSMITTING APPARATUS, OPTICAL RECEIVING APPARATUS, AND OPTICAL COMMUNICATION SYSTEM COMPRISING THEM

CROSS-REFERENCE TO RELATED APPLICATION

This is a continuation-in-part of application Ser. No. 11/256,128, filed on Oct. 24, 2005 now abandoned.

BACKGROUND OF THE INVENTION

1. Field of the Invention

The present invention relates to an optical transmitting apparatus, an optical receiving apparatus, and an optical communication system comprising them, and more specifically to an optical transmitting apparatus for transmitting an optical signal using PSK modulation, an optical receiving apparatus for receiving an optical signal from the optical transmitting apparatus, and an optical communication system comprising those apparatus.

2. Description of the Related Art

Development of a practical implementation of an optical transmitting apparatus aiming to establish a high capacity and long distance optical transmission system has been awaited in recent years. Particularly, expectations for implementation of an optical transmitting apparatus, which employs an optical modulation technique adequate for high capacity and long-distance, to an actual system are growing high. In order to meet with expectations, optical transmission systems using phase shift keying such as DPSK (Differential Phase Shift Keying) and DQPSK (Differential Quadrature Phase Shift Keying) are envisioned.

NRZ (Non-Return-to-Zero) modulation techniques and RZ (Return-to-Zero) modulation techniques, actually operated on land and under the sea, are known as actual optical modulation techniques. In an optical transmission system using such modulation techniques, technology for stabilizing operation of components in a transmitter for optical transmission signal has great importance. An example is an ABC (Automated Bias Control) circuit in the NRZ modulation for preventing transmission signal degradation caused by drift of the operating point of a LN (Lithium Niobate) modulator. (See Patent Document 1: Japanese laid-open unexamined patent publication No. 03-251815)

There is also a bias control method for an optical SSB (Single Side-Band) modulator with a plurality of optical modulation units, in which appropriate correction of direct-current bias for each optical modulation unit is performed during normal operation of the modulator. (See Patent Document 2: Japanese laid-open unexamined patent publication No. 2004-318052)

An example of an optical receiving apparatus for receiving a DQPSK signal is described in Patent Document 3 (Japanese publication of translated version No. 2004-516743). In the optical receiving apparatus in the Patent Document 3, a phase of an optical signal is shifted by $\pi/4$ in one of a pair of waveguides constituting a Mach-Zehnder interferometer.

FIG. 1 is a block diagram describing a configuration of an optical transmitting apparatus employing a conventional NRZ modulation technique with an ABC circuit for NRZ. In FIG. 1, the optical transmitting apparatus employing a conventional NRZ modulation comprises a laser diode 111, a phase modulator 221, comprising a MZ (Mach-Zehnder) modulator etc., which carries out phase modulation by inputting an NRZ data signal DATA to a modulating electrode, and an ABC circuit for NRZ 550, which, by monitoring a part of the optical output of the phase modulator 221, detects a low frequency signal superposed on the data signal DATA, applies a control signal to bias tees (not shown in figures) of the phase modulator 221, and compensates for a deviation of an operating point.

The ABC circuit in the conventional optical transmitting apparatus employing the NRZ modulation, however, only performs bias control, which compensates for the deviation of an operating point of the MZ modulator, and it does not comprise means for monitoring the amount of phase shift of a phase shift unit necessary for phase shift keying such as DQPSK, which is receiving attention for its anticipated potential. For that reason, the conventional technology shown in FIG. 1 could not be applied to phase shift keying such as DQPSK. There was a problem that the concept of total control of phase shifting and DC drift with regard to an entire optical transmitting apparatus employing phase shift keying such as DQPSK did not exist.

Additionally, in an optical receiving apparatus described in the Patent Document 3, it is required to shift the phase of an optical signal by $\pi/4$; however, no measures have been taken to prevent loss of accuracy of an optical device due to age deterioration.

SUMMARY OF THE INVENTION

It is an object of the present invention to provide a configuration of an optical transmitting apparatus comprising a phase modulator, in which phase shifting and DC drift etc. can be properly controlled.

It is another object of the present invention to provide a configuration in which phase shifting and DC drift etc. in a phase shifting unit, a phase modulator, and an intensity modulator can be properly controlled in an entire optical transmitting apparatus.

It is a further object of the present invention to provide a configuration of an optical receiving apparatus for receiving a modulated optical signal, in which the phase shift necessary for demodulating a received signal is properly controlled.

The optical transmitting apparatus according to the present invention comprises a phase modulator and a driving signal generation unit for driving the phase modulator. The phase modulator comprises a phase shift unit which provides a proper phase difference between a pair of split optical signals on an optical waveguide, a data modulation unit which performs a phase modulation of the optical signals on the split optical waveguide and an electrode for superimposing a low-frequency signal. The optical transmitting apparatus according to the present invention comprises: a low-frequency signal superimposing unit for generating low-frequency signals with a proper phase difference and for providing the low-frequency signals to the electrode on the split optical waveguide; a monitor unit for monitoring at least one of maximum power, minimum power and phase of a low-frequency signal or a higher harmonic signal of the low-frequency signal superimposed on the optical signal after coupling of the split optical waveguide; and a phase difference control unit for controlling the phase shift unit so as to obtain a proper phase difference based on the output of the monitor unit.

The optical transmitting apparatus according to another aspect of the present invention transmits a modulated optical signal corresponding to a data signal, and comprises: a phase shift unit for controlling a phase of at least one of a first optical signal and a second optical signal, acquired by splitting an optical input, so that the first and the second optical signals have a predetermined phase difference on an optical waveguide; a data modulation unit for modulating the phases of the first and the second optical signals by using the data signal on the optical waveguide; a monitor unit for monitoring average optical power of a modulated optical signal acquired by coupling the first and the second optical signals modulated by the data modulation unit; and a control unit for controlling the phase shift unit based on an output of the monitor unit. The data modulation unit may comprise a phase addition unit for adding a prescribed phase to a phase determined according to the data signal.

The optical receiving apparatus according to the present invention receives and demodulates a phase-modulated optical signal, and comprises: an interferometer comprising a first arm for delaying first split light of optical input by a symbol time period and a second arm for shifting a phase of the second split light of the optical input by a prescribed amount; a photodetector circuit for converting an optical signal output from the interferometer into an electrical signal; a calculation circuit for generating a squared signal or an absolute value signal of the electrical signal; a filter, connected to the calculation circuit, for transmitting at least a part of frequency component except for the frequency, which is a integral multiple of a symbol frequency; and a control unit for controlling the amount of the phase shift in the second arm based on the output from the filter.

According to the present invention, quality of the output optical signal can be stabilized by controlling phase shift, which may deviate by fluctuation of temperature change or aging and so forth of components constituting an optical transmitting apparatus, to obtain a proper phase.

In addition, since the phase shift necessary for demodulating the receiving optical signal can be appropriately controlled, deterioration of the receiving characteristics can be eliminated.

BRIEF DESCRIPTION OF THE DRAWINGS

FIG. 1 is a block diagram describing a configuration of an optical transmitting apparatus comprising a conventional NRZ modulator;

FIG. 2 is a diagram showing a configuration of an optical communication system relating to the preferred embodiment of the present invention;

FIG. 6 is a diagram showing a first configuration of an optical transmitting apparatus relating to the first embodiment of the present invention;

FIG. 7 is a waveform diagram presenting a simulation result of the low-frequency signal component, when n=1 in the phase shifter;

FIG. 24 is a diagram describing a configuration of an optical transmitting apparatus relating to the eighth embodiment of the present invention;

FIG. 44 is a table summarizing the control in the optical transmitting apparatus;

FIG. 47 is a diagram summarizing the comparison result of the detected signals;

FIG. 57A and FIG. 57B are diagrams showing eye diagram of the differential signal;

FIG. 58A and FIG. 58B are diagrams indicating the waveform of the squared signal;

FIG. 59A and FIG. 59B are diagrams showing spectrum of the squared signal;

FIG. 62A through FIG. 62C explain the principle of operation of the optical receiving apparatus of the second embodiment;

FIG. 63 is a diagram describing a configuration of the optical receiving apparatus of the third embodiment;

FIG. 64A through FIG. 64D explain the principle of operation of the optical receiving apparatus of the third embodiment;

FIG. 66A and FIG. 66B are diagrams showing eye diagrams of a signal received by the optical receiving apparatus shown in FIG. 65;

FIG. 68A through FIG. 68C show the waveform of the differential signal;

FIG. 69A through FIG. 69C show waveform of the squared signals;

FIG. 73A through FIG. 73C explain the principle of operation of the optical receiving apparatus of the fifth embodiment;

FIG. 75A and FIG. 75B are diagrams describing a waveform of the output current of the photodetector;

FIG. 78 is a diagram showing a configuration of the optical receiving apparatus of the eighth embodiment;

FIG. 83 is a diagram showing the time average power of the output signal of the limiter amplifier;

DESCRIPTION OF THE PREFERRED EMBODIMENTS

In the following description, the preferred embodiments of the present invention are set forth with reference to the drawings.

FIG. 2 is a diagram showing a configuration of an optical communication system relating to the preferred embodiment of the present invention. An optical communication system 1000 shown in FIG. 2 comprises an optical transmitting apparatus 1010, an optical receiving apparatus 1020, and a transmission channel optical fiber 1030 for connecting between the preceding devices. The optical transmitting apparatus 1010 comprises a data generation unit 1011 and a modulator 1012. The data generation unit 1011 generates data to be transmitted. The modulator 1012 generates a modulated optical signal using the data generated by the data generation unit 1011. In this case, the modulation method is not limited in particular but is the DQPSK, for example. The optical receiving apparatus 1020 obtains data by demodulating an optical signal transmitted via the transmission channel optical fiber 1030. An optical amplifier or an optical repeater can be provided on the transmission channel optical fiber 1030.

Figure 3:
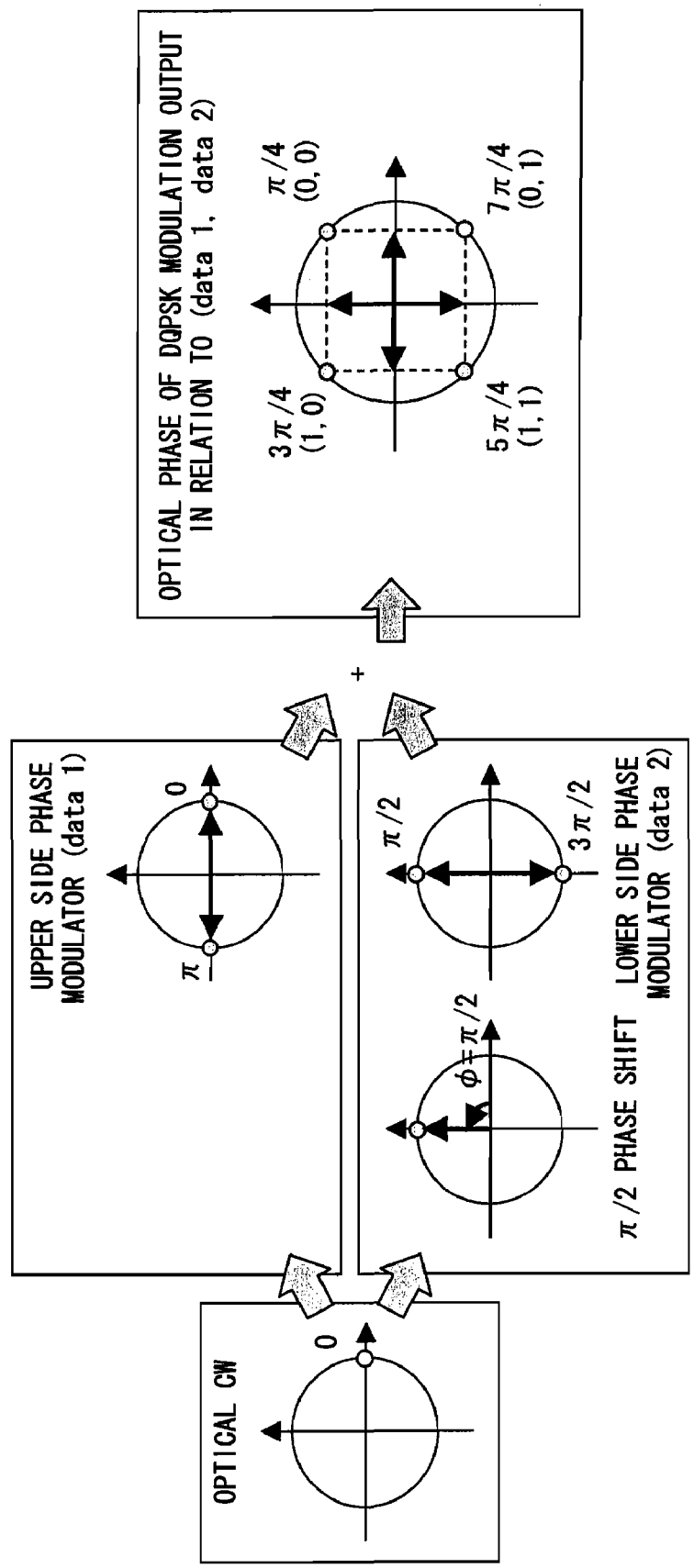
FIG. 3 is a diagram explaining a principle of the DQPSK modulation.

FIG. 3 is a diagram explaining the principle of the DQPSK (or QPSK) modulation. In the DQPSK modulation, two-bit data (data 1, data 2) is transmitted as one symbol. Here, each symbol is assigned with a phase corresponding to a combination of the data (data 1, data2). In the example shown in FIG. 3, "π/4" is assigned to the symbol (0, 0), "3π/4" is assigned to the symbol (1,0), "5π/4" is assigned to the symbol (1,1), and "7π/4" is assigned to the symbol (0,1). Therefore, the optical receiving apparatus can regenerate data by detecting the phase of the received signal.

In order to achieve the above phase modulation, optical CW (Continuous Wave) is split into two, and one of the split light is phase modulated by the data 1 and the other split light is phase modulated by the data 2. Then, the phase assigned to the data 2 is shifted by "π/2" with respect to the phase assigned to the data 1. In other words, a device to generate π/2-phase shift is required in the DQPSK modulation.

Figure 4:
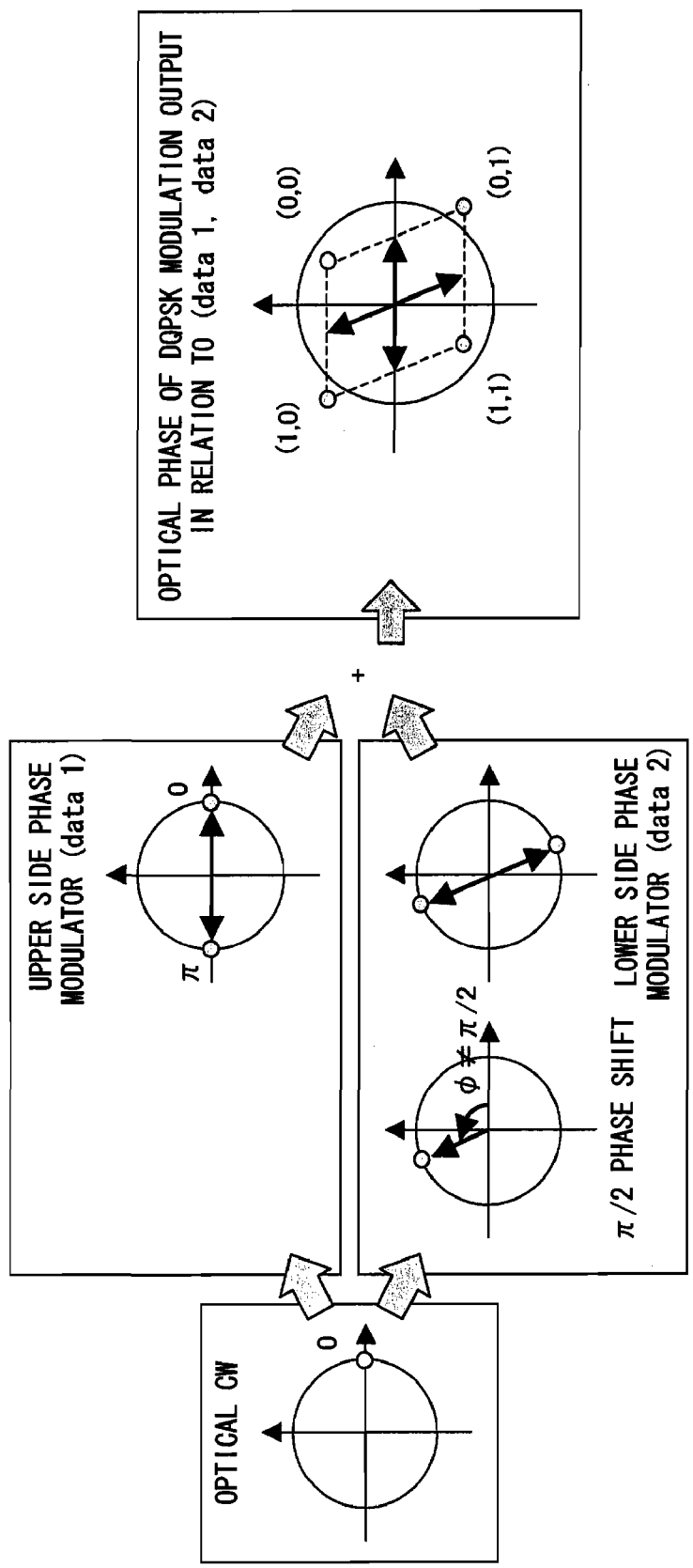
FIG. 4 is a diagram explaining deterioration of communication quality in the DQPSK modulation.

FIG. 4 is a diagram explaining deterioration of communication quality in the DQPSK modulation. An optical transmitting apparatus employing the DQPSK modulation, as described above, comprises a device for generating π/2-phase shift. However, when the amount of phase shift deviates from π/2 due to aging phenomenon etc., the positions of each symbol on a phase plane also deviate, as shown in FIG. 4, and the possibility of erroneous data recognition increases in an optical receiving apparatus. Therefore, in order to improve the communication quality of the DQPSK modulation system, it is important to maintain high accuracy of the π/2-phase shift device.

<<Optical Transmitting Apparatus>>

First Embodiment

Figure 5:
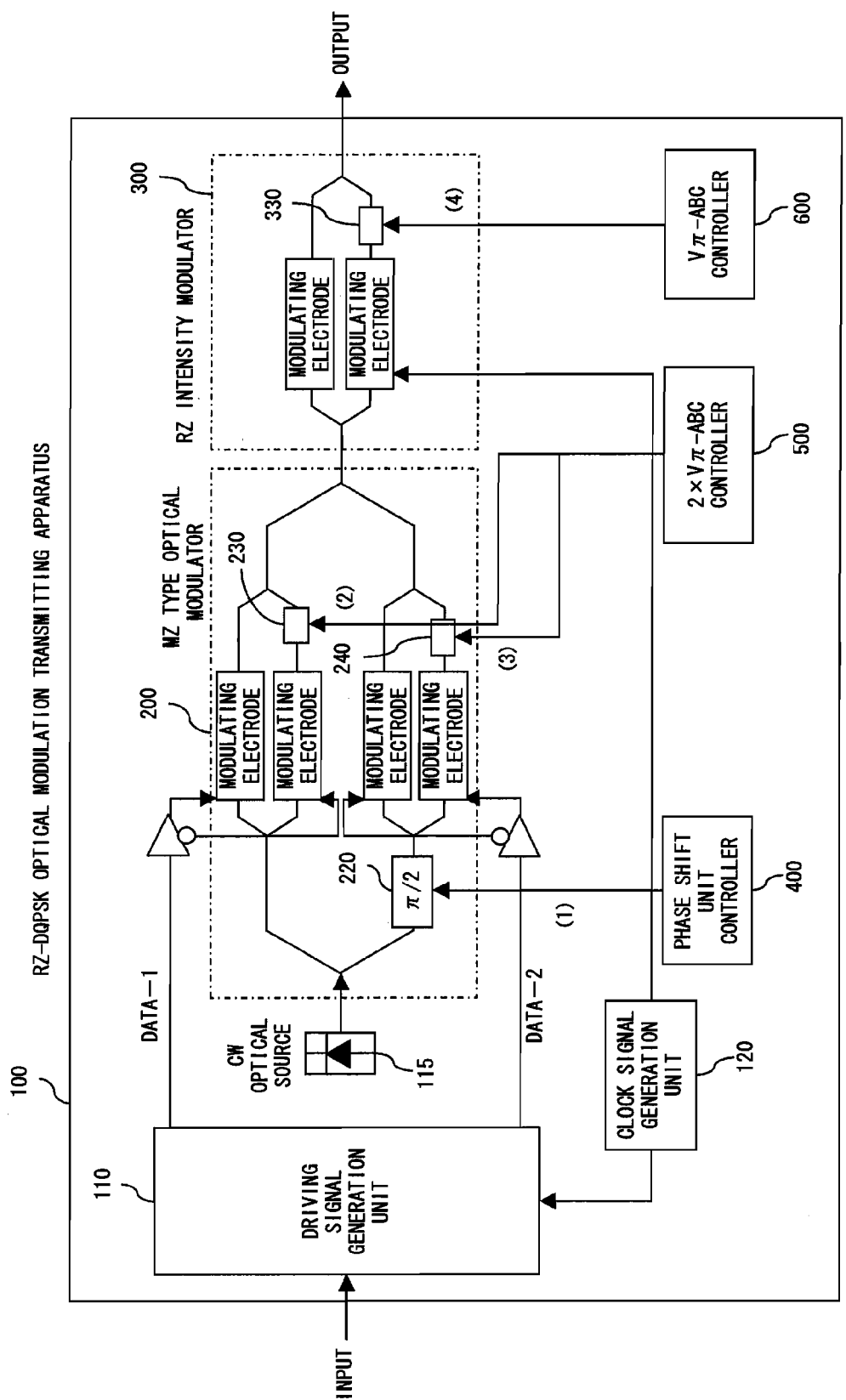
FIG. 5 is a diagram showing an entire configuration of an optical transmitting apparatus using the RZ-DQPSK modulation relating to the preferred embodiment of the present invention.

FIG. 5 is an overview block diagram showing a entire configuration of an optical transmitting apparatus with RZ-DQPSK modulation relating to the preferred embodiment of the present invention. In FIG. 5, a RZ-DQPSK optical modulation transmitter comprises a driving signal generation unit 110 for receiving an input signal and a clock signal from a clock signal generation unit 120 and for generating a driving signal for an MZ (Mach-Zehnder) modulator 200, a clock signal generation unit 120 for providing a clock signal to the driving signal generation unit 110 and an RZ intensity modulator 300, a CW optical source 115 for generating CW (Continuous Wave) light, a phase shift unit 220 for providing an appropriate phase difference for a pair of optical inputs obtained by branching optical waveguide, an MZ modulator 200 comprising a plurality of modulating electrodes in a first arm and a second arm and terminals for inputting data signals DATA 1 and DATA 2 pre-coded for DQPSK to the electrodes, and a RZ intensity modulator 300 for making the output of the MZ modulator 200 RZ-pulsed. The MZ modulator 200 comprises bias input units 230 and 240 for receiving a bias signal for compensating for a drift of each arm. The RZ intensity modulator 300 comprises a bias input unit 330 for receiving a bias signal for compensating for a drift. The configuration and operation of the driving signal generation unit 110 is described in, for example, Japanese patent publication of translated version No. 2004-516743.

Additionally, the optical transmitting apparatus of the embodiment comprises a 2Vπ-ABC controller 500 for compensating for wavelength fluctuation in the CW optical source 115 and deviation of the operating point (DC drift) in the MZ modulator 200, and a Vπ-ABC controller 600 for compensating for deviation of an operating point (DC drift) in the RZ intensity modulator 300. When the CSRZ modulation is to be performed, the 2Vπ-ABC controller should be comprised instead of the Vπ-ABC controller 600. Details of the configuration and operation of the 2Vπ-ABC controller are, for example, described in Japanese laid-open unexamined patent publication No. 2000-162563.

In the optical transmitting apparatus relating to the embodiment of the present invention, a phase shift unit controller 400 performs bias control (see (1) of FIG. 5) so that the amount of phase shift by the phase shift unit 220 attains an appropriate value (for example, an odd-numbered multiple of π/2, that is an odd-numbered multiple of π/4 of the optical input). The ABC controllers 500 and 600 compensate for the DC drift by ABC control (see (2), (3) and (4) shown in FIG. 5).

FIG. 6 is a block diagram showing a first configuration of an optical transmitting apparatus relating to the first embodiment of the present invention. The optical transmitting apparatus relating to the present embodiment in FIG. 6 comprises a clock signal generation unit 120; a driving signal generation unit 110 for generating data signals DATA 1 and DATA 2 pre-coded for the DQPSK using a clock signal from the clock signal generation unit 120; a semiconductor laser (LD) 11; a phase modulator comprising a phase shift unit 12 for providing an appropriate phase difference between a pair of optical inputs obtained by branching optical waveguide, a data modulation unit 20 comprising data terminals for respectively inputting the pre-coded data signals DATA 1 and DATA 2 to first arm 21 and second arm 22, and first and second electrodes 23 and 24, provided in later stages of corresponding arms of the data modulation unit 20, for superposing a low-frequency signal; and an intensity modulator 31 for modulating the intensity of the optical output from the phase modulator using the clock signal from the clock signal generation unit 120. The optical transmitting apparatus further comprises a low-frequency superimposing unit, comprising a low-frequency signal generator 1 for generating a low-frequency signal $f_0$ of several KHz (a several MHz is also acceptable), and a phase shifter 2 for shifting the phase of the low-frequency signal $f_0$ by $n\pi/2$ (where n is a natural number other than 0 and multiples of 4), for providing the low-frequency signal $f_0$ from the low-frequency signal generator 1 to the first electrode 23 and also for providing the low-frequency signal $f_0$, of which the phase was shifted by $n\pi/2$ by the phase shifter 2, to the second electrode 24; a monitor unit comprising a low-speed photodiode 3 for extracting a low-frequency signal from optical output of the phase modulator, which has waveguide to split optical beam into two for generating two optical signals and to couple the two optical signals, a band-pass filter BPF 4 with its center frequency of $2f_0$ (one of higher harmonics), a multiplier 6 for doubling the frequency of the low-frequency signal from the low-frequency generator 1, and a phase comparator 5 for comparing the phase $\phi 1$ of the multiplier 6 with the phase $\phi 2$ of the BPF 4 and for generating a "+" signal when the phase $\phi 1$ is delayed and a "−" signal when the phase $\phi 2$ is delayed, and for outputting an "approximate zero" signal when the phase of the phase shift unit 12 has an appropriate value (an odd-numbered multiple of π/2, for example); and a phase difference control unit, not shown in figures, for controlling the amount of phase shift of the phase shift unit 12 according to the output of the monitor unit (the phase comparator 5). The low-speed photodiode 3 may be replaced by a low-speed photodiode 3' so as to detect an optical signal from the output side of the intensity modulator 31.

Because the phase shifter 2 is operated at a low frequency, amount of phase shift by the phase shifter 2 may be fixed.

In the optical transmitting apparatus with the above configuration, the semiconductor laser 11 generates optical CW. The optical CW is split into two, one split light is guided to an upper side arm 21 of the data modulation unit 20, and the other split light is guided to a lower side arm 22 via a phase shift unit 12. Here, the amount of phase shift by the phase shift unit 12 is controlled at "$n\pi/2$ (n is a natural number other than 0 and multiples of 4)" by feedback control.

The electrodes 23 and 24 are provided to bias the waveguides connected to the output sides of the arms 21 and 22, respectively. The electrodes 23 and 24 are formed using the X-cut or Z-cut, for example, in consideration of crystal orientation of waveguides. The electrode 23 is provided with the low-frequency signal generated by the low-frequency generator 1 without any modification. On the other hand, the electrode 24 is provided with a low-frequency signal with its phase shifted by "$n\pi/2$ (n is a natural number other than 0 and multiples of 4)" using the phase shifter 2. The low-frequency signal generated by the low-frequency signal generator 1 is a sine curve signal or rectangle wave signal, for example, and its amplitude is so small that a transmitted optical signal does not receive an adverse effect.

Although an optical signal generated by the data modulation unit 20 is guided to the intensity modulator 31, a part of which is split and guided to a low-speed photodiode 3. The optical signal is split by an optical splitter, for example. In the present invention, however, "split (or branch)" of an optical signal is not limited to split by an optical splitter, and it may be realized by guiding optical leakage in Y-coupler to the low-speed photodiode 3. A technology to monitor optical leakage of an MZ modulator is described in Japanese laid-open unexamined patent publication No. 10-228006, for example. When coupling the output side waveguides of the arm 21 and the arm 22 by "X-coupler", one output of the X-coupler may be guided to the intensity modulator 31 and the other output of the X-coupler may be guided to the low-speed photodiode 3. There is a description about an optical modulator comprising an X-coupler in Japanese laid-open unexamined patent publication No. 2001-244896, for example.

FIG. 7 is a waveform diagram presenting a simulation result of the low-frequency signal component, when n=1 in the phase shifter 2. Here, "n=1" represents that the phase difference between two low-frequency signals provided to the electrodes 23 and 24 in FIG. 6 is $\pi/2$.

In this simulation, electric spectrum of the $f_0$ component and the $2f_0$ component are observed by changing the phase shift of the phase shift unit 12 by $\pi/4$ in a range between 0°-180°. As a result, when the phase shift of the phase shift unit 12 approaches "90°", that is "$\pi/2$", the following condition is acquired.

(1) Electric spectrum of the $f_0$ component is detected prominently (2) Power reaches its maximum in the $f_0$ component (3) Power attains its minimum in the $2f_0$ component The phase of the $2f_0$ component signal when the amount of phase shift provided by the phase shift unit 12 is less than "$\pi/2$" (45° in FIG. 7), is the inverted from the phase when the amount of phase shit provided by the phase shift unit 12 is greater than "$\pi/2$" (135° in FIG. 7).

Therefore, feedback control of bias voltage provided to the phase shift unit 12 so that the power of the $f_0$ component reaches its maximum enables to maintain the amount of phase shift provided by the phase shift unit 12 at "$\pi/2$". Alternatively, feedback control of bias voltage provided to the phase shift unit 12 so that the power of the $2f_0$ component attains minimum enables to maintain the amount of phase shift provided by the phase shift unit 12 at "$\pi/2$". In such feedback control, it is possible to determine whether the bias voltage should be larger or smaller by monitoring the phase of the $f_0$ component or the $2f_0$ component.

Figure 8:
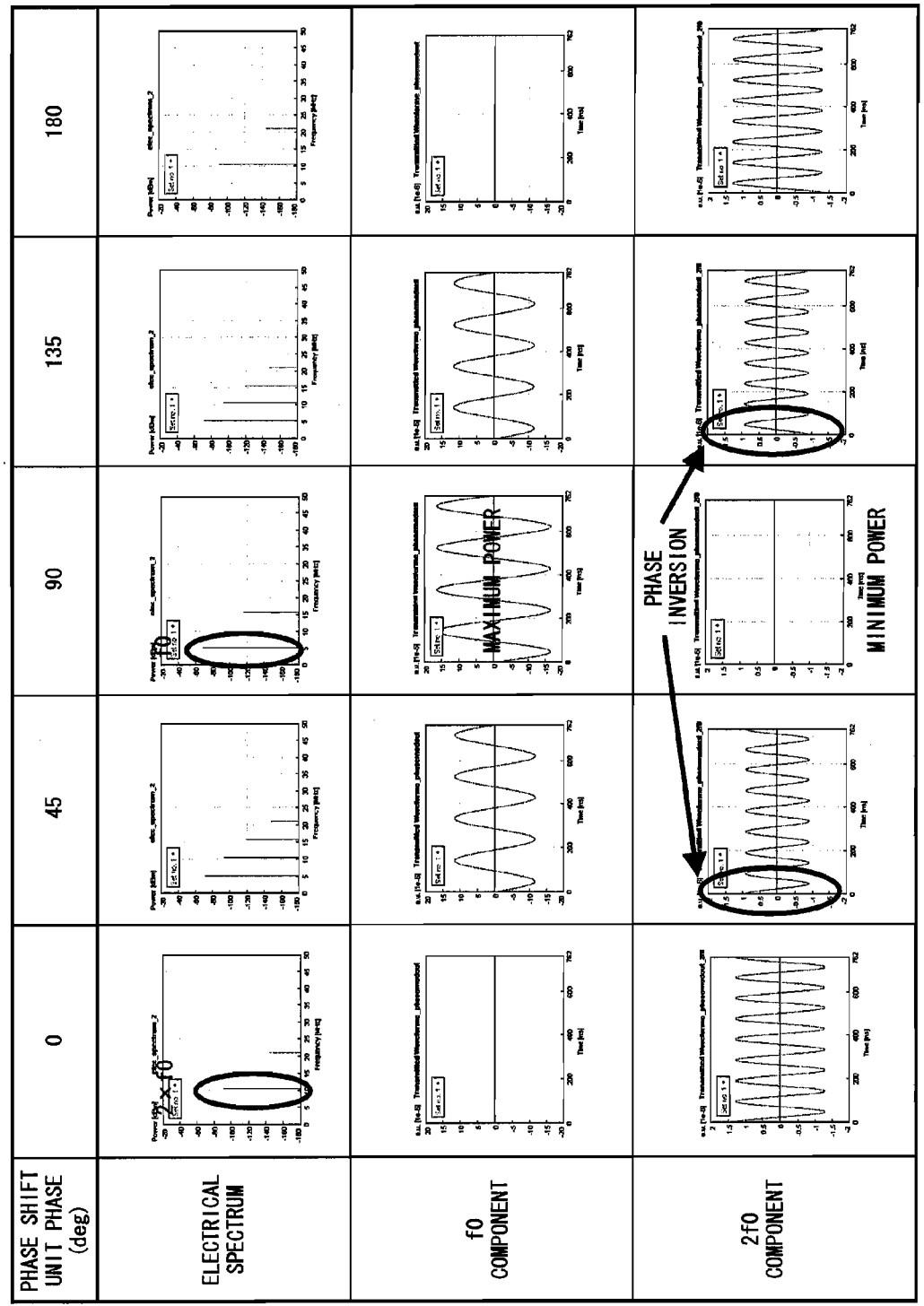
FIG. 8 is a waveform diagram presenting a simulation result of the low-frequency signal component, when n=2 in the phase shifter.

FIG. 8 is a waveform diagram presenting a simulation result of the low-frequency signal component, when n=2 in the phase shifter 2. Here, "n=2" represents that the phase difference between two low-frequency signals provided to the electrodes 23 and 24 in FIG. 6 is $\pi$. The simulation result when "n=2" is the same as the result when "n=1". In other words, the characteristics of the above (1)-(3) are also obtained when n=2. The phase of the $2f_0$ component when the phase of the phase shift unit 12 is 45° is inverted from the phase of the $2f_0$ component when the phase of the phase shift unit 12 is 135°.

Figure 9:
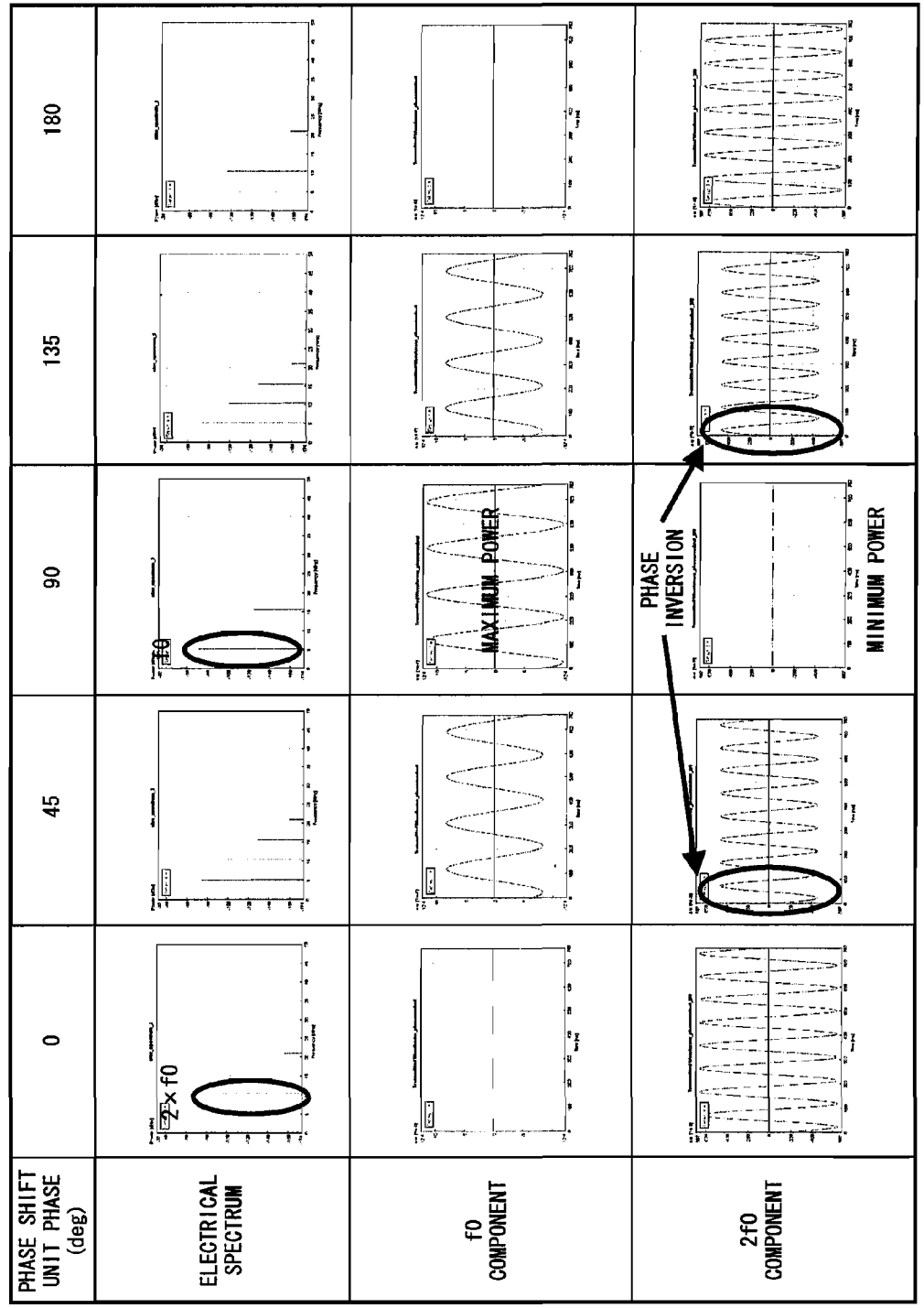
FIG. 9 is a waveform diagram presenting a simulation result of the low-frequency signal component, when n=3 in the phase shifter.

FIG. 9 is a waveform diagram presenting a simulation result of the low-frequency signal component, when n=3 in the phase shifter 2. Here, "n=3" represents that the phase difference between two low-frequency signals provided to the electrodes 23 and 24 in FIG. 6 is $3\pi/2$. The simulation result when "n=3" is the same as the result when "n=1 and 2". In other words, the characteristics of the above (1)-(3) are also obtained when n=3. The phase of the $2f_0$ component when the phase of the phase shift unit 12 is 45° is inverted from the phase of the $2f_0$ component when the phase of the phase shift unit 12 is 135°. When n is a natural number of 5 or above (except for multiples of 4), the results are the same as the results when n=1, 2 or 3.

In simulations shown in FIG. 7 through FIG. 9, the electric spectrum can be obtained as output of the low-speed photodiode 3. That is to say, the $f_0$ component is an $f_0$ component comprised in the output of the low-speed photodiode 3. In addition, the $2f_0$ component is a $2f_0$ component comprised in the output of the low-speed photodiode 3.

In such a manner, the optical transmitting apparatus shown in FIG. 6 is controlled so that the phase difference between the low-frequency signal provided to one electrode and the low-frequency signal provided to another electrode is $n\pi/2$ (n is a natural number other than 0 and multiples of 4) or approximately $n\pi/2$, when superimposing the low-frequency signal on the modulated optical signal via the electrodes 23 and 24. Additionally the $2f_0$ component, comprised in the output optical signal is extracted by the synchronous detection using the low-speed photodiode 3, the band-pass filter 4 and the phase comparator 5 etc. The phase shift of the phase shift unit 12 is maintained at an appropriate value (for example, an odd-numbered multiples of $\pi/2$) by controlling the phase shift unit 12 with the feedback control so that the power of the $2f_0$ component attains the minimum. By so doing, the quality of the output optical signal can be stabilized.

In the above embodiment, a frequency component, in which the frequency $f_0$ of the low-frequency signal was doubled, is monitored; however, the present invention is not limited to this frequency component. In other words, it is possible that, in the present invention, the feedback control can be performed using an nth harmonics (n is a natural number 2 or above) to be superposed on the modulated optical signal.

Figure 10:
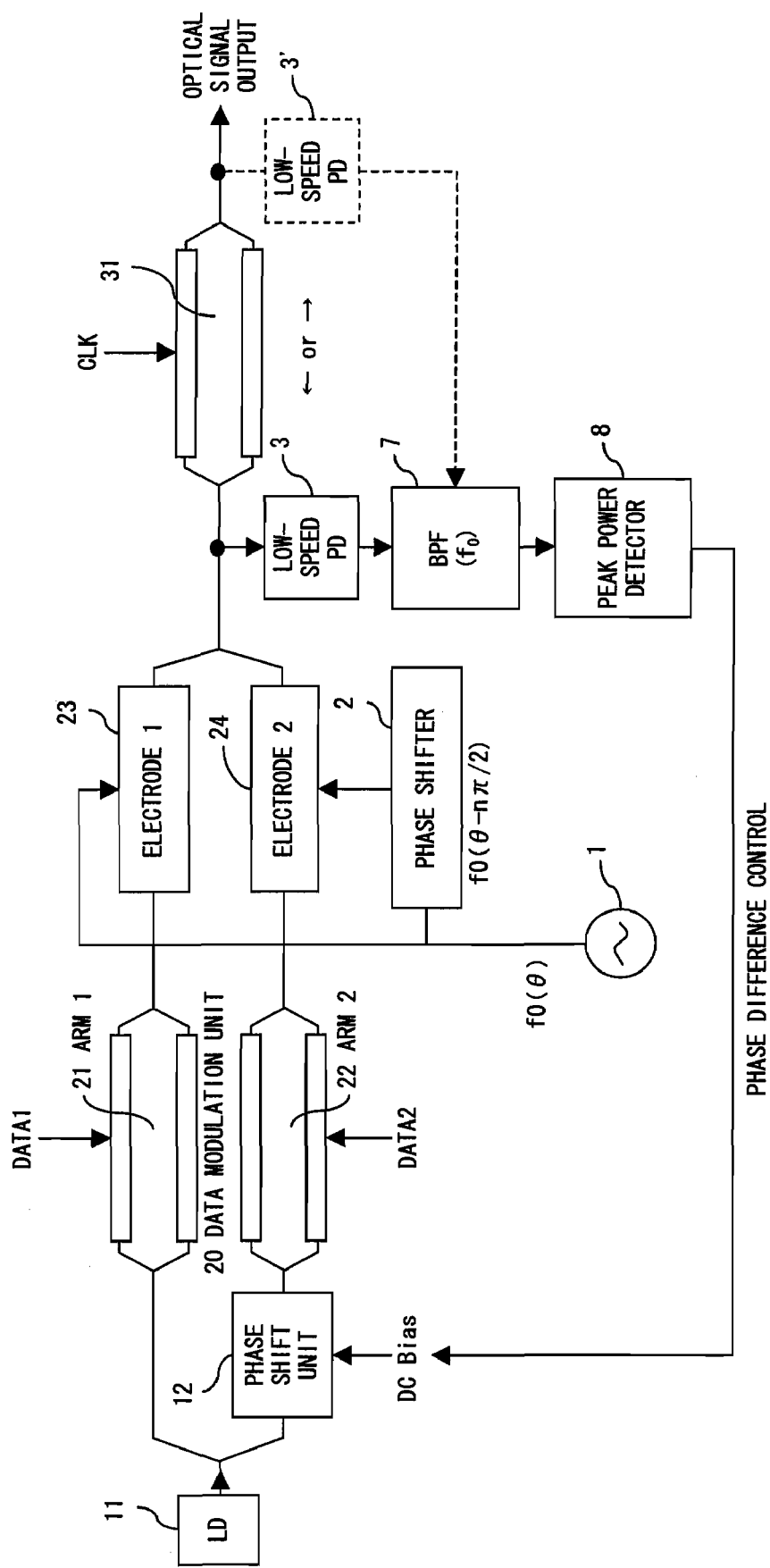
FIG. 10 through FIG. 12 are diagrams describing second through fourth configuration of an optical transmitting apparatus relating to the first embodiment of the present invention.

FIG. 10 is an overview block diagram describing a second configuration of an optical transmitting apparatus relating to the first embodiment of the present invention. In FIG. 10, the illustration of the driving signal generator unit 110 and the clock signal generator unit 120 shown in FIG. 6 is omitted.

The optical transmitting apparatus shown in FIG. 6 performs feedback control by monitoring power of a doubled component ($2f_0$) of the frequency of the low-frequency signal. On the other hand, the optical transmitting apparatus shown in FIG. 10 performs the feedback control by monitoring peak power of the frequency $f_0$ of the low-frequency signal. Therefore, the optical transmitting apparatus comprises a BPF 7, which passed the frequency component $f_0$, and a peak power detector 8 for detecting peak power of the output of the BPF 7. The other configuration of the optical transmitting apparatus shown in FIG. 10 is basically the same as the optical transmitting apparatus shown in FIG. 6.

The optical transmitting apparatus shown in FIG. 10 comprises a clock signal generation unit; a driving signal generation unit for generating data signals DATA 1 and DATA 2 pre-coded for DQPSK using a clock signal from the clock signal generation unit; a semiconductor laser (LD) 11; a phase modulator comprising a phase shift unit 12 for providing an appropriate phase difference between a pair of optical inputs obtained by branching optical waveguide, a data modulation unit 20 comprising data terminals for respectively inputting the pre-coded data signals DATA 1 and DATA 2 to first arm 21 and second arm 22, and first and second electrodes 23 and 24, provided in later stages of corresponding arms of the data modulation unit 20, for superposing a low-frequency signal; and an intensity modulator 31 for modulating the intensity of the optical output from the phase modulator using the clock signal from the clock signal generation unit. The optical transmitting apparatus further comprises a low-frequency superimposing unit, comprising a low-frequency signal generator 1 for generating a low-frequency signal $f_0$ of several KHz (a several MHz is also acceptable), and a phase shifter 2 for shifting the phase of the low-frequency signal $f_0$ by $n\pi/2$ (where n is a natural number other than 0 and multiples of 4), for providing the low-frequency signal $f_0$ from the low-frequency signal generator 1 to the first electrode 23 and also for providing the low-frequency signal $f_0$, of which the phase was shifted by $n\pi/2$ by the phase shifter 2, to the second electrode 24; a monitor unit comprising a low-speed photodiode 3 for extracting a low-frequency signal from optical output of the phase modulator, which has waveguide to split optical beam into two for generating two optical signals and to couple the two optical signals, a band-pass filter BPF 7 with its center frequency of $f_0$, and a peak power detector 8 for detecting peak power of the output of the band-pass filter BPF 7. In addition, a phase difference control unit, not shown in figures, for controlling the amount of phase shift of the phase shift unit 12 according to the output of the monitor unit (the peak power detector 8).

The low-speed photodiode 3 may be replaced by a low-speed photodiode 3' so as to detect an optical signal from the output side of the intensity modulator 31. Because the phase shifter 2 is operated at a low frequency, amount of phase shift by the phase shifter 2 may be fixed.

The simulation results of the optical power of the frequency $f_0$ contained in the modulated optical signal are the same as shown in FIG. 7 through FIG. 9. In other words, the peak power of the frequency $f_0$ becomes greater as the amount of phase shift by the phase shift unit 12 approaches to "$\pi/2$".

In such a manner, the optical transmitting apparatus shown in FIG. 10 is controlled so that the phase difference between the low-frequency signal provided to one electrode and the low-frequency signal provided to another electrode is $n\pi/2$ (n is a natural number other than 0 and multiples of 4) or approximately $n\pi/2$, when superimposing the low-frequency signal on the modulated optical signal via the electrodes 23 and 24. Additionally the peak power of the $f_0$ component, comprised in the output optical signal, is detected using the low-speed photodiode 3, the band-pass filter 7 and the peak power detector 8. The phase shift of the phase shift unit 12 is maintained at an appropriate value (for example, an odd-numbered multiple of $\pi/2$) by controlling the phase shift unit 12 with the feedback control so that the peak power of the $f_0$ component reaches the maximum. By so doing, the quality of the output optical signal can be stabilized.

Figure 11:
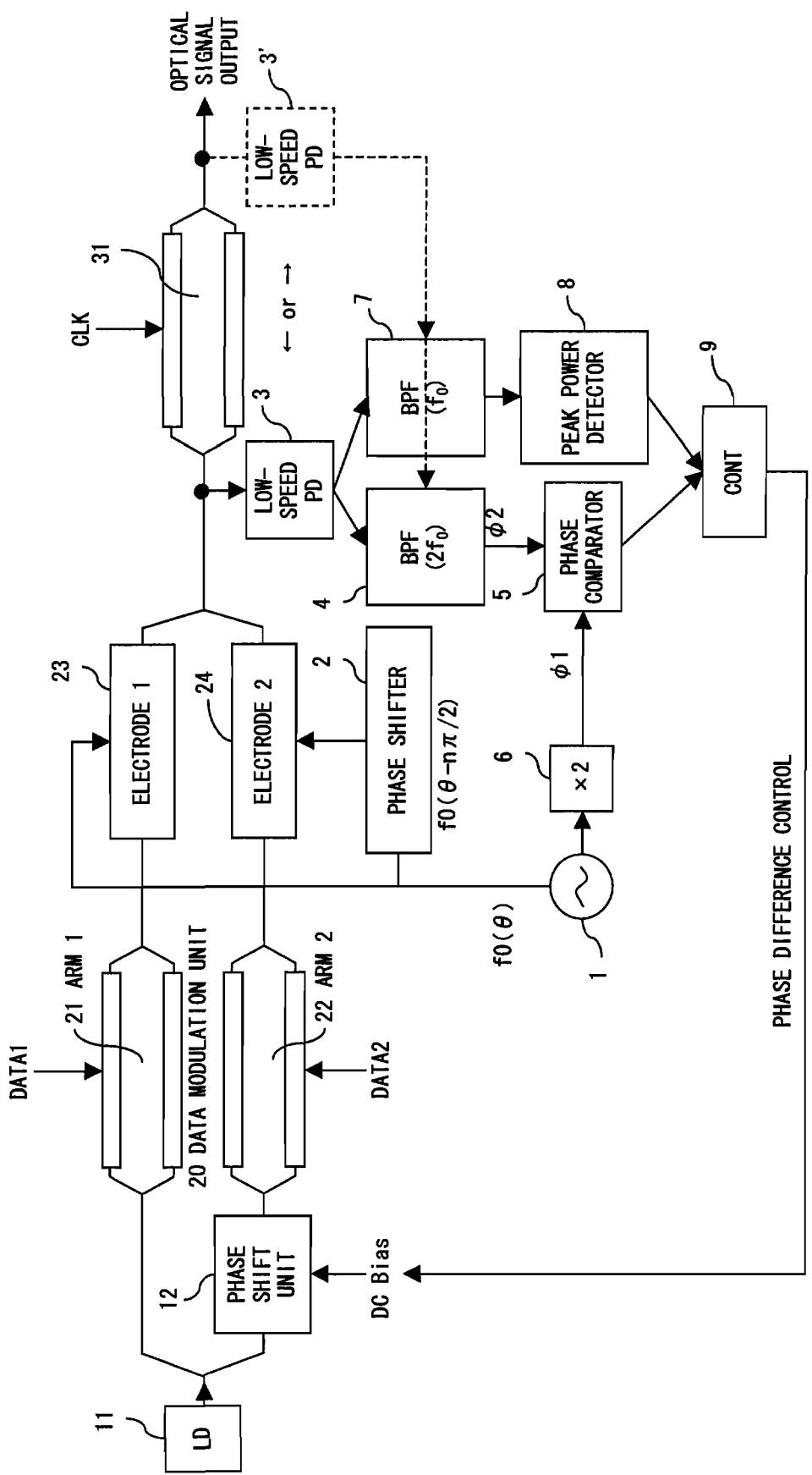

FIG. 11 is an overview block diagram describing a third configuration of an optical transmitting apparatus relating to the first embodiment of the present invention. In FIG. 11, the illustration of the driving signal generator unit 110 and the clock signal generator unit 120 shown in FIG. 6 is omitted.

The optical transmitting apparatus shown in FIG. 11 comprises both a control function shown in FIG. 6 (a configuration for generating bias voltage using $2f_0$ component) and a control function shown in FIG. 10 (a configuration for generating bias voltage using $f_0$ component). A controller (cont) 9 controls the amount of phases shift in the phase shift unit 12 by adjusting the bias voltage according to both control functions (for example, an average value). It is also possible that the controller 9 controls the amount of phase shift according to either one of the control functions.

The optical transmitting apparatus shown in FIG. 11 comprises a clock signal generation unit; a driving signal generation unit for generating data signals DATA 1 and DATA 2 pre-coded for DQPSK using a clock signal from the clock signal generation unit; a semiconductor laser (LD) 11; a phase modulator comprising a phase shift unit 12 for providing an appropriate phase difference between a pair of optical inputs obtained by branching optical waveguide, a data modulation unit 20 comprising data terminals for respectively inputting the pre-coded data signals DATA 1 and DATA 2 to first arm 21 and second arm 22, and first and second electrodes 23 and 24, provided in later stages of corresponding arms of the data modulation unit 20, for superposing a low-frequency signal; an intensity modulator 31 for modulating the intensity of the optical output from the phase modulator using the clock signal from the clock signal generation unit; and a low-frequency superimposing unit, comprising a low-frequency signal generator 1 for generating a low-frequency signal $f_0$ of several KHz (a several MHz is also acceptable), and a phase shifter 2 for shifting the phase of the low-frequency signal $f_0$ by $n\pi/2$ (where n is a natural number other than 0 and multiples of 4), for providing the low-frequency signal $f_0$ from the low-frequency signal generator 1 to the first electrode 23 and also for providing the low-frequency signal $f_0$, of which the phase was shifted by $n\pi/2$ by the phase shifter 2, to the second electrode 24. The optical transmitting apparatus further comprises a first monitor unit comprising a low-speed photodiode 3 for extracting a low-frequency signal from optical output of the phase modulator, which has waveguide to split optical beam into two for generating two optical signals and to couple the optical two signals, a band-pass filter BPF 4 with its center frequency of $2f_0$, a multiplier 6 for doubling the frequency of the low-frequency signal from the low-frequency generator 1, and a phase comparator 5 for comparing the phase $\phi1$ of the multiplier 6 with the phase $\phi2$ of the BPF 4; a second monitor unit comprising the low-speed photodiode 3, a band-pass filter BPF 7 with its pass frequency of $f_0$, and a peak power detector 8 for detecting peak power of the signal output from the band-pass filter BPF 7, and a controller CONT 9 for monitoring output of the first monitor means (the phase comparator 5), and for generating a "+" signal when the phase $\phi1$ is delayed and a "−" signal when the phase $\phi2$ is delayed, and for outputting an "approximate zero" signal when the phase of the phase shift unit 12 has an appropriate value (an odd-numbered multiple of $\pi/2$, for example) and for monitoring the power variation of the second monitor means (the peak power detector 8), and for carrying out bias control on the phase shift unit 12 so that the power reaches its peak.

The low-speed photodiode 3 may be replaced by a low-speed photodiode 3' so as to detect an optical signal from the output side of the intensity modulator 31. Because the phase shifter 2 is operated at a low frequency, amount of phase shift by the phase shifter 2 may be fixed.

The simulation results of the optical power of the frequency $f_0$ contained in the modulated optical signal are the same as shown in FIG. 7 through FIG. 9. In other words, as the amount of phase shift by the phase shift unit 12 approaches to "$\pi/2$", the peak power of the frequency $f_0$ becomes greater, and the power of the frequency $2f_0$ becomes smaller.

In such a manner, in the optical transmitting apparatus shown in FIG. 11, the amount of phase shift by the phase shift unit 12 is controlled by using both the $f_0$ component and the $2f_0$ component contained in the modulated optical signal, and therefore the amount of phase shift by the phase shift unit 12 is maintained at an appropriate value (for example, an odd-numbered multiples of $\pi/2$) with a high degree of accuracy. By so doing, the quality of the output optical signal can be further stabilized.

Figure 12:
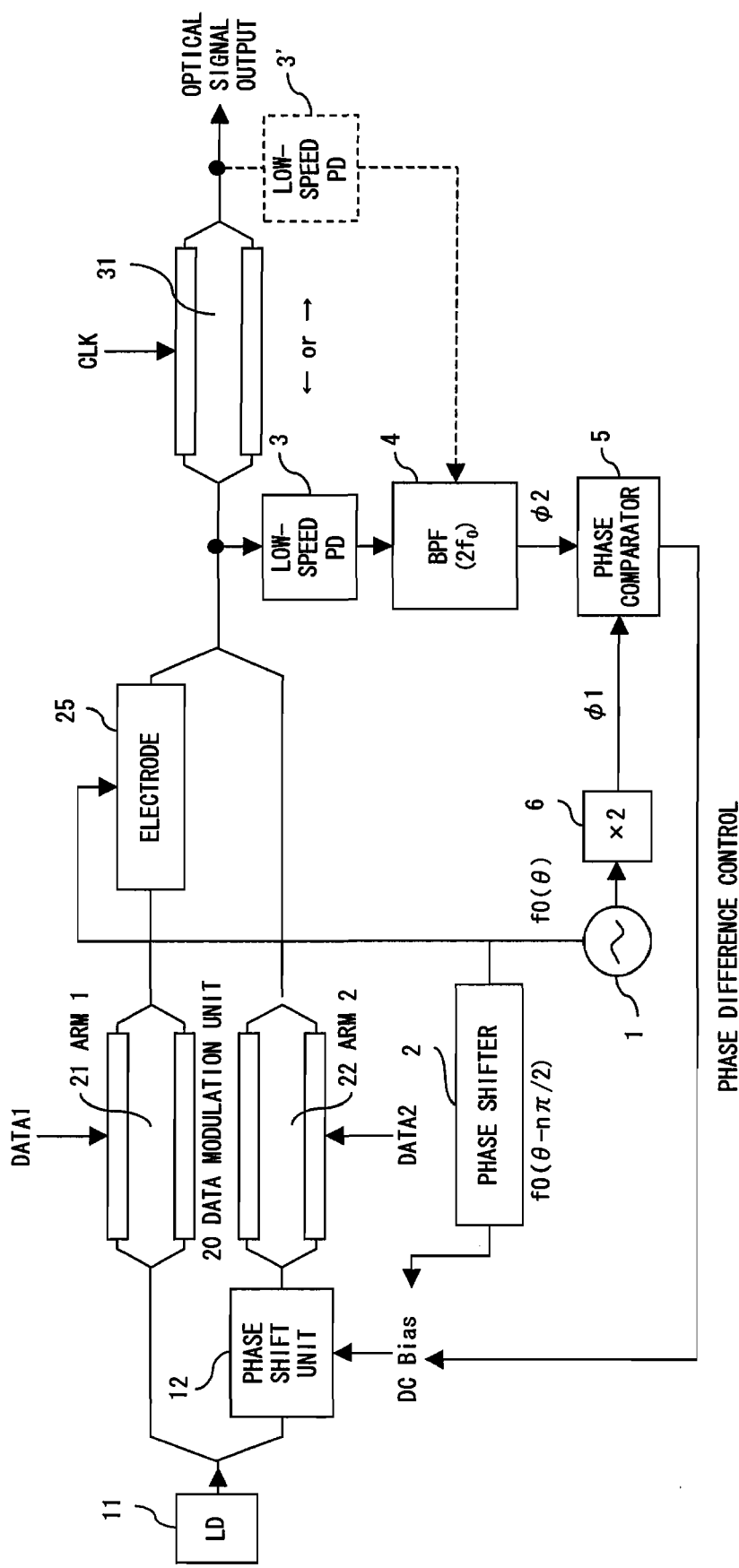

FIG. 12 is an overview block diagram describing a fourth configuration of an optical transmitting apparatus relating to the first embodiment of the present invention. In FIG. 12, the illustration of the driving signal generator unit 110 and the clock signal generator unit 120 shown in FIG. 6 is omitted.

In the optical transmitting apparatus shown in FIG. 12, a low-frequency signal $f_0$ is provided to an electrode 25. By so doing, the low-frequency signal $f_0$ is superimposed on the optical signal output from the arm 21 of a data modulation unit 20. A signal acquired by shifting the phase of the low-frequency signal $f_0$ by $n\pi/2$ (where n is a natural number other than 0 and multiples of 4) using the phase shifter 2 is superimposed on bias voltage (DC Bias) for controlling the phase shift unit 12. The other configuration of the optical transmitting apparatus shown in FIG. 12 is basically the same as that of the optical transmitting apparatus shown in FIG. 6.

The optical transmitting apparatus shown in FIG. 12 comprises a clock signal generation unit; a driving signal generation unit for generating data signals DATA 1 and DATA 2 pre-coded for DQPSK using a clock signal from the clock signal generation unit; a semiconductor laser (LD) 11; a phase modulator comprising a phase shift unit 12 for providing an appropriate phase difference between a pair of optical inputs obtained by branching optical waveguide, a data modulation unit 20 comprising data terminals for respectively inputting the pre-coded data signals DATA 1 and DATA 2 to first arm 21 and second arm 22, and an electrodes 25, provided in later stage of the arm 21 of the data modulation unit 20, for superposing a low-frequency signal; and an intensity modulator 31 for modulating the intensity of the optical output from the phase modulator using the clock signal from the clock signal generation unit. The optical transmitting apparatus further comprises a low-frequency superimposing unit, comprising a low-frequency signal generator 1 for generating a low-frequency signal $f_0$ of several KHz (a several MHz is also acceptable), and a phase shifter 2 for shifting the phase of the low-frequency signal $f_0$ by $n\pi/2$ (where n is a natural number other than 0 and multiples of 4), for providing the low-frequency signal $f_0$ from the low-frequency signal generator 1 to the electrode 25 and also for providing the low-frequency signal $f_0$, of which the phase was shifted by $n\pi/2$ by the phase shifter 2, to the bias input unit of the phase shift unit 12; and a monitor unit comprising a low-speed photodiode 3 for extracting a low-frequency signal from optical output of the phase modulator, which has waveguide to split optical beam into two for generating two optical signals and to couple the two optical signals, a band-pass filter BPF 4 with its center frequency of $2f_0$, a multiplier 6 for doubling the frequency of the low-frequency signal from the low-frequency generator 1, and a phase comparator 5 for comparing the phase φ1 of the multiplier 6 with the phase φ2 of the BPF 4 and for generating a "+" signal when the phase φ1 is delayed and a "−" signal when the phase φ2 is delayed, and for outputting an "approximate zero" signal when the phase of the phase shift unit 12 has an appropriate value (an odd-numbered multiple of $\pi/2$, for example). In addition, the optical transmitting apparatus further comprises a phase difference control unit, not shown in figures, for controlling the amount of phase shift of the phase shift unit 12 according to the output of the monitor unit (the phase comparator 5).

The low-speed photodiode 3 may be replaced by a low-speed photodiode 3' so as to detect an optical signal from the output side of the intensity modulator 31. Because the phase shifter 2 is operated at a low frequency, amount of phase shift by the phase shifter 2 may be fixed.

The optical transmitting apparatus shown in FIG. 12 has a difference from the optical transmitting apparatus shown in FIG. 6 in the position where the low-frequency signal is applied. However, the same characteristics as shown in FIG. 7 through FIG. 9 are also acquired from the configuration shown in FIG. 12. That is, as the amount of phase shift by the phase shift unit 12 approaches to $n\pi/2$ (where n is a natural number other 0 and than multiples of 4), the $2f_0$ component becomes smaller.

Therefore, in the optical transmitting apparatus shown in FIG. 12, the phase shift of the phase shift unit 12 can be maintained at an appropriate value (for example, an odd-numbered multiple of $\pi/2$) by controlling the phase shift unit 12 by the feedback control so that the power of the $2f_0$ component attains the minimum. By such a feedback control, the quality of the output optical signal can be stabilized.

In the optical transmitting apparatus of the first embodiment, the feedback control may be performed by using the $f_0$ component in the configuration shown in FIG. 12, or the feedback control may be performed by using both of the $f_0$ component and the $2f_0$ component.

Second Embodiment

The optical transmitting apparatus of the first embodiment comprises the phase shift unit 12 at the former stage of the data modulation unit 20. On the contrary, the optical transmitting apparatus of the second embodiment a phase shift unit 13 is configured in the later stage of a data modulation unit 40. By so doing, the amplitudes of the $f_0$ component and the $2f_0$ component shown in FIG. 7 through FIG. 9 become larger, compared with the first embodiment. Therefore, in the second embodiment, compared with the first embodiment, detection of the $f_0$ component and the $2f_0$ component is more facilitated, and control accuracy of the amount of phase shift is improved.

Figure 13:
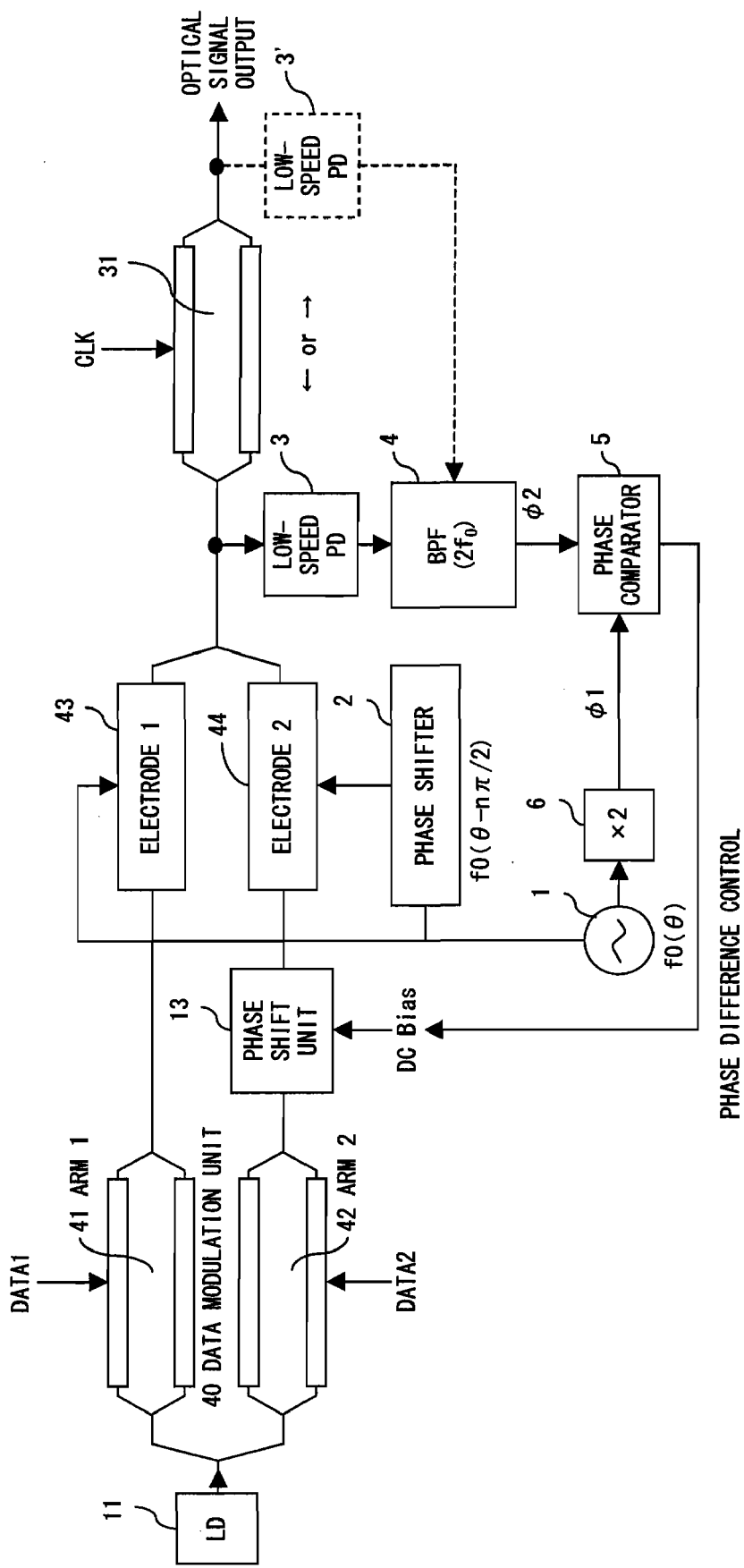
FIG. 13 through FIG. 16 are diagrams describing first through fourth configuration of an optical transmitting apparatus relating to the second embodiment of the present invention.

FIG. 13 is an overview block diagram describing a first configuration of an optical transmitting apparatus relating to the second embodiment of the present invention. The configuration of the optical transmitting apparatus shown in FIG. 13 is basically the same as that of the optical transmitting apparatus shown in FIG. 6. However, in the optical transmitting apparatus shown in FIG. 13, the phase shift unit 13 is configured in a later stage of the data modulation unit 40. In FIG. 13, the illustration of the driving signal generator unit 110 and the clock signal generator unit 120 shown in FIG. 6 is omitted.

The optical transmitting apparatus shown in FIG. 13 comprises a clock signal generation unit; a driving signal generation unit for generating data signals DATA 1 and DATA 2 pre-coded for DQPSK using a clock signal from the clock signal generation unit; a semiconductor laser (LD) 11; a phase modulator comprising a data modulation unit 40 comprising data terminals for respectively inputting the pre-coded data signals DATA 1 and DATA 2 to first arm 41 and second arm 42, a phase shift unit 13 for providing an appropriate phase difference between a pair of optical inputs obtained by branching optical waveguide, and first and second electrodes 43 and 44, provided respectively in later stages of the arm 42 of the data modulation unit 40 and the phase shift unit 13 for superposing a low-frequency signal; and an intensity modulator 31 for modulating the intensity of the optical output from the phase modulator using the clock signal from the clock signal generation unit; and a low-frequency superimposing unit comprising a low-frequency signal generator 1 for generating a low-frequency signal $f_0$ of several KHz (a several MHz is also acceptable), and a phase shifter 2 for shifting the phase of the low-frequency signal $f_0$ by $n\pi/2$ (where n is a natural number other than 0 and multiples of 4), for providing the low-frequency signal $f_0$ from the low-frequency signal generator 1 to the first electrode 43 and also for providing the low-frequency signal $f_0$, of which the phase was shifted by $n\pi/2$ by the phase shifter 2, to the second electrode 44. The optical transmitting apparatus further comprises a monitor unit comprises a low-speed photodiode 3 for extracting a low-frequency signal from optical output of the phase modulator, which has waveguide to split optical beam into two for generating two optical signals and to couple the two optical signals, a band-pass filter BPF 4 with its center frequency of $2f_0$, a multiplier 6 for doubling the frequency of the low-frequency signal from the low-frequency generator 1, and a phase comparator 5 for comparing the phase $\phi 1$ of the multiplier 6 with the phase $\phi 2$ of the BPF 4 and for generating a "+" signal when the phase $\phi 1$ is delayed and a "−" signal when the phase $\phi 2$ is delayed, and for outputting an "approximate zero" signal when the phase of the phase shift unit 12 has an appropriate value (an odd-numbered multiple of $\pi/2$, for example); and a phase difference control unit, not shown in figures, for controlling the amount of phase shift of the phase shift unit 12 according to the output of the monitor unit (the phase comparator 5).

The low-speed photodiode 3 may be replaced by a low-speed photodiode 3' so as to detect an optical signal from the output side of the intensity modulator 31. Because the phase shifter 2 is operated at a low frequency, amount of phase shift by the phase shifter 2 may be fixed.

In the optical transmitting apparatus shown in FIG. 13, the characteristics of the $f_0$ component and the $2f_0$ component presented in FIG. 7 through FIG. 9 are also acquired. However, the optical transmitting apparatus configures the phase shift unit 13 in the later stage of the data modulation unit 40, the amplitudes of the $f_0$ component and the $2f_0$ component become large, as explained above.

Consequently, in the optical transmitting apparatus shown in FIG. 13, the phase shift of the phase shift unit 13 can be maintained at an appropriate value (for example, an odd-numbered multiple of $\pi/2$) by controlling the phase shift unit 13 with feedback control so that the power of the $2f_0$ component attains the minimum.

Figure 14:
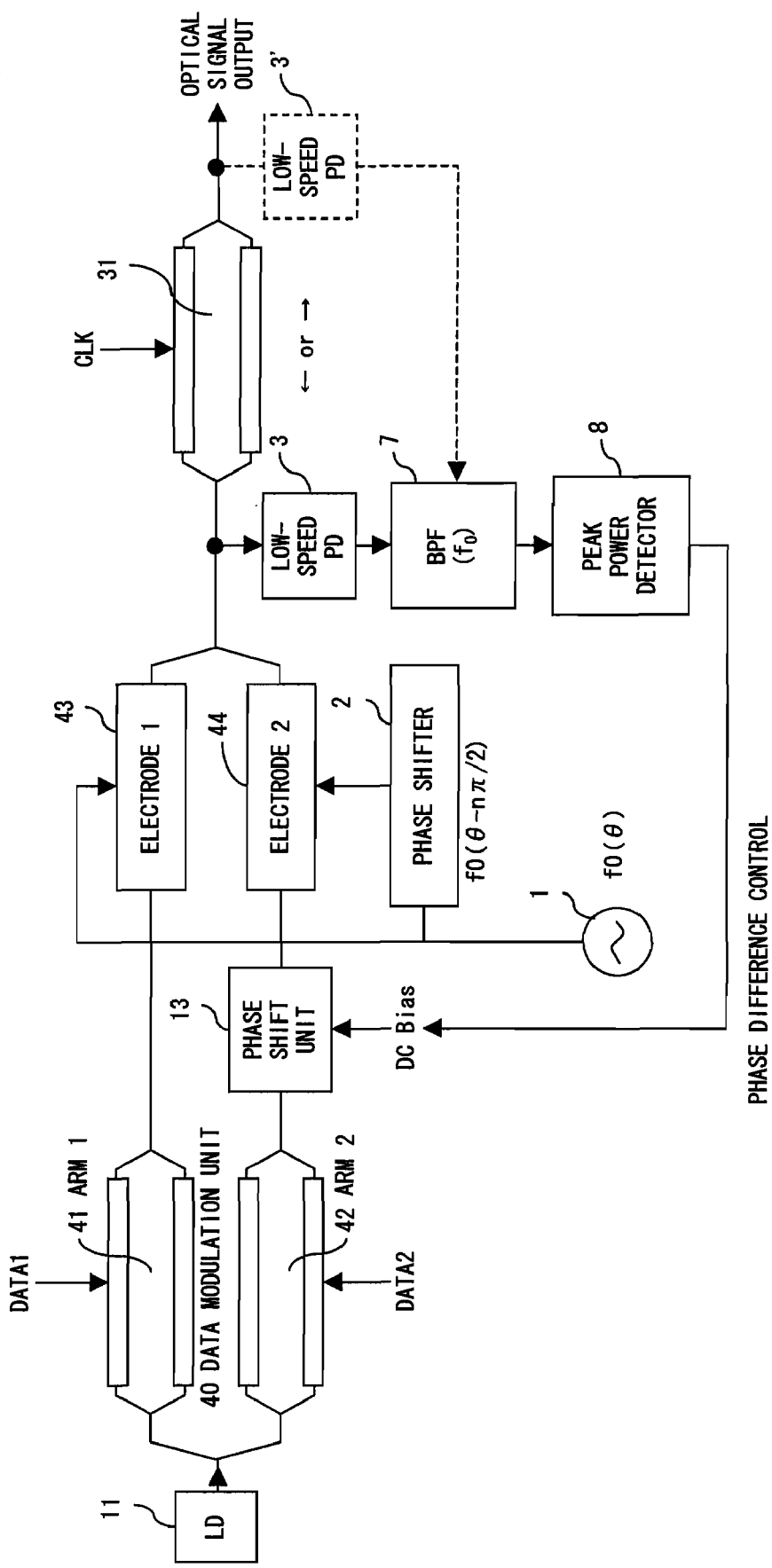

FIG. 14 is an overview block diagram describing a second configuration of an optical transmitting apparatus relating to the second embodiment of the present invention. The configuration of the optical transmitting apparatus shown in FIG. 14 is basically the same as that of the optical transmitting apparatus shown in FIG. 10. However, in the optical transmitting apparatus shown in FIG. 14, the phase shift unit 13 is configured in a later stage of the data modulation unit 40. In FIG. 14, the illustration of the driving signal generator unit 110 and the clock signal generator unit 120 shown in FIG. 6 is omitted.

The optical transmitting apparatus shown in FIG. 14 comprises a clock signal generation unit; a driving signal generation unit for generating data signals DATA 1 and DATA 2 pre-coded for DQPSK using a clock signal from the clock signal generation unit; a semiconductor laser (LD) 11; a phase modulator comprising a data modulation unit 40 comprising data terminals for respectively inputting the pre-coded data signals DATA 1 and DATA 2 to first arm 41 and second arm 42, a phase shift unit 13 for providing an appropriate phase difference between a pair of optical inputs obtained by branching optical waveguide, and first and second electrodes 43 and 44, provided respectively in later stages of the arm 42 of the data modulation unit 40 and the phase shift unit 13 for superposing a low-frequency signal; and an intensity modulator 31 for modulating the intensity of the optical output from the phase modulator using the clock signal from the clock signal generation unit; and a low-frequency superimposing unit comprising a low-frequency signal generator 1 for generating a low-frequency signal $f_0$ of several KHz (a several MHz is also acceptable), and a phase shifter 2 for shifting the phase of the low-frequency signal $f_0$ by $n\pi/2$ (where n is a natural number other than 0 and multiples of 4), for providing the low-frequency signal $f_0$ from the low-frequency signal generator 1 to the first electrode 43 and also for providing the low-frequency signal $f_0$, of which the phase was shifted by $n\pi/2$ by the phase shifter 2, to the second electrode 44. The optical transmitting apparatus further comprises a monitor unit comprises a low-speed photodiode 3 for extracting a low-frequency signal from optical output of the phase modulator, which has waveguide to split optical beam into two for generating two optical signals and to couple the two optical signals, a band-pass filter BPF 7 with its center frequency of $f_0$, and a peak power detector 8 for detecting peak power of the output of the band-pass filter BPF 7. In addition, a phase difference control unit, not shown in figures, for controlling the amount of phase shift of the phase shift unit 12 according to the output of the monitor unit (the peak power detector 8).

The low-speed photodiode 3 may be replaced by a low-speed photodiode 3' so as to detect an optical signal from the output side of the intensity modulator 31. Because the phase shifter 2 is operated at a low frequency, amount of phase shift by the phase shifter 2 may be fixed.

In the optical transmitting apparatus shown in FIG. 14, the characteristics of the $f_0$ component and the $2f_0$ component presented in FIG. 7 through FIG. 9 are also acquired. Consequently, in the optical transmitting apparatus shown in FIG. 14, the phase shift of the phase shift unit 13 can be maintained at an appropriate value (for example, an odd-numbered multiple of $\pi/2$) by controlling the phase shift unit 13 with feedback control so that the power of the $f_0$ component attains the maximum.

Figure 15:
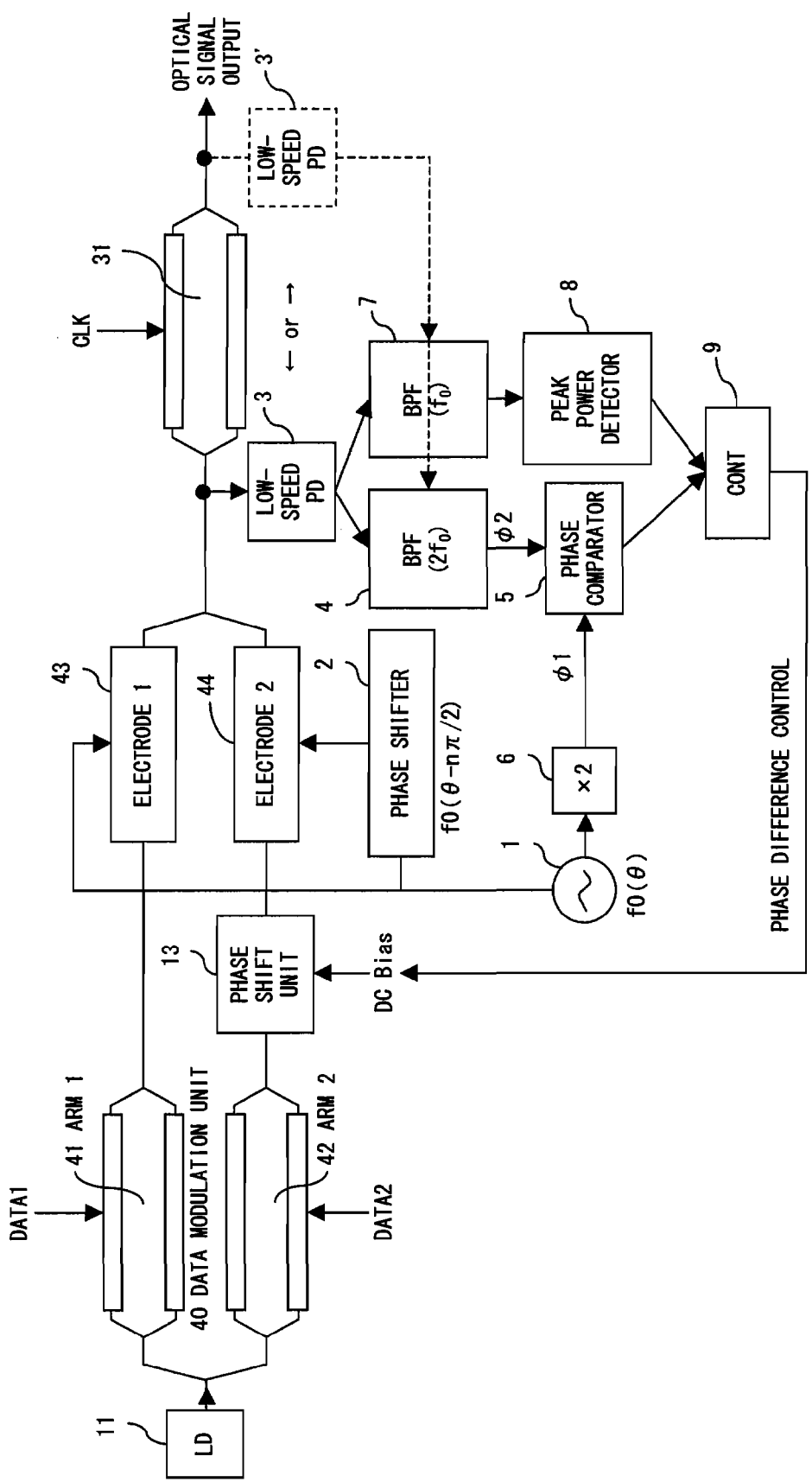

FIG. 15 is an overview block diagram describing a third configuration of an optical transmitting apparatus relating to the second embodiment of the present invention. The configuration of the optical transmitting apparatus shown in FIG. 15 is basically the same as that of the optical transmitting apparatus shown in FIG. 11. However, in the optical transmitting apparatus shown in FIG. 15, the phase shift unit 13 is configured in a later stage of the data modulation unit 40. In FIG. 15, the illustration of the driving signal generator unit 110 and the clock signal generator unit 120 shown in FIG. 6 is omitted.

The optical transmitting apparatus shown in FIG. 15 comprises a clock signal generation unit; a driving signal generation unit for generating data signals DATA 1 and DATA 2 pre-coded for DQPSK using a clock signal from the clock signal generation unit; a semiconductor laser (LD) 11; a phase modulator comprising a data modulation unit 40 comprising data terminals for respectively inputting the pre-coded data signals DATA 1 and DATA 2 to first arm 41 and second arm 42, a phase shift unit 13 for providing an appropriate phase difference between a pair of optical inputs obtained by branching optical waveguide, and first and second electrodes 43 and 44, provided respectively in later stages of the arm 42 of the data modulation unit 40 and the phase shift unit 13 for superposing a low-frequency signal; and an intensity modulator 31 for modulating the intensity of the optical output from the phase modulator using the clock signal from the clock signal generation unit; and a low-frequency superimposing unit comprising a low-frequency signal generator 1 for generating a low-frequency signal $f_0$ of several KHz (a several MHz is also acceptable), and a phase shifter 2 for shifting the phase of the low-frequency signal $f_0$ by $n\pi/2$ (where n is a natural number other than 0 and multiples of 4), for providing the low-frequency signal $f_0$ from the low-frequency signal generator 1 to the first electrode 43 and also for providing the low-frequency signal $f_0$, of which the phase was shifted by $n\pi/2$ by the phase shifter 2, to the second electrode 44. The optical transmitting apparatus further comprises a first monitor unit comprising a low-speed photodiode 3 for extracting a low-frequency signal from optical output of the phase modulator, which has waveguide to split optical beam into two for generating two optical signals and to couple the two optical signals, a band-pass filter BPF 4 with its center frequency of $2f_0$, a multiplier 6 for doubling the frequency of the low-frequency signal from the low-frequency generator 1, and a phase comparator 5 for comparing the phase $\phi 1$ of the multiplier 6 with the phase $\phi 2$ of the BPF 4; a second monitor unit comprising the low-speed photodiode 3, a band-pass filter BPF 7 with its pass frequency of $f_0$, and a peak power detector 8 for detecting peak power of the signal output from the band-pass filter BPF 7, and a controller CONT 9 for monitoring output of the first monitor means (the phase comparator 5), and for generating a "+" signal when the phase $\phi 1$ is delayed and a "−" signal when the phase $\phi 2$ is delayed, and for outputting an "approximate zero" signal when the phase of the phase shift unit 12 has an appropriate value (an odd-numbered multiple of $\pi/2$, for example) and for monitoring the power variation of the second monitor means (the peak power detector 8), and for carrying out bias control on the phase shift unit 12 so that the power reaches its peak.

The low-speed photodiode 3 may be replaced by a low-speed photodiode 3' so as to detect an optical signal from the output side of the intensity modulator 31. Because the phase shifter 2 is operated at a low frequency, amount of phase shift by the phase shifter 2 may be fixed.

In the optical transmitting apparatus shown in FIG. 15, the characteristics of the $f_0$ component and the $2f_0$ component presented in FIG. 7 through FIG. 9 are also acquired. Consequently, in this optical transmitting apparatus also, the phase shift of the phase shift unit 13 can be maintained at an appropriate value (for example, an odd-numbered multiple of $\pi/2$) by controlling the phase shift unit 13 with feedback control so that the power of the $2f_0$ component attains the minimum and the power of the $f_0$ component reaches the maximum.

Figure 16:
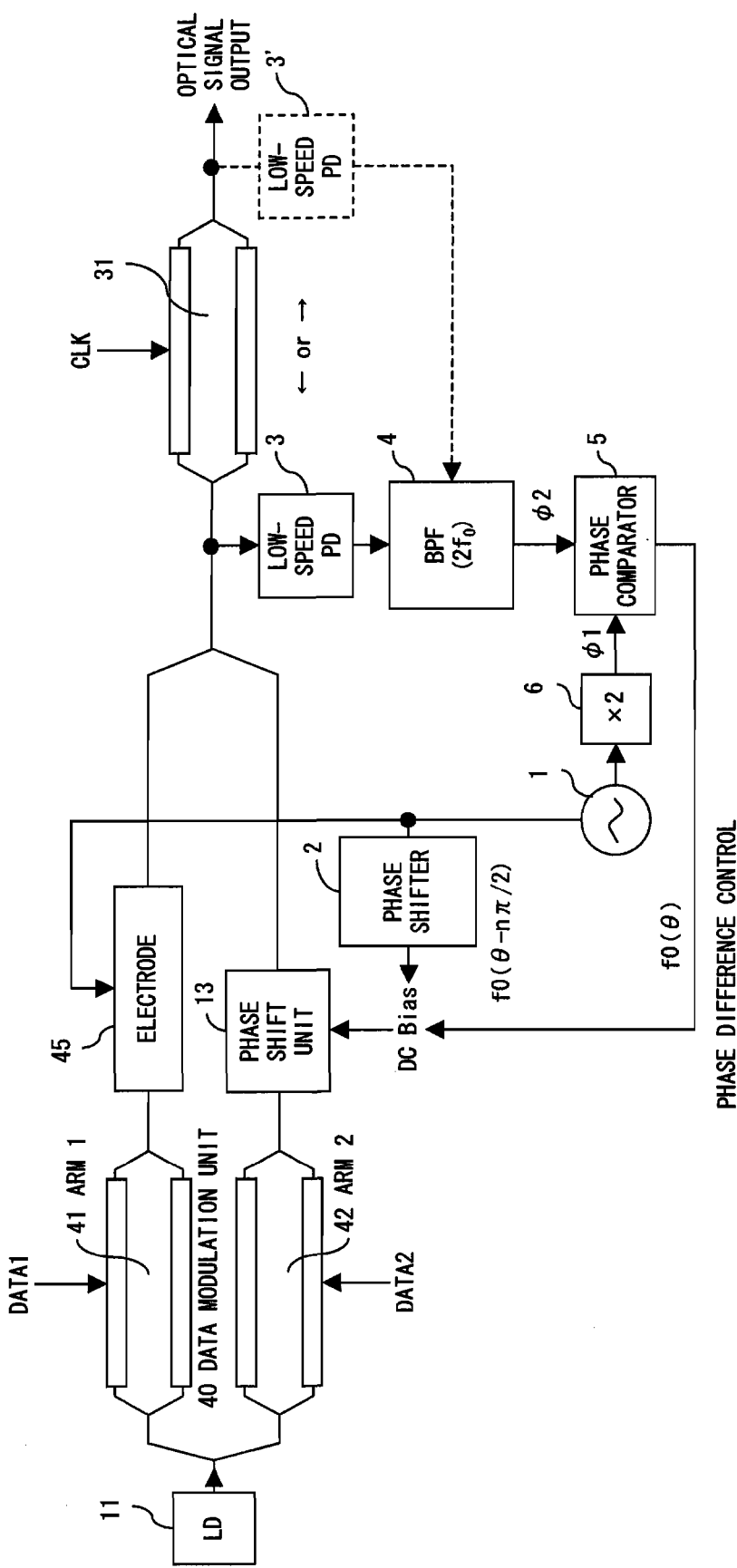

FIG. 16 is an overview block diagram describing a fourth configuration of an optical transmitting apparatus relating to the second embodiment of the present invention. The configuration of the optical transmitting apparatus shown in FIG. 16 is basically the same as that of the optical transmitting apparatus shown in FIG. 12. However, in the optical transmitting apparatus shown in FIG. 16, the phase shift unit 13 is configured in the later stage of the data modulation unit 40. In FIG. 16, the illustration of the driving signal generator unit 110 and the clock signal generator unit 120 shown in FIG. 6 is omitted.

The optical transmitting apparatus shown in FIG. 16 comprises a clock signal generation unit; a driving signal generation unit for generating data signals DATA 1 and DATA 2 pre-coded for DQPSK using a clock signal from the clock signal generation unit; a semiconductor laser (LD) 11; a phase modulator comprising a data modulation unit 40 comprising data terminals for respectively inputting the pre-coded data signals DATA 1 and DATA 2 to first arm 41 and second arm 42, a phase shift unit 13 for providing an appropriate phase difference between a pair of optical inputs obtained by branching optical waveguide, and an electrode 45, provided in later stage of the arm 41 of the data modulation unit 40 for superposing a low-frequency signal; and an intensity modulator 31 for modulating the intensity of the optical output from the phase modulator using the clock signal from the clock signal generation unit; and a low-frequency superimposing unit comprising a low-frequency signal generator 1 for generating a low-frequency signal $f_0$ of several KHz (a several MHz is also acceptable), and a phase shifter 2 for shifting the phase of the low-frequency signal $f_0$ by $n\pi/2$ (where n is a natural number other than 0 and multiples of 4), for providing the low-frequency signal $f_0$ from the low-frequency signal generator 1 to the electrode 45 and also for providing the low-frequency signal $f_0$, of which the phase was shifted by $n\pi/2$ by the phase shifter 2, to the phase shift unit 13. The optical transmitting apparatus further comprises a monitor unit comprises a low-speed photodiode 3 for extracting a low-frequency signal from optical output of the phase modulator, which has waveguide to split optical beam into two for generating two optical signals and to couple the two optical signals, a band-pass filter BPF 4 with its center frequency of $2f_0$, a multiplier 6 for doubling the frequency of the low-frequency signal from the low-frequency generator 1, and a phase comparator 5 for comparing the phase $\phi 1$ of the multiplier 6 with the phase $\phi 2$ of the BPF 4 and for generating a "+" signal when the phase $\phi 1$ is delayed and a "−" signal when the phase $\phi 2$ is delayed, and for outputting an "approximate zero" signal when the phase of the phase shift unit 12 has an appropriate value (an odd-numbered multiple of $\pi/2$, for example); and a phase difference control unit, not shown in figures, for controlling the amount of phase shift of the phase shift unit 12 according to the output of the monitor unit (the phase comparator 5).

The low-speed photodiode 3 may be replaced by a low-speed photodiode 3' so as to detect an optical signal from the output side of the intensity modulator 31. Because the phase shifter 2 is operated at a low frequency, amount of phase shift by the phase shifter 2 may be fixed.

In the optical transmitting apparatus shown in FIG. 16, like the other optical transmitting apparatus, the characteristics of the $f_0$ component and the $2f_0$ component presented in FIG. 7 through FIG. 9 are also acquired. Consequently, in this optical transmitting apparatus also, it is possible to maintain the phase shift of the phase shift unit 13 at an appropriate value (for example, an odd-numbered multiple of $\pi/2$) by controlling the phase shift unit 13 with feedback control so that the power of the $2f_0$ component attains the minimum.

In the optical transmitting apparatus of the second embodiment, the feedback control may be performed by using the $f_0$ component in the configuration shown in FIG. 16, or the feedback control may be performed by using both of the $f_0$ component and the $2f_0$ component.

Third Embodiment

In the optical transmitting apparatus of the third embodiment, a low-frequency signal is superimposed on an optical signal in an MZ modulator performing data modulation. In this configuration, the characteristics of the $f_0$ component and the $2f_0$ component presented in FIG. 7 through FIG. 9 are also acquired. In the following description, a configuration for performing the feedback control by using the $2f_0$ component is presented; however in the third embodiment, the feedback control may be performed by using the $f_0$ component, or the feedback control may be performed by using both of the $f_0$ component and the $2f_0$ component.

Figure 17:
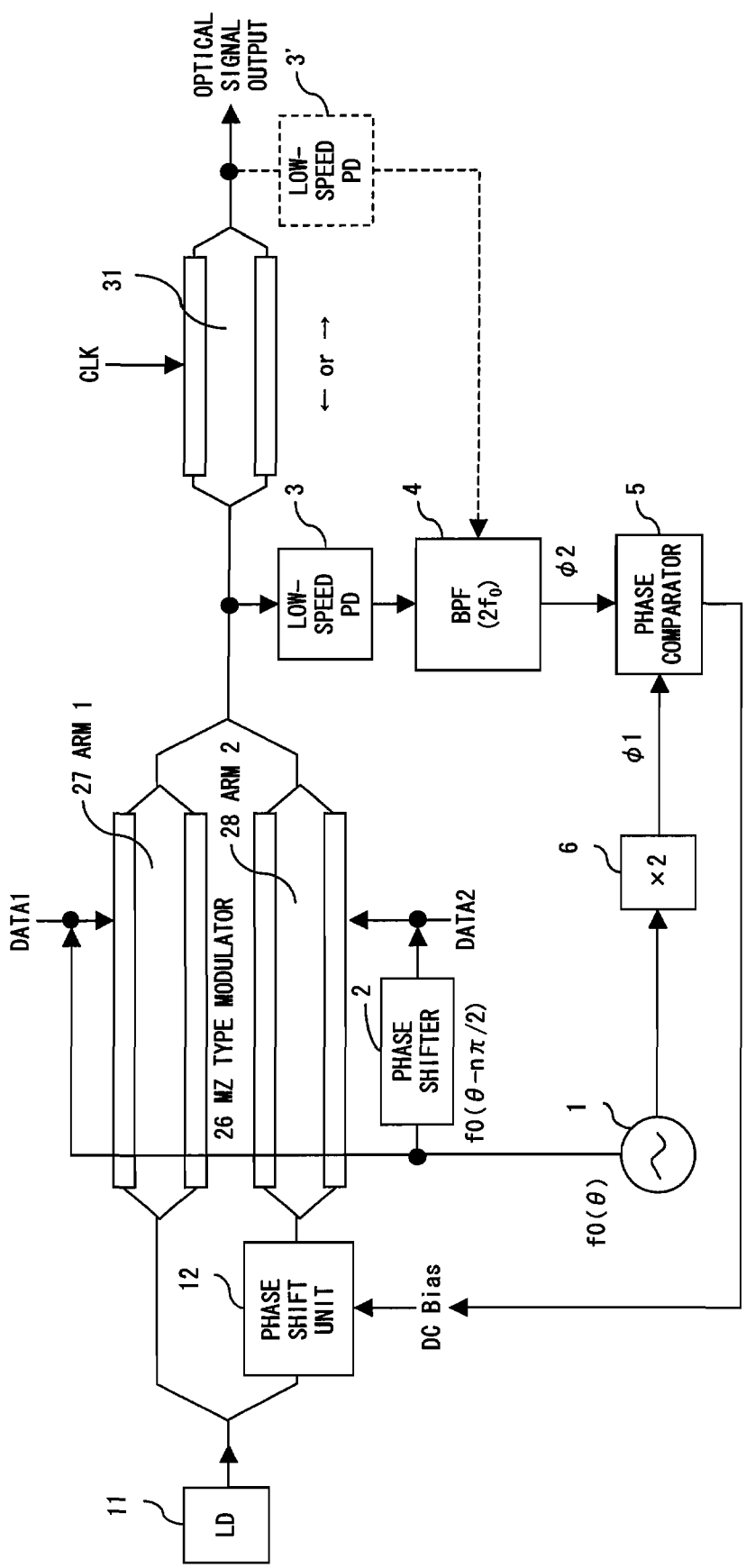
FIG. 17 and FIG. 18 are diagrams describing first and second configuration of an optical transmitting apparatus relating to the third embodiment of the present invention.

FIG. 17 is an overview block diagram describing a first configuration of an optical transmitting apparatus relating to the third embodiment of the present invention. In this optical transmitting apparatus, the low-frequency signal is superimposed on each of the data DATA 1 and the data DATA 2. In FIG. 17, the illustration of the driving signal generator unit 110 and the clock signal generator unit 120 shown in FIG. 6 is omitted.

The optical transmitting apparatus shown in FIG. 17 comprises a clock signal generation unit; a driving signal generation unit for generating data signals DATA 1 and DATA 2 pre-coded for DQPSK using a clock signal from the clock signal generation unit; a semiconductor laser (LD) 11; a phase modulator comprising a phase shift unit 12 for providing an appropriate phase difference between a pair of optical inputs obtained by branching optical waveguide and a MZ (Mach-Zehnder) modulator 26 comprising data terminals for respectively inputting the pre-coded data signals DATA 1 and DATA 2 to first arm 27 and second arm 28; an intensity modulator 31 for modulating the intensity of the optical output from the phase modulator using the clock signal from the clock signal generation unit; and a low-frequency superimposing unit comprising a low-frequency signal generator 1 for generating a low-frequency signal $f_0$ of several KHz (a several MHz is also acceptable), and a phase shifter 2 for shifting the phase of the low-frequency signal $f_0$ by $n\pi/2$ (where n is a natural number other than 0 and multiples of 4), for providing the low-frequency signal $f_0$ from the low-frequency signal generator 1 to an input terminal for the data signal DATA 1 of the first arm 27 and also for providing the low-frequency signal $f_0$, of which the phase was shifted by $n\pi/2$ by the phase shifter 2, to an input terminal for the data signal DATA 2 of the second arm 28. The optical transmitting apparatus further comprises a monitor unit comprises a low-speed photodiode 3 for extracting a low-frequency signal from optical output of the phase modulator, which has waveguide to split optical beam into two for generating two optical signals and to couple the two optical signals, a band-pass filter BPF 4 with its center frequency of $2f_0$, a multiplier 6 for doubling the frequency of the low-frequency signal from the low-frequency generator 1, and a phase comparator 5 for comparing the phase $\phi 1$ of the multiplier 6 with the phase $\phi 2$ of the BPF 4 and for generating a "+" signal when the phase $\phi 1$ is delayed and a "−" signal when the phase $\phi 2$ is delayed, and for outputting an "approximate zero" signal when the phase of the phase shift unit 12 has an appropriate value (an odd-numbered multiple of $\pi/2$, for example); and a phase difference control unit, not shown in figures, for controlling the amount of phase shift of the phase shift unit 12 according to the output of the monitor unit (the phase comparator 5).

The low-speed photodiode 3 may be replaced by a low-speed photodiode 3' so as to detect an optical signal from the output side of the intensity modulator 31. Because the phase shifter 2 is operated at a low frequency, amount of phase shift by the phase shifter 2 may be fixed.

In the optical transmitting apparatus shown in FIG. 17, the characteristics of the $f_0$ component and the $2f_0$ component presented in FIG. 7 through FIG. 9 are also acquired. Consequently, in this optical transmitting apparatus as well, the phase shift of the phase shift unit 12 can be maintained at an appropriate value (for example, an odd-numbered multiple of $\pi/2$) by controlling the phase shift unit 12 with feedback control so that the power of the $2f_0$ component attains the minimum.

Figure 18:
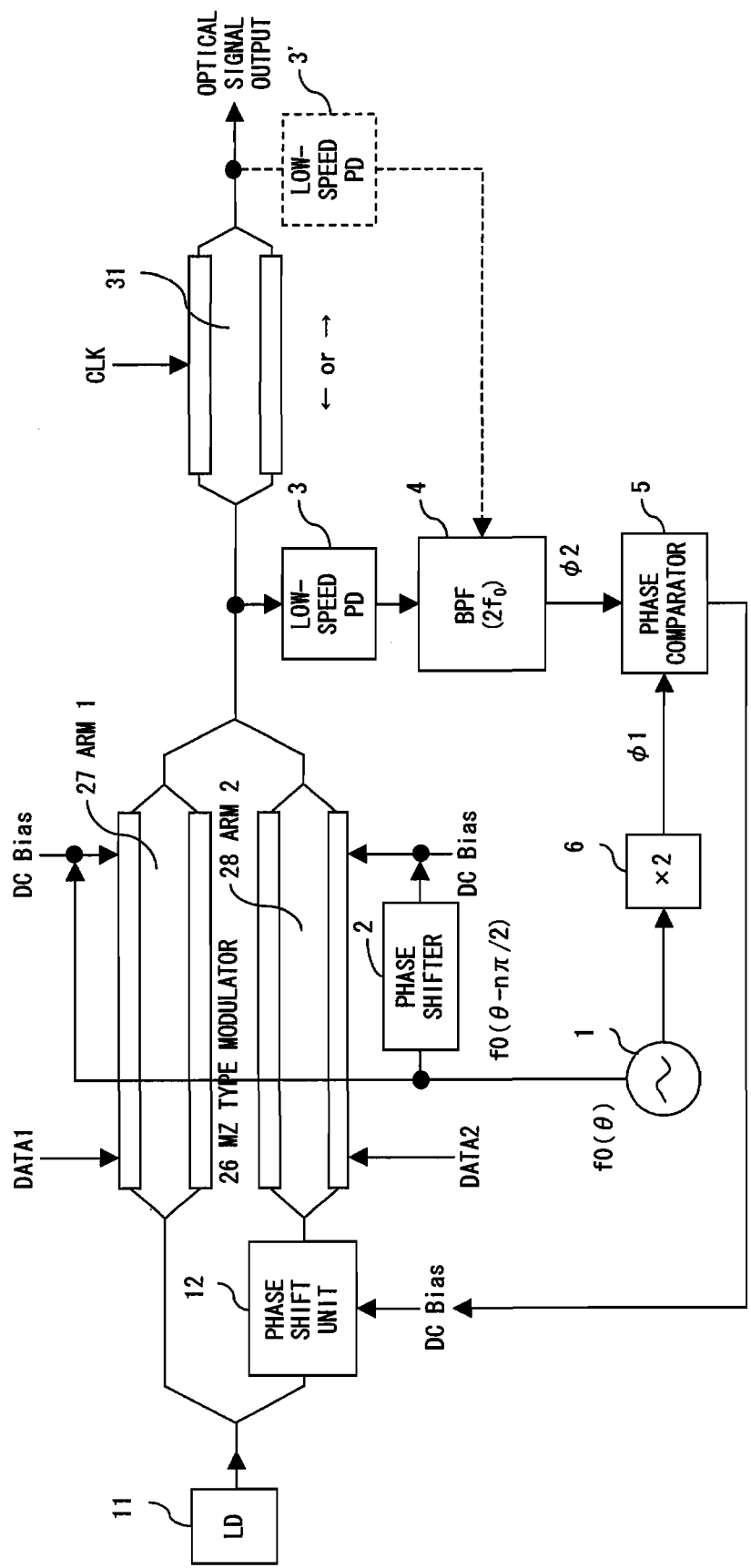

FIG. 18 is an overview block diagram describing a second configuration of an optical transmitting apparatus relating to the third embodiment of the present invention. The configuration of the optical transmitting apparatus shown in FIG. 18 is basically the same as that of the optical transmitting apparatus shown in FIG. 17. However, in the optical transmitting apparatus shown in FIG. 18, the low-frequency signal is superimposed on a DC bias signal of the MZ modulator. In FIG. 18, the illustration of the driving signal generator unit 110 and the clock signal generator unit 120 shown in FIG. 6 is omitted.

The optical transmitting apparatus shown in FIG. 18 comprises a clock signal generation unit; a driving signal generation unit for generating data signals DATA 1 and DATA 2 pre-coded for DQPSK using a clock signal from the clock signal generation unit; a semiconductor laser (LD) 11; a phase modulator comprising a phase shift unit 12 for providing an appropriate phase difference between a pair of optical inputs obtained by branching optical waveguide and a MZ (Mach-Zehnder) modulator 26 comprising data terminals for inputting the pre-coded data signals DATA 1 and DATA 2 and bias terminals through which low-frequency signals with different phase being input to first arm 27 and second arm 28, respectively; an intensity modulator 31 for modulating the intensity of the optical output from the phase modulator using the clock signal from the clock signal generation unit; and a low-frequency superimposing unit comprising a low-frequency signal generator 1 for generating a low-frequency signal $f_0$ of several KHz (a several MHz is also acceptable), and a phase shifter 2 for shifting the phase of the low-frequency signal $f_0$ by $n\pi/2$ (where n is a natural number other than 0 and multiples of 4), for providing the low-frequency signal $f_0$ from the low-frequency signal generator 1 to the bias terminal of the first arm 27 and also for providing the low-frequency signal $f_0$, of which the phase was shifted by $n\pi/2$ by the phase shifter 2, to the bias terminal of the second arm 28. The optical transmitting apparatus further comprises a monitor unit comprises a low-speed photodiode 3 for extracting a low-frequency signal from optical output of the phase modulator, which has waveguide to split optical beam into two for generating two optical signals and to couple the two optical signals, a band-pass filter BPF 4 with its center frequency of $2f_0$, a multiplier 6 for doubling the frequency of the low-frequency signal from the low-frequency generator 1, and a phase comparator 5 for comparing the phase $\phi 1$ of the multiplier 6 with the phase $\phi 2$ of the BPF 4 and for generating a "+" signal when the phase $\phi 1$ is delayed and a "−" signal when the phase $\phi 2$ is delayed, and for outputting an "approximate zero" signal when the phase of the phase shift unit 12 has an appropriate value (an odd-numbered multiple of $\pi/2$, for example); and a phase difference control unit, not shown in figures, for controlling the amount of phase shift of the phase shift unit 12 according to the output of the monitor unit (the phase comparator 5).

The low-speed photodiode 3 may be replaced by a low-speed photodiode 3' so as to detect an optical signal from the output side of the intensity modulator 31. Because the phase shifter 2 is operated at a low frequency, amount of phase shift by the phase shifter 2 may be fixed.

In the optical transmitting apparatus shown in FIG. 18, the characteristics of the $f_0$ component and the $2f_0$ component presented in FIG. 7 through FIG. 9 are also acquired. Consequently, in this optical transmitting apparatus, the phase shift of the phase shift unit 12 can be also maintained at an appropriate value (for example, an odd-numbered multiple of $\pi/2$) by controlling the phase shift unit 12 with feedback control so that the power of the $2f_0$ component attains the minimum.

Fourth Embodiment

Figure 19:
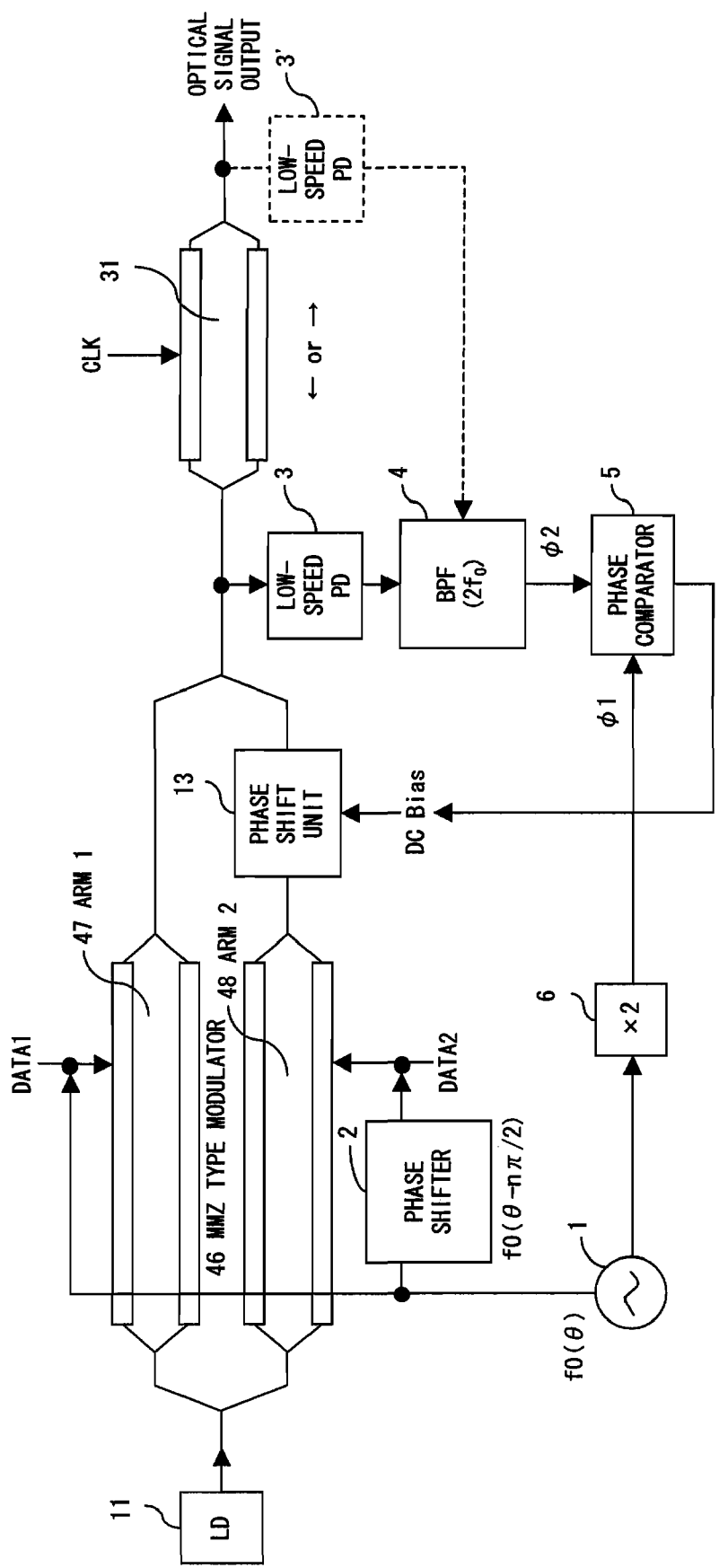
FIG. 19 and FIG. 20 are diagrams describing first and second configuration of an optical transmitting apparatus relating to the fourth embodiment of the present invention.
Figure 20:
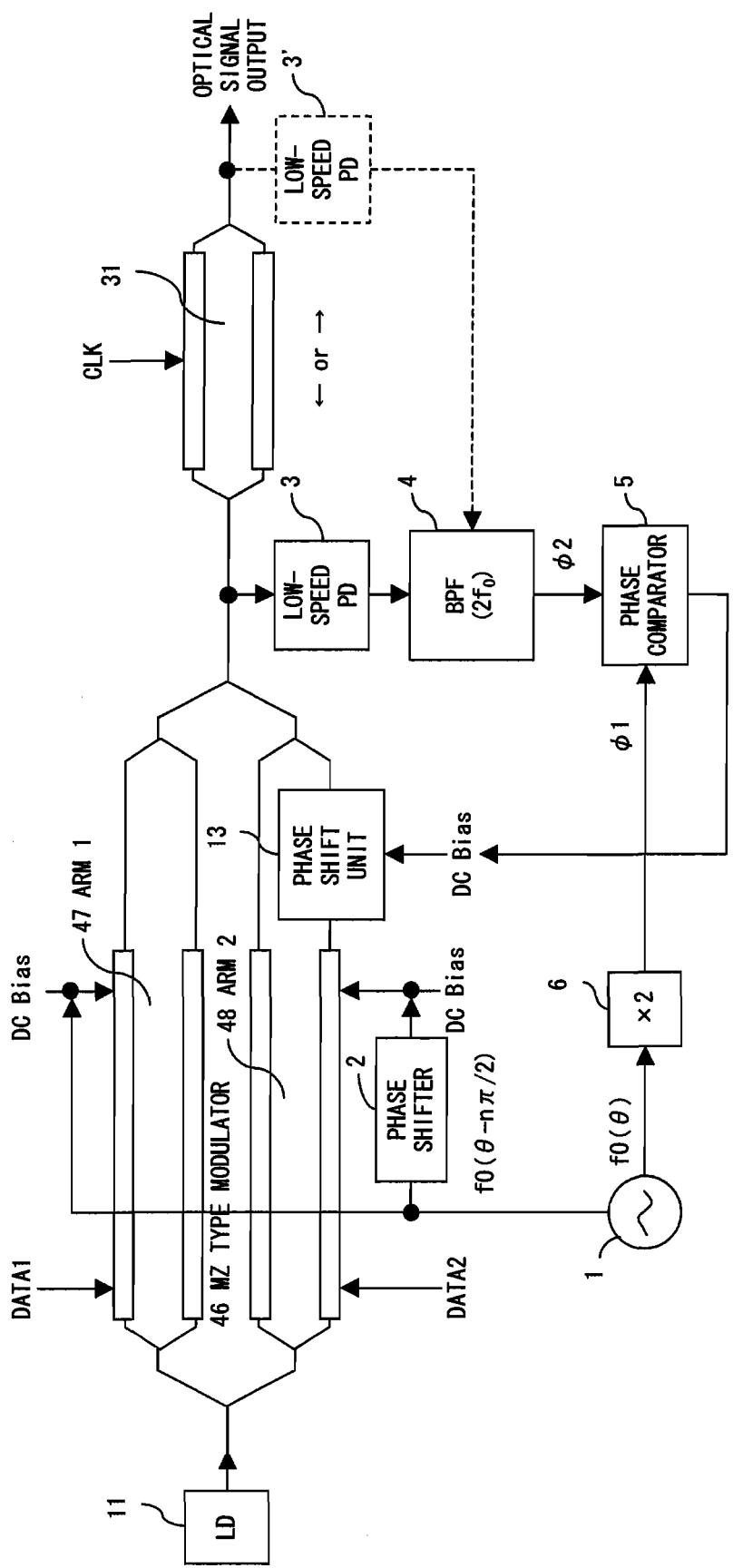

The fourth configuration of the optical transmitting apparatus is basically the same as that of the optical transmitting apparatus of the third embodiment. However, in the configuration of the optical transmitting apparatus of the fourth embodiment, the phase shift unit 13 is configured in the later stage of the MZ modulator (the data modulation unit). In FIG. 19 and FIG. 20 describing the fourth embodiment, the illustration of the driving signal generator unit 110 and the clock signal generator unit 120 shown in FIG. 6 is omitted.

FIG. 19 is an overview block diagram describing a first configuration of an optical transmitting apparatus relating to the fourth embodiment of the present invention. The optical transmitting apparatus shown in FIG. 19 comprises a clock signal generation unit; a driving signal generation unit for generating data signals DATA 1 and DATA 2 pre-coded for DQPSK using a clock signal from the clock signal generation unit; a semiconductor laser (LD) 11; a phase modulator comprising a MZ (Mach-Zehnder) modulator 46 comprising data terminals for respectively inputting the pre-coded data signals DATA 1 and DATA 2 to first arm 47 and second arm 48 and a phase shift unit 13 for providing an appropriate phase difference between a pair of optical inputs obtained by branching optical waveguide; an intensity modulator 31 for modulating the intensity of the optical output from the phase modulator using the clock signal from the clock signal generation unit; and a low-frequency superimposing unit comprising a low-frequency signal generator 1 for generating a low-frequency signal $f_0$ of several KHz (a several MHz is also acceptable), and a phase shifter 2 for shifting the phase of the low-frequency signal $f_0$ by $n\pi/2$ (where n is a natural number other than 0 and multiples of 4), for providing the low-frequency signal $f_0$ from the low-frequency signal generator 1 to the data terminal for the data signal DATA 1 of the first arm 47 and also for providing the low-frequency signal $f_0$, of which the phase was shifted by $n\pi/2$ by the phase shifter 2, to the data terminal for the data signal DATA 2 of the second arm 48. The optical transmitting apparatus further comprises a monitor unit comprises a low-speed photodiode 3 for extracting a low-frequency signal from optical output of the phase modulator, which has waveguide to split optical beam into two for generating two optical signals and to couple the two optical signals, a band-pass filter BPF 4 with its center frequency of $2f_0$, a multiplier 6 for doubling the frequency of the low-frequency signal from the low-frequency generator 1, and a phase comparator 5 for comparing the phase $\phi1$ of the multiplier 6 with the phase $\phi2$ of the BPF 4 and for generating a "+" signal when the phase $\phi1$ is delayed and a "−" signal when the phase $\phi2$ is delayed, and for outputting an "approximate zero" signal when the phase of the phase shift unit 12 has an appropriate value (an odd-numbered multiple of $\pi/2$, for example); and a phase difference control unit, not shown in figures, for controlling the amount of phase shift of the phase shift unit 12 according to the output of the monitor unit (the phase comparator 5).

The low-speed photodiode 3 may be replaced by a low-speed photodiode 3' so as to detect an optical signal from the output side of the intensity modulator 31. Because the phase shifter 2 is operated at a low frequency, amount of phase shift by the phase shifter 2 may be fixed.

In the optical transmitting apparatus shown in FIG. 19, the characteristics of the $f_0$ component and the $2f_0$ component presented in FIG. 7 through FIG. 9 are also acquired. Consequently, in this optical transmitting apparatus, the phase shift of the phase shift unit 13 can be maintained at an appropriate value (for example, an odd-numbered multiple of $\pi/2$) by controlling the phase shift unit 13 with feedback control so that the power of the $2f_0$ component attains the minimum.

FIG. 20 is an overview block diagram describing a second configuration of an optical transmitting apparatus relating to the fourth embodiment of the present invention. The optical transmitting apparatus shown in FIG. 20 comprises a clock signal generation unit; a driving signal generation unit for generating data signals DATA 1 and DATA 2 pre-coded for DQPSK using a clock signal from the clock signal generation unit; a semiconductor laser (LD) 11; a phase modulator comprising a MZ (Mach-Zehnder) modulator 46 comprising data terminals for inputting the pre-coded data signals DATA 1 and DATA 2 and bias terminals through which low-frequency signals with different phase being input to first arm 47 and second arm 48, respectively and a phase shift unit 13 for providing an appropriate phase difference between a pair of optical inputs obtained by branching optical waveguide; an intensity modulator 31 for modulating the intensity of the optical output from the phase modulator using the clock signal from the clock signal generation unit; and a low-frequency superimposing unit comprising a low-frequency signal generator 1 for generating a low-frequency signal $f_0$ of several KHz (a several MHz is also acceptable), and a phase shifter 2 for shifting the phase of the low-frequency signal $f_0$ by $n\pi/2$ (where n is a natural number other than 0 and multiples of 4), for providing the low-frequency signal $f_0$ from the low-frequency signal generator 1 to the bias terminal of the first arm 47 and also for providing the low-frequency signal $f_0$, of which the phase was shifted by $n\pi/2$ by the phase shifter 2, to the bias terminal of the second arm 48. The optical transmitting apparatus further comprises a monitor unit comprises a low-speed photodiode 3 for extracting a low-frequency signal from optical output of the phase modulator, which has waveguide to split optical beam into two for generating two optical signals and to couple the two optical signals, a band-pass filter BPF 4 with its center frequency of $2f_0$, a multiplier 6 for doubling the frequency of the low-frequency signal from the low-frequency generator 1, and a phase comparator 5 for comparing the phase $\phi1$ of the multiplier 6 with the phase $\phi2$ of the BPF 4 and for generating a "+" signal when the phase $\phi1$ is delayed and a "−" signal when the phase $\phi2$ is delayed, and for outputting an "approximate zero" signal when the phase of the phase shift unit 12 has an appropriate value (an odd-numbered multiple of $\pi/2$, for example); and a phase difference control unit, not shown in figures, for controlling the amount of phase shift of the phase shift unit 12 according to the output of the monitor unit (the phase comparator 5).

The low-speed photodiode 3 may be replaced by a low-speed photodiode 3' so as to detect an optical signal from the output side of the intensity modulator 31. Because the phase shifter 2 is operated at a low frequency, amount of phase shift by the phase shifter 2 may be fixed.

In the optical transmitting apparatus shown in FIG. 20, the characteristics of the $f_0$ component and the $2f_0$ component presented in FIG. 7 through FIG. 9 are also acquired. Consequently, in this optical transmitting apparatus, the phase shift of the phase shift unit 13 can be maintained at an appropriate value (for example, an odd-numbered multiple of $\pi/2$) by controlling the phase shift unit 13 with feedback control so that the power of the $2f_0$ component attains the minimum.

In the fourth embodiment also, the feedback control may be performed by using the $f_0$ component, or the feedback control may be performed by using both of the $f_0$ component and the $2f_0$ component.

Fifth Embodiment

Figure 21:
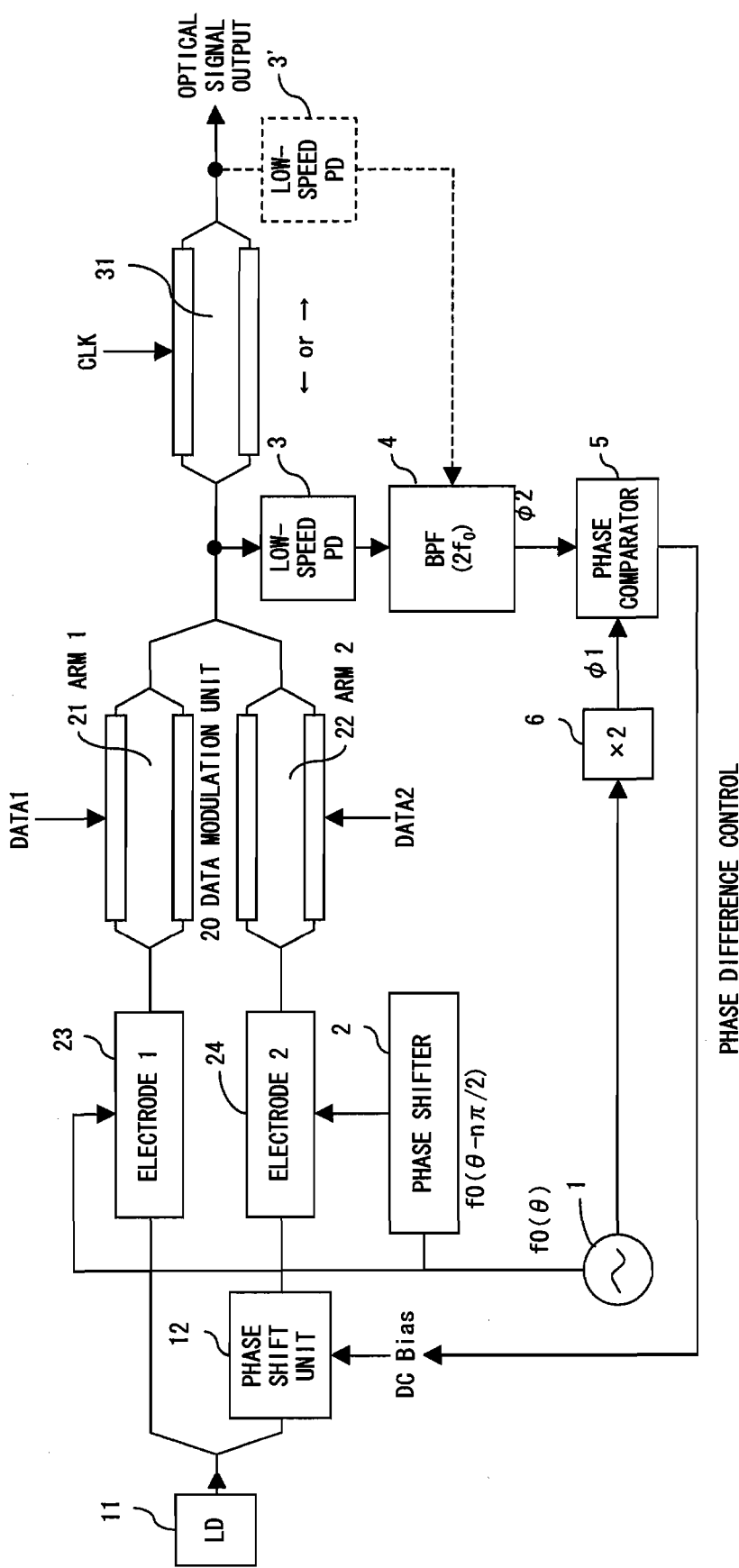
FIG. 21 is a diagram describing a configuration of an optical transmitting apparatus relating to the fifth embodiment of the present invention.

In the optical transmitting apparatus of the fifth embodiment, electrodes for superimposing a low-frequency signal on an optical signal is configured in the former stage of a data modulation unit and a phase shift unit is configured in the former stage of the electrodes. In FIG. 21 describing the fifth embodiment, the illustration of the driving signal generator unit 110 and the clock signal generator unit 120 shown in FIG. 6 is omitted.

FIG. 21 is an overview block diagram describing a configuration of an optical transmitting apparatus relating to the fifth embodiment of the present invention. The optical transmitting apparatus shown in FIG. 21 comprises a clock signal generation unit; a driving signal generation unit for generating data signals DATA 1 and DATA 2 pre-coded for DQPSK using a clock signal from the clock signal generation unit; a semiconductor laser (LD) 11; a phase modulator comprising a phase shift unit 12 for providing an appropriate phase difference between a pair of optical inputs obtained by branching optical waveguide, first and second electrodes 23 and 24, provided in former stages of corresponding arms of a data modulation unit 20, for superposing a low-frequency signals, and the data modulation unit 20 comprising data terminals for respectively inputting the pre-coded data signals DATA 1 and DATA 2 to first arm 21 and second arm 22; an intensity modulator 31 for modulating the intensity of the optical output from the phase modulator using the clock signal from the clock signal generation unit; and a low-frequency superimposing unit comprising a low-frequency signal generator 1 for generating a low-frequency signal $f_0$ of several KHz (a several MHz is also acceptable), and a phase shifter 2 for shifting the phase of the low-frequency signal $f_0$ by $n\pi/2$ (where n is a natural number other than 0 and multiples of 4), for providing the low-frequency signal $f_0$ from the low-frequency signal generator 1 to the first electrode 23 and also for providing the low-frequency signal $f_0$, of which the phase was shifted by $n\pi/2$ by the phase shifter 2, to the second electrode 24. The optical transmitting apparatus further comprises a monitor unit comprises a low-speed photodiode 3 for extracting a low-frequency signal from optical output of the phase modulator, which has waveguide to split optical beam into two for generating two optical signals and to couple the two optical signals, a band-pass filter BPF 4 with its center frequency of $2f_0$, a multiplier 6 for doubling the frequency of the low-frequency signal from the low-frequency generator 1, and a phase comparator 5 for comparing the phase $\phi 1$ of the multiplier 6 with the phase $\phi 2$ of the BPF 4 and for generating a "+" signal when the phase $\phi 1$ is delayed and a "−" signal when the phase $\phi 2$ is delayed, and for outputting an "approximate zero" signal when the phase of the phase shift unit 12 has an appropriate value (an odd-numbered multiple of $\pi/2$, for example); and a phase difference control unit, not shown in figures, for controlling the amount of phase shift of the phase shift unit 12 according to the output of the monitor unit (the phase comparator 5).

The low-speed photodiode 3 may be replaced by a low-speed photodiode 3' so as to detect an optical signal from the output side of the intensity modulator 31. Because the phase shifter 2 is operated at a low frequency, amount of phase shift by the phase shifter 2 may be fixed.

In the optical transmitting apparatus shown in FIG. 21, the characteristics of the $f_0$ component and the $2f_0$ component presented in FIG. 7 through FIG. 9 are also acquired. Consequently, in this optical transmitting apparatus, the phase shift of the phase shift unit 12 can be maintained at an appropriate value (for example, an odd-numbered multiple of $\pi/2$) by controlling the phase shift unit 12 with feedback control so that the power of the $2f_0$ component attains the minimum.

In the fifth embodiment also, the feedback control may be performed by using the $f_0$ component, or the feedback control may be performed by using both of the $f_0$ component and the $2f_0$ component.

Sixth Embodiment

Figure 22:
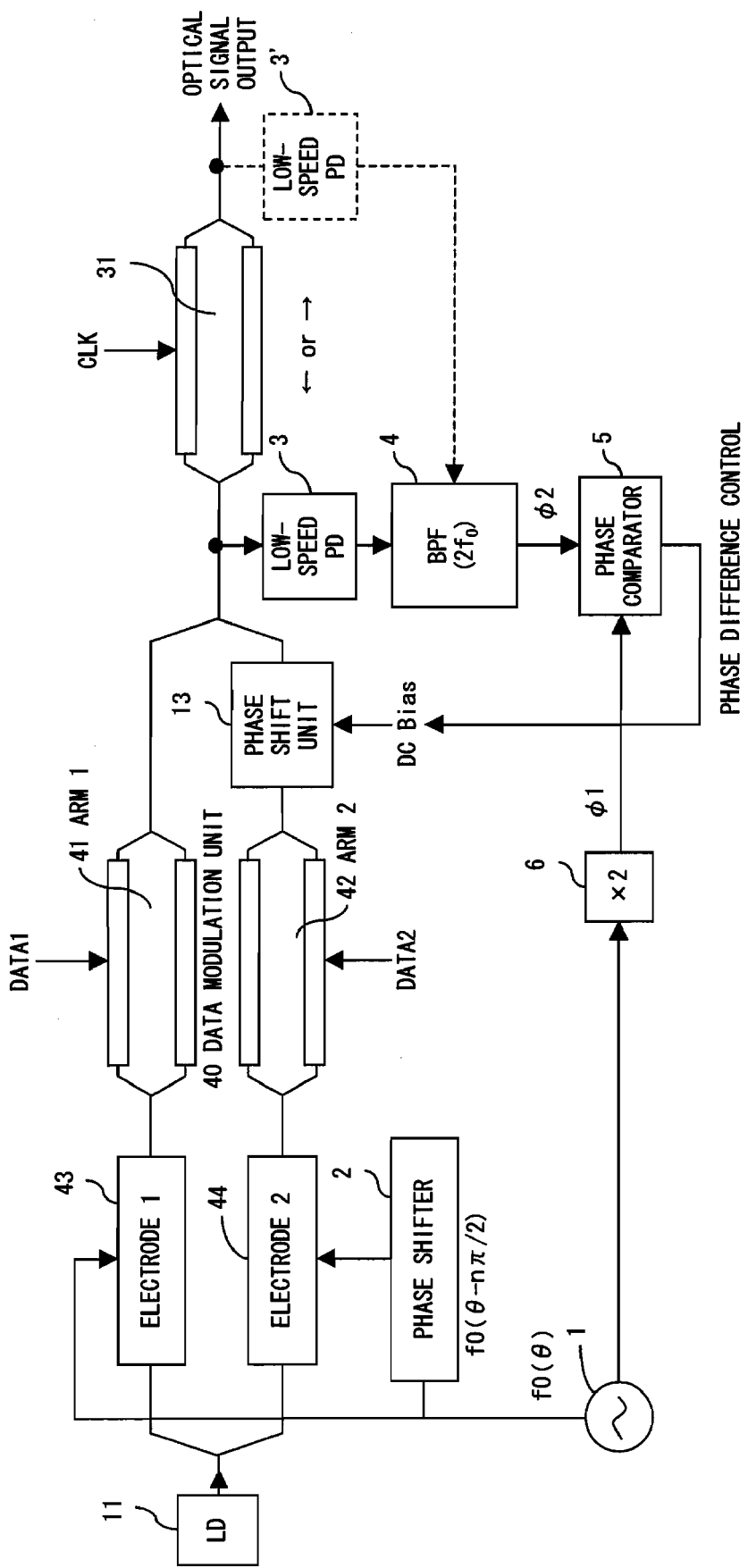
FIG. 22 is a diagram describing a configuration of an optical transmitting apparatus relating to the sixth embodiment of the present invention.

In the optical transmitting apparatus of the sixth embodiment, the electrodes for superimposing a low-frequency signal on an optical signal is configured in the former stage of the data modulation unit, and a phase shift unit is configured in the later stage of the data modulation unit. In FIG. 22 describing the sixth embodiment, the illustration of the driving signal generator unit 110 and the clock signal generator unit 120 shown in FIG. 6 is omitted.

FIG. 22 is an overview block diagram describing a configuration of an optical transmitting apparatus relating to the sixth embodiment of the present invention. The optical transmitting apparatus shown in FIG. 22 comprises a clock signal generation unit; a driving signal generation unit for generating data signals DATA 1 and DATA 2 pre-coded for DQPSK using a clock signal from the clock signal generation unit; a semiconductor laser (LD) 11; a phase modulator comprising first and second electrodes 43 and 44, provided in former stages of corresponding arms of a data modulation unit 40, for superposing a low-frequency signals, the data modulation unit 40 comprising data terminals for respectively inputting the pre-coded data signals DATA 1 and DATA 2 to first arm 41 and second arm 42 and a phase shift unit 13 for providing an appropriate phase difference between a pair of optical inputs obtained by branching optical waveguide; an intensity modulator 31 for modulating the intensity of the optical output from the phase modulator using the clock signal from the clock signal generation unit; and a low-frequency superimposing unit comprising a low-frequency signal generator 1 for generating a low-frequency signal $f_0$ of several KHz (a several MHz is also acceptable), and a phase shifter 2 for shifting the phase of the low-frequency signal $f_0$ by $n\pi/2$ (where n is a natural number other than 0 and multiples of 4), for providing the low-frequency signal $f_0$ from the low-frequency signal generator 1 to the first electrode 43 and also for providing the low-frequency signal $f_0$, of which the phase was shifted by $n\pi/2$ by the phase shifter 2, to the second electrode 44. The optical transmitting apparatus further comprises a monitor unit comprises a low-speed photodiode 3 for extracting a low-frequency signal from optical output of the phase modulator, which has waveguide to split optical beam into two for generating two optical signals and to couple the two optical signals, a band-pass filter BPF 4 with its center frequency of $2f_0$, a multiplier 6 for doubling the frequency of the low-frequency signal from the low-frequency generator 1, and a phase comparator 5 for comparing the phase $\phi 1$ of the multiplier 6 with the phase $\phi 2$ of the BPF 4 and for generating a "+" signal when the phase $\phi 1$ is delayed and a "−" signal when the phase $\phi 2$ is delayed, and for outputting an "approximate zero" signal when the phase of the phase shift unit 12 has an appropriate value (an odd-numbered multiple of $\pi/2$, for example); and a phase difference control unit, not shown in figures, for controlling the amount of phase shift of the phase shift unit 12 according to the output of the monitor unit (the phase comparator 5).

The low-speed photodiode 3 may be replaced by a low-speed photodiode 3' so as to detect an optical signal from the output side of the intensity modulator 31. Because the phase shifter 2 is operated at a low frequency, amount of phase shift by the phase shifter 2 may be fixed.

In the optical transmitting apparatus shown in FIG. 22, the characteristics of the $f_0$ component and the $2f_0$ component presented in FIG. 7 through FIG. 9 are also acquired. Consequently, in the optical transmitting apparatus, the phase shift of the phase shift unit 13 can be maintained at an appropriate value (for example, an odd-numbered multiple of $\pi/2$) by controlling the phase shift unit 13 with feedback control so that the power of the $2f_0$ component attains the minimum.

In the sixth embodiment also, the feedback control may be performed by using the $f_0$ component, or the feedback control may be performed by using both of the $f_0$ component and the $2f_0$ component.

Seventh Embodiment

Figure 23:
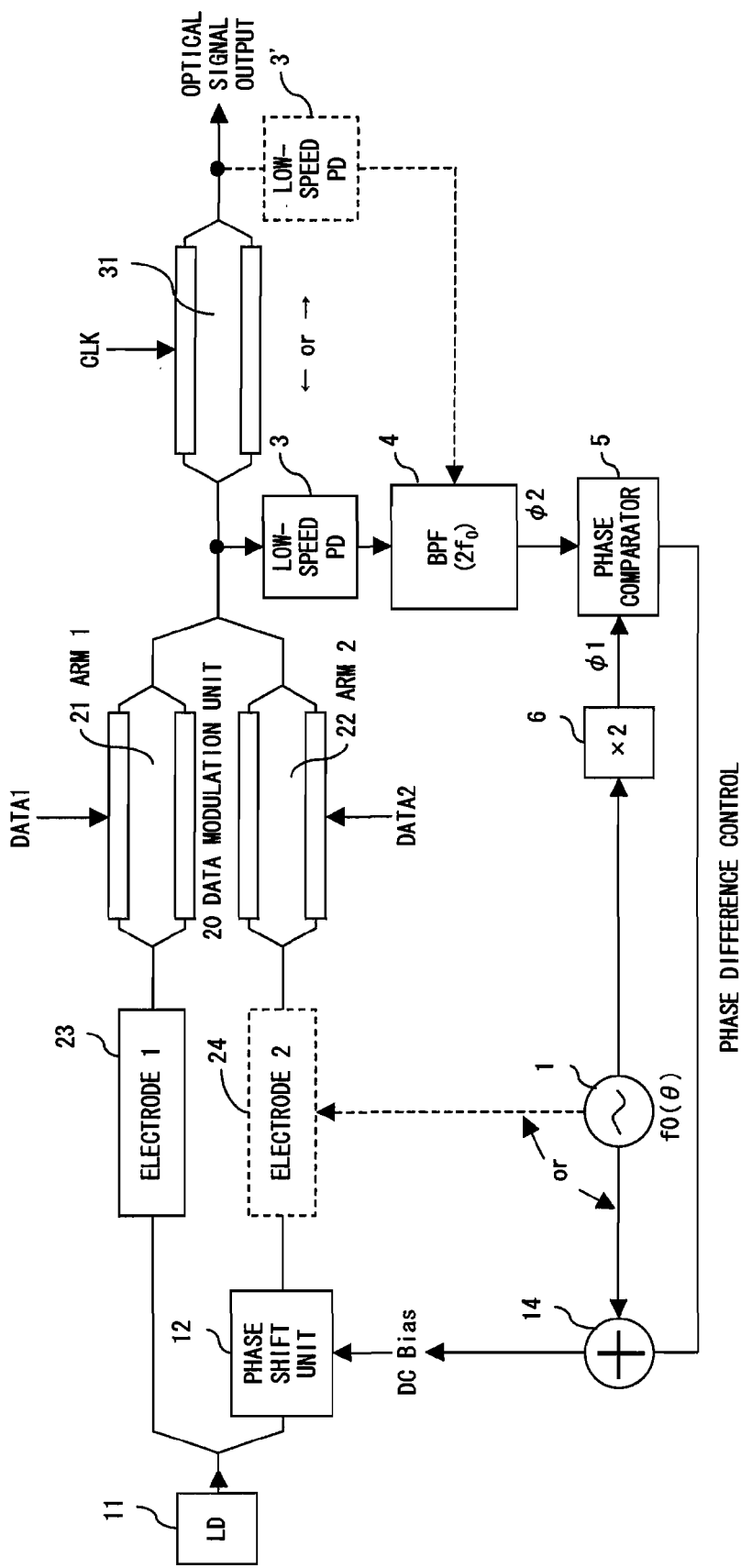
FIG. 23 is a diagram describing a configuration of an optical transmitting apparatus relating to the seventh embodiment of the present invention.

In the optical transmitting apparatus of the first through sixth embodiments, a low-frequency signal is superimposed on one of a pair of optical signals, and a signal obtained by shifting a phase of the low-frequency signal by a prescribed amount is superimposed on the other optical signal. On the other hand, in the optical transmitting apparatus of the seventh and the eighth embodiments, a low-frequency signal is superimposed only on one of a pair of optical signals. The low-frequency signal is, in an example shown in FIG. 23, provided via a bias input terminal of a phase shift unit 12; however, in order to superimpose the low-frequency signal, it may be provided via an electrode, may be superimposed on either of data signals DATA 1 or DATA 2, or may be provided via a bias terminal of one arm of a data modulation unit. Even with the configuration in which the low-frequency signal is superimposed only on one of a pair of optical signals, it was confirmed by simulations that the characteristics of the $f_0$ component and the $2f_0$ component presented in FIG. 7 through FIG. 9 are acquired.

FIG. 23 is an overview block diagram describing a configuration of an optical transmitting apparatus relating to the seventh embodiment of the present invention. In FIG. 23, the illustration of the driving signal generator unit 110 and the clock signal generator unit 120 shown in FIG. 6 is omitted.

The optical transmitting apparatus shown in FIG. 23 comprises a clock signal generation unit; a driving signal generation unit for generating data signals DATA 1 and DATA 2 pre-coded for DQPSK using a clock signal from the clock signal generation unit; a semiconductor laser (LD) 11; a phase modulator comprising a phase shift unit 12 for providing an appropriate phase difference between a pair of optical inputs obtained by branching optical waveguide, first and second electrodes 23 and 24, provided in former stages of corresponding arms of a data modulation unit 20, for superposing a low-frequency signals, and the data modulation unit 20 comprising data terminals for respectively inputting the pre-coded data signals DATA 1 and DATA 2 to first arm 21 and second arm 22; an intensity modulator 31 for modulating the intensity of the optical output from the phase modulator using the clock signal from the clock signal generation unit; and a low-frequency superimposing unit comprising a low-frequency signal generator 1 for generating a low-frequency signal $f_0$ of several KHz (a several MHz is also acceptable), and for providing the low-frequency signal $f_0$ to a bias terminal of the phase shift unit 12 via an adder 14. Here, the low-frequency superimposing unit may provide the low-frequency signal to the electrode 23 or the electrode 24 instead of providing the phase shift unit 12.

The optical transmitting apparatus further comprises a monitor unit comprises a low-speed photodiode 3 for extracting a low-frequency signal from optical output of the phase modulator, which has waveguide to split optical beam into two for generating two optical signals and to couple the two optical signals, a band-pass filter BPF 4 with its center frequency of $2f_0$, a multiplier 6 for doubling the frequency of the low-frequency signal from the low-frequency generator 1, and a phase comparator 5 for comparing the phase $\phi 1$ of the multiplier 6 with the phase $\phi 2$ of the BPF 4 and for generating a "+" signal when the phase $\phi 1$ is delayed and a "−" signal when the phase $\phi 2$ is delayed, and for outputting an "approximate zero" signal when the phase of the phase shift unit 12 has an appropriate value (an odd-numbered multiple of $\pi/2$, for example); and a phase difference control unit, not shown in figures, for controlling the amount of phase shift of the phase shift unit 12 according to the output of the monitor unit (the phase comparator 5). The low-speed photodiode 3 may be replaced by a low-speed photodiode 3' so as to detect an optical signal from the output side of the intensity modulator 31.

In the optical transmitting apparatus shown in FIG. 23, the characteristics of the $f_0$ component and the $2f_0$ component presented in FIG. 7 through FIG. 9 are also acquired. Consequently, in this optical transmitting apparatus, the phase shift of the phase shift unit 12 can be also maintained at an appropriate value (for example, an odd-numbered multiple of $\pi/2$) by controlling the phase shift unit 13 with feedback control so that the power of the $2f_0$ component attains the minimum.

In the seventh embodiment also, the feedback control may be performed by using the $f_0$ component, or the feedback control may be performed by using both of the $f_0$ component and the $2f_0$ component.

Eighth Embodiment

The configuration of the optical transmitting apparatus of the eighth embodiment is basically the same as that of the optical transmitting apparatus of the seventh embodiment. However, in the optical transmitting apparatus of the eighth embodiment, a phase shift unit 13 is configured in the later stage of a data modulation unit 40, and when an electrode for superimposing a low-frequency signal is required, the electrode would be also configured in the later stage of the data modulation unit 40.

FIG. 24 is an overview block diagram describing the eighth embodiment of the present invention. In FIG. 24, the illustration of the driving signal generator unit 110 and the clock signal generator unit 120 shown in FIG. 6 is omitted.

The optical transmitting apparatus shown in FIG. 24 comprises a clock signal generation unit; a driving signal generation unit for generating data signals DATA 1 and DATA 2 pre-coded for DQPSK using a clock signal from the clock signal generation unit; a semiconductor laser (LD) 11; a phase modulator comprising a data modulation unit 40 comprising data terminals for respectively inputting the pre-coded data signals DATA 1 and DATA 2 to first arm 41 and second arm 42, a phase shift unit 13 for providing an appropriate phase difference between a pair of optical inputs obtained by branching optical waveguide, and first and second electrodes 43 and 44, provided in later stages of corresponding arms of the data modulation unit 40, for superposing a low-frequency signals; an intensity modulator 31 for modulating the intensity of the optical output from the phase modulator using the clock signal from the clock signal generation unit; and a low-frequency superimposing unit comprising a low-frequency signal generator 1 for generating a low-frequency signal $f_0$ of several KHz (a several MHz is also acceptable), and for providing the low-frequency signal $f_0$ to a bias terminal of the phase shift unit 13 via an adder 14. Here, the low-frequency superimposing unit may provide the low-frequency signal to the electrode 43 or the electrode 44 instead of providing the phase shift unit 13.

The optical transmitting apparatus further comprises a monitor unit comprises a low-speed photodiode 3 for extracting a low-frequency signal from optical output of the phase modulator, which has waveguide to split optical beam into two for generating two optical signals and to couple the two optical signals, a band-pass filter BPF 4 with its center frequency of $2f_0$, a multiplier 6 for doubling the frequency of the low-frequency signal from the low-frequency generator 1, and a phase comparator 5 for comparing the phase $\phi 1$ of the multiplier 6 with the phase $\phi 2$ of the BPF 4 and for generating a "+" signal when the phase $\phi 1$ is delayed and a "−" signal when the phase $\phi 2$ is delayed, and for outputting an "approximate zero" signal when the phase of the phase shift unit 12 has an appropriate value (an odd-numbered multiple of $\pi/2$, for example); and a phase difference control unit, not shown in figures, for controlling the amount of phase shift of the phase shift unit 12 according to the output of the monitor unit (the phase comparator 5). The low-speed photodiode 3 may be replaced by a low-speed photodiode 3' so as to detect an optical signal from the output side of the intensity modulator 31.

In the optical transmitting apparatus shown in FIG. 24, the characteristics of the $f_0$ component and the $2f_0$ component presented in FIG. 7 through FIG. 9 are also acquired. Consequently, in the optical transmitting apparatus, the phase shift of the phase shift unit 13 can be maintained at an appropriate value (for example, an odd-numbered multiple of $\pi/2$) by controlling the phase shift unit 13 with feedback control so that the power of the $2f_0$ component attains the minimum.

In the eighth embodiment also, the feedback control may be performed by using the $f_0$ component, or the feedback control may be performed by using both of the $f_0$ component and the $2f_0$ component.

Ninth Embodiment

The above optical transmitting apparatus of the first through the eighth embodiments have a configuration for monitoring variation components of modulator output power or transmitter output power in a state that a low-frequency signal is superimposed on an optical signal, and for controlling the amount of phase shift in the phase shift unit so as to be an appropriate value (for example, an odd-numbered multiple of $\pi/2$). Meanwhile, an optical transmitting apparatus relating to the ninth embodiment monitors the modulator output power or transmitter output power by RF (Radio Frequency) power monitor with a square-law detector function, and controls the amount of the phase shift of the phase shift unit to be an appropriate value (for example, an odd-numbered multiple of $\pi/2$) without superimposing a low-frequency signal.

Figure 25:
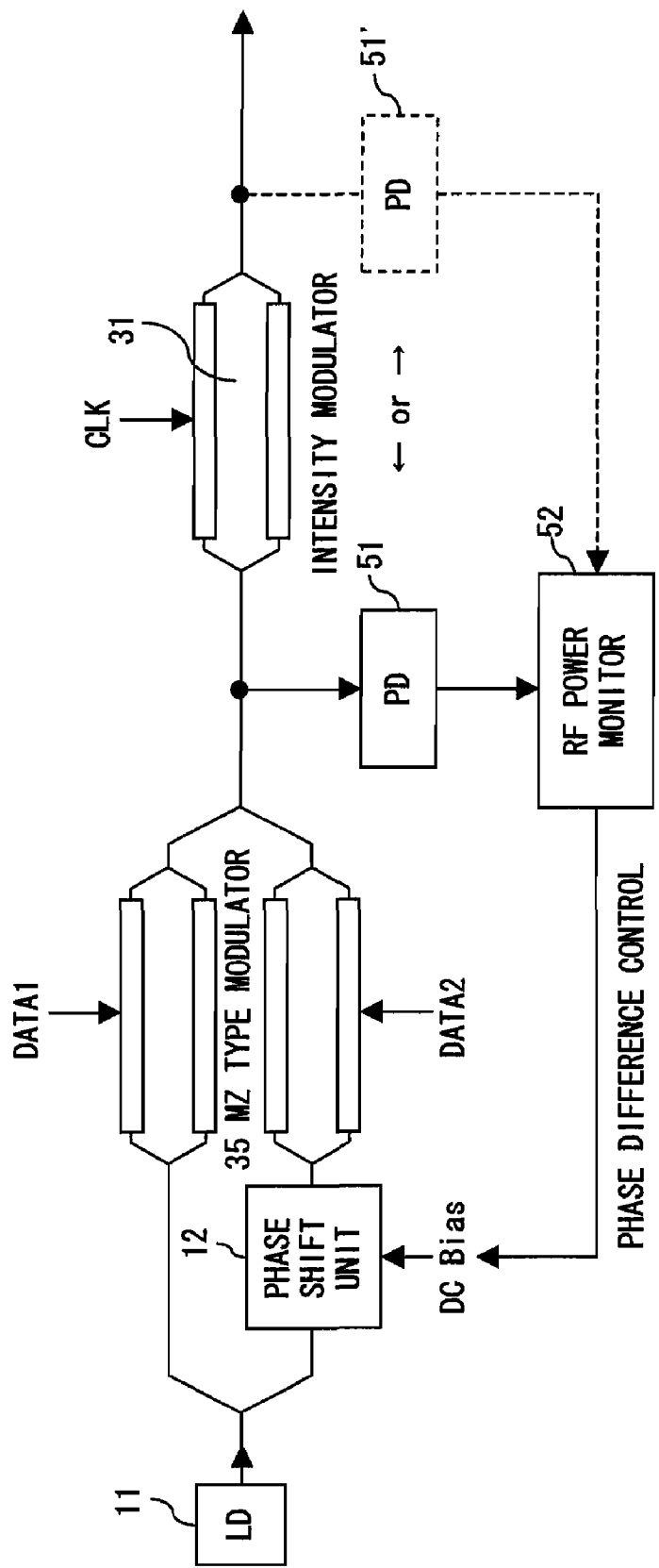
FIG. 25 is a diagram describing a configuration of an optical transmitting apparatus relating to the ninth embodiment of the present invention.

FIG. 25 is an overview block diagram describing the ninth embodiment of the present invention. In FIG. 25, the illustration of the driving signal generator unit 110 and the clock signal generator unit 120 shown in FIG. 6 is omitted.

The optical transmitting apparatus shown in FIG. 25 comprises a clock signal generation unit; a driving signal generation unit for generating data signals DATA 1 and DATA 2 pre-coded for DQPSK using a clock signal from the clock signal generation unit; a semiconductor laser (LD) 11; a phase modulator comprising a phase shift unit 12 for providing an appropriate phase difference between a pair of optical inputs obtained by branching optical waveguide, and a MZ type modulator 35 comprising data terminals for respectively inputting the pre-coded data signals DATA 1 and DATA 2 to a pair of arms; and an intensity modulator 31 for modulating the intensity of the optical output from the phase modulator using the clock signal from the clock signal generation unit.

The optical transmitting apparatus further comprises a photodiode (PD) 51 for converting optical output of the phase modulator, which has waveguide to split optical beam into two for generating two optical signals and to couple the two optical signals, into an electrical signal from in order to detect deviation from the appropriate value of the phase shift unit 12 (for example, an odd-numbered multiple of $\pi/2$); an RF power monitor 52 for detecting by a square-law detector an output signal of the photodiode 51 and for monitoring fluctuation of the peak power; and a phase difference control unit, not shown in figures, for controlling the phase shift unit 12 based on the output of the RF power monitor 52. The photodiode 51 may be replaced by a photodiode 51' so as to extract an electrical signal from the output side of the intensity modulator 31. The photodiode 51 can be realized by a high speed response photodiode, which can be compliant with the speed of the data signal.

Figure 26A:
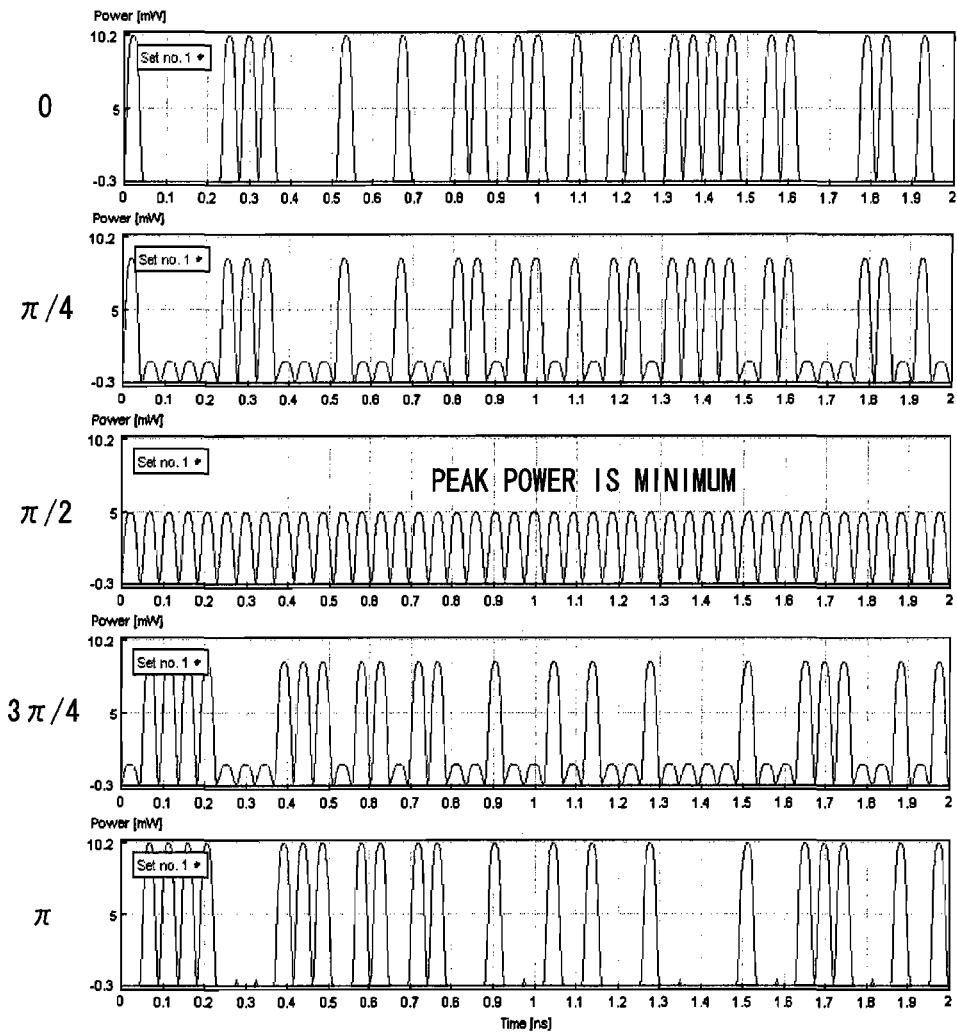
FIG. 26A is a diagram showing waveform of optical power detected by a square-law detection.
Figure 26B:
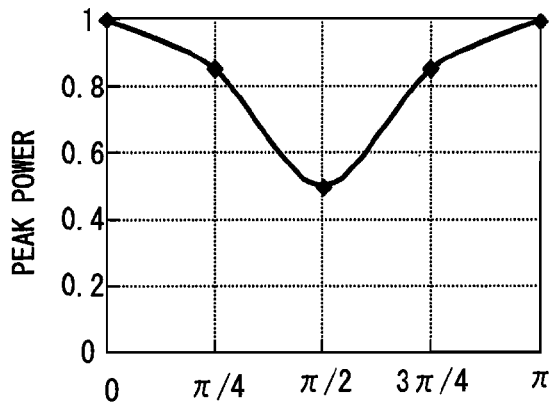
FIG. 26B is a graph showing a relation between the amount of phase shift and the peak power.

FIG. 26A is a simulation result showing a relation between the amount of phase shift in the phase shift unit and the output optical signal waveform. FIG. 26B is a graph showing a relation between the amount of phase shift and the peak power of the output optical signal. As shown in FIG. 26A and FIG. 26B, when the amount of phase shift of the phase shift unit 12 is "$\pi/2$", the peak power of the output optical signal attains minimum. In other words, if the feedback control is performed so that the peak power of the output optical signal attains minimum, the amount of phase shift of the phase shift unit 12 can be maintained at "$\pi/2$".

In such a manner, the optical transmitting apparatus of the ninth embodiment monitors fluctuation of the peak power of the optical signal using the RF power monitor with the square-law detector function, and by controlling the phase shift unit by bias controlling according to the monitoring result, the amount of the phase shift of the phase shift unit can be maintained at an appropriate value (for example, an odd-numbered multiple of $\pi/2$), and the quality of the output optical signal can be stabilized.

Tenth Embodiment

The first through the ninth embodiments has a configuration for controlling to maintain only the amount of phase shift of the phase shift unit at an appropriate value. The tenth embodiment, meanwhile, has a configuration to stabilize the operation of a whole optical transmitting apparatus.

Figure 27:
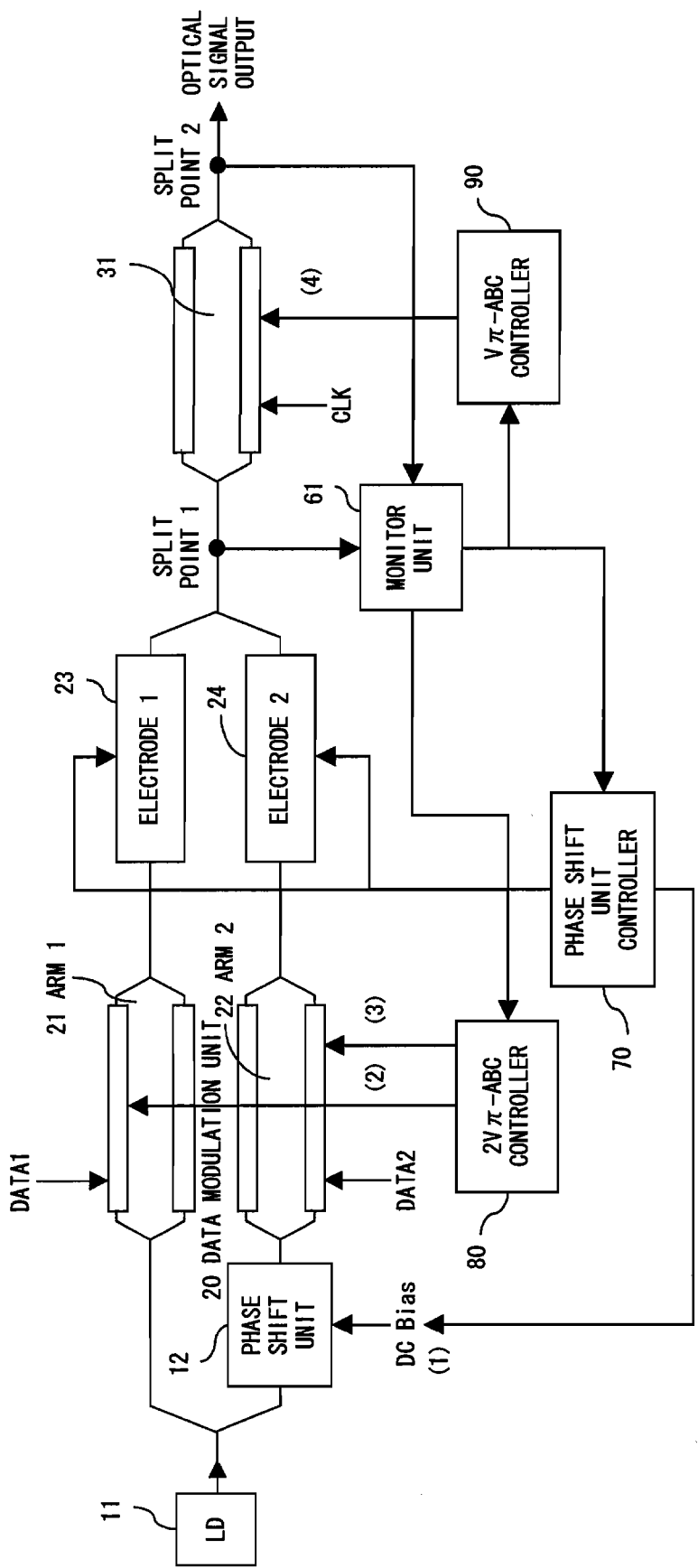
FIG. 27 is a diagram describing an entire configuration of the optical transmitting apparatus using the DMPSK modulation.

FIG. 27 is a block diagram describing an entire configuration of the optical transmitting apparatus using DMPSK modulation (where M=$2^n$). When "n=2", it becomes DQPSK modulation, in which four values can be transmitted. FIG. 27 shows an entire configuration of the optical transmitting apparatus employing DQPSK modulation as an example of the DMPSK modulation. In FIG. 27, the illustration of the driving signal generator unit 110 and the clock signal generator unit 120 shown in FIG. 6 is omitted.

The optical transmitting apparatus shown in FIG. 27 comprises a clock signal generation unit; a driving signal generation unit for generating data signals DATA 1 and DATA 2 pre-coded for DQPSK using a clock signal from the clock signal generation unit; a semiconductor laser (LD) 11; a phase modulator comprising a phase shift unit 12 for providing an appropriate phase difference between a pair of optical inputs obtained by branching optical waveguide, a data modulation unit 20 comprising data terminals for respectively inputting the pre-coded data signals DATA 1 and DATA 2 to first arm 21 and second arm 22, and first and second electrodes 23 and 24, provided in later stages of corresponding arms of the data modulation unit 20, for superposing a low-frequency signal from a phase shift unit controller 70; an intensity modulator 31 for modulating the intensity of the optical output from the phase modulator using the clock signal from the clock signal generation unit.

A monitor unit 61 monitors optical output from the phase modulator, which has waveguide to split optical beam into two for generating two optical signals and to couple the two optical signals, to detect fluctuation components such as interference and DC drift etc. of the phase modulator using optical signal from a split point 1, and monitors DC drift component of the intensity modulator 31 using optical signal from a split point 2 in output side of the intensity modulator 31, and supplies monitor output to the phase shift unit controller 70, $2V\pi$-ABC controller 80 and $V\pi$-ABC controller 90. The phase shift unit controller 70 controls bias (a control signal (1) in FIG. 27) of the phase shift unit 12 based on the monitor output of the monitor unit 61. The $2V\pi$-ABC controller 80 performs a bias control (a control signal (2) in FIG. 27) on a bias input unit configured in the first arm 21 of the data modulation unit 20 and a bias control (a control signal (3) in FIG. 27) on a bias input unit configured in the second arm 22 of the data modulation unit 20 based on the monitor output from the monitor unit 61. The $V\pi$-ABC controller 90 performs a bias control (a control signal (4) in FIG. 27) on a bias input unit of the intensity modulator 31 based on the monitor output from the monitor unit 61. It is also possible to perform the above monitoring using only optical signal from the split point 2 without using optical signal from the split point 1.

In the above optical transmitting apparatus, like the first through the ninth embodiment, when superimposing a low-frequency signal on an optical signal, the monitor unit 61 monitors power of the $f_0$ component and/or the $2f_0$ component. By the feedback control according to the monitoring result, each of the phase shift unit controller 70, the $2V\pi$-ABC controller 80 and the $V\pi$-ABC controller 90 generates individually corresponding bias voltage. By so doing stable operation of the entire optical transmitting apparatus can be realized. When the intensity modulator 31 performs CSRZ modulation, the $2V\pi$-ABC controller should be used instead of the $V\pi$-ABC controller 90.

Figure 28:
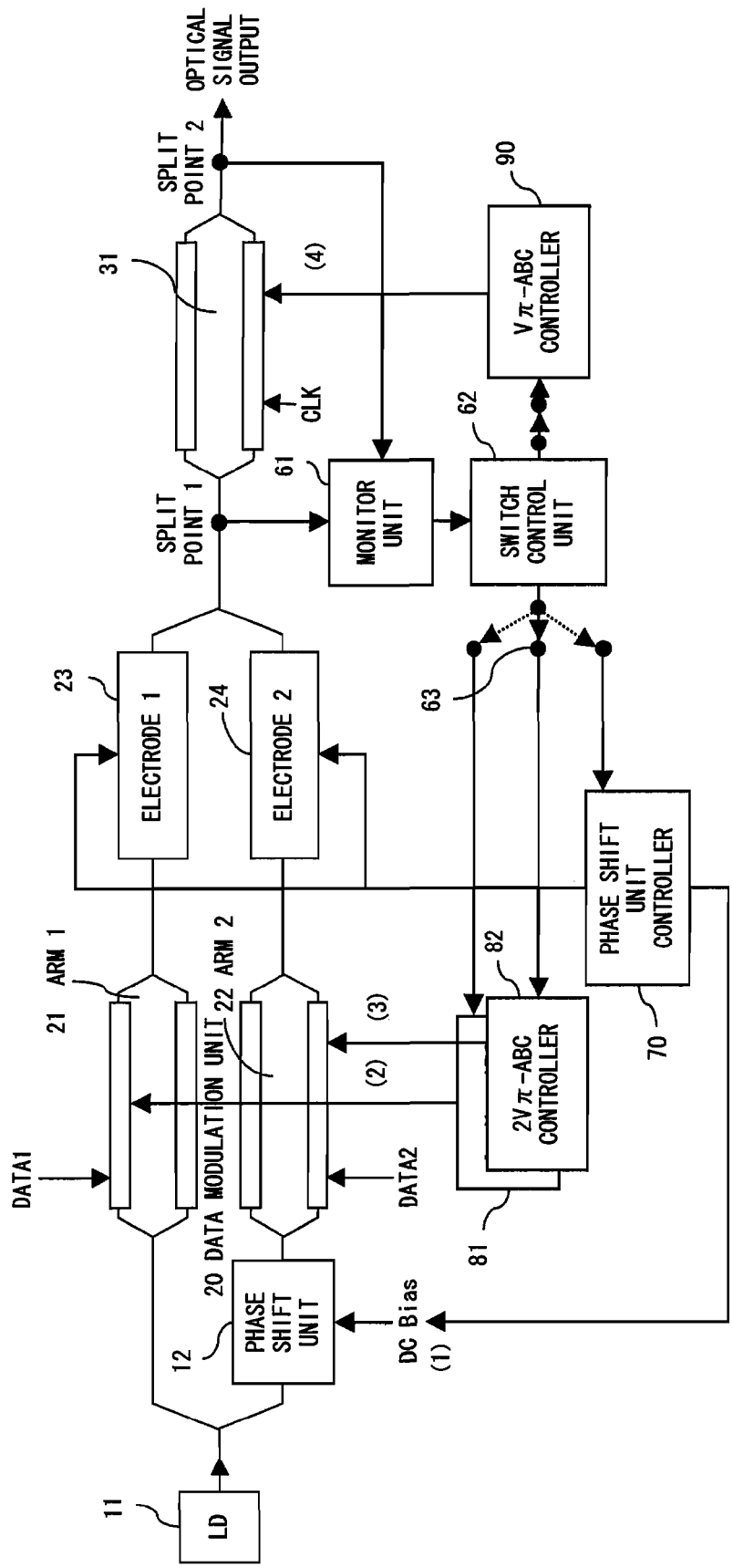
FIG. 28 is a diagram describing a first specific example of the control method shown in FIG. 27.

FIG. 28 is a diagram describing a first specific example of the control method shown in FIG. 27. In FIG. 28, the illustration of the driving signal generator unit 110 and the clock signal generator unit 120 shown in FIG. 6 is omitted.

In the method described in FIG. 28, low-frequency signals with the same frequency are superimposed on the control signals (1)-(4). Then, the bias control and monitoring of the low-frequency signal is performed on the control signals (1)-(4) by time-division manner. In this example, a signal generator for generating the low-frequency signal is incorporated into a switch control unit 62, and the low-frequency signal is provided in sequence to the phase shift controller 70, to the $2V\pi$-ABC controllers 81 and 82 and to the $V\pi$-ABC controller 90, via a switch 63.

In FIG. 28, when controlling the phase shift unit 12, the switch 63 is switched so that the low-frequency signal is provided to the phase shift unit 12 via a phase shift unit controller 70. At that time, the control signals (2)-(4) are fixed. The monitor unit 61 monitors the low-frequency signal superimposed on the optical signal. According to the monitoring result, the phase shift unit 12 is controlled. When the control for the phase shift unit 12 is finished, the switch 63 is switched so that the low-frequency signal is provided to the arm 21 of the data modulation unit 20 via the $2V\pi$-ABC controller 81. At that time, the control signal (1), (3) and (4) are fixed. The monitor unit 61 monitors the low-frequency signal superimposed on the optical signal. According to the monitoring result, DC drift in the arm 21 of the data modulation unit 20 is controlled. In the same manner, control over the DC drift in the arm 22 of the data modulation unit 20 and control over the DC drift in the intensity modulator 31 are performed. Although it is not shown in FIG. 28, methods shown as the above the first through the eighth embodiments can be used for superimposing the low-frequency signal. At that time, when the intensity modulator 31 supports CSRZ, the $2V\pi$-ABC controller should be used instead of the $V\pi$-ABC controller 90.

Figure 29:
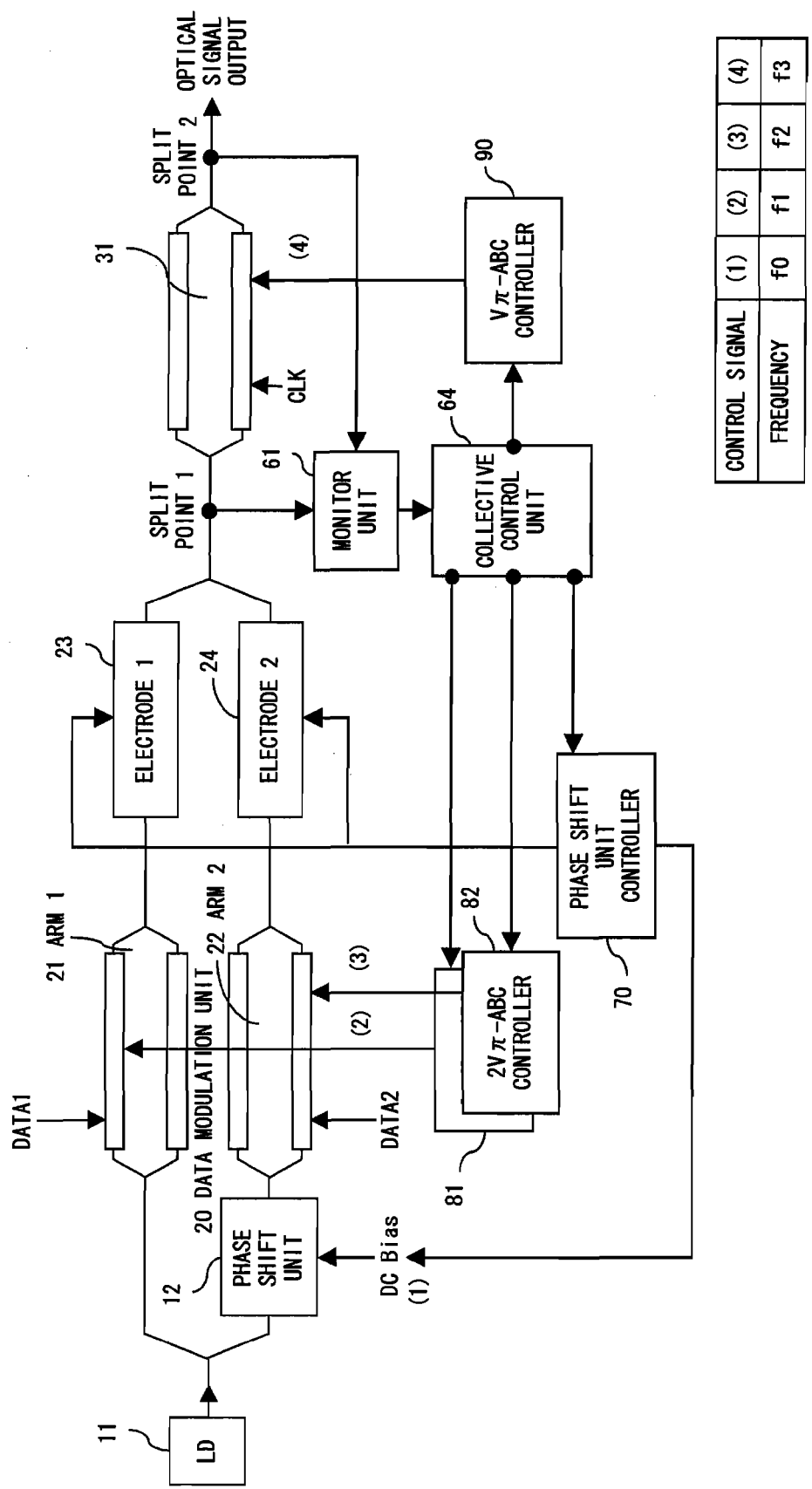
FIG. 29 is a diagram describing a second specific example of the control method shown in FIG. 27.

FIG. 29 is a diagram describing a second specific example of the control method shown in FIG. 27. In FIG. 29, the illustration of the driving signal generator unit 110 and the clock signal generator unit 120 shown in FIG. 6 is omitted.

In the method shown in FIG. 29, low-frequency signals with different frequencies are superimposed on the control signals (1)-(4). Then, the bias control and the monitoring of the low-frequency signal are performed simultaneously on the control signal (1)-(4). In other words, as shown in FIG. 29, the low-frequency signals with the frequency $f_0$ through $f_3$ are superimposed on the control signal (1) through (4), respectively. In this method, a collective control unit 64 controls the phase shift controller 70, the $2V\pi$-ABC controllers 81 and 82 and the $V\pi$-ABC controller 90. A signal generator for generating the low-frequency signals with the frequency $f_0$ through $f_3$ is, for example, incorporated in the collective control unit 64.

As a modified example of he above second example, a configuration which comprises the switch control unit in the first specific example, superimposes the low-frequency signal with different frequencies on the control signals by time-division and performs the bias control and monitoring on the control signals (1)-(4) by time-division is also possible. In addition, as a modified example of the above first and the second specific examples, a configuration, in which some of the control signals (1)-(4) are superimposed by low-frequency signals with the same frequencies and the rest of the control signals are superimposed by the low-frequency signals with different frequencies and the monitoring and the bias control are performed combining the time-division and simultaneous control, can be also a possibility.

Eleventh Embodiment

In the eleventh embodiment, like the tenth embodiment, a configuration for enhancing the stability of the operation of the entire optical transmitting apparatus. The eleventh embodiment, however, is an optical transmitting apparatus, which adopted a DBPSK modulation (i.e. n=1) among the DMPSK modulation ($M=2^n$).

Figure 30:
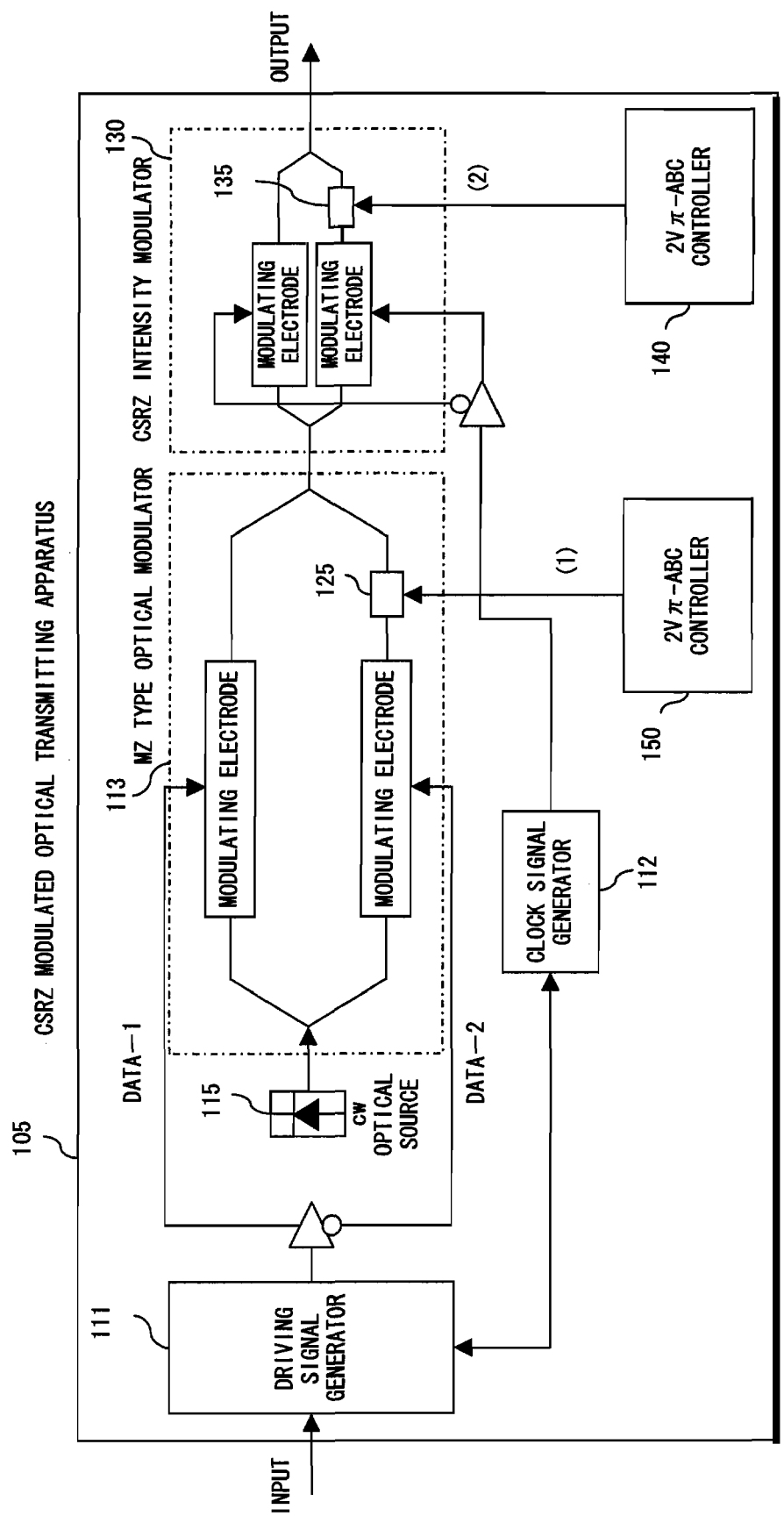
FIG. 30 is a diagram showing an entire configuration of an optical transmitting apparatus using CSRZ-DPSK modulation.

FIG. 30 is a block diagram of an optical transmitting apparatus using CSRZ (Carrier Suppressed Return-to-Zero)-DPSK modulation. An optical transmitting apparatus 105 shown in FIG. 30 comprises a driving signal generator 111 for generating a driving signal to be sent to a MZ modulator 113 using an input signal and a clock signal from a clock signal generator 112; a clock signal generator 112 for providing a clock signal to the driving signal generator 111 and a CSRZ intensity modulator 130; a CW optical source 115; a MZ modulator 113 comprising a plurality of modulating electrodes with input terminals for receiving data signals DATA 1 and DATA 2; the CSRZ intensity modulator 130 for generating a CSRZ-pulsed optical signal; a $2V\pi$-ABC controller 150 for bias-controlling a bias input terminal 125 (a control signal (1) in FIG. 30) of the MZ modulator 113 based on the monitor output from a monitor unit (not shown in figures) for monitoring the low-frequency signal component superimposed on the optical signal; and a 2Vπ-ABC controller 140 for bias-controlling a bias input terminal 135 (the control signal (2) in FIG. 30) of the CSRZ intensity modulator 130 based on the above monitor output. The MZ modulator 113 comprises the bias input terminal 125 at one side of the modulating electrodes, and the CSRZ intensity modulator 130 also comprises the bias input terminal 135 at one side of the modulating electrodes.

In such a manner, the optical transmitting apparatus of the eleventh embodiment can operate stably as a whole by controlling the bias fluctuation of both of the MZ modulator and the CSRZ intensity modulator, using control signals (1) and (2) based on the monitor output from the monitor unit (not shown in figures) for monitoring the low-frequency signal component superimposed on the optical signal.

Figure 31:
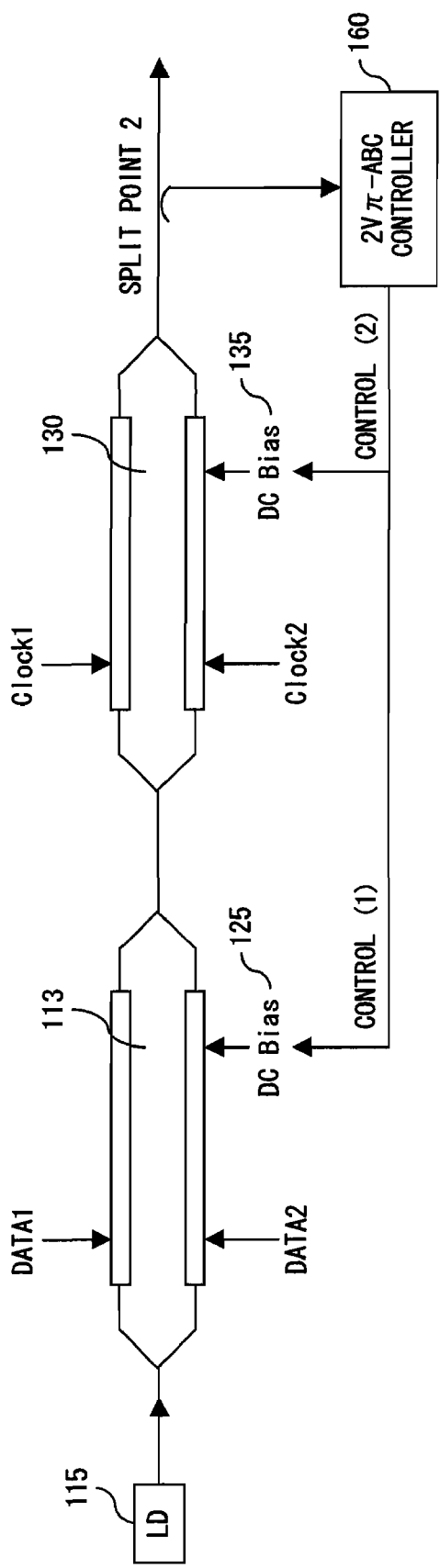
FIG. 31 is a diagram showing a first practical example of fluctuation control in the optical transmitting apparatus shown in FIG. 30.

FIG. 31 is a diagram showing a first practical example of fluctuation control in the optical transmitting apparatus shown in FIG. 30. In FIG. 31, the illustration of the driving signal generator 111 and the clock signal generator 112 shown in FIG. 30 is omitted.

In a method shown in FIG. 31, the low-frequency signals with the same frequency are added to the bias input terminal 125 of the MZ modulator 113 and the bias input terminal 135 of the CSRZ intensity modulator 130 by time-division manner. A 2Vπ-ABC controller 160 monitors an optical signal split at the split point 2 by the time-division. In addition, the 2Vπ-ABC controller 160 performs the bias control over the bias input terminal 125 of the MZ modulator 113 and the bias input terminal 135 of the CSRZ intensity modulator 130 by time-division, as shown in the control signals (1) and (2) in FIG. 31.

Figure 32:
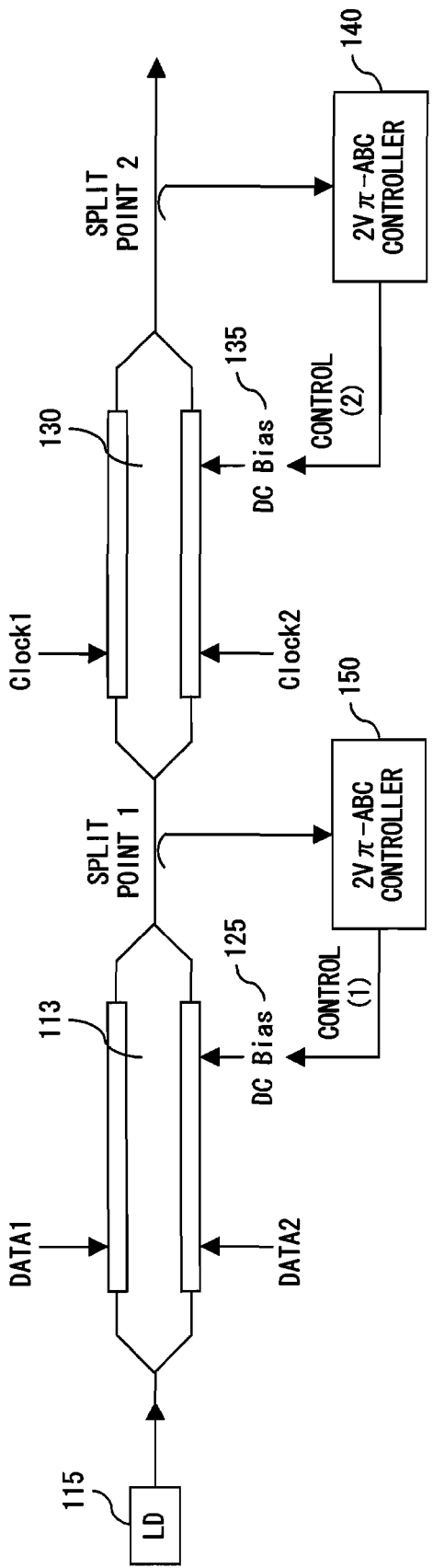
FIG. 32 is a diagram showing a second configuration example of a fluctuation control in the optical transmitting apparatus shown in FIG. 30.

FIG. 32 is a diagram showing a second practical example of a fluctuation control in the optical transmitting apparatus shown in FIG. 30. In FIG. 32, the illustration of the driving signal generator 111 and the clock signal generator 112 shown in FIG. 30 is omitted.

In a method shown in FIG. 32, the low-frequency signals with different frequencies from each other are superimposed on corresponding DC bias. A 2Vπ-ABC controller 150 monitors the optical signal split from the split point 1, and performs bias control using the control signal (1) shown in FIG. 32, over the bias input terminal 125 of the MZ modulator 113. A 2Vπ-ABC controller 140 monitors an optical signal split at the split point 2, and performs bias control using the control signal (2) shown in FIG. 32, over the bias input terminal 135 of the CSRZ intensity modulator 130, in parallel with the operation of the 2Vπ-ABC controller 150.

In the configuration in FIG. 32, the optical signals split at the split points 1 and 2 is guided to the 2Vπ-ABC controllers 150 and 140, respectively; however, a configuration in which the optical signal split at the split point 2 is guided to both of the 2Vπ-ABC controllers 150 and 140 is also possible.

Figure 33:
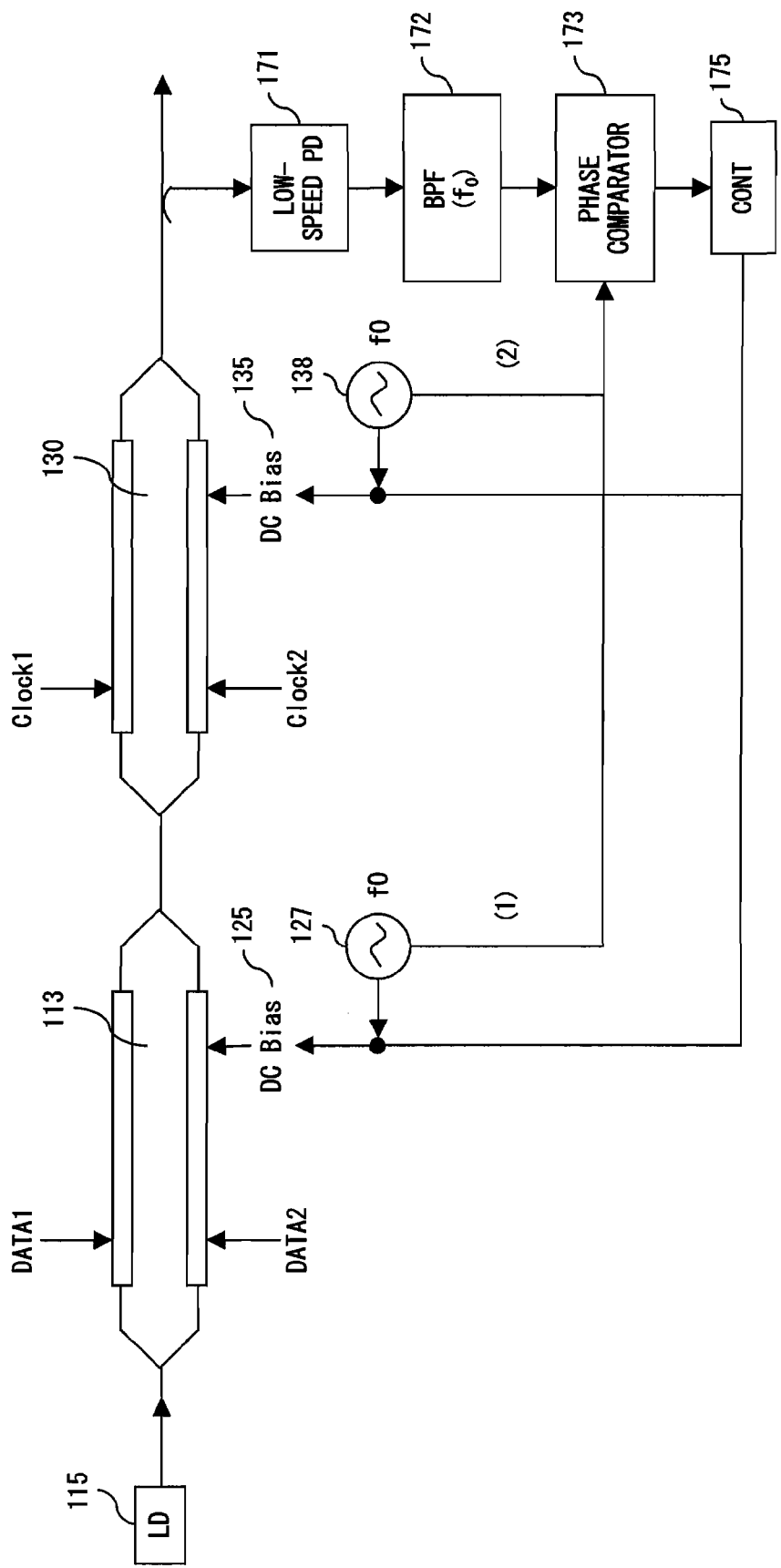
FIG. 33 is a diagram describing a specific example of the first configuration shown in FIG. 31.

FIG. 33 is a diagram describing a specific example of the first configuration shown in FIG. 31. In FIG. 33, the illustration of the driving signal generator 111 and the clock signal generator 112 shown in FIG. 30 is omitted.

In FIG. 33, a 2Vπ-ABC controller 160, in which low-frequency signal generators 127 and 138 for generating a low-frequency signal $f_0$ are configured near the bias input terminals 125 and 135, comprises a low-speed photodiode 171, a bandpass filter BPF 172 with pass frequency $f_0$, a phase comparator 173 for monitoring the bias fluctuation in the MZ modulator 113 and the bias fluctuation in the CSRZ intensity modulator 130 by comparing the output phase of the low-frequency signal generators 127 and 138 and the output phase of the BPF 172, and a controller CONT 175 for controlling the bias of the MZ modulator 113 and the CSRZ intensity modulator 130 based on the monitor output. In this example, superimposing of the low-frequency signal and bias control are performed by time-division, respectively.

Figure 34:
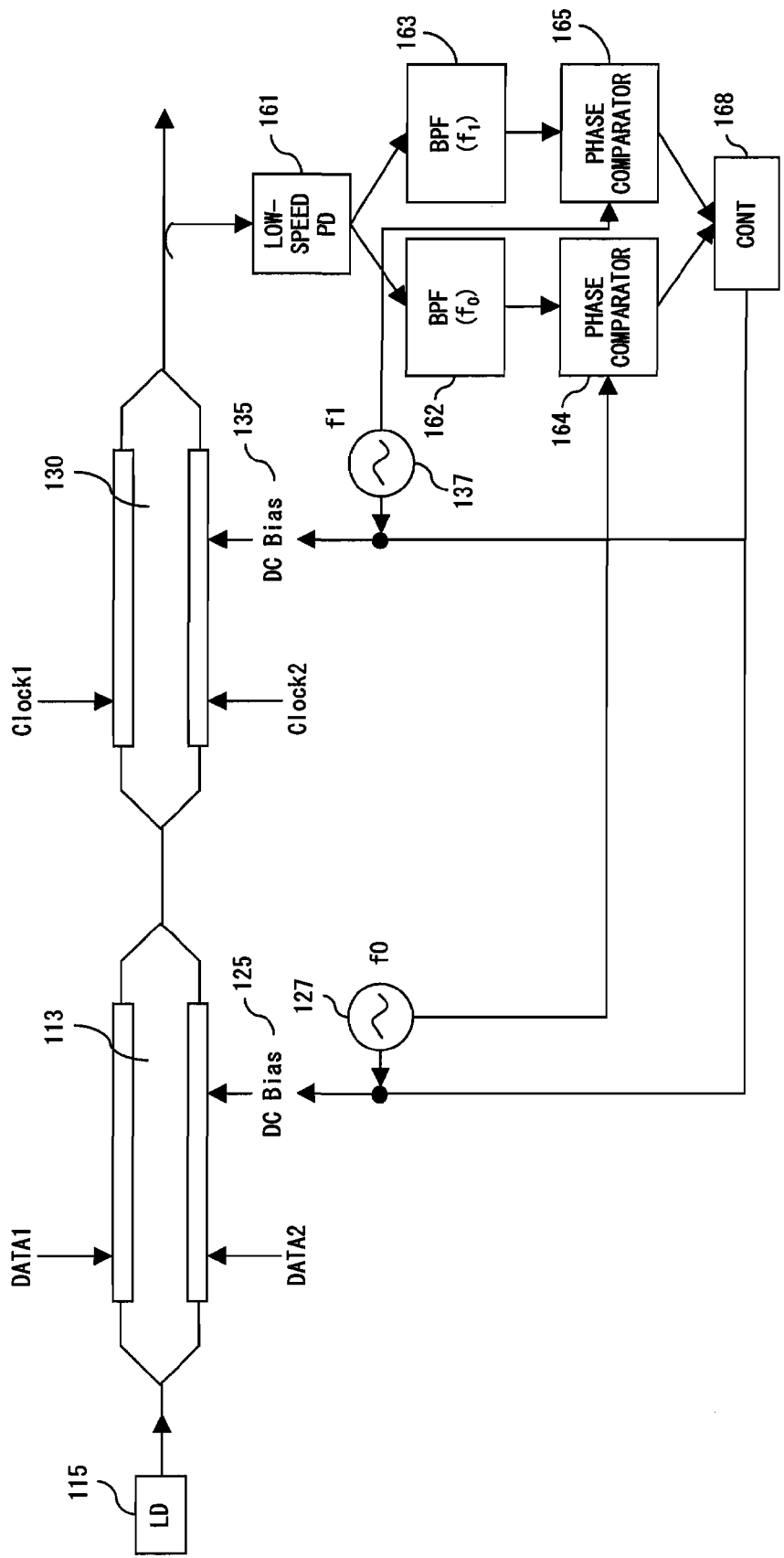
FIG. 34 is a diagram describing a specific example of the second configuration shown in FIG. 32.

FIG. 34 is a diagram describing a specific example of the second configuration shown in FIG. 32. The illustration of the driving signal generator 111 and the clock signal generator 112 shown in FIG. 30 is omitted in FIG. 34. In FIG. 34, also, one 2Vπ-ABC controller controls the MZ modulator 113 and the CSRZ modulator 130.

In FIG. 34, a low-frequency signal generator 127 for generating a low-frequency signal with a frequency $f_0$ is configured near the bias input terminal 125, and a low-frequency signal generator 137 for generating a low-frequency signal with a frequency f1 is configured near the bias input terminal 135. The 2Vπ-ABC controller comprises a low-speed photodiode 161, a bandpass filter BPF 162 with pass frequency $f_0$, a phase comparator 164 for monitoring bias deviation in the MZ modulator 113 by comparing the output phase of the low-frequency signal generator 127 and the output phase of the BPF 162, a bandpass filter BPF 163 with pass frequency f1, a phase comparator 165 for monitoring bias deviation in the CSRZ modulator 130 by comparing the output phase of the low-frequency signal generator 137 and the output phase of the BPF 163, and a controller 168 for controlling the MZ modulator 113 and the CSRZ modulator 130 according to the monitoring result of the phase comparators 164 and 165.

Figure 35:
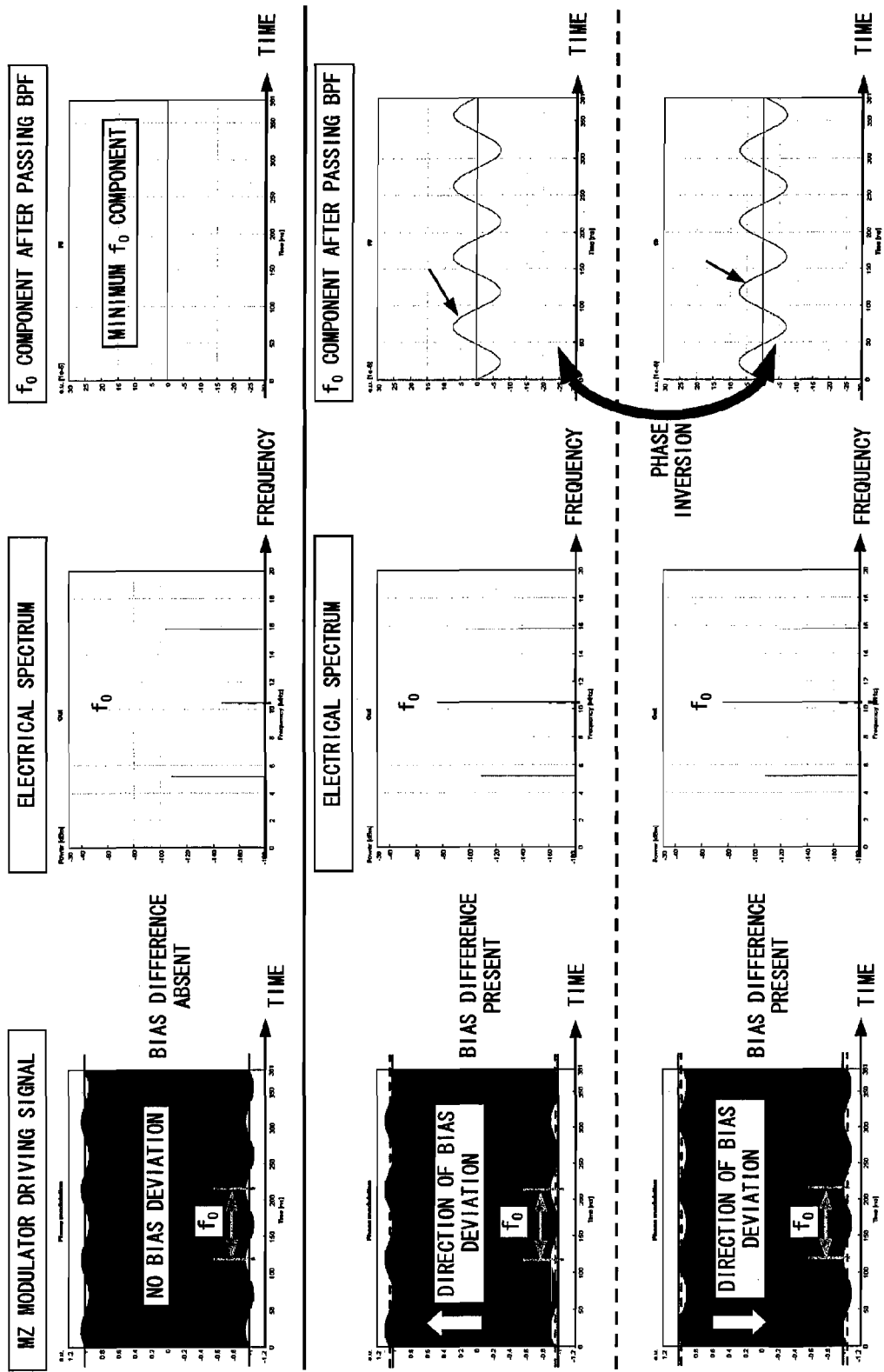
FIG. 35 is a diagram indicating a relation between the bias in the MZ modulator and detected low-frequency signals.

FIG. 35 is a diagram indicating a relation between the bias in the MZ modulator 113 and detected low-frequency signals shown in FIG. 31 through FIG. 34. As in FIG. 35, when the bias in the MZ modulator 113 is proper, the $f_0$ component extracted from the output optical signal attains the minimum, and when the bias deviation is generated, the $f_0$ component becomes large. The phase of the extracted $f_0$ component signal when the bias deviation is on the + side is inverted from the phase of the extracted $f_0$ component signal when the bias deviation is on the − side. Therefore, the bias in the MZ modulator 113 can be properly controlled by performing feedback control so that the $f_0$ component attains its minimum.

Figure 36:
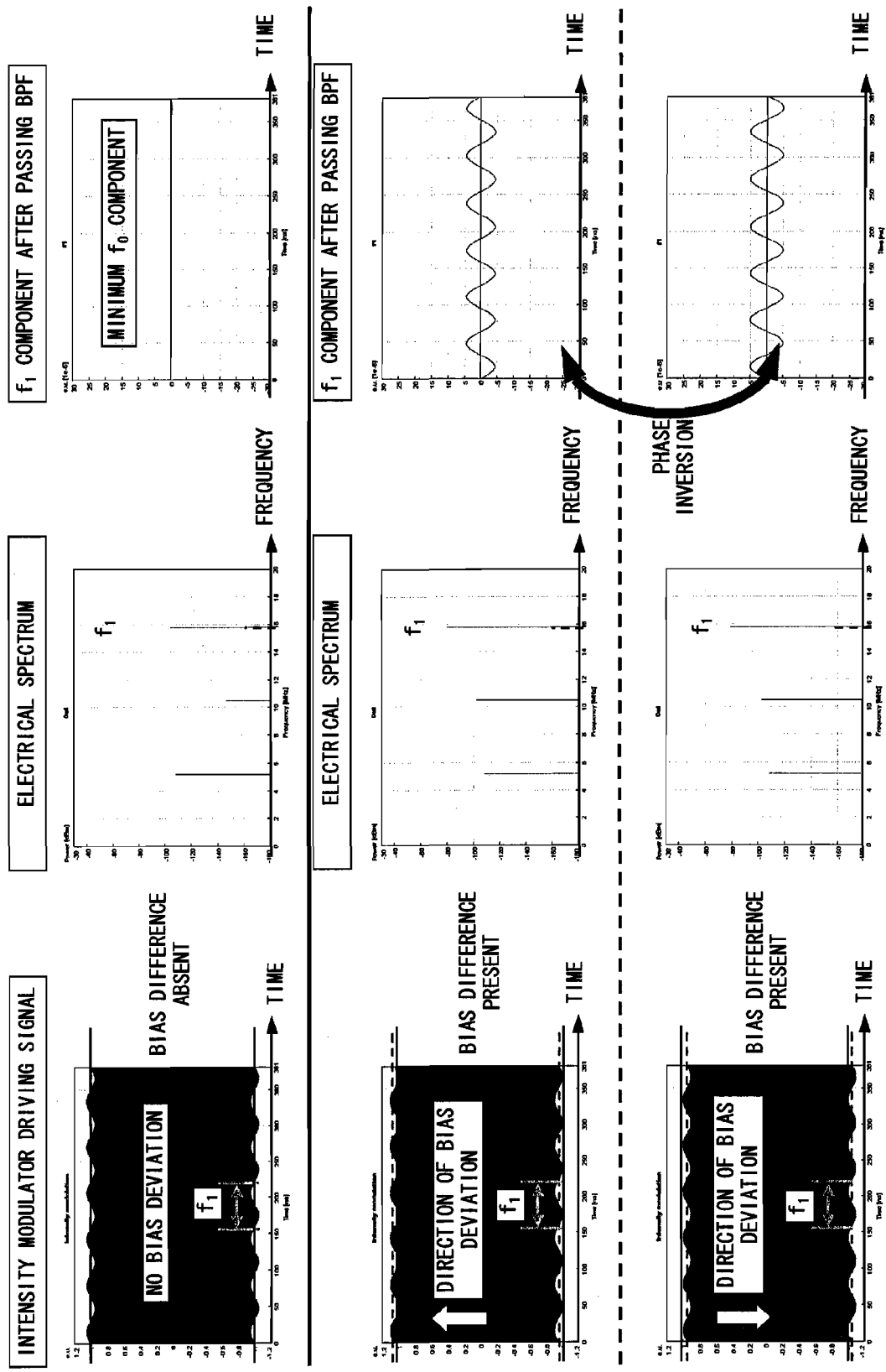
FIG. 36 is a diagram indicating a relation between the bias in the intensity modulator and detected low-frequency signals.

FIG. 36 is a diagram indicating a relation between the bias in the CSRZ modulator 130 and detected low-frequency signals shown in FIG. 31 through FIG. 34. As in FIG. 36, when the bias in the CSRZ modulator 130 is proper, the f1 component extracted from the output optical signal attains the minimum, and when the bias deviation is generated, the f1 component becomes large. The phase of the extracted f1 component signal when the bias deviation is on the + side is inverted from the phase of the extracted f1 component signal when the bias deviation is on the − side. Therefore, the bias in the CSRZ modulator 130 can be properly controlled by performing feedback control so that the f1 component attains its minimum.

Figure 37:
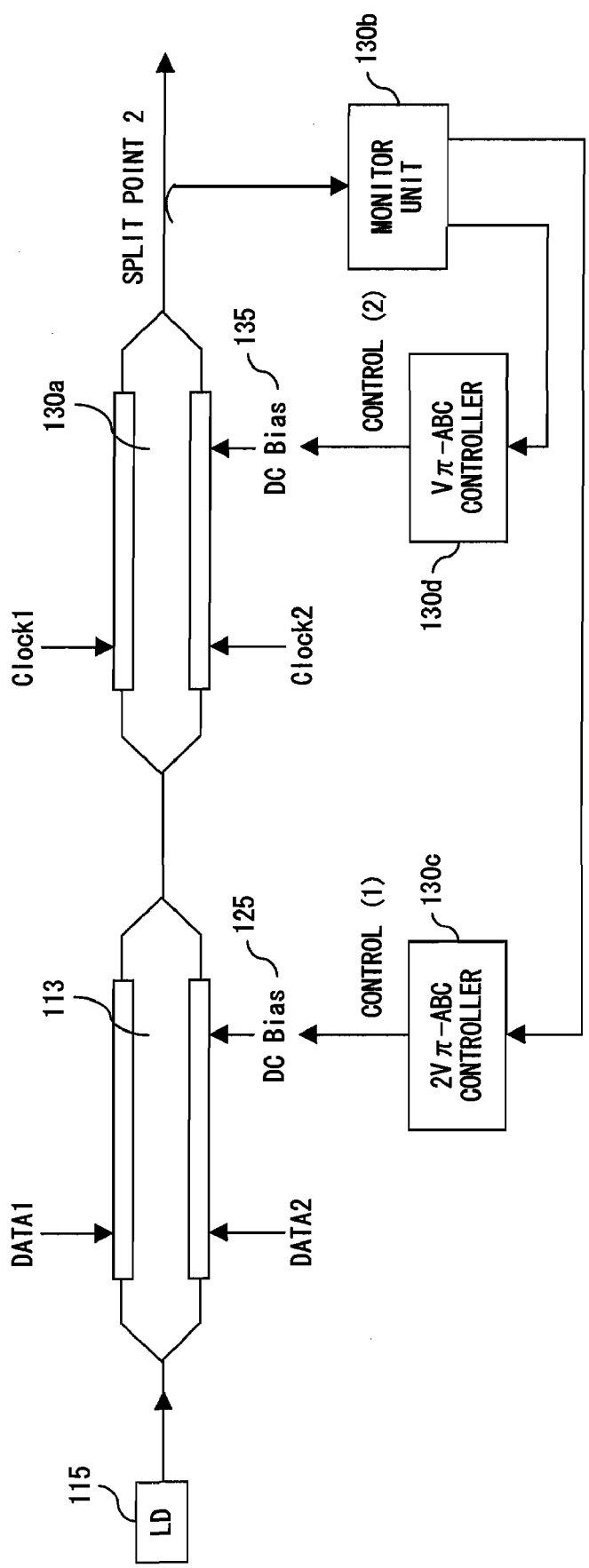
FIG. 37 is a diagram showing a modified example of the optical transmitting apparatus shown in FIG. 31.

FIG. 37 is a modified example of the optical transmitting apparatus shown in FIG. 31, and a RZ intensity modulator 130a is configured instead of the CSRZ modulator 130. In this apparatus, the $f_0$ component contained in the optical signal split at the split point 2 is monitored in a monitor unit 130b. Each of a 2Vπ-ABC controller 130c for providing bias to the MZ modulator 113 and a Vπ-ABC controller 130d for providing bias to the RZ intensity modulator 130a refers to the monitoring result by the monitor unit 130b. According to this configuration, the 2Vπ-ABC controller 130c and the Vπ-ABC controller 130d shares one monitor unit.

As explained above, the phase shift units 12 and 13 can provide an appropriate phase difference (for example, an odd-numbered multiple of π/2) between a pair of optical waveguides in a data modulation unit. As another embodiment, for example, the refractive index of the optical waveguides can be changed by changing the temperature of the optical waveguide by configuring a thin film heater on the split optical waveguide, or by adding stress on the optical waveguide by configuring a piezoelectric element etc. and applying appropriate voltage to the optical waveguide. As a result, the control to provide an appropriate phase difference between a pair of optical waveguides in the phase modulator becomes possible.

In addition, in the above embodiments, the phase shift units 12 and 13 are configured in one of a pair of optical waveguides; however, they can be configured in both of the optical waveguides. In such a case, relative phase difference can be provided properly by asymmetrical applied voltage or temperature to the phase shift unit (electrode, thin film heater, piezoelectric element) configured in the waveguides.

Moreover, in the above embodiment, the explanation is mainly on the DQPSK modulation; however, the control of the present invention can be applied to the QPSK modulation without any modification. The present invention, also, can be applied to $2^n$PSK (n≧3) or QAM. However, when applying the present invention to these modulation, for example, multivalued data with four or more values should be used as a data signal input to the data modulation unit.

In the following description, an explanation of a technology for improving the adjustment accuracy of the above amount of the phase shift is provided.

In the DQPSK modulation, as described above, a phase shift unit for generating a phase difference of "π/2" between a pair of optical signals is required. In order for the phase shift unit to adjust the amount of the phase shift, the bias voltage provided to the phase shift unit is controlled by the feedback control. Here, it is desirable to have a configuration for monitoring the time average optical power of the modulated optical signal using low-price and low-speed photodiode in attempting to downsize and cut the cost of a circuit for monitoring a parameter used for the feedback control. However, in the DQPSK modulation, even though the phase difference deviates from "π/2", the change in average optical power is small, and it is not easy to detect and to adjust the DC drift.

In view of the problem, in the following twelfth and thirteenth embodiments, a configuration for enlarging the change in average optical power of an output optical signal with respect to the DC drift of a phase shift unit is presented.

Twelfth Embodiment

In the DQPSK modulation, as explained referring to FIG. 3, each symbol comprises 2-bit data (DATA 1 and DATA 2). Either "0" or "π" is assigned to the data DATA 1, and either "π/2" or "3π/2" is assigned to the data DATA 2. Therefore, each of the symbols (00, 10, 11, 01) can be represented by "π/4", "3π/4", "5π/4" and "7π/4".

Figure 38:
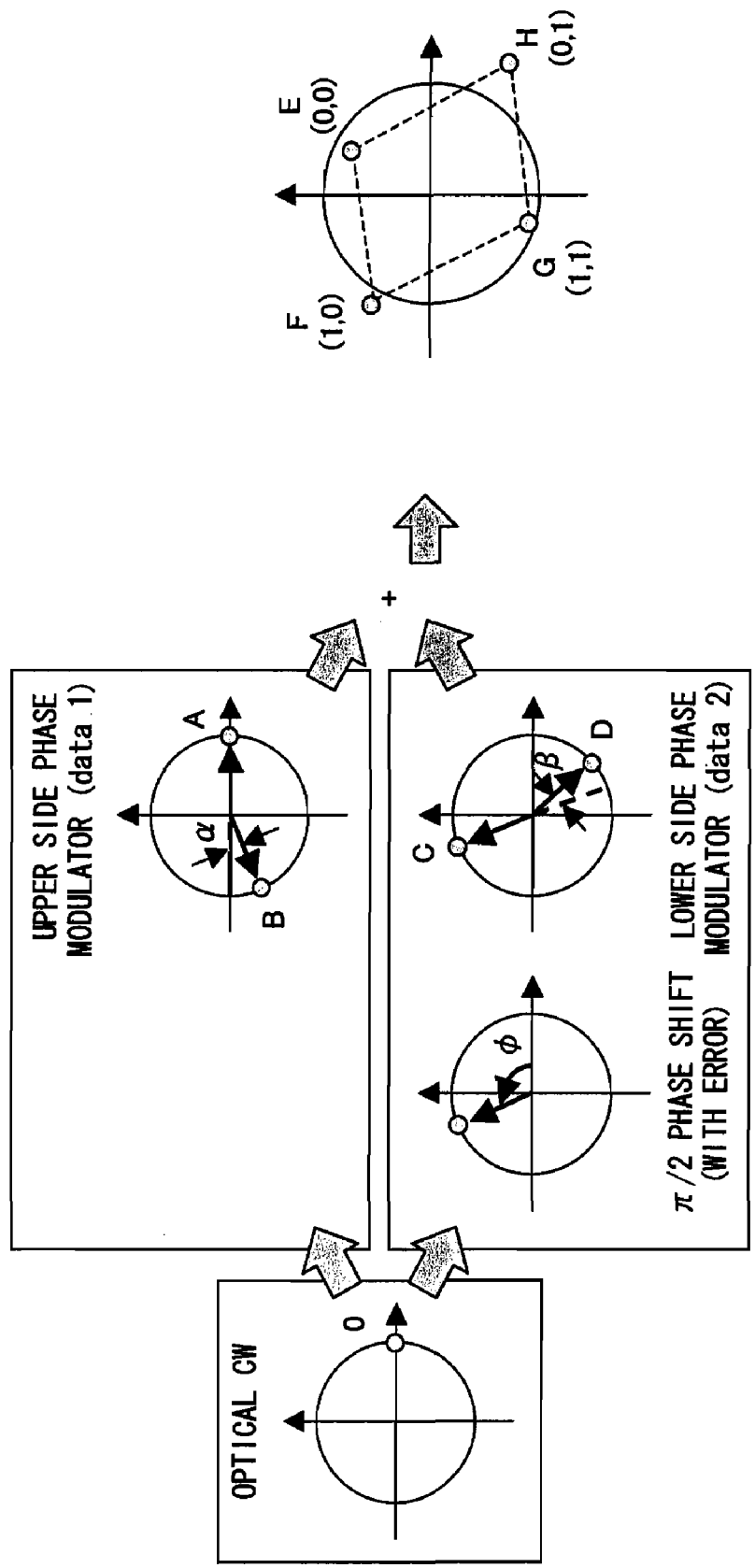
FIG. 38 is a diagram explaining a principle of the twelfth embodiment.

In the twelfth embodiment, as shown in FIG. 38, "0" or "π+α" is assigned to the data DATA 1. "φ" or "φ+π+β" is assigned to the data DATA 2. Here, "φ" is the amount of phase shift by the phase shift unit, and is ideally "π/2". "α" and "β" are the phases added in the twelfth embodiment.

Signal points A and B corresponding to the data DATA 1, and signal points C and D corresponding to the data DATA 2 are represented as the following on the phase plane.

$$A\left(\frac{\sqrt{2}}{2}\quad 0\right)$$

$$B\left(-\frac{\sqrt{2}}{2}\cos\alpha\quad -\frac{\sqrt{2}}{2}\sin\alpha\right)$$

$$C\left(\frac{\sqrt{2}}{2}\cos\phi\quad \frac{\sqrt{2}}{2}\sin\phi\right)$$

$$D\left(-\frac{\sqrt{2}}{2}\cos(\beta+\phi)\quad -\frac{\sqrt{2}}{2}\sin(\beta+\phi)\right)$$

Signal points E, F, G and H corresponding to each of the symbols (00, 10, 11, 01) are represented as the following on the phase plane.

$$E\left(\frac{\sqrt{2}}{2}(1+\cos\phi)\quad \frac{\sqrt{2}}{2}\sin\phi\right)$$

$$F\left(\frac{\sqrt{2}}{2}(\cos\phi-\cos\alpha)\quad \frac{\sqrt{2}}{2}(\sin\phi-\sin\alpha)\right)$$

$$G\left(\frac{\sqrt{2}}{2}(\cos\alpha+\cos(\beta+\phi))\quad -\frac{\sqrt{2}}{2}(\sin\alpha+\sin(\beta+\phi))\right)$$

$$H\left(-\frac{\sqrt{2}}{2}(1-\cos(\beta+\phi))\quad -\frac{\sqrt{2}}{2}\sin(\beta+\phi)\right)$$

The average optical power $P_{ave}$ of the modulated optical signal is proportional to an average of squared distance from an origin of the phase plane to each of the signal points (E through H). Consequently, the average optical power $P_{ave}$ of the modulated optical signal is represented as the following equation (1).

$$P_{ave} = \frac{4+\cos\phi+\cos(\beta-\alpha+\phi)-\cos(\alpha-\phi)-\cos(\beta+\phi)}{4} \quad (1)$$

In the DQPSK modulation, generally, both "α" and "β" are zero. Therefore, in this case, the average optical power $P_{ave}$ of the modulated optical signal maintains "1", being independent of "φ". In other words, when the amount of phase shift by the phase shift unit deviates from π/2 due to aged deterioration etc., it is difficult to detect the deviation of the amount of the phase shift by monitoring the average power $P_{ave}$.

On the contrary, according to the optical transmitting apparatus of the twelfth embodiment, neither "α" nor "β" is zero, and therefore the terms including "φ" remain in the above equation (1). Consequently, when the amount of phase shift deviates from π/2, the average optical power $P_{ave}$ changes in response to the deviation. In other words, by monitoring the average optical power $P_{ave}$, the change in the amount of phase shift by the phase shift unit can be easily detected.

"α" and "β" can be the same to or can be different from each other. "α" and "β", also, can be positive phases or negative phases. Thus, in the twelfth embodiment, "adding the phase" includes both rotating the phase in a positive direction and rotating the phase in a negative direction. It is required that "α" and "β" have to be determined within a range where the reduction of communication quality is permissible.

Figure 39:
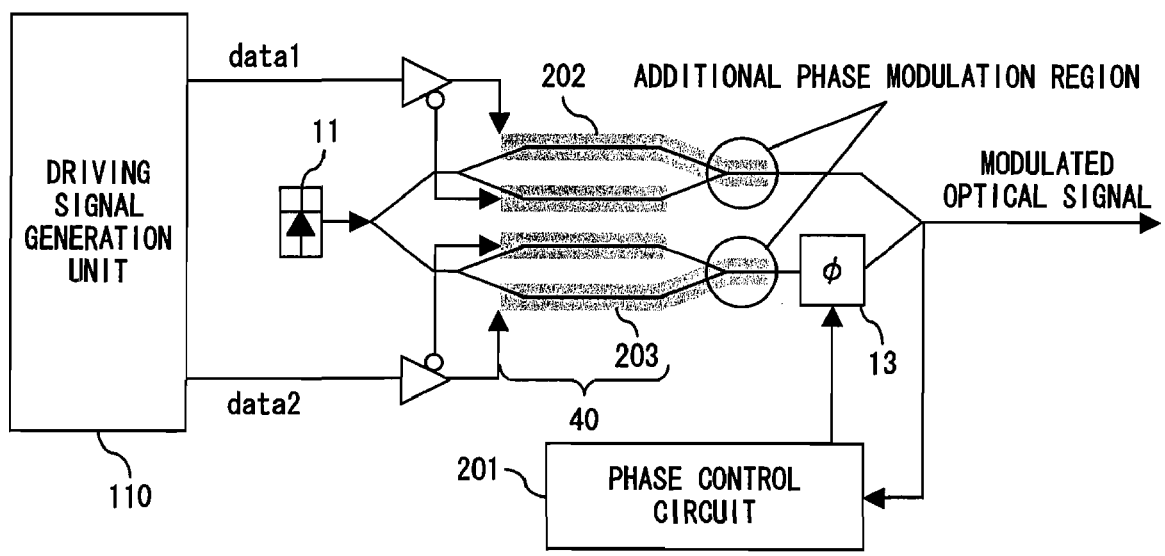
FIG. 39 through FIG. 41 are first through third practical example of the 12th embodiment.
Figure 40:
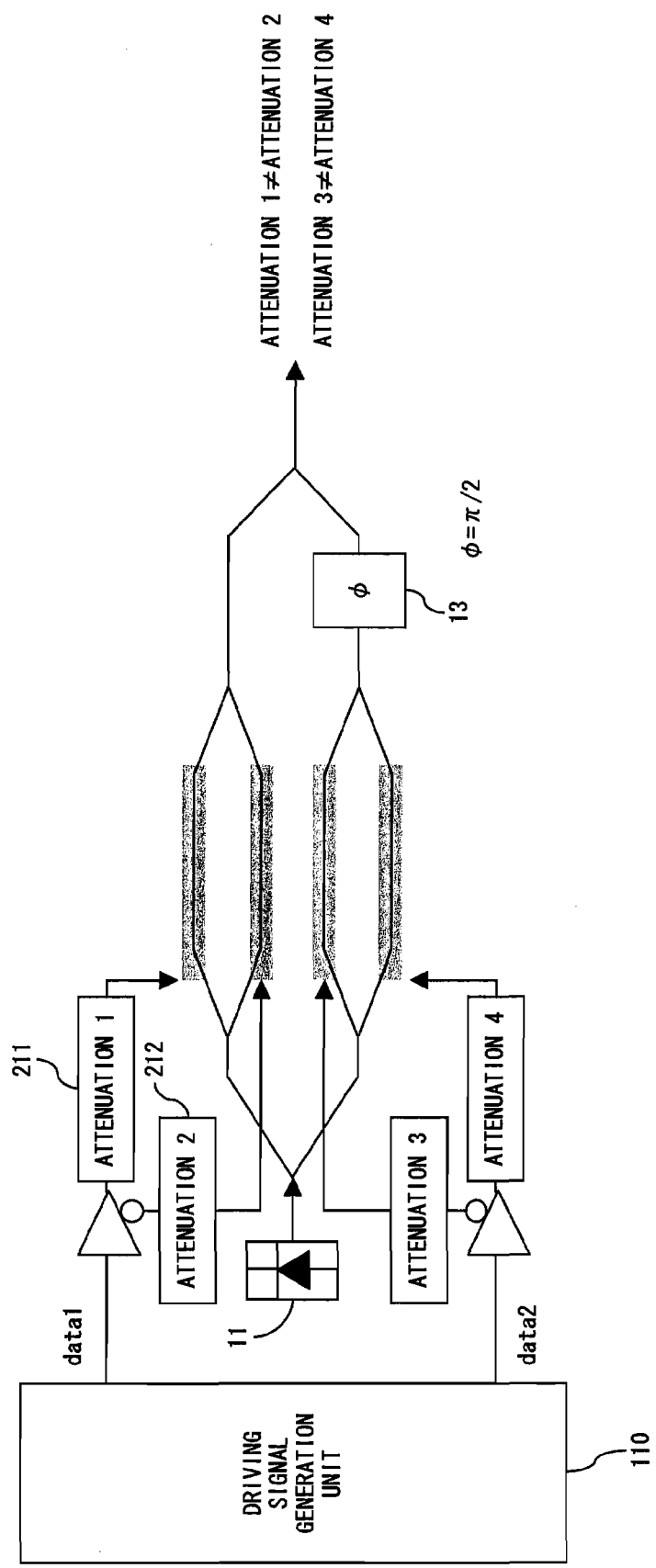
Figure 41:
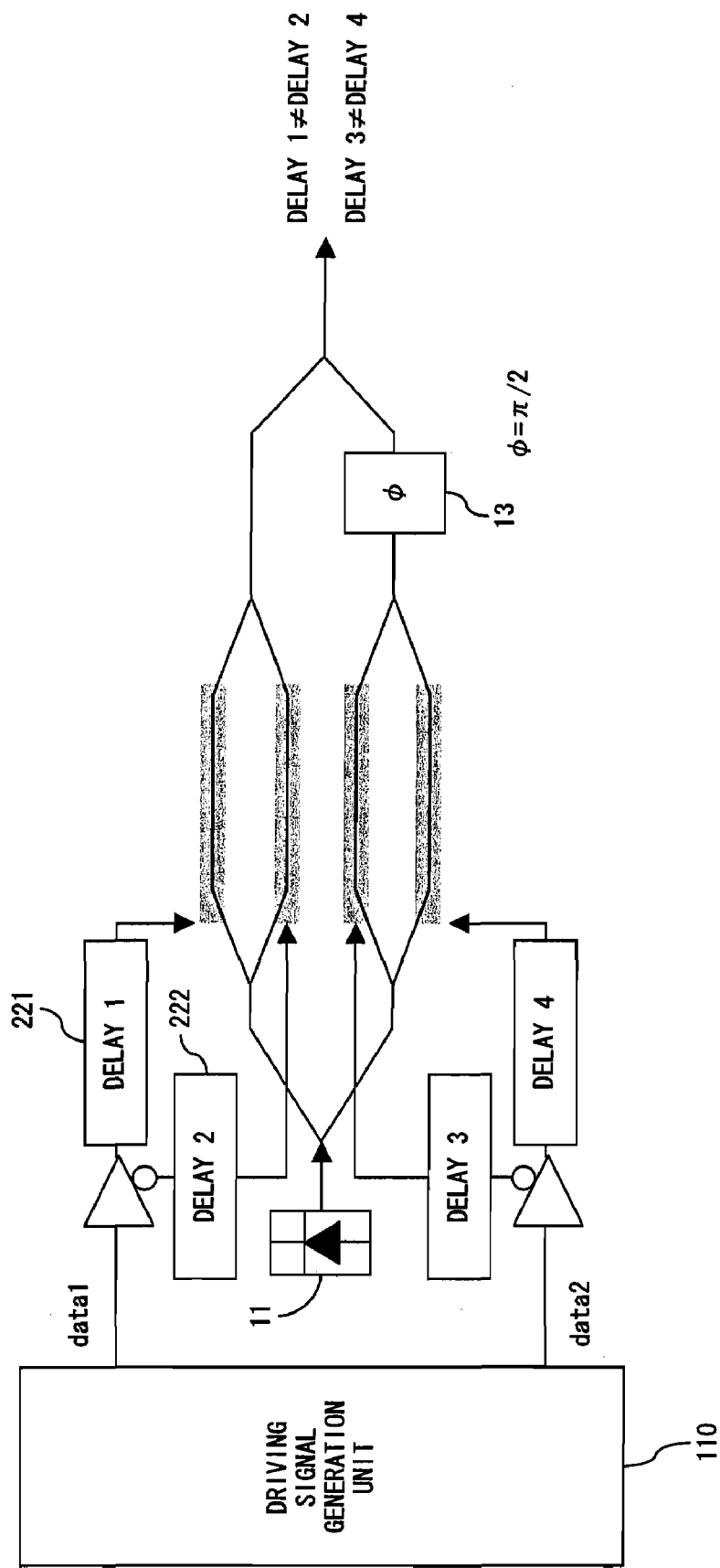

FIG. 39 through FIG. 41 are first through third practical examples of the twelfth embodiment. In these examples, only a configuration for adding "α" and "β" explained with reference to FIG. 38 is described. The semiconductor laser 11, the phase shift unit 13, the data modulation unit 40 and the driving signal generation unit 110 are the same as explained above. A phase control circuit 201 monitors the average optical power of the modulated optical signal output from the data modulation unit 40 and controls the amount of phase shift by the phase shift unit 13 according to the monitoring result.

In the first practical example, one of a pair of electrodes for applying data signal voltage to each MZ modulator is formed so as to reach the coupled waveguide in the output side of the MZ modulator. In an example shown in FIG. 39, each of electrodes 202 and 203 are formed so as to reach the Y-coupler. In a case that the electrodes 202 and 203 of a MZ modulator are formed in a way as explained above, the frequency of an optical signal in the MZ modulator changes instantaneously upon changing in the logical value of a data signal, and so-called chirp is generated. As a result a phase $\alpha$ and a phase $\beta$ shown in FIG. 38 are obtained. Details of the technique for generating chirp by extending electrodes of a MZ modulator are described in, for example, Japanese laid-open unexamined patent publication No. 07-199133.

In the second practical example, amplitudes of a pair of data signals provided to a MZ modulator differ from each other. In an example shown in FIG. 40, a data signal DATA 1 is provided to one of the electrodes of the MZ modulator via an attenuator element 211, and the data signal DATA 2 is provided to the other electrode of the MZ modulator via an attenuator element 212. Here, the attenuation by the attenuator element 211 (attenuation 1) and the attenuation by the attenuator element 212 (attenuation 2) are different from each other. Then, like the first practical example, chirp is generated when logical value of the data signal changes, and the phase $\alpha$, explained with reference to FIG. 38, is obtained. The explanation thing is applied to the data signal DATA 2, and the phase is generated by providing attenuation 3 and attenuation 4, which differ from each other.

The attenuation elements to obtain the attenuation 1 through 4 can be a metal pattern for transmitting the electrical signals. In such a case, the attenuation can be adjustable by changing the width and/or the length of the metal pattern.

In the third practical example, timing of a pair of data signals provided to a MZ modulator differs from each other. In an example shown in FIG. 41, a data signal DATA 1 is provided to one of the electrode in a MZ modulator via a delay element 221, and the data signal DATA 2 is provided to the other electrode of the MZ modulator via a delay element 222. At that time, the delay by the delay element 221 (delay 1) and the delay by the delay element 222 (delay 2) are different from each other. Then, like the first practical example, chirp is generated when logical value of the data signal changes, and the phase $\alpha$, explained with reference to FIG. 38, is obtained. The same explanation is applied to the data signal DATA 2, and the phase $\beta$ is generated by providing delay 3 and delay 4, which differ from each other.

The attenuation elements to obtain the delay 1 through 4 can be a metal pattern for transmitting the electrical signals. In such a case, the delay can be adjustable by changing the length of the metal pattern.

Thirteenth Embodiment

The average optical power $P_{ave}$ of a modulated optical signal is represented by the above equation (1) as explained in the twelfth embodiment. However, the above equation (1) is under an assumption that a mark rate of a data signal is equal. In other words, the above equation (1) assumes that four kinds of symbol (00, 10, 11, 01) are generated with equal frequency.

On the contrary, in the thirteenth embodiment, the mark rates of four kinds of symbols in the data signal are not equal. By having the unequal mark rates of the data signal, practically the same effect as the twelfth embodiment can be acquired.

Figure 42:
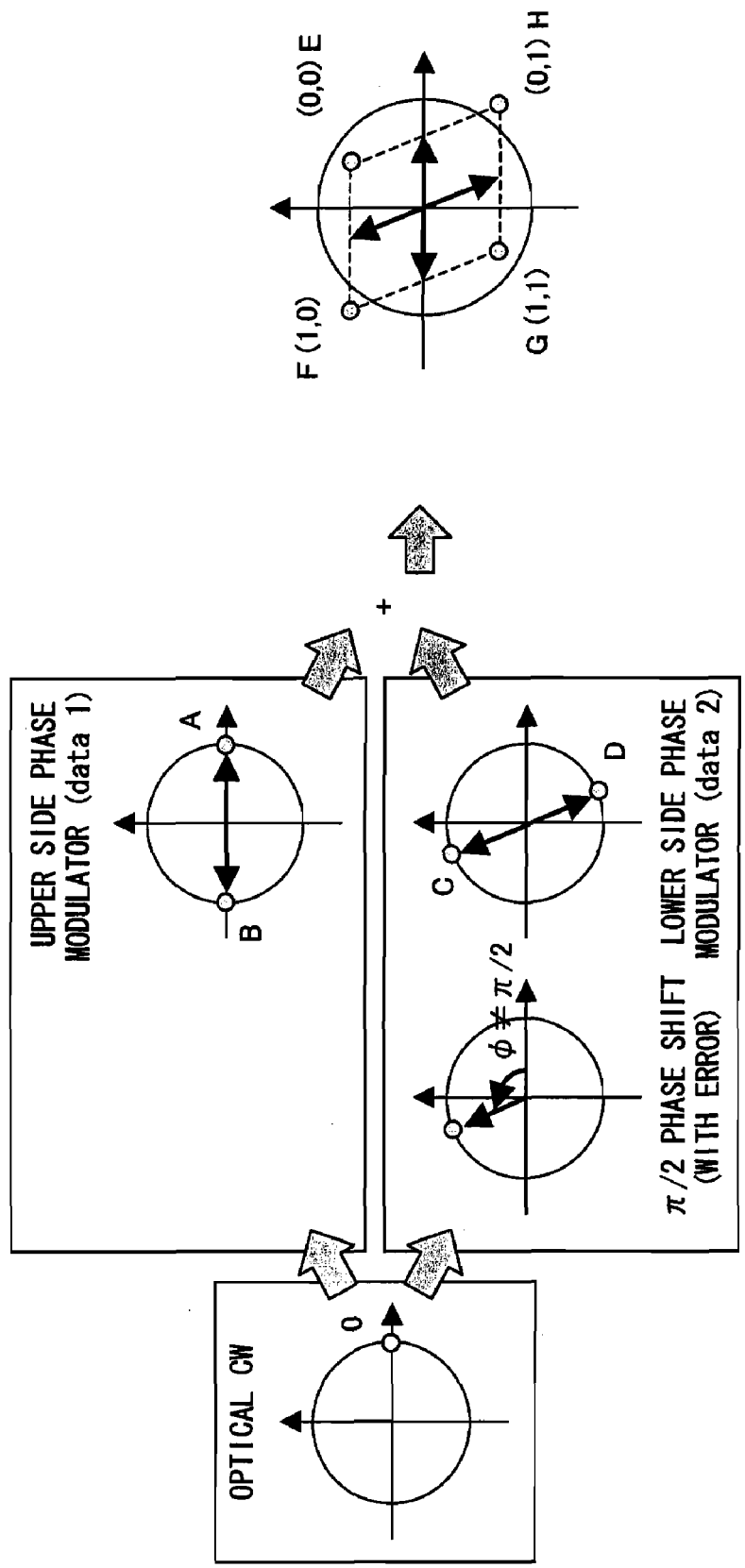
FIG. 42 is a diagram explaining a principle of the 13th embodiment.

FIG. 42 is a diagram explaining the principle of the thirteenth embodiment. In the thirteenth embodiment, either "0" or "$\pi$" is assigned to the data DATA 1. Either "$\phi$" or "$\phi+\pi$" is assigned to the data DATA 2 as well. Here, "$\phi$" is the amount of phase shift by the phase shift unit, and is ideally "$\pi/2$".

Signal points A and B corresponding to the data DATA 1 and signal points C and D corresponding to the data DATA 2 are represented as the following on a phase plane.

$$A\left(\frac{\sqrt{2}}{2},\ 0\right)$$

$$B\left(-\frac{\sqrt{2}}{2},\ 0\right)$$

$$C\left(\frac{\sqrt{2}}{2}\cos\phi,\ \frac{\sqrt{2}}{2}\sin\phi\right)$$

$$D\left(-\frac{\sqrt{2}}{2}\cos(\phi),\ -\frac{\sqrt{2}}{2}\sin(\phi)\right)$$

Signal points E, F, G and H corresponding to each of the symbols (00, 10, 11, 01) are represented as the following on the phase plane.

$$E\left(\frac{\sqrt{2}}{2}(1+\cos\phi),\ \frac{\sqrt{2}}{2}\sin\phi\right)$$

$$F\left(-\frac{\sqrt{2}}{2}(1-\cos\phi),\ \frac{\sqrt{2}}{2}\sin\phi\right)$$

$$G\left(-\frac{\sqrt{2}}{2}(1+\cos\phi),\ -\frac{\sqrt{2}}{2}\sin\phi\right)$$

$$H\left(\frac{\sqrt{2}}{2}(1-\cos\phi),\ -\frac{\sqrt{2}}{2}\sin\phi\right)$$

Optical power $P_E$, $P_F$, $P_G$ and $P_H$ for transmitting each of the symbols (00, 10, 11, 01) is represented as the following. The optical power for transmitting each of the symbols is proportional to squared distance from an origin the phase plane to each of signal points (E through H).

$$P_E = \frac{1}{2}((1+\cos\phi)^2 + \sin^2\phi) = \frac{2+2\cos\phi}{2} = 1+\cos\phi$$

$$P_F = \frac{1}{2}((1-\cos\phi)^2 + \sin^2\phi) = \frac{2-2\cos\phi}{2} = 1-\cos\phi$$

$$P_G = \frac{1}{2}((1+\cos\phi)^2 + \sin^2\phi) = \frac{2+2\cos\phi}{2} = 1+\cos\phi$$

$$P_H = \frac{1}{2}((1-\cos\phi)^2 + \sin^2\phi) = \frac{2-2\cos\phi}{2} = 1-\cos\phi$$

When appearance ratio of each of the symbols (00, 10, 11, 01) is $W_E$, $W_F$, $W_G$ and $W_H$, the average optical power $P_{ave}$ of the modulated optical signal is represented by the following equation (2).

$$P_{ave} = W_E P_E + W_F P_F + W_G P_G + W_H P_H = 1 + (W_E + W_F - W_G - W_H)\cos\phi \quad (2)$$

In the thirteenth embodiment, the mark rate of the data signal is adjusted so that the appearance ratio of each of the symbols is unequal. More specifically, when the mark rate of a data signal is adjusted so that the sum of the appearance ratio $W_E$ of a symbol (00) and the appearance ratio $W_G$ of a symbol (11) differs from the sum of the appearance ratio $W_F$ of a symbol (10) and the appearance ratio $W_H$ of a symbol (01), the average optical power $P_{ave}$ is a function of "φ". In other words, the average optical power of a modulated optical signal changes in response to the change in the amount of the phase shift φ by a phase shift unit. Therefore, feedback control over the phase shift unit is possible using the monitoring result acquired from monitoring of the average optical power of a modulated optical signal.

Figure 43:
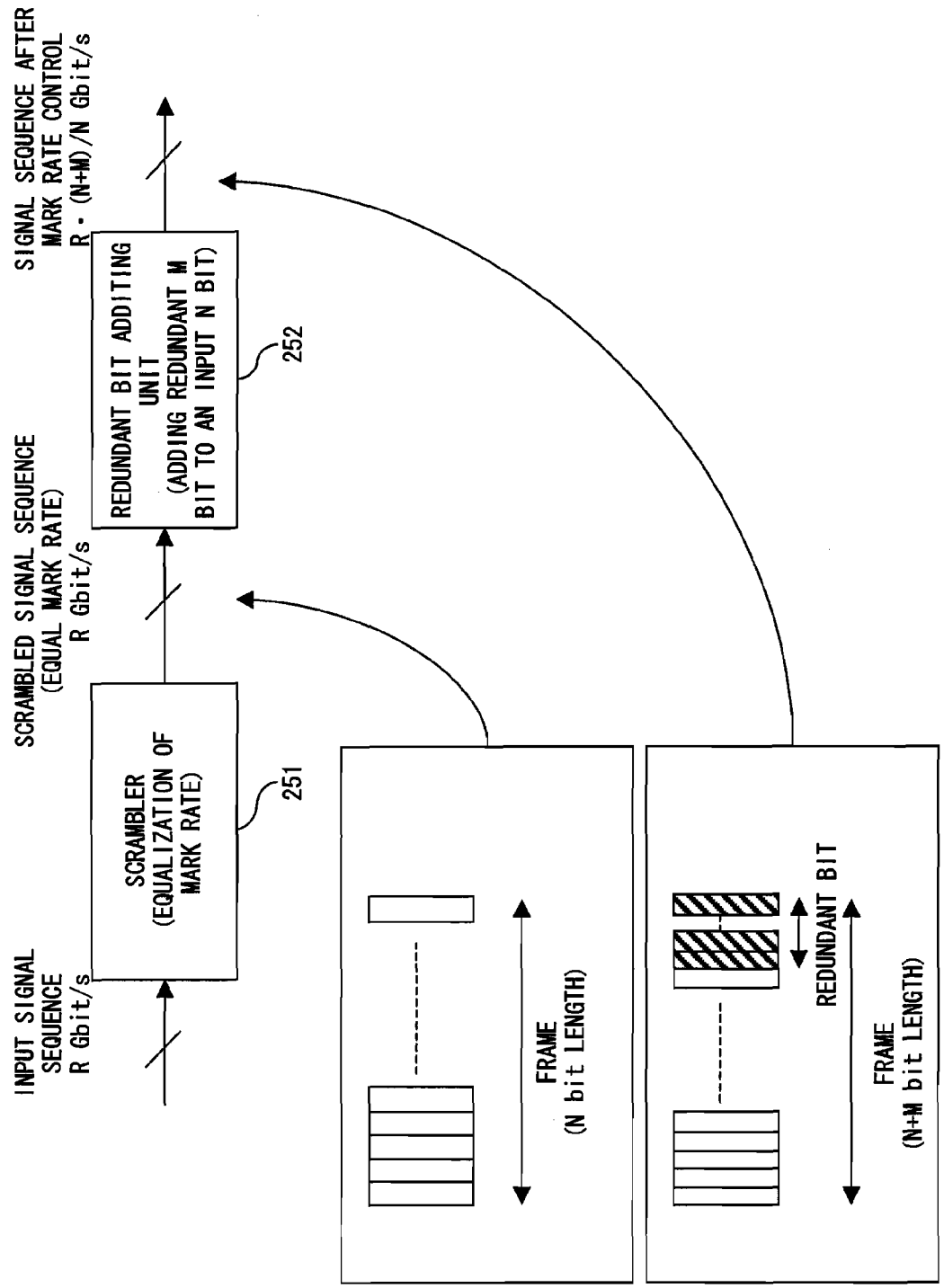
FIG. 43 is a diagram explaining a brief overview of a method for controlling a mark rate of a data signal.

FIG. 43 is a diagram explaining a brief overview of a method for controlling a mark rate of a data signal. The control of a mark rate is performed in a driving signal generation unit, for example.

The data signal (input signal sequence) has its mark rate equalized by a scrambler 251. By so doing, the appearance ratio of each symbol (00, 10, 11, 01) is controlled to be approximately equal. A technique for equalizing a mark rate of a data signal is a publicly known technique.

A redundant bit adding unit 252 adds redundant bit to a data signal scrambled by the scrambler 251. At that time, the redundant bit with M bit is added to data signal with N bit. Therefore, the data rate increases by (N+M)/N times. As the redundant bit, a value generating a particular symbol ("00" or "11", for example) is used. By so doing, the average optical power $P_{ave}$ of the modulated optical signal is function of the amount of the phase shift φ, and feedback control of the phase shift unit is possible with the average optical power as a parameter.

Each of the functions shown as the twelfth and the thirteenth embodiment is applied to the optical transmitting apparatus of the first through the eighth embodiments, and can be also applied to an optical transmitting apparatus, which does not use a low-frequency signal.

Fourteenth Embodiment

In the optical transmitting apparatus of the first through the eighth embodiments, as described above, by superimposing a low-frequency signal on an optical signal, and by monitoring the $f_0$ component and/or $2f_0$ component included in the optical output from a modulator, the amount of phase shift of the phase shift unit 12 or 13 is adjusted (phase adjusting ABC). The control of the DC drift of the phase modulator (2Vπ-ABC) and the control of the DC drift of the RZ modulator (Vπ-ABC) are also performed. These controls are collectively shown in FIG. 44.

Figure 45:
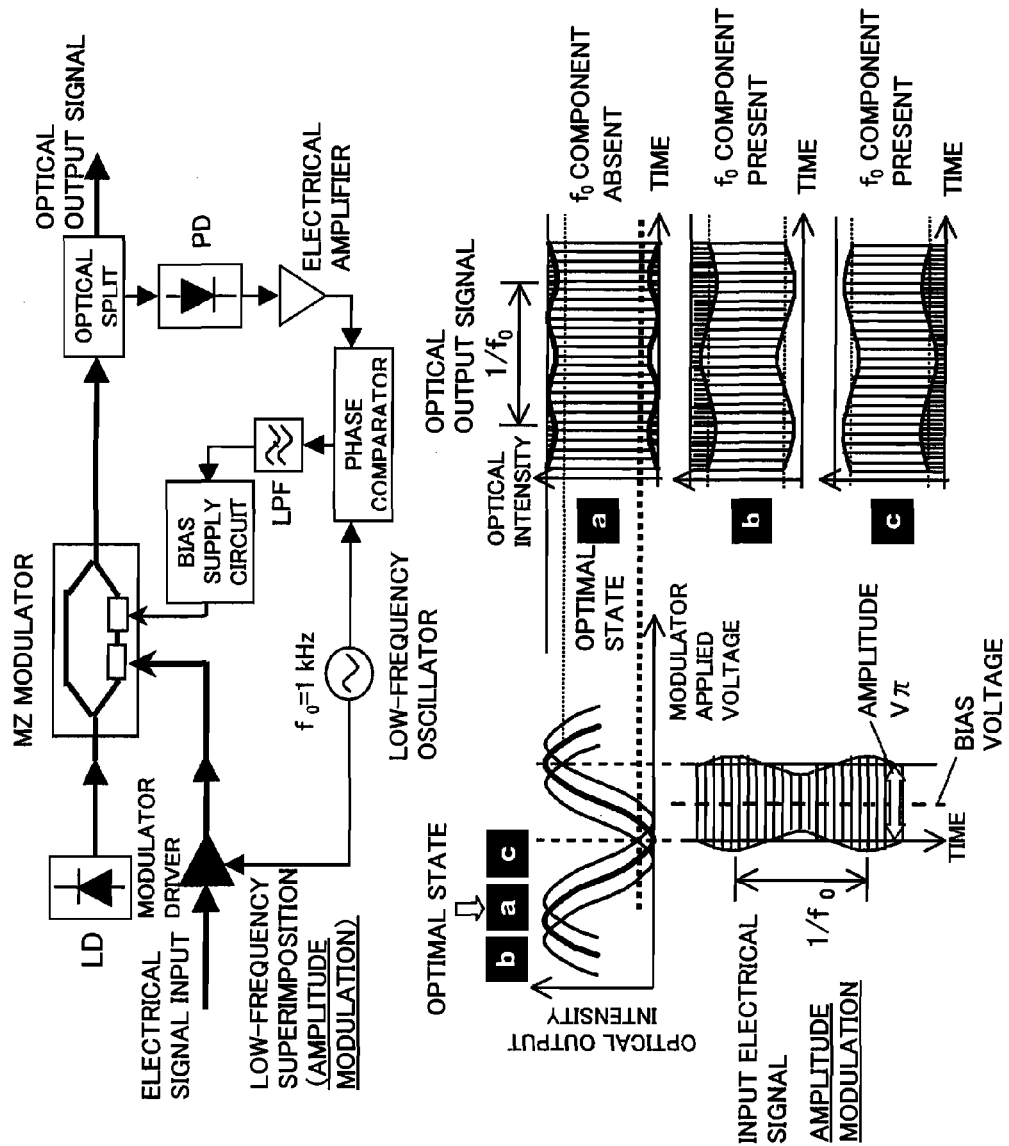
FIG. 45 is a diagram explaining the Vπ-ABC control of the RZ modulator.

FIG. 45 is a diagram explaining the Vπ-ABC control of the RZ modulator (the RZ intensity modulator 300 shown in FIG. 5). In the Vπ-ABC, the low-frequency signal $f_0$ is superimposed on a driving signal of the modulator. The $f_0$ component included in optical output from the modulator is monitored. At that time, if the bias voltage of the modulator is adjusted appropriately, the detected $f_0$ component is zero or minimum. Meanwhile, if the bias voltage deviates from an appropriate value and DC drift occurs, the $f_0$ component is detected from the optical output of the modulator. Hence, the Vπ-ABC circuit performs the feedback control of the bias voltage so as to minimize the $f_0$ component detected from the optical output of the modulator. By so doing, the bias point can be maintained at an optimal point. The phase of the $f_0$ component signal detected when the bias point deviates in a positive direction is inverted from the phase of the $f_0$ component signal detected when the bias point deviates in a negative direction. Therefore, by monitoring the polarity of the phase, it is possible to find out whether the bias voltage should be increased or decreased.

Figure 46:
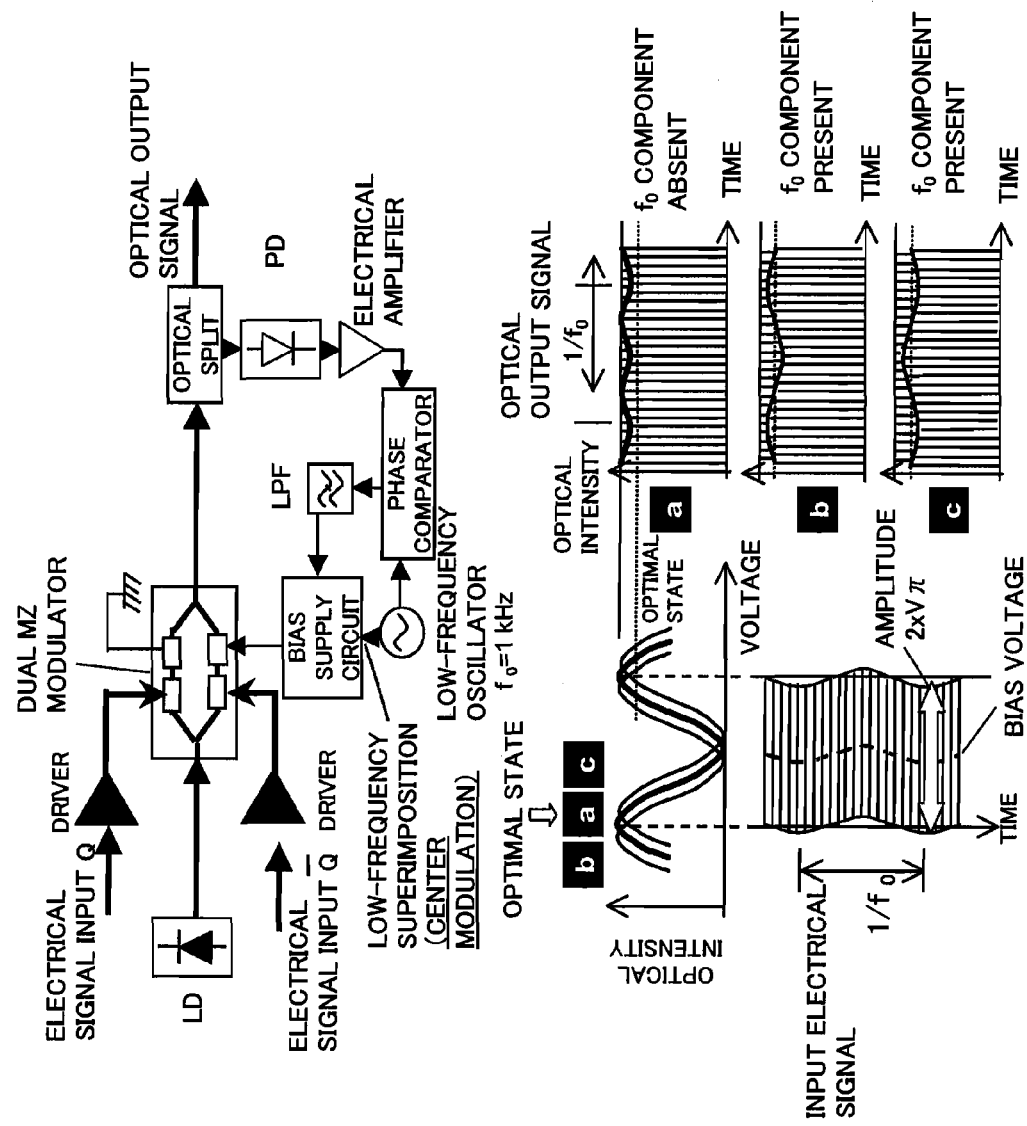
FIG. 46 is a diagram explaining the 2Vπ-ABC control of I-arm/Q-arm comprised in the phase modulator.

FIG. 46 is a diagram explaining the 2Vπ-ABC control of I-arm/Q-arm comprised in the phase modulator (the MZ modulator 200 shown in FIG. 5). Also in the 2Vπ-ABC, basically in the same way as the Vπ-ABC, the bias point can be maintained at an optimal point by a feedback control to minimize the $f_0$ component. In addition, in the 2Vπ-ABC, like the Vπ-ABC, the phase of the detected $f_0$ component changes in accordance with a direction of the deviation of the bias point.

In the phase adjusting ABC for adjusting the amount of phase shift of the phase shift unit 12 or 13, as shown in FIG. 7 through FIG. 9, the bias voltage is adjusted by the feedback control so that the $f_0$ component reaches the maximum, or that the $2f_0$ component becomes the minimum. By so doing, the amount of phase shift of the phase shift units 12 or 13 is maintained at an optimal point. However, in the phase adjusting ABC, the bias point is set to the middle of the maximum point and the minimum point, and consequently, even when the amount of phase shift of the phase shift unit 12 or 13 deviates from "π/2", the change in the amplitude of the $f_0$ component detected from the optical output of the modulator is small.

FIG. 47 is a table summarizing the comparison result of the detected low-frequency signals (i.e. the $f_0$ component and the $2f_0$ component). In this embodiment, the frequency of the low-frequency signal (a pilot signal) superimposed on the optical signal is 1.1 kHz. In the automatic bias control, "AC component amplitude" described as the item 4 in FIG. 47 is monitored. However, the amplitude of the AC component detected in the phase control ABC is extremely small compared with the amplitude of the AC component detected when compensating for the DC drift. In the example shown in FIG. 47, the current amplitude detected in the phase control ABC is approximately 1 nA. Therefore, the adjustment of the amount of phase shift of the phase shift unit 12 or 13 is more difficult compared with the control for compensating for the DC drift of the phase modulator or the RZ modulator.

In the adjustment of the amount of phase shift of the phase shift unit 12 or 13, as shown in FIG. 7 through FIG. 9, the phase of the $f_0$ component signal detected when the amount of phase shift of the phase shift unit deviates in a positive direction is the same as the phase of the $f_0$ component signal detected when the amount of phase shift of the phase shift unit deviates in a negative direction. Therefore, also from this point, the adjustment of the amount of phase shift of the phase shift unit 12 or 13 is more difficult than the control for compensating for the DC drift. In the fourteenth embodiment, a configuration to overcome these problems is presented.

Figure 48:
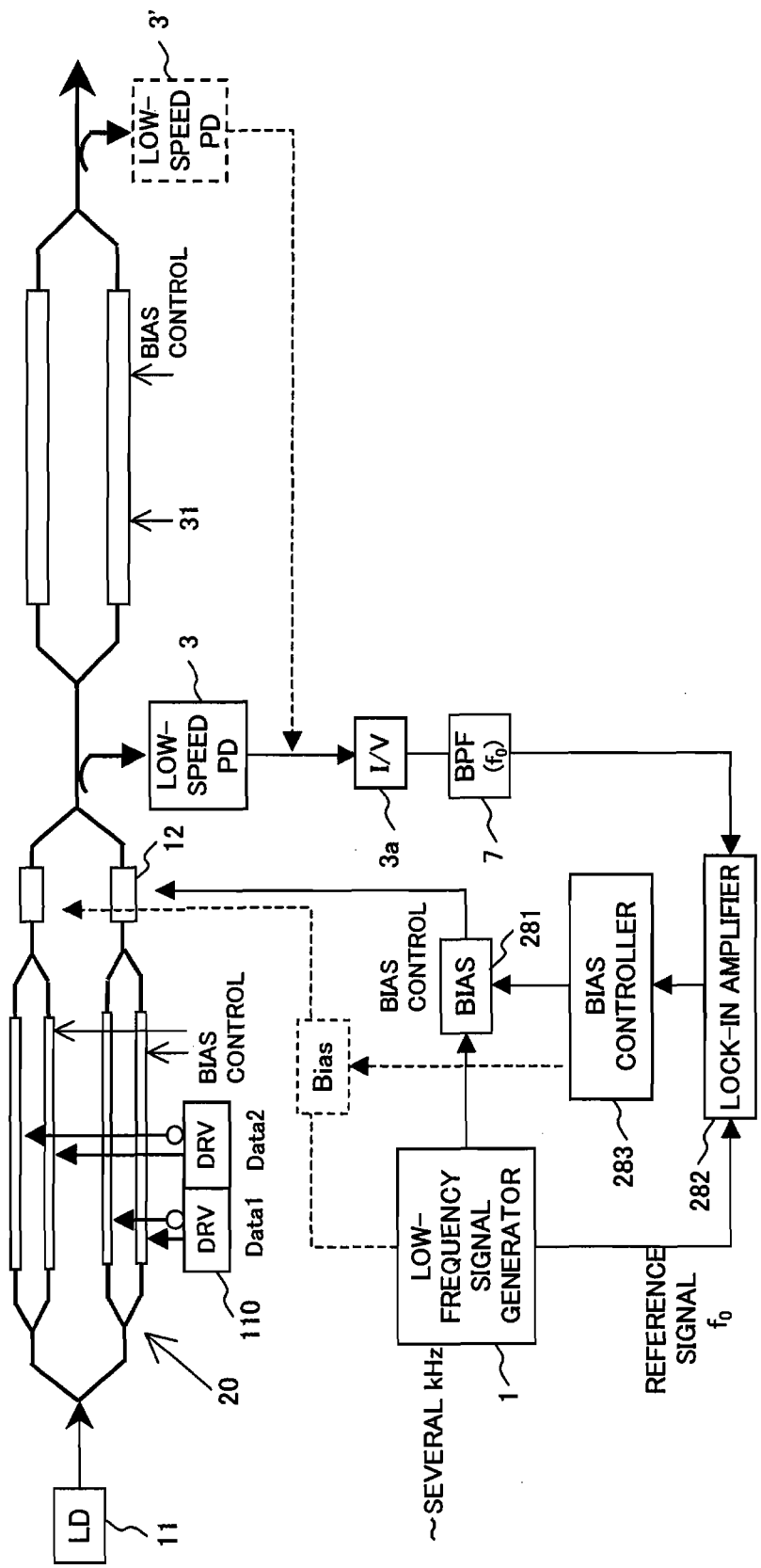
FIG. 48 is a diagram describing a configuration of the optical transmitting apparatus of the fourteenth embodiment.

FIG. 48 is a diagram describing a configuration of the optical transmitting apparatus of the fourteenth embodiment. In FIG. 48, the configurations and the operations of the data modulator 20 comprising a pair of phase modulators and the intensity modulator 31 are basically the same as those in the first through the eighth embodiments. The input optical power of the low-speed photodiode 3 (or the low-speed photodiode 3') is approximately −10 dBm, for example. The bias voltage is ±30V or more, for example. The amplitude of the low-frequency signal is adequately small compared with the bias voltage, and is approximately 100 mV (approximately 0.05Vπ), for example.

In FIG. 48, a bias generator 281 generates a bias signal in accordance with the instruction from a bias controller 283, and provides the signal to the phase shift unit 12. In this example, the bias signal is, for example, a DC voltage signal within a prescribed range. The low-frequency signal generator 1 generates a low-frequency signal with the frequency $f_0$. This low-frequency signal is superimposed on the bias signal. Accordingly, this low-frequency signal is also provided to the phase shift unit 12. As a result, the optical output of the data modulator unit 20 includes the $f_0$ component.

The low-speed photodiode 3 generates the current corresponding to the split beam of the optical output of the data modulator unit 20. An I/V converter 3a converts a current signal generated by the low-speed photodiode 3 into a voltage signal. The band-pass filter 7, which has the center frequency of $f_0$, and filters the output signal of the I/V converter 3a. A lock-in amplifier 282 detects the amplitude of the output signal of the band-pass filter 7 by synchronous detection using the low-frequency signal generated by the low-frequency signal generator 1, and outputs the detected value after amplifying it with a constant gain. A bias controller 283 issues an instruction to a bias generator 281 based on the detected amplitude value.

Like the above embodiments, instead of the low-speed photodiode 3 for monitoring the optical output of the data modulator unit 20, the low-speed photodiode 3' for monitoring the optical output of the intensity modulator 31 may be employed. The phase shift unit 12 may be provided to one of the arms of the data modulator unit 20 alone, or may be provided to both arms.

Figure 49:
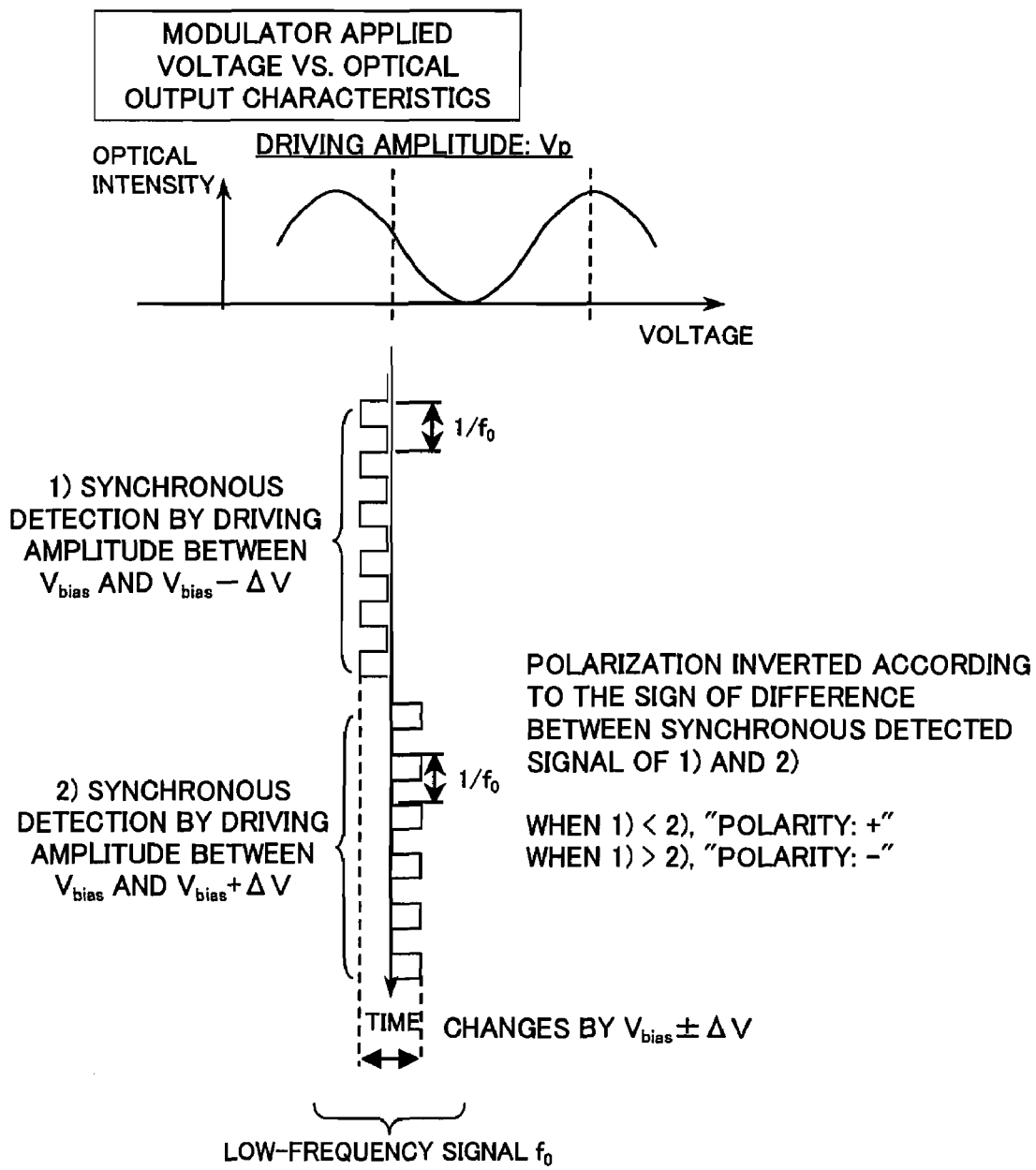
FIG. 49 is a diagram for explaining the overview of the amount of phase shift adjustment method in the fourteenth embodiment.

FIG. 49 is a diagram for explaining the overview of the phase shift adjustment method in the fourteenth embodiment. In this description, the bias voltage $V_{bias}$ is provided to the phase shift unit 12.

During a period 1, a bias signal oscillating between the "$V_{bias}$" and "$V_{bias}-\Delta V$" is provided to the phase shift unit 12, and the synchronous detection is performed at that state. An amplitude value $V_{det1}$ obtained from the synchronous detection is stored. "$\Delta V$" is amplitude of the low-frequency signal. Next, during a period 2, a bias signal oscillating between the "$V_{bias}$" and "$V_{bia}+\Delta V$" is provided to the phase shift unit 12, and the synchronous detection is performed at that state. In the same way, an amplitude value $V_{det2}$ obtained from the synchronous detection is stored. Then, the "$V_{det1}$" and "$V_{det2}$" are compared, and the bias voltage $V_{bias}$ is controlled in accordance with the result.

In order to optimize the amount of phase shift of the phase shift unit 12, the detected amplitude value is required to be maximized. Therefore, when "$V_{det1}<V_{det2}$", the bias control unit 283 determines that the state in the period 2 is closer to the optimal amount of phase shift rather than the state in period 1, and generates an instruction to increase the bias voltage. On the other hand, when "$V_{det1}>V_{det2}$", the bias control unit 283 determines that the state in the period 1 is closer to the optimal amount of phase shift rather than the state in period 2, and generates an instruction to decrease the bias voltage. Afterwards, by repeating the control in the period 1 and the period 2, the amount of phase shift of the phase shift unit 12 converges on the optimal value "$\pi/2$". When "$V_{det1}$" and "$V_{det2}$" are equal to each other, the amount of phase shift of the phase shift unit 12 is determined to be the optimal value $\pi/2$, and the bias voltage is maintained without modulation.

Figure 50:
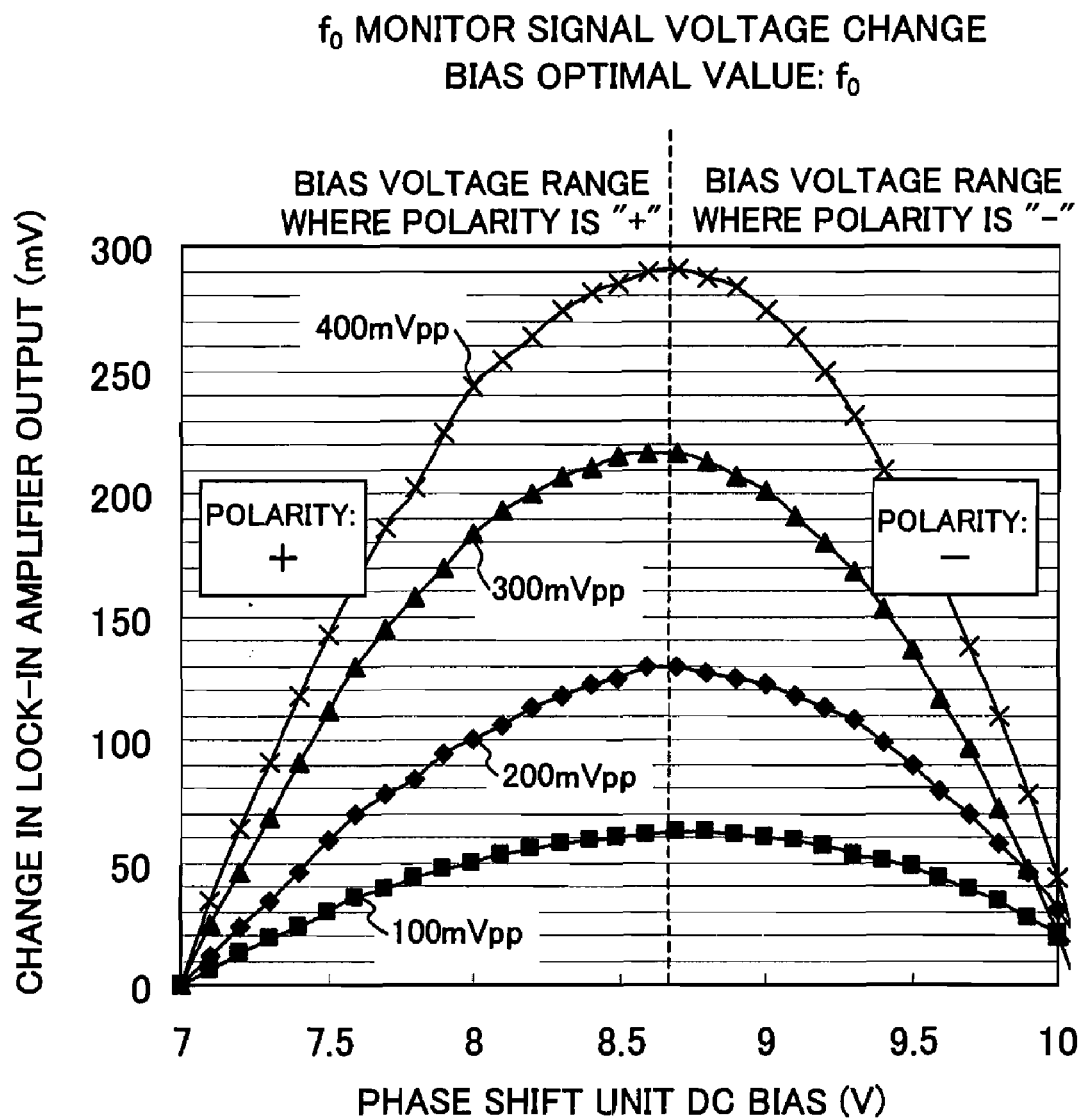
FIG. 50 is a diagram showing the relation between the amplitude of the low-frequency signal and the detected $f_0$ component.

FIG. 50 is a diagram showing the relation between the amplitude of the low-frequency signal and the detected $f_0$ component. In this diagram, the amount of phase shift of the phase shift unit 12 is optimized when the bias voltage is approximately 8.6V. The amplitude of the detected $f_0$ component is represented as an output signal of the lock-in amplifier 282. A rectangular wave signal with 100 mV-400 mV is employed as the low-frequency signal.

As shown in FIG. 50, as the amplitude of the low-frequency signal becomes large, the amplitude of the $f_0$ component detected from the optical output of the data modulator unit 20 becomes larger. However, caution should be exercised when the amplitude of the low-frequency signal is too large, for the communication quality may be deteriorated. According to this embodiment, increase/decrease is determined by comparing a pair of signals output from the lock-in amplifier 282 (the $V_{det1}$ and the $V_{det2}$ shown in FIG. 49), it is possible to obtain adjustment accuracy equivalent to that of the configuration in which the bias voltage is controlled by using the polarity of the phase of the $f_0$ component signal in compensating the DC drift.

Figure 51B:
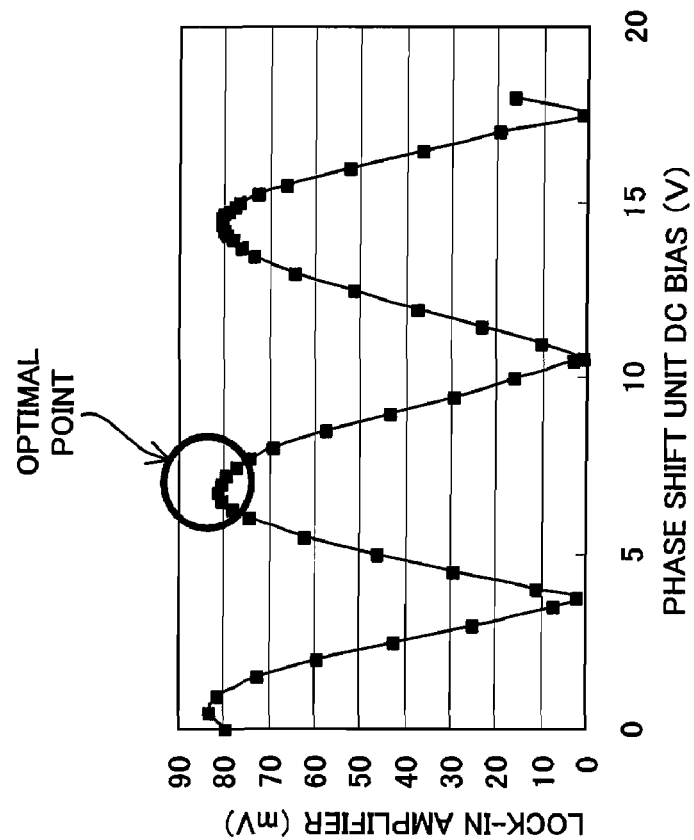
FIG. 51A and FIG. 51B are diagrams explaining an effect of the fourteenth embodiment.
Figure 51A:
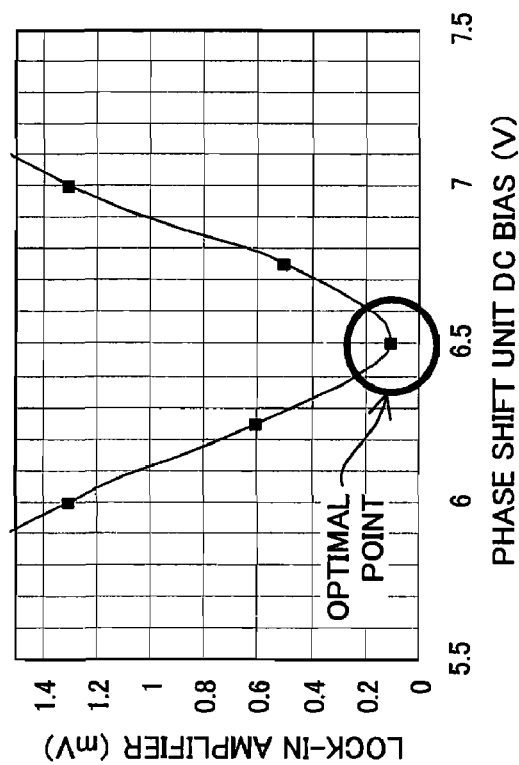

FIG. 51A and FIG. 51B are diagrams explaining an effect of the fourteenth embodiment. These diagrams show the output amplitude of the lock-in amplifier when a rectangular wave with amplitude of 400 mV is used as a low-frequency signal.

FIG. 51A shows the amplitude of the $2f_0$ component detected from the optical output of the modulator in the first embodiment etc. In the first embodiment etc., as stated above, the phase of the $f_0$ component signal obtained from the output of the modulator does not change, even if a deviating direction of the amount of phase shift changes. On the other hand, in the first embodiment etc., when the deviating direction of the amount of phase shift changes, the phase of the $2f_0$ component signal obtained from the output of the modulator changes. Therefore, as a method in contrast with the fourteenth embodiment, a method employing the $2f_0$ component, which enables to detect the deviating direction of the amount of phase shift by monitoring the phase, is adopted.

In the first embodiment, as stated above, a feedback control detecting the minimum value of the $2f_0$ component is performed. However, in the region close to the optimal point of the amount of phase shift, the amplitude of the $2f_0$ component is extremely small. Therefore, influenced by noise, the accuracy of the amount of phase shift control may be reduced. Also the lock-in time of the lock-in amplifier becomes long.

FIG. 51B shows the amplitude of the $f_0$ component detected from the optical output of the modulator in the fourteenth embodiment. In the fourteenth embodiment, the feedback control for detecting the maximum value of the $f_0$ component is performed. Therefore, in the region close to the optimal point of the amount of phase shift, the amplitude of the $f_0$ component is sufficiently large. Consequently, even under an environment where noise occurs, the amount of phase shift control has high accuracy. Also it is possible that the lock-in time of the lock-in amplifier becomes short.

As described above, according to the fourteenth embodiment, whether to increase or to decrease the amount of phase shift can be easily detected by monitoring the phase of the $f_0$ component signal obtained from the optical output of the modulator, and consequently, the adjustment of the amount of phase shift has high accuracy.

Figure 52:
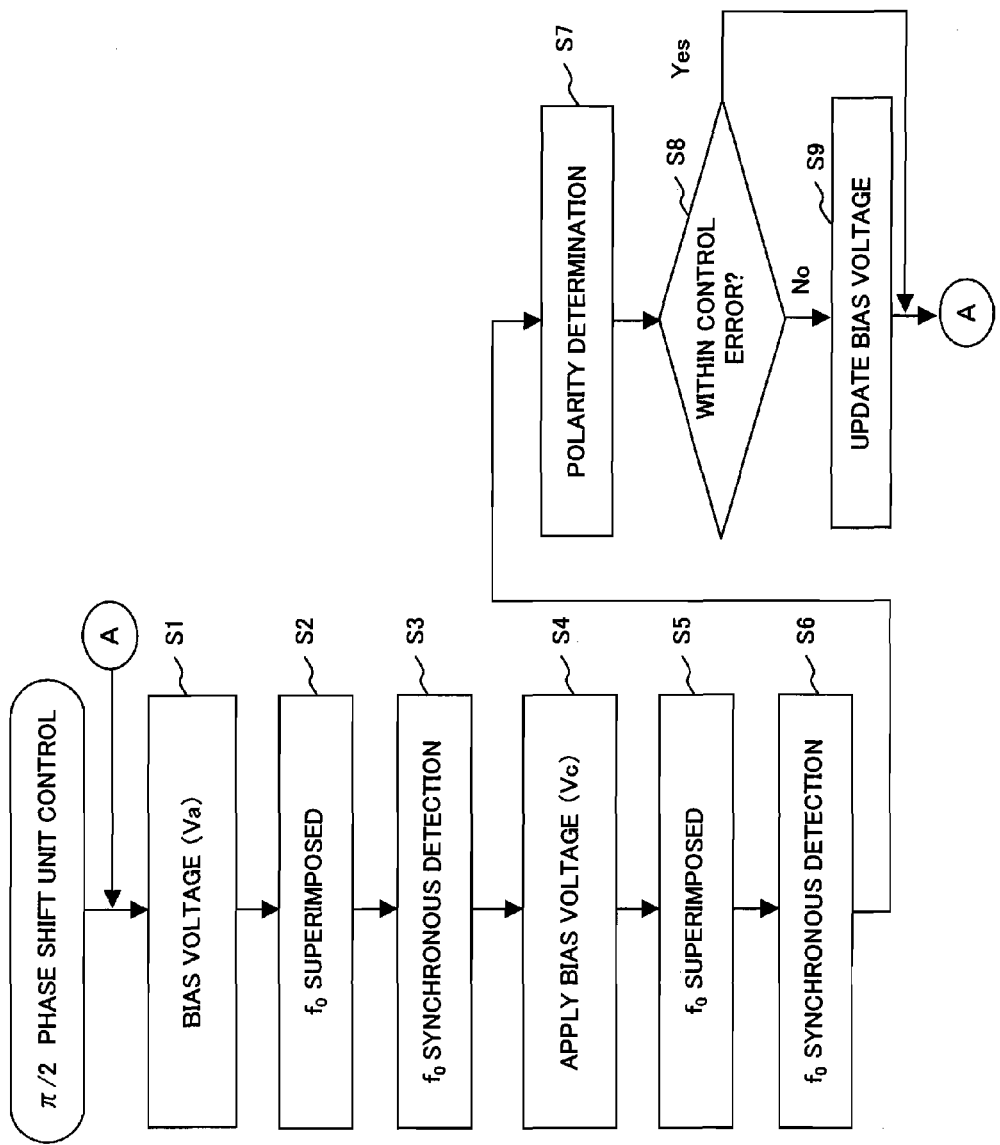
FIG. 52 is a flowchart of the amount of phase shift adjustment method in the fourteenth embodiment.
Figure 53:
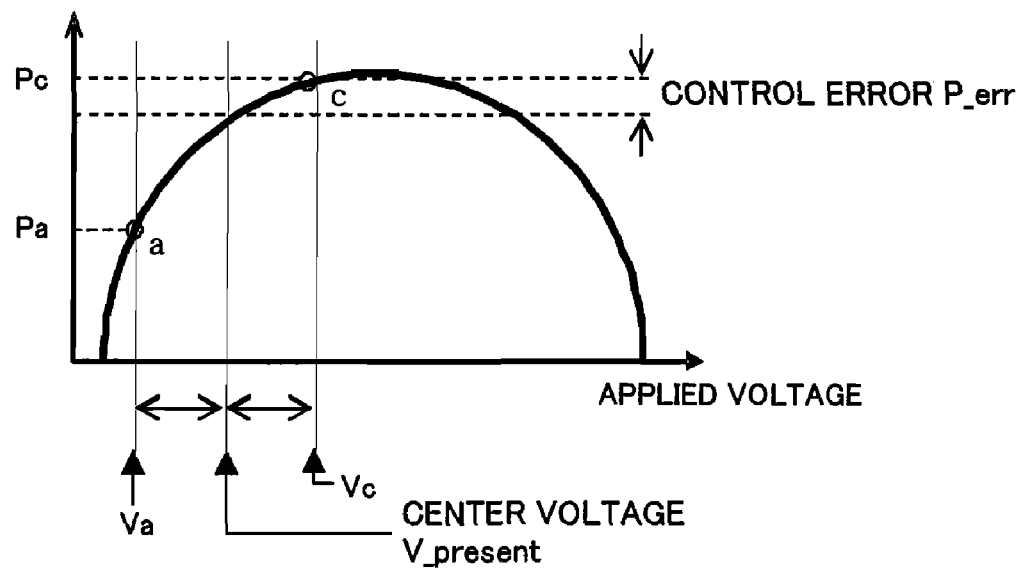
FIG. 53 is a reference diagram of the flowchart of FIG. 52.

FIG. 52 is a flowchart of the amount of phase shift adjustment method in the fourteenth embodiment. FIG. 53 is a reference diagram of the flowchart of FIG. 52. In this description, the current bias voltage is referred to as "$V_{present}$".

In step S1, the bias voltage $V_a$ is generated in accordance with the instruction of the bias controller 283, and the bias voltage is applied to the phase shift unit 12. The "$V_a$" is voltage lower than the "$V_{present}$" by a prescribed value. In step S2, a low-frequency signal is superimposed on the bias voltage $V_a$. In step S3, the amplitude of the $f_0$ component in the optical output of the data modulator unit 20 is detected by the synchronous detection of the $f_0$ component. By performing the steps S1-S3 continuously for a prescribed time period, a synchronous detection value $P_a$ is obtained.

In step S4, the bias voltage $V_c$ is generated in accordance with the instruction of the bias controller 283, and the bias voltage is applied to the phase shift unit 12. The "$V_c$" is a voltage higher than the "$V_{present}$" by a prescribed value. In step S5, a low-frequency signal is superimposed on the bias voltage $V_c$. In step S6, the amplitude of the $f_0$ component in the optical output of the data modulator unit 20 is detected by the synchronous detection of the $f_0$ component. By performing the steps S4-S6 continuously for a prescribed time period, a synchronous detection value $P_c$ is obtained.

In step S7, by comparing the synchronous detection value $P_a$ and the synchronous detection value $P_c$ obtained from the steps S1-S6, the polarity of the changed direction of the bias voltage is detected. In this description, the "polarity" indicates whether the bias voltage should be increased or decreased. That is to say, if the synchronous detection value $P_c$ is larger than the synchronous detection value $P_a$, the "polarity:+" is determined. On the other hand, if the synchronous detection value $P_c$ is smaller than the synchronous detection value $P_a$, the "polarity:−" is determined.

In step S8, whether or not the difference between the synchronous detection value $P_a$ and the synchronous detection value $P_c$ is within an error range is examined. If the difference is within the error range, the bias voltage $V_{present}$ is considered to be adjusted at the optimal value or approximately at the optimal value, and the processing is terminated. On the other hand, if the above difference exceeds the error range, in step S9, the bias voltage $V_{present}$ is changed in accordance with the polarity detected in the above manner. Practically, when "polarity:+" is obtained, the bias voltage $V_{present}$ is increased by a prescribed amount, and when "polarity:−" is obtained, the bias voltage $V_{present}$ is decreased by a prescribed amount.

By repeating the above steps S1-S9, the bias voltage is controlled so that the $f_0$ component in the optical output of the data modulator unit 20 is maximized, and the amount of phase shift of the phase shift unit 12 is adjusted to the optimal value $\pi/2$.

The "$V_c$-$V_{present}$" and "$V_{present}$-$V_a$" may be larger than the amplitude of the low-frequency signal, may be smaller than the amplitude of the low-frequency signal, or may be equal to the amplitude of the low-frequency signal. The amount of change in step S9 may be constant, or may be determined according to the difference between the synchronous detection value $P_a$ and the synchronous detection value $P_c$.

As described above, according to the fourteenth embodiment, it is possible to easily and accurately adjust the amount of phase shift of $\pi/2$ delay element necessary in a DQPSK optical transmitting apparatus and an RZ-DQPSK optical transmitting apparatus. It is also possible to realize an amount of phase shift adjustment circuit of an optical transmitting apparatus of 40 Gbps with a size similar to a conventional automatic bias control circuit used in an optical transmitting apparatus of 10 Gbps. Therefore, it is possible to provide a high-speed transponder of 40 Gbps with a size, which meets an internationally standardized MSA (Multi Source Agreement) standard.

<<Optical Receiving Apparatus>>

An explanation of an optical receiving apparatus relating to the present invention is described.

<DQPSK Modulation Receiving Apparatus>

Figure 54:
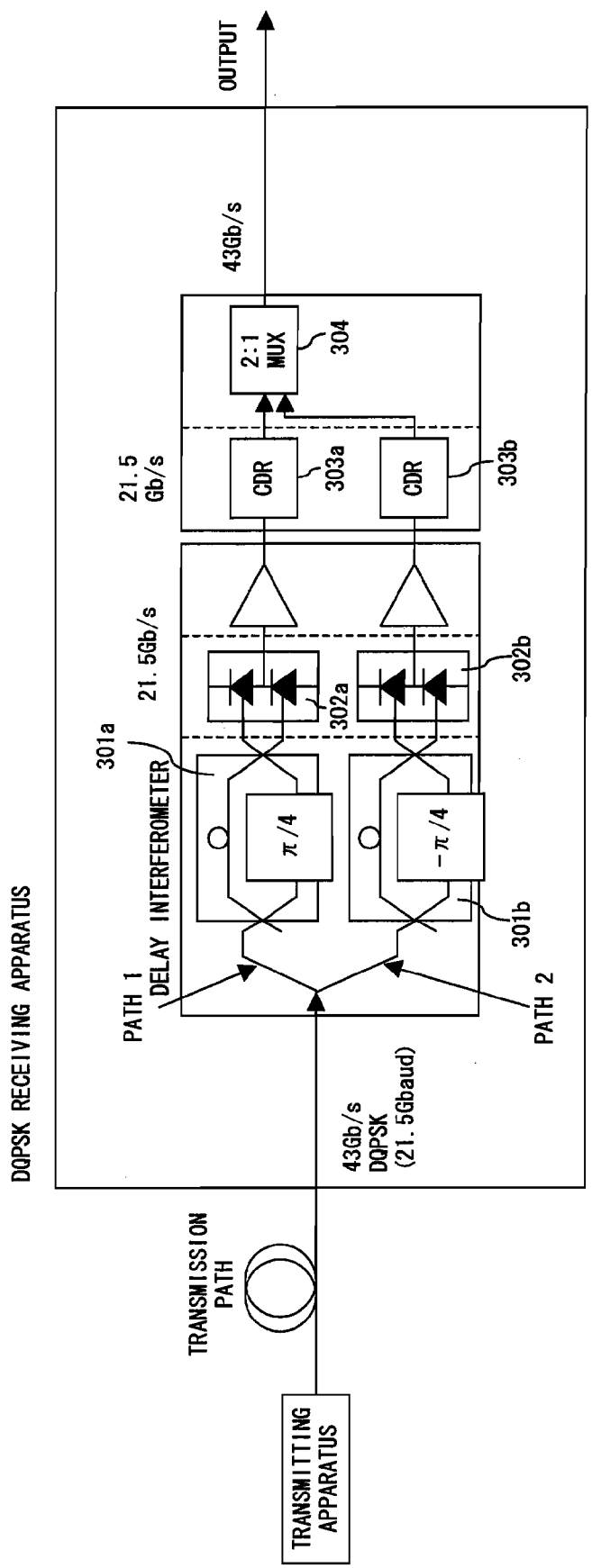
FIG. 54 is a diagram describing a configuration of an optical receiving apparatus of an embodiment of the present invention.

FIG. 54 is a diagram describing a configuration of an optical receiving apparatus of an embodiment of the present invention. The optical receiving apparatus receives a DQPSK-modulated optical signal, and demodulates the signal. In this example the speed of the data transmitted by the optical signal is 43 Gbps, for example, and the symbol rate is 21.5G.

In FIG. 54, the input optical signal is split, and guided to a first path and a second path. An interferometer 301 (301*a* and 301*b*) is provided on each of the first and the second path. The interferometer 301 is a Mach-Zehnder delay interferometer, for example. The interferometer 301 comprises a first arm and a second arm. Here, the first arm of the interferometer 301 delays the optical signal by 1 symbol time. However, the second arm of the interferometer 301*a* shifts the phase of the optical signal by "+$\pi/4$", and the second arm of the interferometer 301*b* shifts the phase of the optical signal by "−$\pi/4$". The amount of phase shift of each of the second arm is controlled by bias voltage.

A photodetector (O/E converter) circuit 302 (302*a* and 302*b*) converts an optical signal output from a corresponding interferometer 301 into an electrical signal. In this example, a pair of photodiodes (twin-photodiodes) constitutes each of the photodetector circuit 302. When a pair of optical signals output from the interferometer 301 is provided to a pair of photodiodes, the photodetector circuit 302 outputs a differential reception signal indicating the difference in the current generated by a pair of the photodiodes.

The photodetector circuit 302 outputs difference current equivalent to the difference in current generated by a pair of the photodiodes. A trans impedance amplifier (TIA) 305 converts the difference current into a voltage signal, and outputs as a differential reception signal. In the following explanation, however, unless otherwise instructed, the output signal of the O/E converter circuit 302 and the output signal of the TIA 305 are not distinguished. The word "photodetector circuit" may be used as a concept encompassing the photodetector circuit 302 and the TIA 305.

CDR (Clock Data Recovery) circuit 303 (303*a* and 303*b*) recovers a clock signal and a data signal from the output signal from the corresponding photodetector circuit 302. A multiplexer 304 multiplexes the output signals of the CDR circuits 303*a* and 303*b*. By so doing, demodulated data can be obtained. The configuration and the operation of this optical receiving apparatus are described in, for example, Japanese publication of translated version No. 2004-516743.

In order to recover the data from an optical signal received in the optical receiving apparatus with the above configuration, it is required that the amount of the phase shift of the second arm of each interferometer 301 should be adjusted to exactly "+$\pi/4$" or "−$\pi/4$". In the following description, a configuration and operation for adjusting the amount of the phase shift are explained.

First Embodiment

Figure 55:
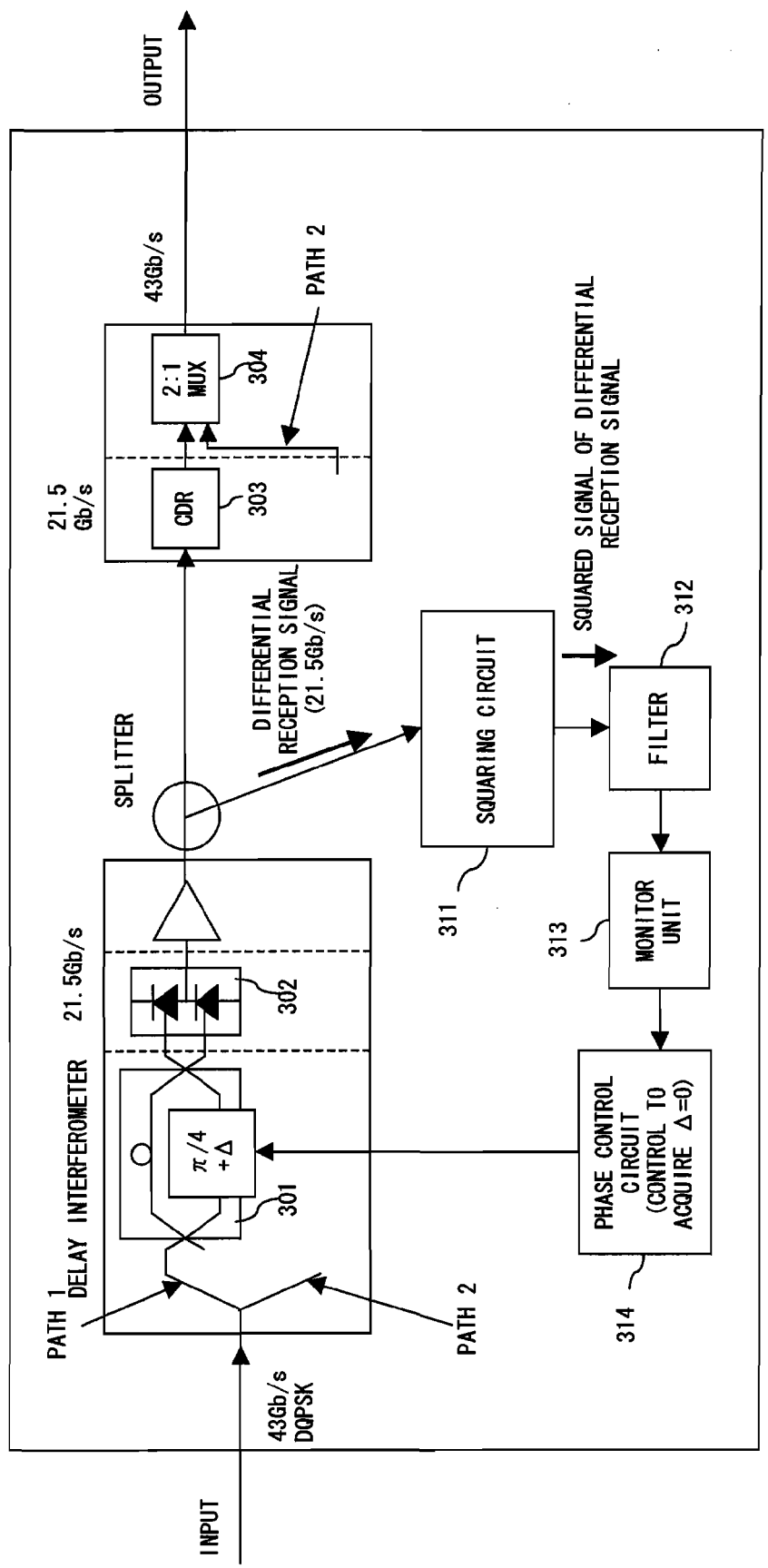
FIG. 55 is a diagram describing an optical receiving apparatus of the first embodiment.

FIG. 55 is a diagram describing an optical receiving apparatus of the first embodiment. The optical receiving apparatus in the first embodiment comprises a squaring circuit 311, a filter 312, a monitor unit 313 and a phase control circuit 314. The configuration on the second path is basically the same as the configuration on the first path, and thus the description of the second path is hereinafter omitted.

Figure 56A:
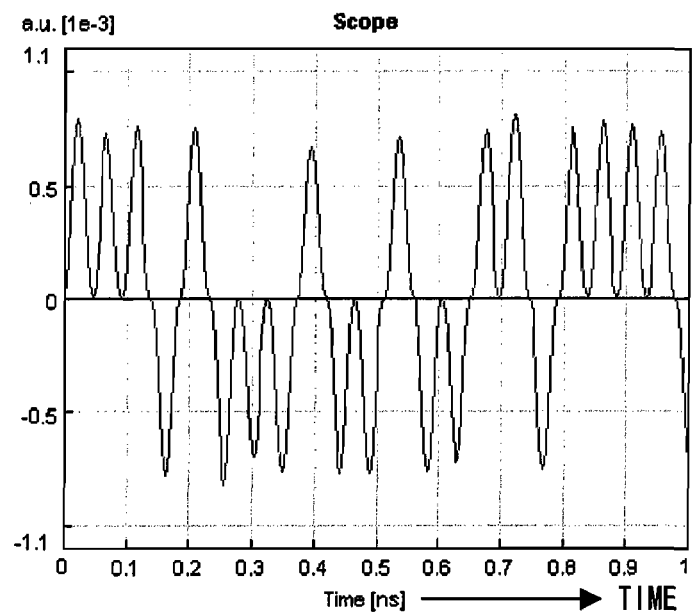
FIG. 56A and FIG. 56B are diagrams showing waveforms of the differential signal.
Figure 56B:
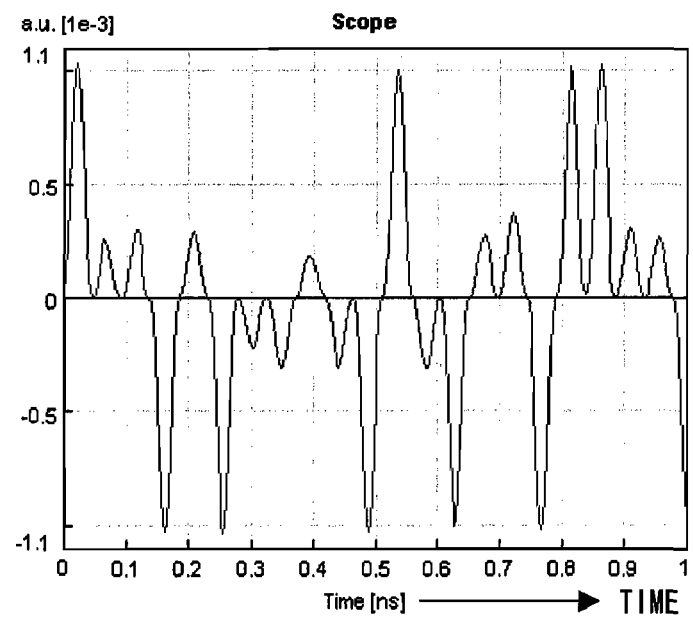

FIG. 56A and FIG. 56B are diagrams showing waveforms of the differential reception signal output from the photodetector circuit 302. FIG. 57A and FIG. 57B are diagrams showing an eye diagram (eye pattern) of the differential reception signal. If the amount of the phase shift on the second arm is exactly the "$\pi/4$", the differential reception signal shows stable waveform as in FIG. 56A, and the eye diagram with wide eye aperture, as shown in FIG. 57A, can be acquired. However, when the amount of the phase shift deviates from "π/4", the waveform of the differential reception signal becomes unstable as shown in FIG. 56B, and the eye aperture of the eye diagram is small as indicated in FIG. 57B. FIG. 56B and FIG. 57B, incidentally, are simulation results when the amount of the phase shift is "π/4+Δ (Δ=30 degrees)".

The squaring circuit 311 squares the differential reception signal output from the photodetector circuit 302. The squaring circuit 311 is not limited in particular, but can be realized by an analog multiplier circuit including a Gilbert cell, for example. In such a case, by multiplying the differential reception signals one another using the analog multiplier circuit, squared signal of the differential reception signal can be acquired.

FIG. 58A and FIG. 58B are diagrams indicating the waveform of the squared signal output from the squaring circuit 311. FIG. 59A and FIG. 59B are diagrams showing spectrum of the squared signal. When the amount of the phase shift in the second arm is exactly "π/4", the squared signal has a waveform in which a substantially constant value appears within a symbol period as shown in FIG. 58A. Thus, in this case, as shown in FIG. 59A, only a symbol frequency component (21.5 GHz in this example) and its higher harmonic components in the spectrum of the squared signal appear. On the other hand, when the amount of the phase shift deviates from "π/4", the squared signal has waveforms in which various values appear in a random period, as shown in FIG. 58B. Consequently, in such a case, the spectrum of the squared signal contains various frequency components, as shown in FIG. 59B.

The filter 312 transmits at least a part of continuous frequency components except for the frequencies, which are integral multiples of the symbol frequencies. In other words, the filter 312 is a low-pass filter (or a bandpass filter) for transmitting frequencies lower than the symbol frequency (21.5 GHz in this example), for example, and it filters the squared signal output from the squaring circuit 311. The monitor unit 313 monitors the power of output signal from the filter 312. The phase control circuit 314 controls the amount of the phase shift of the second arm of the interferometer 301, according to the monitoring result of the monitor unit 313. The amount of the phase shift is controlled by bias voltage, for example, provided to the second arm.

In the above configuration, when deviation of the amount of the phase shift in the second arm is zero (i.e. the amount of the phase shift by the phase shift unit is exactly "π/4"), the squared signal contains the symbol frequency component and its higher harmonic components alone. In such a case, the power detected by the monitor unit 313 is close to zero. Meanwhile, when deviation of the amount of the phase shift occurs, the squared signal contains various frequency components (especially lower frequency components than the symbol rate). In this case, the power detected by the monitor unit 313 depends on the deviation value of the phase shift. Thus, when the feedback control is performed so as to minimize the power detected by the monitor unit 313, the amount of the phase shift should be kept at "π/4".

Figure 60:
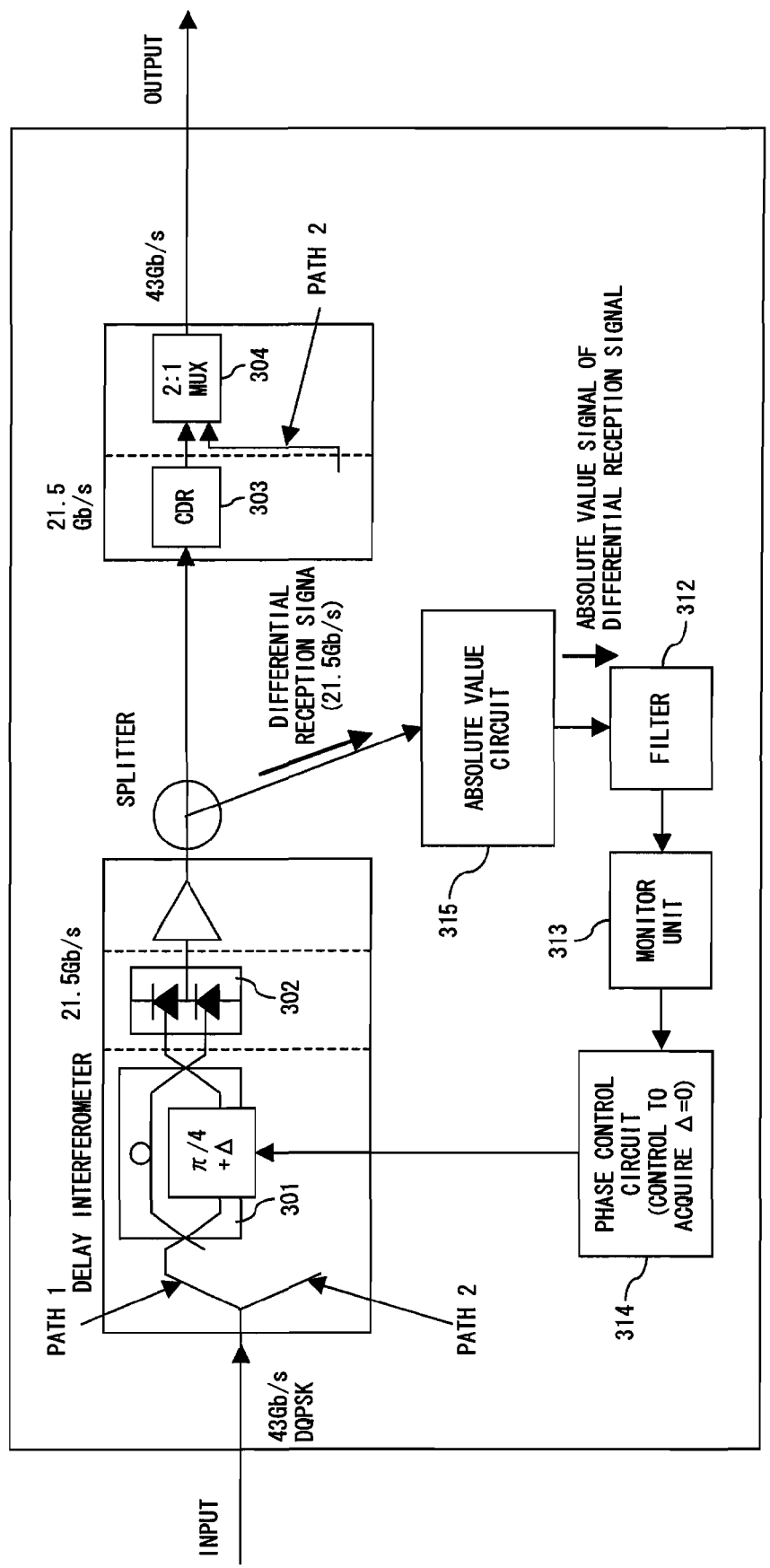
FIG. 60 is a diagram showing a modified example of an optical receiving apparatus shown in FIG. 55.

FIG. 60 is a diagram showing a modified example of the optical receiving apparatus shown in FIG. 55. The configuration of the optical receiving apparatus described in FIG. 60 is basically the same as the optical receiving apparatus shown in FIG. 55. However, the optical receiving apparatus comprises an absolute value circuit 315 instead of the squaring circuit 311.

The absolute value circuit 315 performs full-wave rectification on the differential reception signal output from the photodetector circuit 302. The absolute value circuit 315 is not limited in particular, but, for example, is realized by a full-wave rectification circuit comprising a plurality of diodes or a full-wave rectification circuit formed using an operational amplifier.

The Filter 312, the monitor unit 313, the phase control circuit 314 are basically the same as ones in the optical receiving circuit described in FIG. 55. In this optical receiving apparatus also, when the feedback control is performed so as to minimize the power detected by the monitor unit 313, the amount of the phase shift should be kept at "π/4".

Second Embodiment

Figure 61:
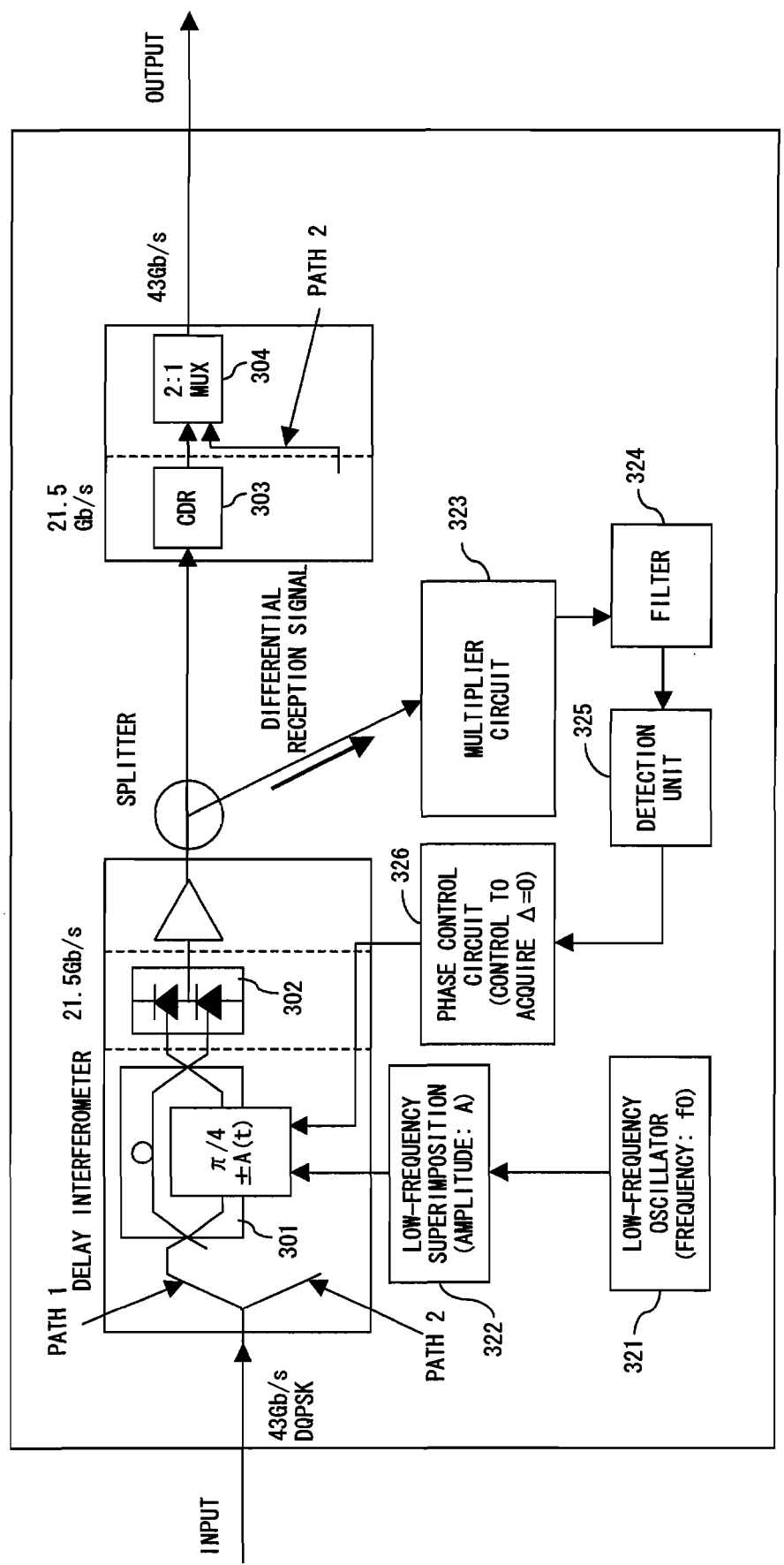
FIG. 61 is a diagram describing a configuration of the optical receiving apparatus of the second embodiment.

FIG. 61 is a diagram describing a configuration of the optical receiving apparatus of the second embodiment. The optical receiving apparatus of the second embodiment has a configuration for adjusting the amount of the phase shift using a low-frequency signal.

In FIG. 61, a low-frequency oscillator 321 generates a low-frequency signal, for example, in a frequency range between several kHz and several MHz. In the following description, the frequency of the low-frequency signal is defined as "$f_0$". The low-frequency signal is provided to the second arm of the interferometer 301 via a low-frequency superimposing circuit 322. For that reason, the amount of the phase shift in the second arm changes periodically in response to the voltage of the low-frequency signal. Therefore, the optical signal output from the interferometer 301 or the differential reception signal output from the photodetector circuit 302 comprises the $f_0$ component.

The multiplier circuit 323 multiplies the differential reception signals output from the photodetector circuit 302 one another as in the case of the above squaring circuit 311. The filter 324 is a low-pass filter, which transmits the frequency $2f_0$, and filters the output signal from the multiplier circuit 323. The detection unit 325 detects the $f_0$ component and/or the $2f_0$ component from the output of the filter 324 by synchronous detection using the low-frequency signal. The phase control circuit 326 controls the amount of the phase shift of the second arm of the interferometer 301 according to the detection result of the detection unit 325. The amount of the phase shift is controlled by bias voltage, for example, provided to the second arm. A monitor unit for monitoring the amplitude or the power of the output signal of the multiplier 323 is provided between the multiplier 323 and the filter 324, however the monitor unit is omitted in FIG. 61.

FIG. 62A through FIG. 62C explain the principle of operation of the optical receiving apparatus of the second embodiment. FIG. 62A shows a relation between the amount of the phase shift in the second arm and the optical power (relative value) of the output of the interferometer 301. In this figure, the horizontal axis indicates deviation from the "π/4". When the amount of the phase shift controlled by the phase shift circuit 326 is exactly "π/4", the amount of the phase shift, while the low-frequency signal is superimposed, periodically changes around the point where the optical power has its minimum value. Consequently, in such a case, the $2f_0$ component is generated as shown in FIG. 62B. On the other hand, when the amount of the phase shift deviates from "π/4", the amount of the phase shift, while the low-frequency signal is superimposed, periodically changes in a region away from the point where the optical power has its minimum value. Thus, in such a case, the $2f_0$ component is not generated, and the $f_0$ component alone is acquired as shown in FIG. 62C. At that time, the phase of the $f_0$ component signal when the amount of phase shift deviates in a positive side is inverted from the phase of the $f_0$ component signal when the amount of phase shift deviates in a negative side.

The optical receiving apparatus of the second embodiment optimizes the amount of the phase shift in the second arm using the above principle of operation. In other words, the phase control circuit 326 performs the feedback control so that the power of the $2f_0$ component detected by the detection unit 325 reaches maximum. Alternatively, the phase control circuit 326 performs the feedback control so that the power of the $f_0$ component detected by the detection unit 325 is its minimum. By so doing, the amount of the phase shift in the second arm is kept at "π/4". At that time, by monitoring the phase of the $f_0$ component signal, determination of whether to increase or to decrease the amount of phase shift can be facilitated.

Third Embodiment

FIG. 63 is a diagram describing a configuration of the optical receiving apparatus of the third embodiment. The optical receiving apparatus of the third embodiment adjusts the amount of the phase shift by using statistical processing on the received signal.

In FIG. 63, a high-speed sampling circuit 331 samples the differential reception signal output from the photodetector circuit 302. The sampling timing is determined by a clock signal generated by the CDR circuit 303 and a trigger signal from a sampling signal processing circuit 332. Specifically, the sampling is performed, for example, in the symbol period or in a period, which is integral multiple of the symbol period.

The sampling signal processing circuit 332 calculates occurrence frequency of each sampling value acquired from the sampling. The phase control circuit 333 controls the amount of the phase shift of the second arm of the interferometer 301 in accordance with the occurrence frequency information acquired by the sampling signal processing circuit 332. The amount of the phase shift is controlled by, for example, bias voltage provided to the second arm.

FIG. 64A and FIG. 64B shows an example of sampling operation by the high-speed sampling circuit 331. In this example, the sampling is performed in a period three times longer than the symbol period. In a case that the amount of the phase shift is exactly "π/4", the signal voltage value acquired by the sampling is only one positive value (+0.7) and one negative value (−0.7), as shown in FIG. 64A. On the contrary, in a case that the amount of the phase shift deviates from "π/4", four or more signal voltage values are acquired by the sampling, as shown in FIG. 64B. In this example, four values (+1.1, +0.3, −0.3, −1.1) are acquired. FIG. 64C and FIG. 64D are examples of the processing result by the sampling signal processing circuit 332, and are corresponding to FIG. 64A and FIG. 64B, respectively.

The optical receiving apparatus of the third embodiment optimizes the amount of the phase shift in the second arm using the above principle of the operation. In other words, the phase control circuit 333 performs the feedback control so as to reduce the fluctuation of the signal voltage values (for example, to keep the signal voltage value at a particular two values) By so doing, the amount of the phase shift of the second arm is kept at "π/4".

<DPSK (DBPSK) Receiving Apparatus>

Figure 65:
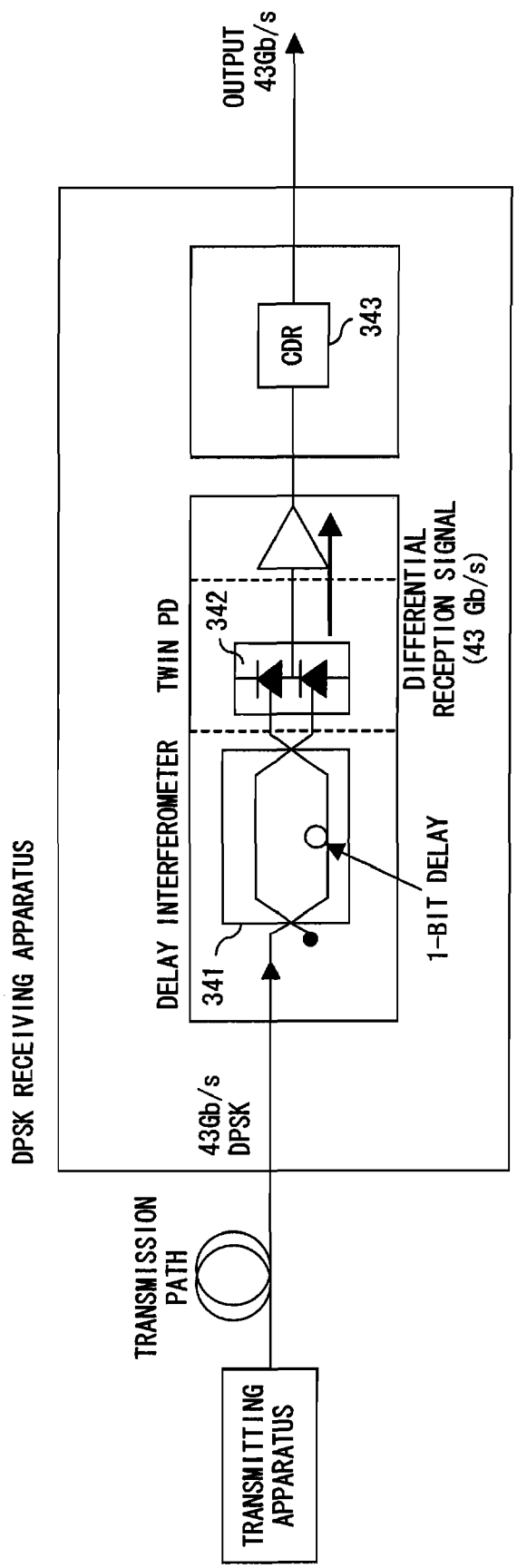
FIG. 65 is a diagram describing a configuration of the optical receiving apparatus for receiving the DPSK modulated signal.

FIG. 65 is a diagram describing a configuration of the optical receiving apparatus for receiving the DPSK modulated signal. In FIG. 65, the input optical signal is guided to an interferometer 341. The interferometer 341 is, for example, a Mach-Zehnder delay interferometer, and comprises a first arm and a second arm. The second arm of the interferometer 341 provides 1-bit delay to the optical signal. The delay time in the second arm is the difference between the time period in which the optical signal is transmitted via the first arm and the time period in which the optical signal is transmitted via the second arm, and is controlled by bias voltage.

A photodetector circuit 342 converts the optical signal output from the interferometer 341 into an electrical signal. The photodetector circuit 342 is the same as the photodetector circuit 302 shown in FIG. 54, and outputs a differential reception signal corresponding to the optical signal. Here, bit rate of the differential reception signal is 43 Gbps. The CDR circuit 343 recovers and outputs the clock signal and the data signal from the output signal of the photodetector circuit 342.

In order to regenerate data from the optical signal received in the optical receiving apparatus of the above configuration, it is required that the delay time of the second arm of the interferometer 341 is adjusted exactly to "1 bit". In other words, if the delay time is adjusted exactly to "1 bit", then the eye diagram (eye pattern) with wide eye aperture shown in FIG. 66A can be acquired; however, if the delay time deviates from "1 bit", the eye aperture of the eye diagram becomes small as shown in FIG. 66B. When the eye aperture of the eye diagram is small, the possibility of the occurrence of bit error increases. In the following description, as the fourth and the fifth embodiments, configuration and operation for adjusting the delay time in a DBPSK optical receiving apparatus are explained.

Fourth Embodiment

Figure 67:
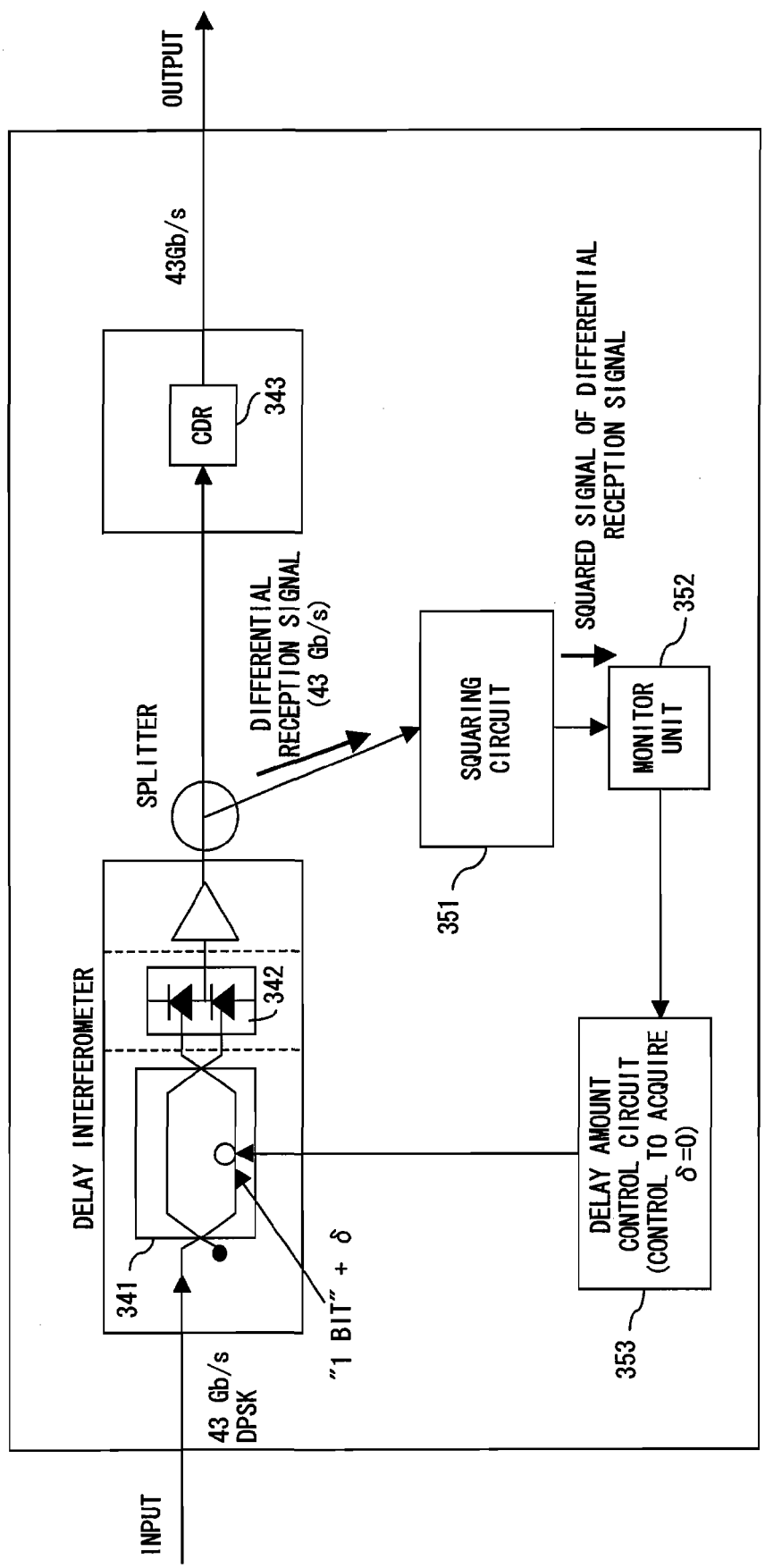
FIG. 67 is a diagram describing a configuration of the optical receiving apparatus of the fourth embodiment.

FIG. 67 is a diagram describing a configuration of the optical receiving apparatus of the fourth embodiment. In FIG. 67, a squaring circuit 351 generates a squared signal by multiplying the differential reception signals output from the photodetector circuit 342 by one another. The squaring circuit 351 is basically the same as the squaring circuit 311 in the first embodiment. A monitor unit 352 acquires an average of the squared signals in time domain by integration. A delay control circuit 353 controls the delay time of the second arm of the interferometer 341 in accordance with the average value acquired by the monitor unit 352. The delay time is controlled by, for example, bias voltage provided to the second arm.

FIG. 68A through FIG. 68C show the waveform of the differential reception signal. FIG. 69A through FIG. 69C show waveform of the squared signals acquired by squaring the differential reception signal. When the delay time is adjusted properly, as shown in FIG. 68A and FIG. 69A, the amplitudes of the differential reception signal and the squared signal becomes large. In other words, in such a case, the average power of the squared signal becomes large. On the other hand, when deviation in delay time occurs, as shown in FIG. 68B, FIG. 68C, FIG. 69B and FIG. 69C, the amplitudes of the differential reception signal and the squared signal becomes small. In such a case, then, the average power of the squared signal is also small.

Figure 70:
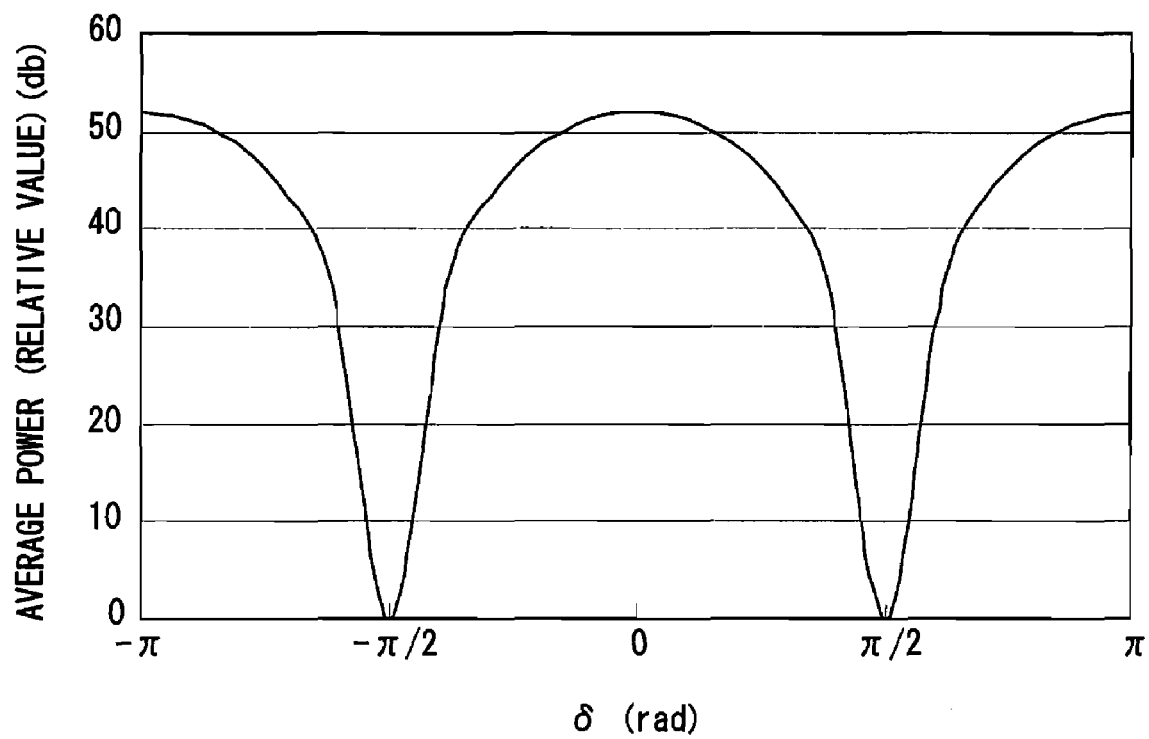
FIG. 70 describes a relation between the deviation amount of the delay time and the average power of the squared signal.

FIG. 70 describes a relation between the amount of deviation of the delay time and the average power of the squared signal. As shown in FIG. 70, when "amount of deviation δ" of the delay time is zero, the average power of the squared signal reaches its maximum. As the "amount of deviation δ" becomes large, the average power of the squared signal becomes small. However, the average power of the squared signal changes periodically as "amount of deviation δ" changes.

The optical receiving apparatus of the fourth embodiment optimizes the delay time in the second arm using the above principle of operation. In other words, the delay control circuit 353 performs the feedback control so that the average power of the squared signal acquired by the monitor unit 352 reaches its maximum. By so doing, the delay time in the second arm is kept at "1 bit".

Figure 71:
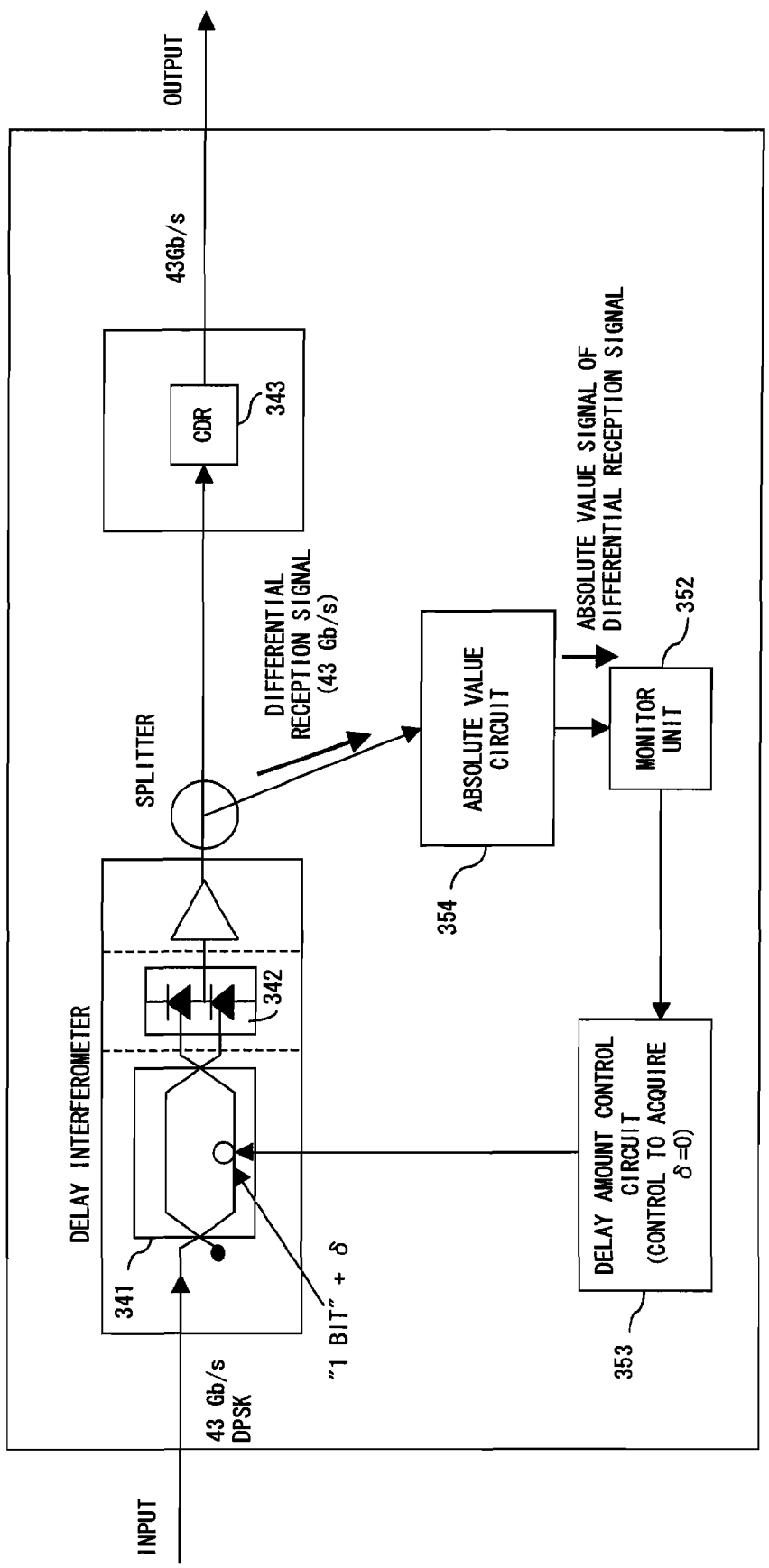
FIG. 71 is a diagram describing a modified example of the optical receiving apparatus shown in FIG. 67.

FIG. 71 is a diagram describing a modified example of the optical receiving apparatus shown in FIG. 67. The configuration of the optical receiving apparatus in FIG. 71 is basically the same as that of the optical receiving apparatus in FIG. 67. However, this optical receiving apparatus comprises an absolute value circuit 354 instead of the squaring circuit 351. The operation and the configuration comprising the absolute value circuit 354 instead of the squared circuit 351 are basically the same as the explanation of the first embodiment.

Fifth Embodiment

Figure 72:
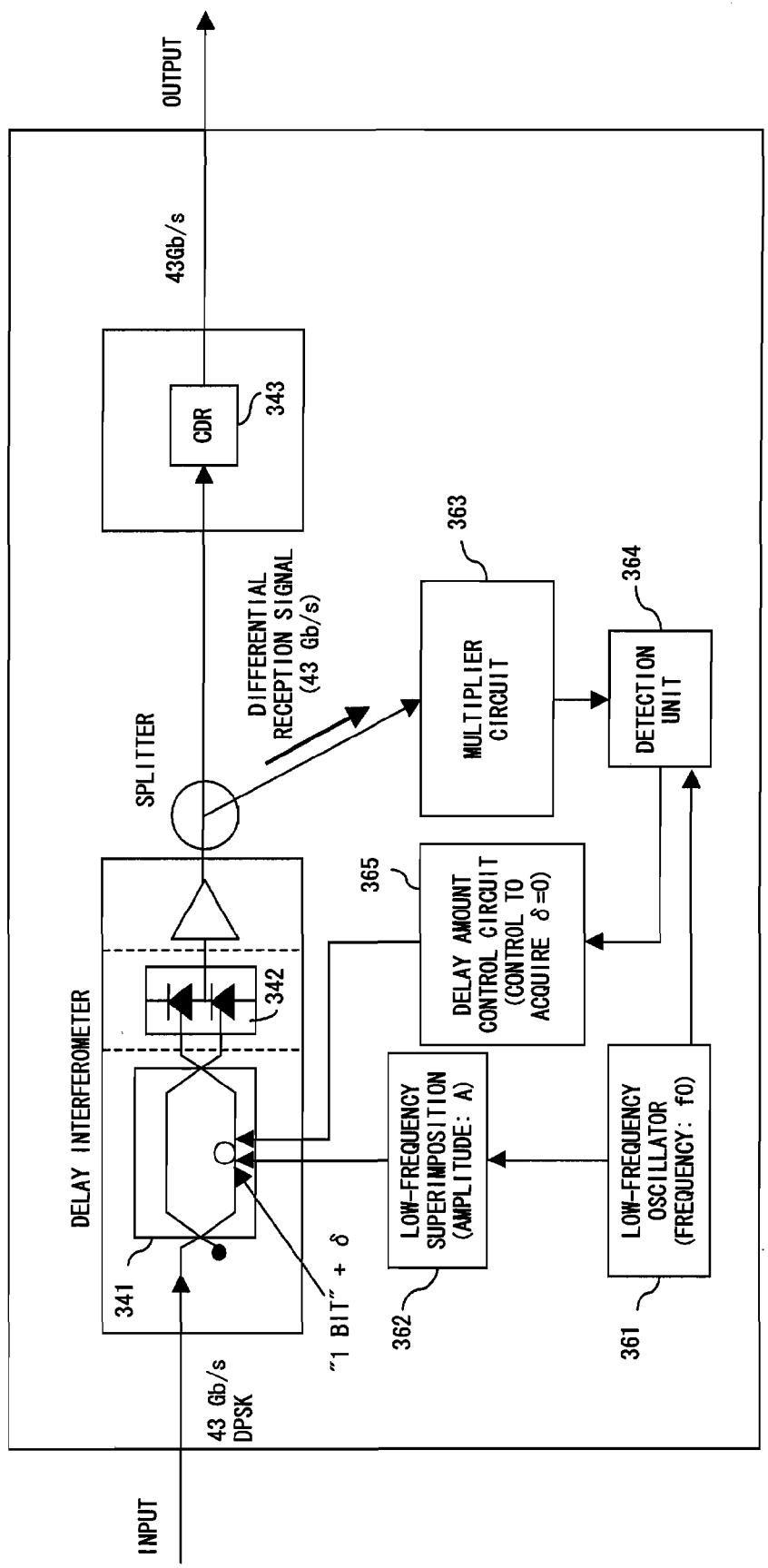
FIG. 72 is a diagram describing a configuration of the optical receiving apparatus of the fifth embodiment.

FIG. 72 is a diagram describing a configuration of the optical receiving apparatus of the fifth embodiment. In FIG. 72, operation of a low-frequency oscillator 361, a low-frequency superimposing circuit 362, a multiplier circuit 363, a detection unit 364 is basically the same as those in the second embodiment. In other words, the low-frequency signal $f_0$ is provided to the second arm of the interferometer 341, and the detection unit 364 detects the $f_0$ component and/or the $2f_0$ component. The delay control circuit 365 controls the delay time of the second arm of the interferometer 341 in accordance with the detection result of the detection unit 364.

FIG. 73A through FIG. 73C explain the principle of operation of the optical receiving apparatus of the fifth embodiment. FIG. 73A shows a relation between the delay time in the second arm and the optical power (relative value) of the output of the interferometer 341. In this figure, the horizontal axis indicates deviation from the "1 bit". In a case that the delay time controlled by the delay control circuit 365 is exactly "1 bit", the $2f_0$ component is generated as shown in FIG. 73B. On the other hand, in a case that the delay time deviates from "1 bit", the $2f_0$ component is not generated; however, the $f_0$ component alone is acquired as shown in FIG. 73C.

The optical receiving apparatus of the fifth embodiment optimizes the delay time in the second arm using the above principle of operation. In other words, the delay control circuit 365 performs the feedback control so that the power of the $2f_0$ component detected by the detection unit 364 can reach its maximum. Alternatively, the delay control circuit performs the feedback control so that the power of the $f_0$ component detected by the detection unit 364 becomes its minimum. By so doing, the delay time in the second arm is kept at "1 bit".

Sixth Embodiment

Figure 74:
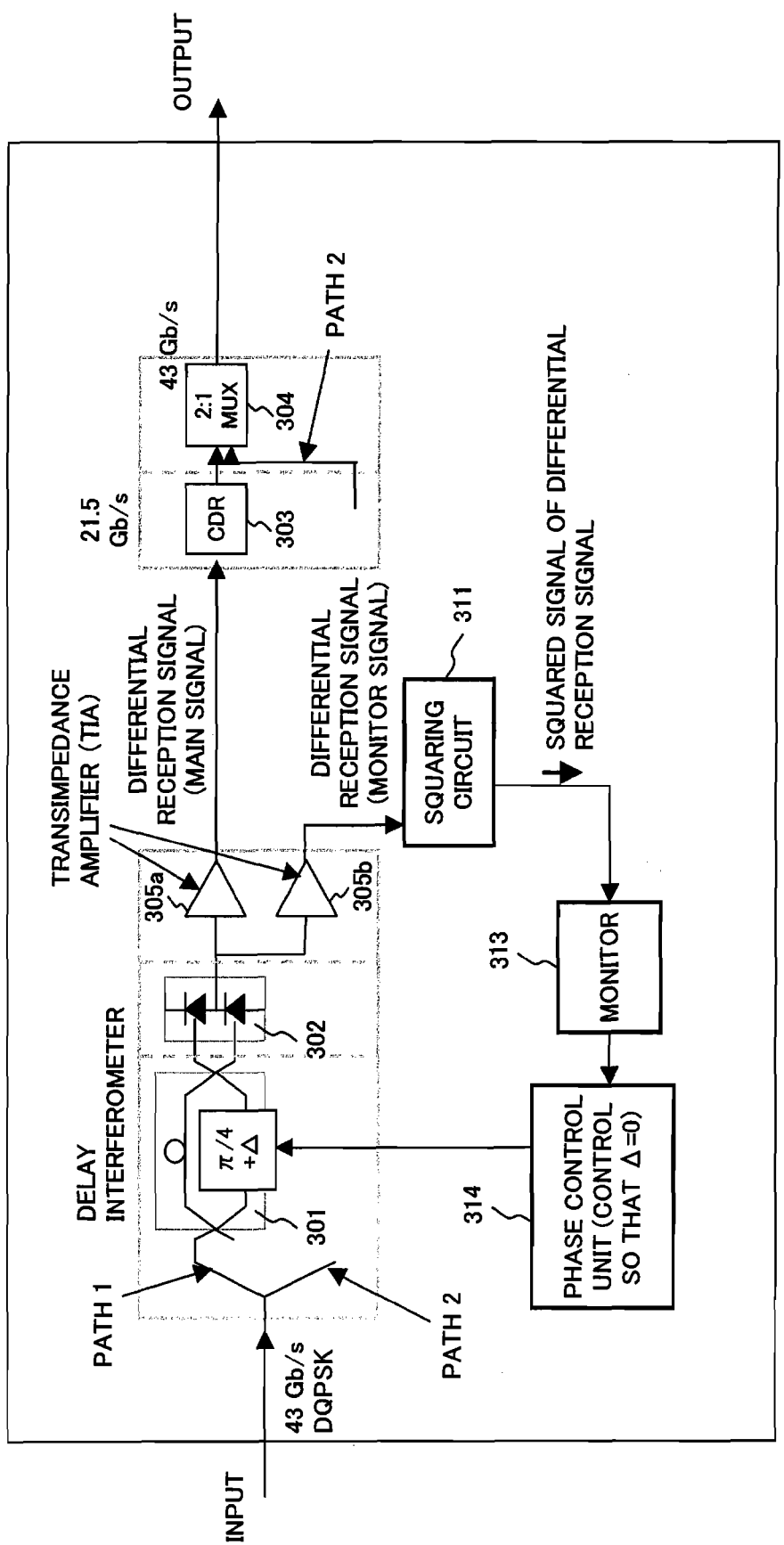
FIG. 74 is a diagram describing a configuration of the optical receiving apparatus of the sixth embodiment.

FIG. 74 is a diagram describing a configuration of the optical receiving apparatus of the sixth embodiment. In the configuration shown in FIG. 55 etc., the output signal of the TIA 305 is guided to the squaring circuit 311. On the other hand, in the sixth embodiment, the TIA 305a and the TIA 305b are connected to the later stage of the photodetector circuit 302. In this example, the output current of the photodetector circuit 302 is split at a prescribed ratio, and provided to the TIA 305a and the TIA 305b. The output signal of the TIA 305a is transmitted to the CDR circuit 303 as a main signal. On the other hand, the output signal of the TIA 305b is transmitted to the squaring circuit 311 as a monitor signal. A method for controlling the amount of phase shift of the phase shift unit of the delay interferometer 301 is the same as in the configuration shown in FIG. 55.

As stated above, the optical receiving apparatus of the present invention may control the phase shift unit by having a current signal split in the former stage of the TIA 305 as a monitor signal. This configuration is applicable to the first through the fifth embodiments.

Seventh Embodiment

FIG. 75A and FIG. 75B are diagrams showing a waveform of the output current of the photodetector circuit. FIG. 75A and FIG. 75B show results of a simulation of an output current waveform of a pair of photodiodes PD1 and PD2 constituting the photodetector circuit 302 shown in FIG. 55.

In FIG. 55, the delay interferometer 301 outputs a pair of complementary optical signals. For that reason, waveforms of the output current of a pair of the photodiodes PD1 and PD2 are inverted with respect to each other, as shown in FIG. 75A and FIG. 75B. In the following description, therefore, one of the photodiodes (hereinafter referred to as the photodiode PD1) is examined.

The output current of the photodiode PD1 should have either one of two values (approximately 0.9 mA or approximately 0.15 mA) as long as the amount of phase shift of the phase shift unit of the delay interferometer 301 is adjusted exactly to "π/4". However, when the amount of phase shift becomes "π/4+22.5 degrees", the output current of the photodiode PD1 becomes any one of four values (approximately 1.0 mA, approximately 0.75 mA, approximately 0.35 mA, approximately 0.05 mA). In addition, the amount of phase shift becomes "π/4+45 degrees", the output current of the photodiode PD1 becomes any one of three values (approximately 1.1 mA, approximately 0.5 mA, zero).

Figure 76:
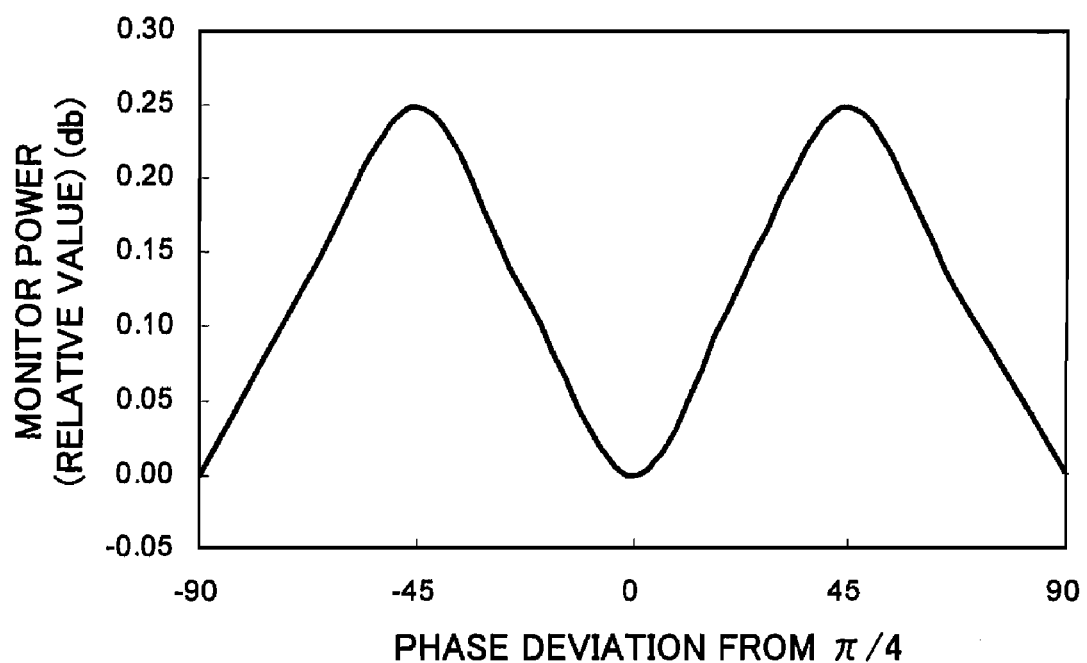
FIG. 76 is a diagram showing squared time average power of the output current of the photodetector.

FIG. 76 is a diagram showing a time average of the squared output current of the photodiode PD1. This graph is obtained from a simulation. The x-axis is "an amount of deviation" based on a condition where the amount of phase shift of the phase shift unit 12 of the delay interferometer 301 is "π/4".

As shown in FIG. 76, the time average of the squared output current of the photodiode PD1 is minimized, when the amount of phase shift of the phase shift unit of the delay interferometer 301 is "π/4". Therefore, by performing a feedback control so as to minimize the time average power, the amount of phase shift of the phase shift unit of the delay interferometer 301 converges on the optimal value π/4.

Figure 77:
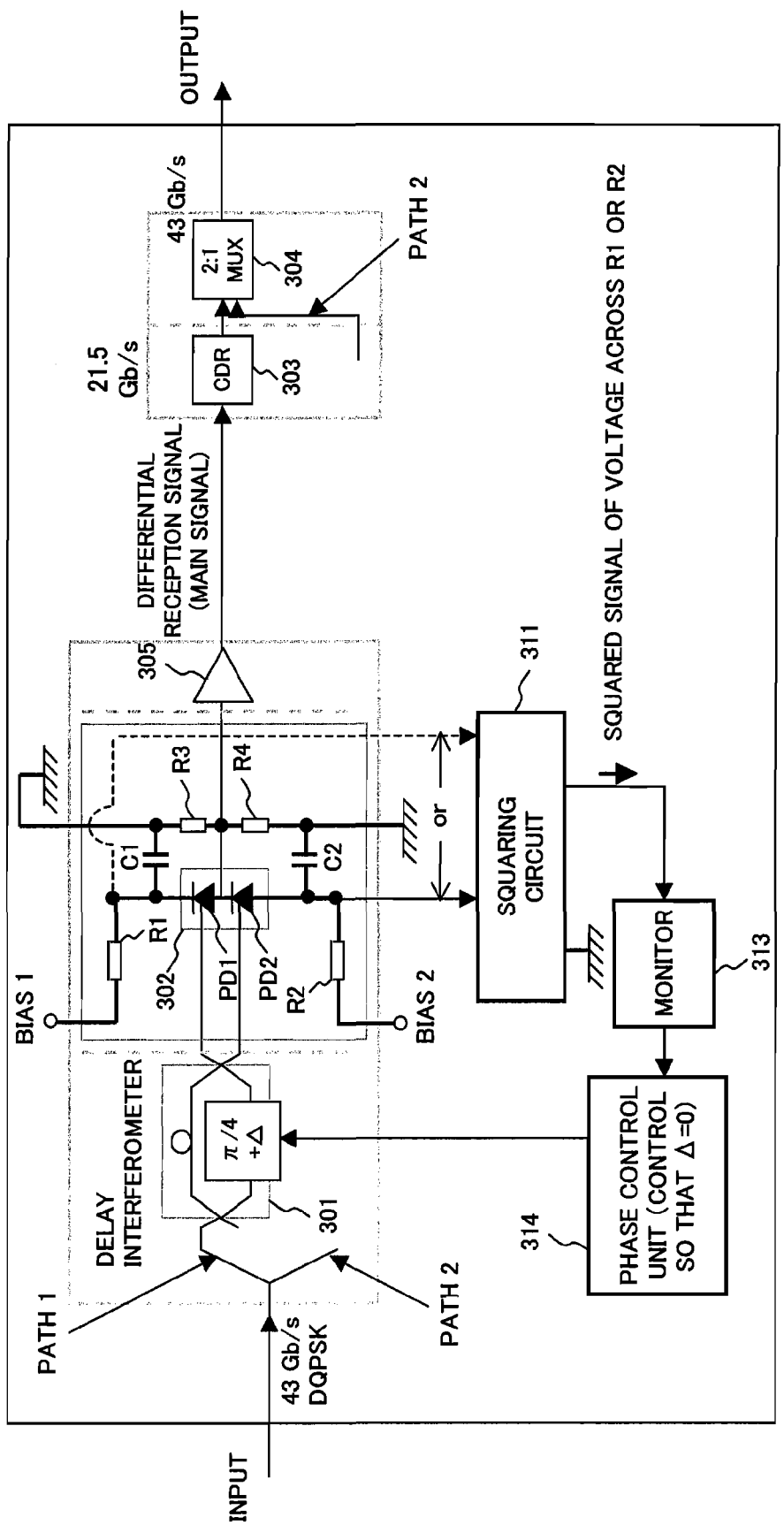
FIG. 77 is a diagram showing a configuration of the optical receiving apparatus of the seventh embodiment.

FIG. 77 is a diagram showing a configuration of the optical receiving apparatus of the seventh embodiment. A basic configuration of the optical receiving apparatus of the seventh embodiment is the same as that of the first embodiment shown in FIG. 55. However, in the seventh embodiment, a feedback control for adjusting the amount of phase shift is performed using the voltage across the load resistance connected to the photodiodes PD1 and PD2 constituting the photodetector circuit 302.

In FIG. 77, a bias 1, which is a prescribed DC voltage, is provided via a load resistance R1 to the photodiode PD1. In the same manner, a bias 2, which is a prescribed DC voltage, is provided via a load resistance R2 to the photodiode PD2. Then, each of the current generated by the photodiodes PD1 and PD2 can be detected by monitoring the voltage across the load resistances R1 and R2, respectively.

The waveforms of the currents generated by the photodiodes PD1 and PD2 have waveforms, which have phases inverted with respect to each other, as shown in FIG. 75A and FIG. 75B. Consequently, the time average value of the squared current generated by the photodiodes PD1 and PD2 becomes the same. As a result, the feedback control system of the seventh embodiment employs the squared signal of the voltage across either one of the load resistance R1 or the load resistance R2. In other words, the amount of phase shift of the phase shift unit of the delay interferometer 301 is adjusted so that the squared signal of the voltage across either one of the load resistance R1 or the load resistance R2 is minimized. By so doing, the amount of phase shift converges on the optimal value "π/4".

In the seventh embodiment, an absolute value circuit 315 may be employed instead of the squaring circuit 311. The feedback control system may employ both of the voltages across the load resistances R1 and R2. Additionally, DC-cut capacitors C1 and C2 for removing the DC component from the current flowing via the load resistances R1 and R2 may be comprised. Further, resistances R3 and R4 for grounding a signal line between the photodetector circuit 302 and the TIA 305 may also be comprised. Moreover, the configuration of the seventh embodiment is applicable to a DBPSK optical receiving apparatus.

Eighth Embodiment

FIG. 78 is a diagram describing a configuration of the optical receiving apparatus of the eighth embodiment. A basic configuration of the optical receiving apparatus of the eighth embodiment is the same as that of the second embodiment shown in FIG. 61. However, in the eighth embodiment, a feedback control is performed employing the voltage across the load resistance R1 or R2. In other words, when the $f_0$ component is used, the squared signal of the voltage across the load resistance R1 or R2 is monitored, and the amount of phase shift is adjusted so as to minimize the $f_0$ component included in the squared signal. When the $2f_0$ component is used, the squared signal of the voltage across the load resistance R1 or R2 is monitored, and the amount of phase shift is adjusted so as to maximize the $2f_0$ component included in the squared signal.

The principle of the method for adjusting the amount of phase shift using the $f_0$ component or the $2f_0$ component is the same as explained with reference to FIG. 62A through FIG. 62C. The monitor unit 327, though it is omitted in FIG. 61, monitors the amplitude or the power of the output signal of the squaring circuit 311.

Figure 79:
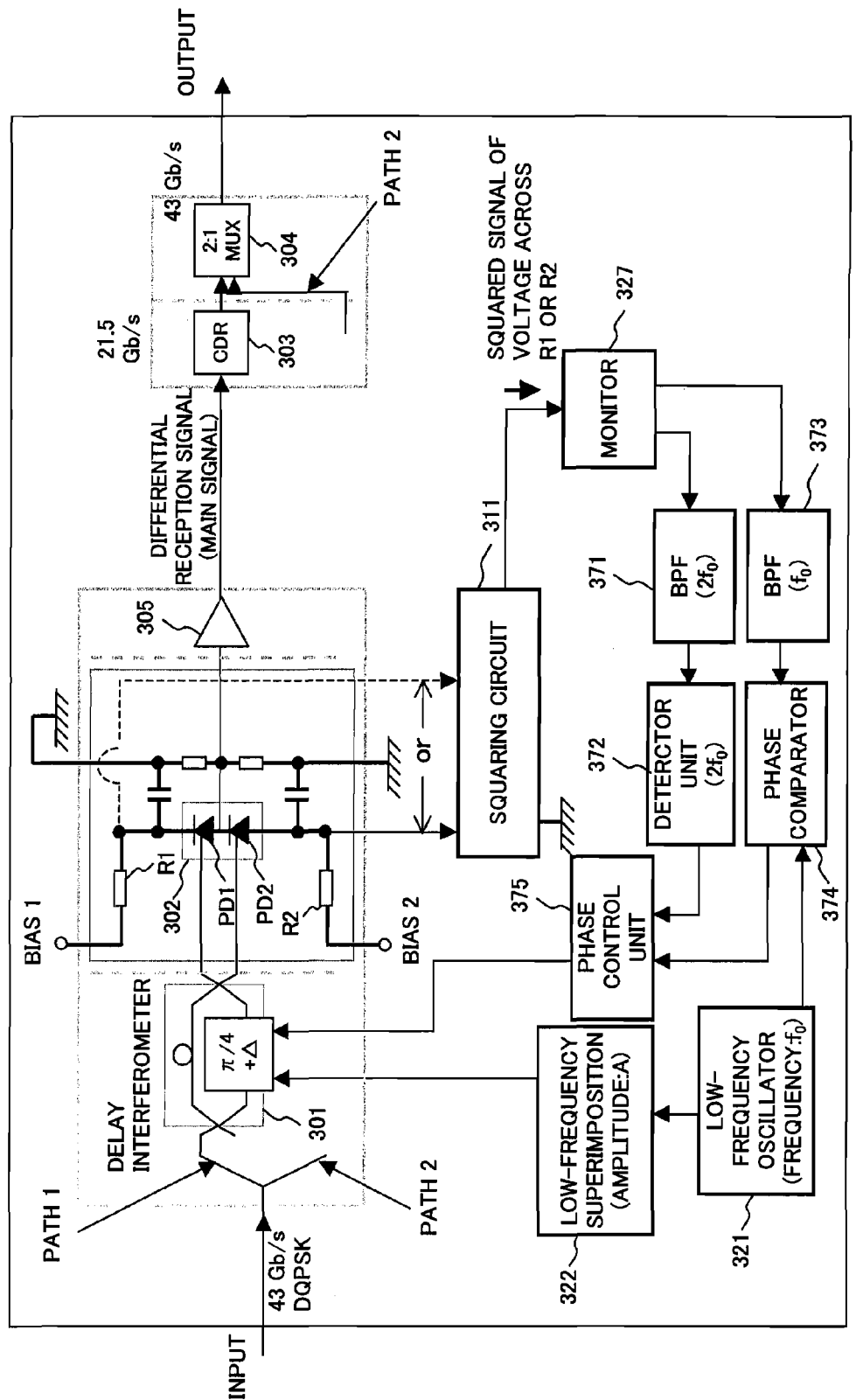
FIG. 79 is a variation of the optical receiving apparatus of the eighth embodiment.

FIG. 79 is a variation of the optical receiving apparatus of the eighth embodiment. In the optical receiving apparatus shown in FIG. 79, as the optical receiving apparatus shown in FIG. 78, the feedback control is performed using the voltage across the load resistance R1 or R2. However, in the feedback control system of the optical receiving apparatus shown in FIG. 79, both of the $f_0$ component and the $2f_0$ component are used.

As explained with reference to FIG. 62A through FIG. 62C, the $2f_0$ component obtained by the monitor unit 327 is maximized when the amount of phase shift is "π/4". Therefore, a detection unit 372 obtains the amplitude or the power of the $2f_0$ component signal obtained by the filter 371. The phase control unit 375 adjusts the amount of phase shift of the phase shift unit of the delay interferometer 301 so that the $2f_0$ component obtained by the detection unit 372 becomes maximum. On the other hand, the phase of the $f_0$ component signal obtained by the monitor unit 327 when the amount of phase shift of the phase shift unit of the delay interferometer 301 deviates in a positive side is inversed from the phase of the $f_0$ component signal obtained by the monitor unit 327 when the amount of phase shift of the phase shift unit deviates in a negative side. Hence, a phase comparator 374 detects the phase of the $f_0$ component signal obtained by a filter 373 by synchronous detection. A phase control unit 375 identifies whether the amount of phase shift should be increased or decreased with reference to the phase of the $f_0$ component signal in adjusting the amount of phase shift using the $2f_0$ component.

In the eighth embodiment, the DC-cut capacitors C1 and C2 and the resistances R3 and R4 may also be employed. The configuration of the eighth embodiment is also applicable to a DBPSK optical receiving apparatus.

Ninth Embodiment

Figure 80:
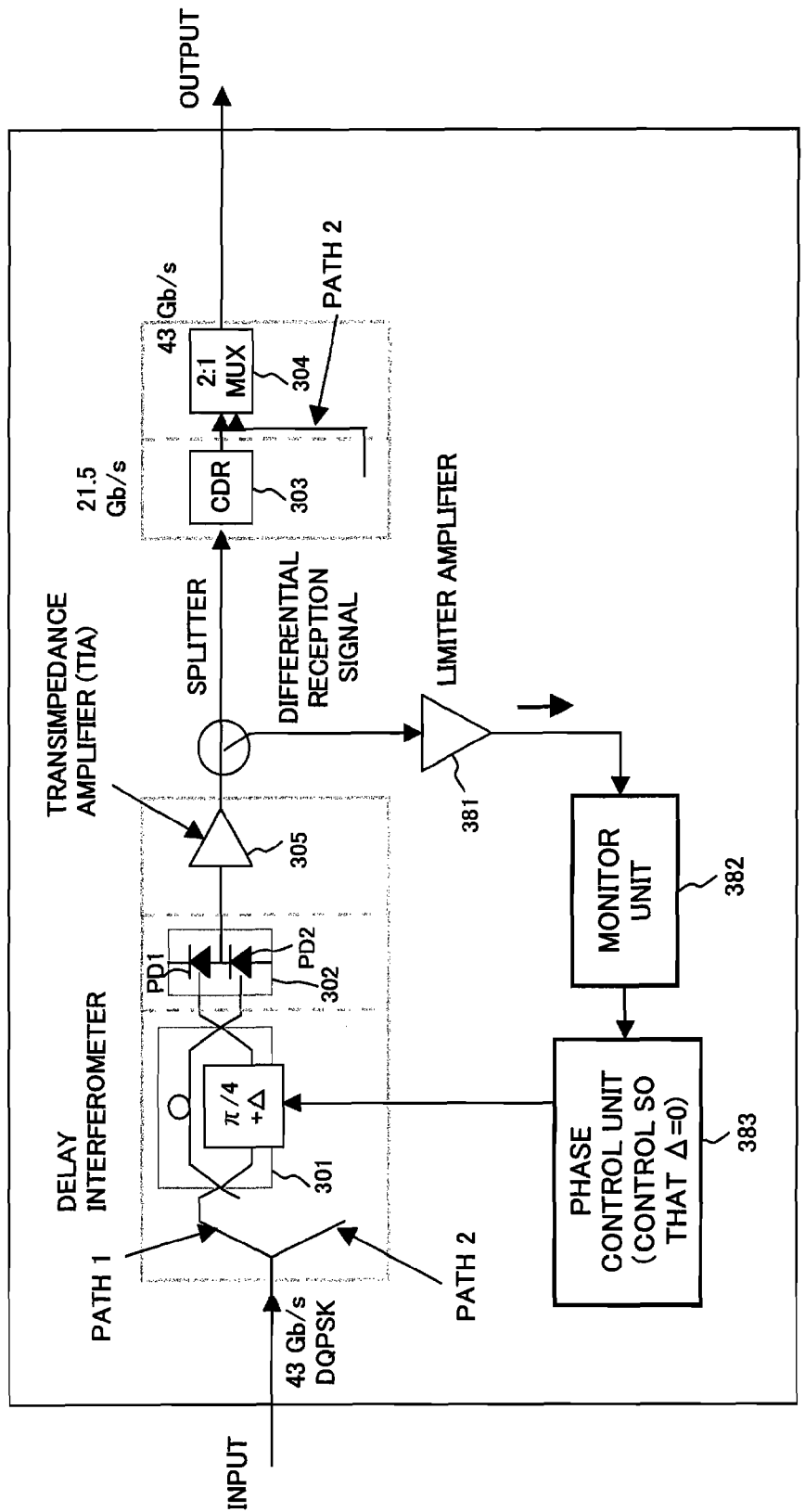
FIG. 80 is a diagram showing a configuration of the optical receiving apparatus of the ninth embodiment.

FIG. 80 is a diagram describing a configuration of the ninth embodiment. A basic configuration of the optical receiving apparatus of the ninth embodiment is the same as that of the first embodiment shown in FIG. 55. However, in the ninth embodiment, a limiter amplifier 381, a monitor unit 382, and a phase control unit 383 are comprised instead of the squaring circuit 311, the filter 312, the monitor unit 313, and the phase control circuit 314 of the first embodiment.

The limiter amplifier 381 amplifies the current signal generated by the photodetector circuit 302. The current signal output from the photodetector circuit 302 is, in this embodiment, provided to the limiter amplifier 381 after converted into a voltage signal by the TIA 305. The saturation characteristics of the limiter amplifier 381 are explained later. The monitor unit 382 monitors the average power of the output signal of the limiter amplifier 381. The phase control unit 383 adjusts the amount of phase shift of the phase shift unit of the delay interferometer 301 based on the output of the monitor unit 382.

Figure 81A:
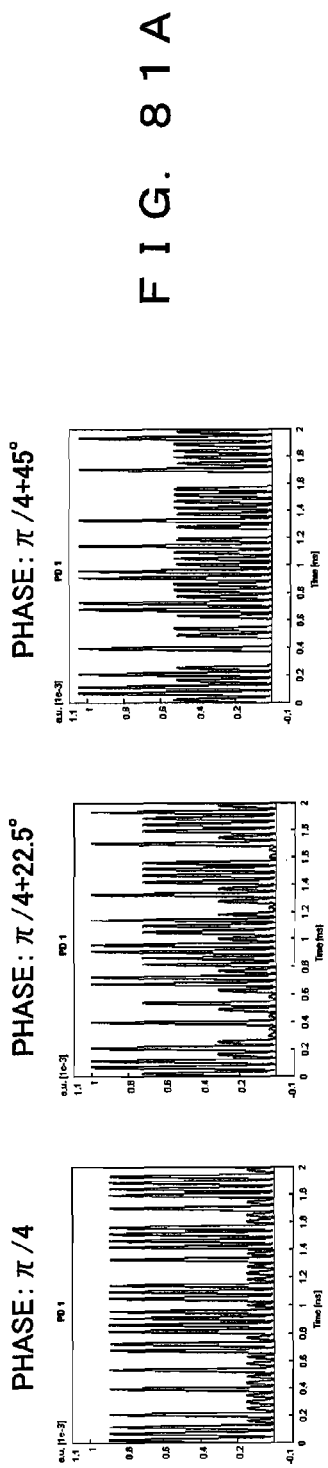
FIG. 81A through FIG. 81C are diagrams showing the waveforms of the output current of the photodetector.
Figure 81B:
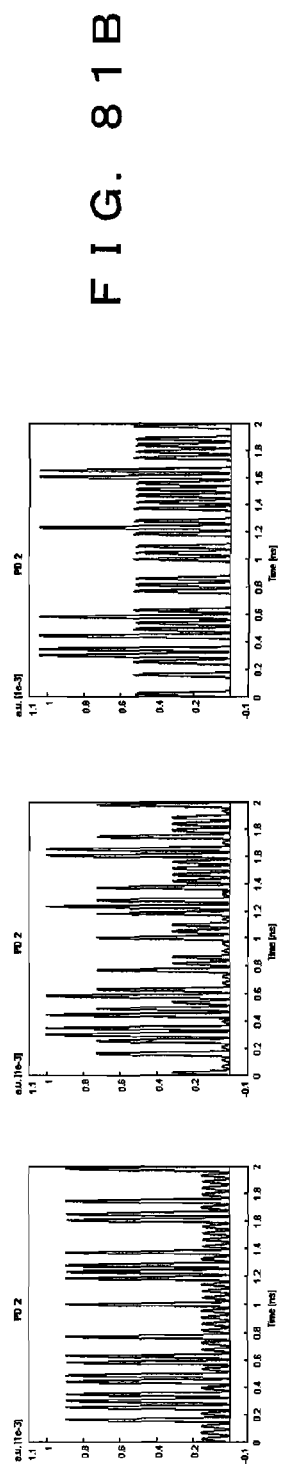
Figure 81C:
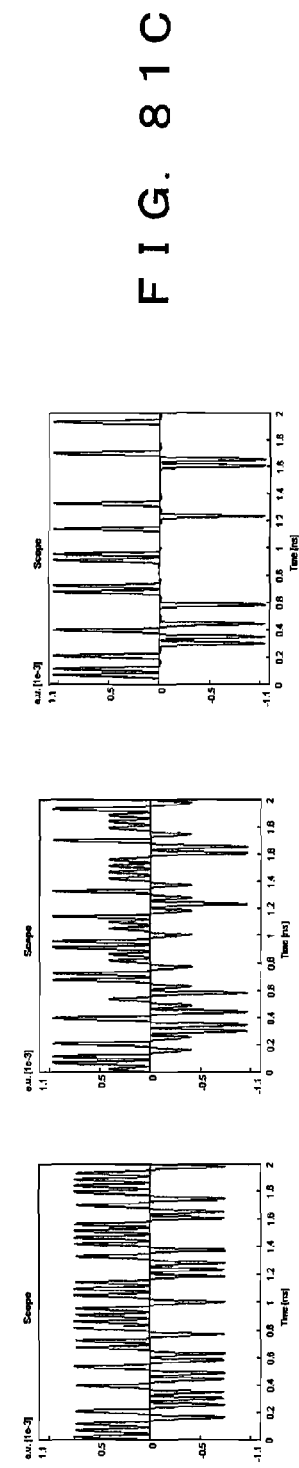

FIG. 81A through FIG. 81C are diagrams showing the waveforms of the output current of the photodetector circuit 302. FIG. 81A is a waveform of the output current of the photodiode PD1, FIG. 81B is a waveform of the output current of the photodiode PD2, and FIG. 81C is a waveform of the differential output current of the photodetector circuit 302 (i.e. the difference between the output currents of the photodiodes PD1 and PD2). These waveforms are converted and indicated in voltage.

As shown in FIG. 81A through FIG. 81C, the maximum peak current changes in accordance with the amount of phase shift of the phase shift unit of the delay interferometer 301. Specifically, the maximum peak current is the smallest when the amount of phase shift of the phase shift unit of the delay interferometer 301 is "π/4". As the amount of phase shift deviates from "π/4", the maximum peak current becomes larger. For example, the amplitude of the differential output current is, as shown in FIG. 81C, approximately 1.5 mV when "π/4", it is approximately 2.0 mV when "π/4+22.5 degrees", and it is approximately 2.4 mV when "π/4+45 degrees". The average value of the output current of the photodetector circuit 302 is constant regardless of the amount of phase shift of the phase shift unit.

Figure 82A:
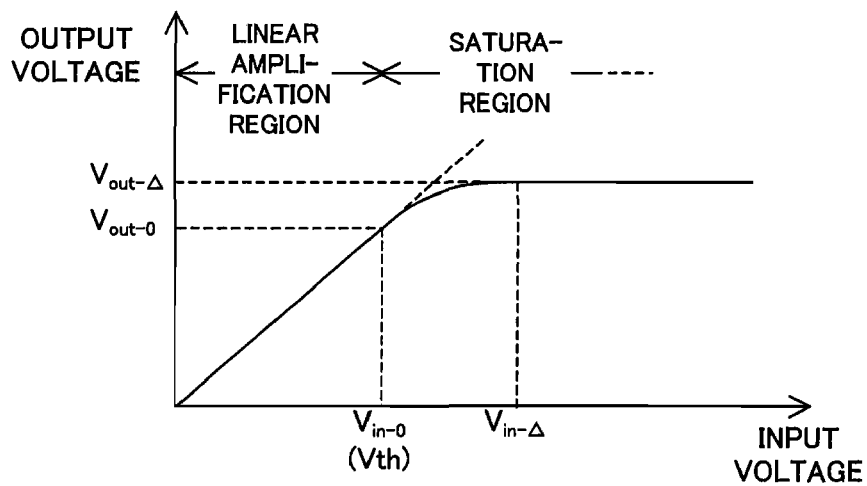
FIG. 82A through FIG. 82C are diagrams explaining the operation of the limiter amplifier.
Figure 82B:
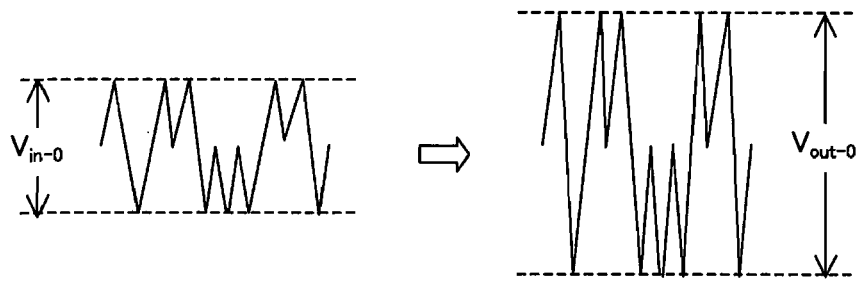
Figure 82C:
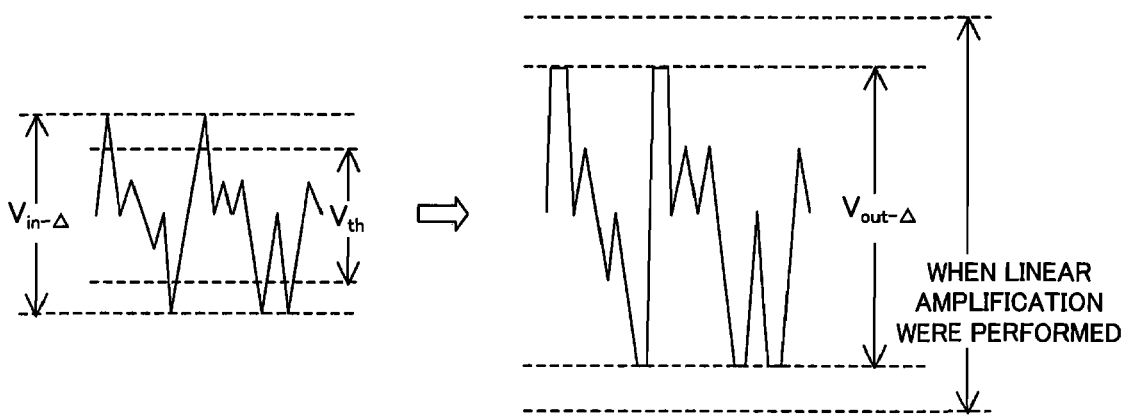

FIG. 82A-FIG. 82C are diagrams explaining the operation of the limiter amplifier 381. "$V_{in\text{-}0}$" represents the maximum peak level of an input signal of the limiter amplifier 381 when the amount phase shift is "π/4", and "$V_{out\text{-}0}$" represents the output level of the limiter amplifier 381 when "$V_{in\text{-}0}$" is input. The "$V_{in\text{-}\Delta}$" represents the maximum peak level of the input signal of the limiter amplifier 381 when the amount of phase shift deviates from "π/4" by "Δ", and "$V_{out\text{-}\Delta}$" represents the output level of the limiter amplifier 381 when "$V_{in\text{-}\Delta}$" is input. In addition, the limiter amplifier 381, as shown in FIG. 82A, performs linear amplification of the input signal in a region where the input voltage is less than the threshold $V_{th}$, and its gain saturates in a region where the input voltage exceeds the threshold $V_{th}$.

In the optical receiving apparatus of the ninth embodiment, the maximum peak level of the input signal of the limiter amplifier 381, when the amount of phase shift of the phase shift unit is "π/4", is set so as to be equivalent or approximately equivalent to the "threshold $V_{th}$". By so doing, the input signal to the limiter amplifier 381 is entirely amplified, as shown in FIG. 82B, when the amount of phase shift of the phase shift unit is "π/4". On the other hand, when the amount of phase shift of the phase shift unit deviates from "π/4", the maximum peak level of the input signal of the limiter amplifier 381 exceeds the threshold $V_{th}$. Accordingly, since the components which exceeds the threshold $V_{th}$ belong to the saturation region of the limiter amplifier 381, as shown in FIG. 82C, the gain becomes smaller. In such a case, the amplitude of the output signal of the limiter amplifier 381 is limited compared with the case assuming the linear amplification is performed.

The average value of the output current of the photodetector circuit 302 is constant regardless of the amount of phase shift of the phase shift unit. Therefore, when the amplitude of the output signal of the limiter amplifier 381 is limited, the time average power of the output signal of the limiter amplifier 381 is reduced. In other words, when the amount of phase shift deviates from "π/4", the time average power of the output signal of the limiter amplifier 381 is reduced in accordance with the amount of deviation.

FIG. 83 is a diagram showing the time average power of the output signal of the limiter amplifier 381. As mentioned above, the amount of phase shift of the phase shift unit is "π/4 (deviation=0)", the linear amplification is performed on the entire input signal of the limiter amplifier 381. On the contrary, when the amount of phase shift deviates from "π/4", the amplitude of the output signal of the limiter amplifier 381 is limited by gain saturation. Therefore, the time average power of the output signal of the limiter amplifier 381 is, as shown in FIG. 83, maximized when the amount of phase shift is "π/4 (deviation=0)".

The phase control unit 383 adjusts the amount of phase shift of the phase shift unit of the delay interferometer 301 using the above characteristics. That is to say, the phase control unit 383 adjusts the amount of phase shift of the phase shift unit by the feedback control that maximizes the time average power (or average amplitude) of the output signal of the limiter amplifier 381. By so doing, the amount of phase shift is adjusted exactly to "π/4".

Figure 84:
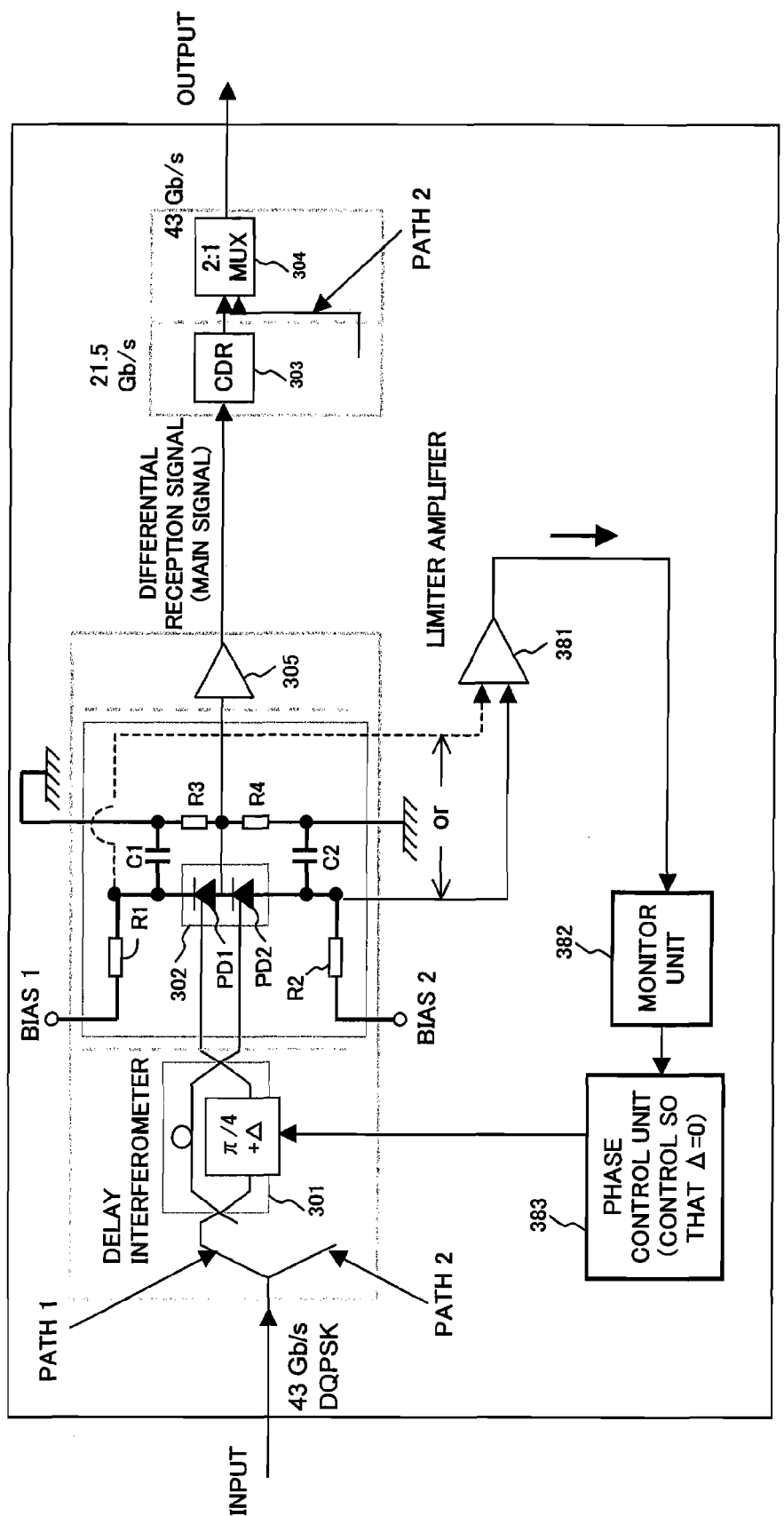
FIG. 84 through FIG. 86 are diagrams showing first through third modifications of optical receiving apparatus of the ninth embodiment, respectively.
Figure 85:
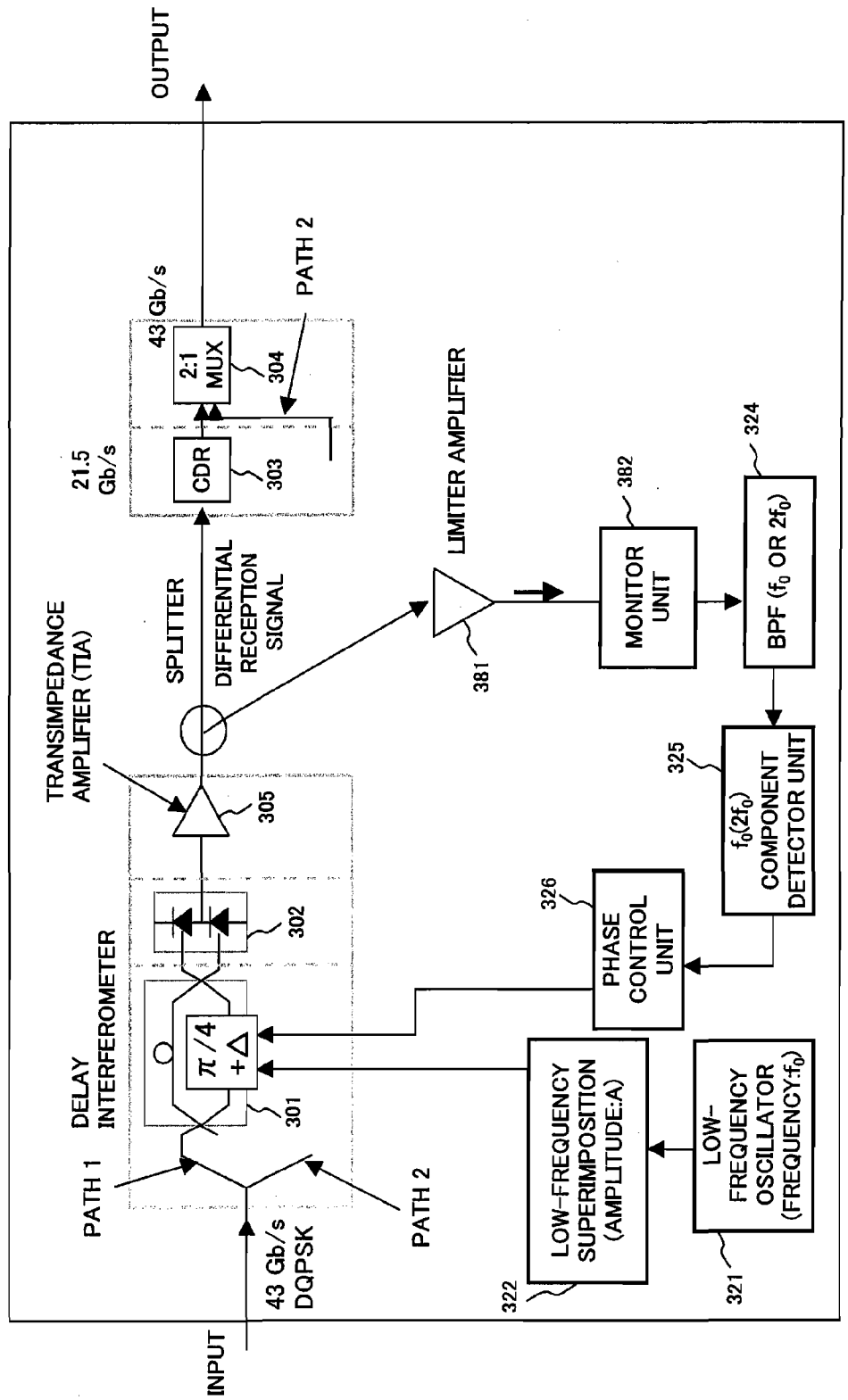
Figure 86:
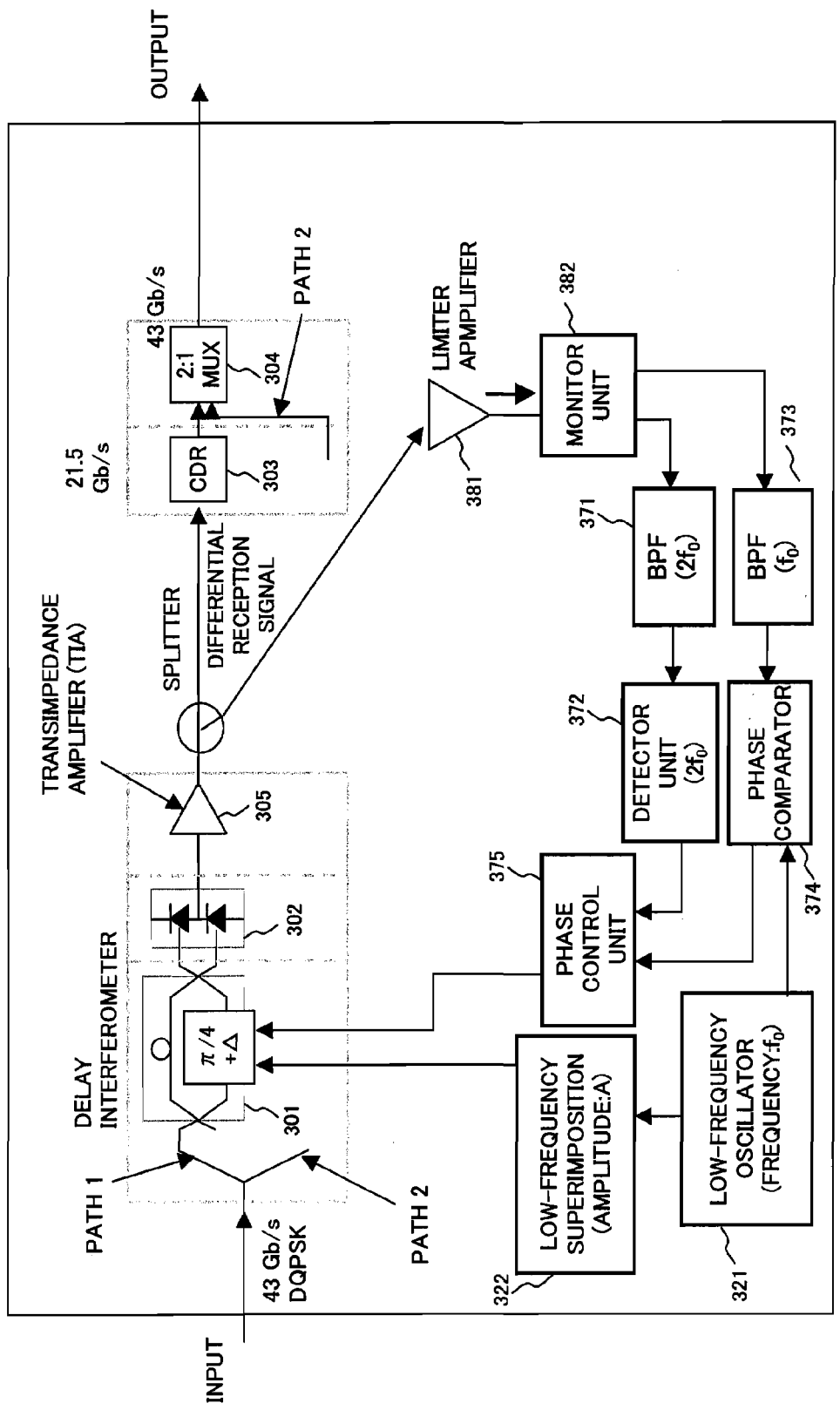

FIG. 84 through FIG. 86 are diagrams describing variations of optical receiving apparatus of the ninth embodiment. In the optical receiving apparatus shown in FIG. 84, the amount of phase shift is adjusted using the voltage across the load resistance R1 or R2. Practically, the voltage across the load resistance R1 or R2 is fed to the limiter amplifier 381. The phase control unit 383 adjusts the amount of phase shift of the phase shift unit so as to maximize the time average power of the output signal of the limiter amplifier 381 as explained with reference to FIG. 80. The operation for performing the feedback control using the voltage across the load resistance connected to the photodiode is the same as explained in the eighth embodiment.

In the optical receiving apparatus shown in FIG. 85, the amount of phase shift is adjusted using the low-frequency signal $f_0$. That is, the low-frequency signal generated by the low-frequency signal oscillator 321 is provided to the phase shift unit of the interferometer 301 via the low-frequency superimposing circuit 322. Here, the time average power of the output signal of the limiter amplifier 381 is, as shown in FIG. 83, maximized when the amount of phase shift of the phase shift unit is "π/4". Thus, when the amount of phase shift of the phase shift unit is "π/4", the $2f_0$ component appears in the output signal of the limiter amplifier 381. Therefore, when using the $f_0$ component, the time average power of the output signal of the limiter amplifier 381 is monitored, and the amount of phase shift is adjusted so as to minimize the $f_0$ component included in the average power signal. When using the $2f_0$ component, the time average power of the output signal of the limiter amplifier 381 is monitored, and the amount of phase shift is adjusted so as to maximize the $2f_0$ component included in the average power signal. The method for adjusting the amount of phase shift using the $f_0$ component or the $2f_0$ component is the same as explained with reference to FIG. 62A through FIG. 62C, or FIG. 73A through FIG. 73C.

In the optical receiving apparatus shown in FIG. 86, like the optical receiving apparatus shown in FIG. 85, the amount of phase shift is adjusted using the low-frequency signal. However, in this optical receiving apparatus, both of the $f_0$ component and the $2f_0$ component are used. Practically, the phase control unit 375 adjusts the amount of phase shift of the phase shift unit of the delay interferometer 301 so as to maximize the $2f_0$ component obtained by the detector 372. At that time, the phase control unit 375, in adjusting the amount of phase shift using the $2f_0$ component, recognizes whether the amount of phase shift should be increased or decreased based on the phase of the $f_0$ component signal. The method for adjusting the amount of phase shift using both of the $f_0$ component and the $2f_0$ component is the same as explained with reference to FIG. 79.

In the configuration shown in FIG. 85 or FIG. 86, the voltage across the load resistance R1 or R2 connected to the photodetector circuit 302 may be provided instead of the output signal of the TIA 305.

The above embodiment has a configuration in which signal components exceeding the threshold $V_{th}$ is cut using the saturation characteristics of the limiter amplifier 381; however, the present invention is not limited to the configuration. In other words, the ninth embodiment of the present invention includes a configuration comprising a limiter circuit, in which an amplitude of the output signal of the photodetector circuit 302 when the amount of phase shift is "π/4" is equivalent to the threshold, for limiting the output signal of the photodetector circuit 302 at the threshold level.

<<Variation of the Optical Transmitting Apparatus/Optical Receiving Apparatus>>

The amount of phase shift of the phase shift unit ("π/2" in the optical transmitting apparatus and "π/4" in the optical receiving apparatus) is, for example, adjusted by changing the refractive index of an optical waveguide. In such a case, the refractive index of the optical waveguide can be adjusted by changing the temperature of the optical waveguide by a thin film heater etc. provided near the optical waveguide, by adding stress to the optical waveguide by applying appropriate voltage using a piezoelectric element, or by induction of an electro-optical effect (Pockelse Effect) by applying voltage.

In the above embodiments, the phase shift unit may be provided to only one optical waveguide, or may be provided to both of a pair of the optical waveguide. In a latter case, a relative phase difference can be generated by applied voltage or temperature asymmetrically provided to the phase shift unit (electrodes, thin film heater, piezoelectric element and so on) configured in a pair of optical waveguides.

In the above embodiment, the explanation is mainly on the DQPSK modulation; however, the control of the present invention can be applied to the QPSK modulation without any modification. The present invention may also be applied to $2^n$PSK ($n \geq 3$) or the QAM. However, when the present invention is applied to these modulations, a multi-value data of 4 values or more, for example, should be employed as a data signal input to the data modulation unit.

When a LN (LiNbO$_3$) modulator is used as a modulator, because the LN modulator has a polarization dependency, it is desirable to use a polarization maintaining optical fiber for connection between an optical source and the modulator or between the modulators. It is favorable that the configuration using the polarization maintaining optical fiber is basically applied to all embodiments.

Although a limiter amplifier is used in the optical receiving apparatus in the embodiments, an element with a limiter function may be used instead of a limiter amplifier. In amplifying the output signal of the limiter element, an amplifier with lower speed than the limiter amplifier may be used.

What is claimed is:

1. An optical transmitting apparatus for transmitting an optical signal modulated corresponding to a data signal, comprising:
    a phase shifter to control a phase of at least one of a first optical signal and a second optical signal, acquired by splitting by an optical input, so that the first and the second optical signals have a predetermined phase difference on an optical waveguide;
    a data modulator to modulate the first and the second optical signals by using the data signal on the optical waveguide;
    a first generator to generate a first low-frequency signal;
    a second generator to generate a second low-frequency signal from the first low-frequency signal;
    a superimposer to superimpose the first and second low-frequency signals on the first and the second optical signals, respectively;
    a monitor to monitor at least one of maximum power, minimum power and phase of the low-frequency signal or a higher harmonic signal of the low-frequency signal, superimposed on a modulated optical signal acquired by coupling the first and second optical signals modulated by the data modulator; and
    a controller to control the phase shift unit using an output of the monitor unit by maximizing a frequency component with a same frequency as the low-frequency signal or minimizing a frequency component with a double frequency of the low-frequency signal.

2. An optical communication system, comprising:
    the optical transmitting apparatus according to claim 1; and
    an optical receiving apparatus receiving an optical signal transmitted from the optical transmitting apparatus.

3. The system of claim 2, wherein the optical receiving apparatus comprises:
    an interferometer comprising a first arm for delaying first split light of optical input by a symbol time period and a second arm for shifting a phase of the second split light of the optical input by a prescribed amount;
    a photodetector circuit for converting an optical signal output from the interferometer into an electrical signal;
    a calculation circuit for generating a squared signal or an absolute value signal of the electrical signal;
    a filter, connected to the calculation circuit, for transmitting at least a part of frequency component except for the frequency, which is a integral multiple of a symbol frequency; and
    a control unit for controlling the amount of the phase shift in the second arm based on the output from the filter.

4. The system according to claim 3, wherein
    the photodetector circuit comprises a photodiode for generating current corresponding to an optical signal output from the interferometer and a converter for converting the current generated by the photodiode into a voltage signal, and wherein
    the calculation circuit generates a squared signal or an absolute value signal of an electrical signal output from the converter.

5. The system according to claim 3, wherein
    the photodetector circuit comprises a photodiode for generating current corresponding to an optical signal output from the interferometer, a first converter for converting a first part of the current generated by the photodiode into a voltage signal, and a second converter for converting a second part of the current generated by the photodiode into a voltage signal, and wherein
    transmission data is recovered from an output signal of the first converter, and wherein
    the calculation circuit generates a squared signal or an absolute value signal of an electrical signal output from the second converter.

6. The system according to claim 3, wherein
    the photodetector circuit comprises a photodiode for generating current corresponding to an optical signal output from the interferometer and a load resistance connected to the photodiode, and
    the calculation circuit generates a squared signal or an absolute value signal of an electrical signal obtained as voltage across the load resistance.

7. The system according to claim 3, wherein
    the photodetector circuit comprises a pair of photodiodes for generating current corresponding to a pair of optical signals from the interferometer and a pair of load resistances connected to each of the pair of the photodiodes, and
    the calculation circuit generates a squared signal or an absolute value signal of an electrical signal obtained as voltage across either one of the pair of the load resistances.

8. The system according to claim 2, wherein the optical receiving apparatus comprises:
    an interferometer comprising a first arm for delaying first split light of optical input by a symbol time period and a second arm for shifting a phase of the second split light of the optical input by a prescribed amount;
    a low-frequency signal generator unit for providing a low-frequency signal to the second arm;
    a photodetector circuit for converting an optical signal output from the interferometer into an electrical signal; and
    a control unit for controlling the amount of the phase shift in the second arm based on at least one of the phase or the power of the low-frequency signal or a higher harmonic signal of the low-frequency signal extracted from the electrical signal.

9. The system according to claim 2, wherein the optical receiving apparatus comprises:
    an interferometer comprising a first arm for delaying first split light of optical input by a symbol time period and a second arm for shifting a phase of the second split light of the optical input by a prescribed amount;
    a photodetector circuit for converting an optical signal output from the interferometer into an electrical signal;

a sampling unit for sampling the electrical signal in a period of a symbol period or an integral multiple of the symbol period; and a control unit for controlling the amount of the phase shift in the second arm based on distribution of sampling values acquired by the sampling unit.

10. The system according to claim 2, wherein the optical receiving apparatus comprises:

an interferometer comprising a first arm for delaying first split beam of an optical input by a symbol time and a second arm for shifting a phase of a second split beam of the optical input by a prescribed amount;

a photodetector circuit for converting an optical signal output from the interferometer into an electrical signal;

a limiter circuit, when an amplitude of the electrical signal exceeds a threshold level, for limiting an amplitude of the electrical signal; and a control unit for controlling an amount of phase shift of the second arm according to an average power of an output signal of the limiter circuit.

11. The system according to claim 10, wherein the limiter circuit is an amplifier for performing linear amplification when an amplitude of an input signal is less than the threshold level, and a gain of the amplifier is saturated when the amplitude of the input signal exceeds the threshold level, and wherein the threshold level of the amplifier matches or approximately matches an amplitude of an output signal of the photodetector circuit when the amount of phase shift is adjusted at an optimal value.

12. The system according to claim 2, wherein the optical receiving apparatus comprises:

an interferometer comprising a first arm for transmitting first split light of an optical input and a second arm for delaying second split light of the optical input by one bit;

a photodetector circuit for converting an optical signal output from the interferometer into an electrical signal;

a calculation circuit for generating a squared signal or an absolute value signal of the electrical signal; and a control unit for controlling delay time in the second arm based on the output of the calculation circuit.

13. The system according to claim 2, wherein the optical receiving apparatus comprises:

an interferometer comprising a first arm for transmitting first split light of an optical input and a second arm for delaying second split light of the optical input by one bit;

a low-frequency signal generator unit for providing a low-frequency signal to the second arm;

a photodetector circuit for converting an optical signal output from the interferometer into an electrical signal; and a control unit for controlling delay time in the second arm based on power of the low-frequency signal or a higher harmonic signal of the low-frequency signal extracted from the electrical signal.

14. The optical transmitting apparatus according to claim 1, wherein a phase of the second low-frequency signal is different by a predetermined value from a phase of the first low-frequency signal.

15. The optical transmitting apparatus according to claim 14, wherein the phase of the first low-frequency signal and the phase of the second low-frequency signal are shifted to each other by $n\pi/2$ where n is a natural number other than 0 and a multiple of 4.

16. An optical transmitting apparatus comprising a phase modulator and a driving signal generator to drive the phase modulator, wherein the phase modulator comprises a phase shift unit which provides a proper phase difference between a pair of split optical signals on an optical waveguide, a data modulator which performs a phase modulation of the optical signals on the split optical waveguide and an electrode for superimposing a low-frequency signal, and wherein said optical transmitting apparatus further comprises:

a low-frequency signal superimposer to generate low-frequency signals with a proper phase difference and to provide the low-frequency signals to the electrode on the split optical waveguide;

a monitor to monitor at least one of maximum power, minimum power and phase of a low-frequency signal or a higher harmonic signal of the low-frequency signal superimposed on the optical signal after coupling of the split optical waveguide; and a phase difference controller to control the phase shift unit so as to obtain a proper phase difference using the output of the monitor unit by maximizing a frequency component with a same frequency as the low-frequency signal or minimizing a frequency component with a double frequency of the low-frequency signal.

17. The optical transmitting apparatus according to claim 16, wherein the phase shift unit is configured in a former stage or a later stage of the data modulation unit.

18. The optical transmitting apparatus according to claim 16, wherein the monitor comprises a synchronous detector to extract and to synchronously detect a signal with twice of the frequency of the low-frequency signal from a photodetector or a peak power detector to extract a signal with the same frequency as the low-frequency signal from the photodetector to detect peak power.

19. The optical transmitting apparatus according to claim 18, wherein the monitor comprises the synchronous detector and the peak power detector.

20. The optical transmitting apparatus according to the claim 16, wherein the low-frequency signal superimposer comprises a phase shifter and the phase shifter adjusts the phase difference between the low-frequency signals at $n\pi/2$ where n is a natural number other than 0 and multiples of 4.

21. An optical transmitting apparatus comprising a phase modulator and a driving signal generator to drive the phase modulator, wherein the phase modulator comprises a phase shifter which provides a proper phase difference between a pair of split optical signals on an optical waveguide, a data modulator with a data input unit on the split optical waveguide and an electrode, provided on a different optical waveguide from the optical waveguide where the phase shifter is configured, for superimposing a low-frequency signal, and wherein said optical transmitting apparatus further comprises:

a low-frequency signal superimposer to generate low-frequency signals with a proper phase difference and to provide the low-frequency signals to the electrode and on a bias input terminal of the phase shift unit;

a monitor to monitor at least one of maximum power, minimum power and phase of a low-frequency signal or a higher harmonic signal of the low-frequency signal superimposed on the optical signal after coupling of the split optical waveguide; and a phase difference controller to control the phase shift unit so as to obtain a proper phase difference using the output of the monitor unit by maximizing a frequency component with a same frequency as the low-frequency signal or minimizing a frequency component with a double frequency of the low-frequency signal.

22. The optical transmitting apparatus according to claim 21, wherein the phase shifter is configured in a former stage or a later stage of the data modulator.

23. An optical transmitting apparatus comprising a phase modulator and a driving signal generator to drive the phase modulator, wherein
the phase modulator comprises a phase shifter which provides a proper phase difference between a pair of split optical signals on an optical waveguide and data modulator with a data input unit on a split optical waveguide, and wherein
said optical transmitting apparatus further comprises:
a low-frequency signal superimposer to generate low-frequency signals with a proper phase difference and to provide the low-frequency signal to the data input unit of the data modulator;
a monitor to monitor at least one of maximum power, minimum power and phase of a low-frequency signal or a higher harmonic signal of the low-frequency signal superimposed on the optical signal after coupling of the split optical waveguide; and
a phase difference controller to control the phase shift unit so as to obtain a proper phase difference using the output of the monitor unit by maximizing a frequency component with a same frequency as the low-frequency signal or minimizing a frequency component with a double frequency of the low-frequency signal.

24. The optical transmitting apparatus according to claim 23, wherein the phase shifter is configured in a former stage or in a later stage of the data modulator.

25. The optical transmitting apparatus according to claim 23, wherein the monitor comprises synchronous detector to extract and synchronously detecting a signal component with a frequency twice of the low-frequency signal from a photodetector.

26. An optical transmitting apparatus comprising a phase modulator and a driving signal generator to drive the phase modulator, wherein
the phase modulator comprises a phase shifter which provides a proper phase difference between a pair of split optical signals on an optical waveguide and data modulator with a data input unit and a bias input unit on a split optical waveguide, and wherein
said optical transmitting apparatus further comprises:
a low-frequency signal superimposer to generate low-frequency signals with a proper phase difference and to provide the low-frequency signal to the bias input unit of the data modulator;
a monitor to monitor at least one of maximum power, minimum power and phase of a low-frequency signal or a higher harmonic signal of the low-frequency signal superimposed on the optical signal after coupling of the split optical waveguide; and
a phase difference controller to control the phase shifter so as to obtain a proper phase difference using the output of the monitor by maximizing a frequency component with a same frequency as the low-frequency signal or minimizing a frequency component with a double frequency of the low-frequency signal.

27. An optical transmitting apparatus comprising a phase modulator and a driving signal generator to drive the phase modulator, wherein
the phase modulator comprises a phase shifter which provides a proper phase difference between a pair of split optical signals on an optical waveguide, a data modulator with a data input unit on a split optical waveguide, and an electrode, which is configured in a former stage of the data modulator, to superimpose a low-frequency signal, and wherein
said optical transmitting apparatus further comprises:
a low-frequency signal superimposer to generate low-frequency signals with a proper phase difference and to provide the low-frequency signals to the electrode;
a monitor to monitor at least one of maximum power, minimum power and phase of a low-frequency signal or a higher harmonic signal of the low-frequency signal superimposed on the optical signal after coupling of the split optical waveguide; and
a phase difference controller to control the phase shift unit so as to obtain a proper phase difference using the output of the monitor unit by maximizing a frequency component with a same frequency as the low-frequency signal or minimizing a frequency component with a double frequency of the low-frequency signal.

28. The optical transmitting apparatus according to claim 27, wherein the phase shifter is configured in a former stage of the electrode or a later stage of the data modulator.

29. The optical transmitting apparatus according to claim 27, wherein the monitor comprises a synchronous detector to extract and to synchronously detect a signal with twice of the frequency of the low-frequency signal from a photodetector or a peak power detector to extract a signal with the same frequency as the low-frequency signal from the photodetector to detect peak power.

30. An optical transmitting apparatus comprising a phase modulator and a driving signal generator to drive the phase modulator, wherein
the phase modulator comprises a phase shifter which provides a proper phase difference between a pair of split optical signals on an optical waveguide, a data modulator with a data input unit on a split optical waveguide, and an electrode, which is configured in a former stage or later stage of the data modulator to superimpose a low-frequency signal, and wherein
said optical transmitting apparatus further comprises:
a low-frequency signal superimposer to generate a low-frequency signal and to provide the low-frequency signal to the electrode configured in an optical waveguide, which is the same as the optical waveguide where the phase shifter or a bias input terminal of the phase shifter is configured or on the electrode configured on an optical waveguide, which is different from the optical waveguide where the phase shifter is configured;
a monitor to monitor at least one of maximum power, minimum power and phase of a low-frequency signal or a higher harmonic signal of the low-frequency signal superimposed on the optical signal after coupling of the split optical waveguide; and
a phase difference controller to control the phase shifter so as to obtain a proper phase difference using the output of the monitor by minimizing a frequency component with a double frequency of the low-frequency signal.

31. An optical transmitting apparatus comprising a phase modulator, a driving signal generator to drive the phase modulator and an intensity modulator for modulating an optical output signal from the phase modulator, wherein
the phase modulator comprises a phase shifter which provides a proper phase difference between a pair of split optical signals on an optical waveguide, a data modulator with a data input unit on a split optical waveguide, and an electrode, which is configured in a later stage of the data modulation unit, to superimpose a low-frequency signal, and wherein said optical transmitting apparatus further comprises:

a monitor to monitor any of the maximum power of the low-frequency signal, the minimum power of a higher harmonic signal with a frequency of twice of the frequency of the low-frequency signal, or the phase of the higher harmonic signal, by extracting the low-frequency signal after coupling of the split optical waveguide;

a phase shifter controller to provide the low-frequency signals with a proper phase difference to the electrode and to control the phase shifter by bias control so that the proper phase difference can be obtained based on the output from the monitor;

first and second automatic bias controllers to add the low-frequency signals on each arm of the data modulation unit and to control the data modulator by bias control based on the output of the monitor;

a third automatic bias controller to add the low-frequency signal on the intensity modulator and to control the intensity modulator by bias control based on the output from the monitor; and a switch controller comprising a switch to perform the controls in the monitoring in the monitor, the phase shifter controller and the first through the third automatic controller by time division.

32. An optical transmitting apparatus comprising a phase modulator, a driving signal generator to drive the phase modulator and an intensity modulator for modulating an optical output signal from the phase modulator, wherein the phase modulator comprises a phase shifter which provides a proper phase difference between a pair of split optical signals on an optical waveguide, a data modulator with a data inputter on a split optical waveguide, and an electrode, which is configured in a later stage of the data modulator, to superimpose a low-frequency signal, and wherein said optical transmitting apparatus further comprises:

a monitor to monitor at least one of maximum power, minimum power and phase of a low-frequency signal or a higher harmonic signal of the low-frequency signal superimposed on the optical signal after coupling of the split optical waveguide;

a phase shifter controller to add a first low-frequency signals with a proper phase difference to the electrode, and to control the phase shifter by bias control so as to obtain a proper phase difference based on the output from the monitor;

first and second automatic bias controllers to add second and third low-frequency signals on each arm of the data modulator and to control the data modulator by bias control based on the output from the monitor;

a third automatic bias controller to add a fourth low-frequency signal on the intensity modulator and to control the intensity modulator by bias control based on the output from the monitor; and a collective controller to cause controls in the monitor operation in the monitor, the phase shifter controller , and the first through third automatic bias controllers in parallel.

33. An optical transmitting apparatus comprising a phase modulator to perform phase modulation according to input data signal, an intensity modulator to perform intensity modulation on an optical output signal from the phase modulator, and a driving signal generator to drive the phase modulator and the intensity modulator, comprising:

a monitor to monitor at least one of maximum power, minimum power and phase of a low-frequency signal or a higher harmonic signal of the low-frequency signal superimposed on the optical signal after coupling of the split optical waveguide;

an automatic bias controller to add a low-frequency signal on the phase modulator and the intensity modulator and to control the phase modulator and the intensity modulator by bias control using the output from the monitor; and a controller to cause the bias control in the monitor operation of the monitor unit and the automatic bias control unit by time division.

34. An optical transmitting apparatus for transmitting an optical signal modulated corresponding to a data signal, comprising:

a phase shifter to control a phase of at least one of a first optical signal and a second optical signal, acquired by splitting an optical input, so that the first and the second optical signals have a predetermined phase difference on an optical waveguide;

a data modulator to modulate the phases of the first and the second optical signals by using the data signal on the optical waveguide;

a monitor to monitor average optical power of a modulated optical signal acquired by coupling the first and the second optical signals modulated by the data modulator; and a controller to control the phase shifter using an output of the monitor, wherein the data modulator is a Mach-Zehnder modulator and comprises a phase adder to add a prescribed phase to a phase determined according to the data signal, and the phase adder is realized by providing a phase modulation region to form an electrode for applying voltage to one waveguide of the Mach-Zehnder modulator so that the electrode reaches the coupled waveguide in the output side of the Mach-Zehnder modulator.

35. An optical transmitting apparatus for transmitting an optical signal modulated corresponding to a data signal, comprising:

a phase shifter to control a phase of at least one of a first optical signal and a second optical signal, acquired by splitting an optical input, so that the first and the second optical signals have a predetermined phase difference on an optical waveguide;

a data modulator to modulate the phases of the first and the second optical signals by using the data signal on the optical waveguide;

a monitor to monitor average optical power of a modulated optical signal acquired by coupling the first and the second optical signals modulated by the data modulator; and a controller to control the phase shifter based on an output of the monitor, wherein the data modulator is a Mach-Zehnder modulator and comprises a phase adder to add a prescribed phase to a phase determined according to the data signal, and the phase adder is an attenuation element for causing difference in amplitudes of a pair of data signals provided for the Mach-Zehnder modulator from each other.

36. An optical transmitting apparatus for transmitting an optical signal modulated corresponding to a data signal, comprising:

a phase shifter to control a phase of at least one of a first optical signal and a second optical signal, acquired by splitting an optical input, so that the first and the second optical signals have a predetermined phase difference on an optical waveguide;

a data modulator to modulate the phases of the first and the second optical signals by using the data signal on the optical waveguide;

a monitor to monitor average optical power of a modulated optical signal acquired by coupling the first and the second optical signals modulated by the data modulator; and a controller to control the phase shifter based on an output of the monitor, wherein the data modulator is a Mach-Zehnder modulator and comprises a phase adder to add a prescribed phase to a phase determined according to the data signal, and the phase adder is a delay element to cause difference in timings of a pair of data signals provided for the Mach-Zehnder modulator from each other.

37. An optical transmitting apparatus for transmitting an optical signal modulated corresponding to a data signal, comprising:

a mark rate unbalancer to unbalance mark rate of the data signal in such a way that an appearance rate of each symbol value becomes unbalanced;

a phase shifter to control a phase of at least one of a first optical signal and a second optical signal, acquired by splitting an optical input, so that the first and the second optical signals have a predetermined phase difference on an optical waveguide;

a data modulator to modulate the phase of the first and the second optical signals by using a data signal with its mark rate adjusted on the optical waveguide;

a monitor to monitor average optical power of a modulated optical signal acquired by coupling the first and the second optical signals modulated by the data modulator; and a controller to control the phase shifter based on the output of the monitor.

* * * * *

UNITED STATES PATENT AND TRADEMARK OFFICE
CERTIFICATE OF CORRECTION

PATENT NO. : 7,817,923 B2
APPLICATION NO. : 11/275420
DATED : October 19, 2010
INVENTOR(S) : Yuichi Akiyama et al.

Page 1 of 2

It is certified that error appears in the above-identified patent and that said Letters Patent is hereby corrected as shown below:

Column 55, Line 65, In Claim 15, after "shifted" insert --relative--.

Column 58, Line 41, In Claim 30, after "modulator" insert --,--.

Column 60, Line 16-40 (Approx.), In Claim 34, delete "34. An optical transmitting apparatus for transmitting an optical signal modulated corresponding to a data signal, comprising:
a phase shifter to control a phase of at least one of a first optical signal and a second optical signal, acquired by splitting an optical input, so that the first and the second optical signals have a predetermined phase difference on an optical waveguide;
a data modulator to modulate the phases of the first and the second optical signals by using the data signal on the optical waveguide;
a monitor to monitor average optical power of a modulated optical signal acquired by coupling the first and the second optical signals modulated by the data modulator; and
a controller to control the phase shifter using an output of the monitor, wherein the data modulator is a Mach-Zehnder modulator and comprises a phase adder to add a prescribed phase to a phase determined according to the data signal, and
the phase adder is realized by providing a phase modulation region to form an electrode for applying voltage to one waveguide of the Mach-Zehnder modulator so that the electrode reaches the coupled waveguide in the output side of the Mach-Zehnder modulator."
and insert --34. An optical transmitting apparatus for transmitting an optical signal modulated corresponding to a data signal, comprising:
a phase shifter to control a phase of at least one of a first optical signal and a second optical signal, acquired by splitting an optical input, so that the first and the second optical signals have a predetermined phase difference on an optical waveguide;
a data modulator to modulate the phases of the first and the second optical signals by using the data signal on the optical waveguide;
a monitor to monitor average optical power of a modulated optical signal acquired by coupling the first and the second optical signals modulated by the data modulator; and
a controller to control the phase shifter using an output of the monitor,

Signed and Sealed this
Fourteenth Day of August, 2012

David J. Kappos
*Director of the United States Patent and Trademark Office* wherein the data modulator is a Mach-Zehnder modulator and comprises a phase adder to add a prescribed phase to a phase determined according to the data signal, and
the phase adder is realized by providing a phase modulation region to form an electrode for applying voltage to one waveguide of the Mach-Zehnder modulator so that the electrode reaches the coupled waveguide in the output side of the Mach-Zehnder modulator.--, therefor.